(12) United States Patent
Shoji et al.

(10) Patent No.: US 10,952,089 B2
(45) Date of Patent: Mar. 16, 2021

(54) COMMUNICATION SYSTEM

(71) Applicant: Mitsubishi Electric Corporation, Chiyoda-ku (JP)

(72) Inventors: Hiroyuki Shoji, Tokyo (JP); Toshiki Tanaka, Tokyo (JP); Mitsuru Mochizuki, Tokyo (JP); Kuniyuki Suzuki, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/097,901

(22) PCT Filed: May 8, 2017

(86) PCT No.: PCT/JP2017/017367
§ 371 (c)(1),
(2) Date: Oct. 31, 2018

(87) PCT Pub. No.: WO2017/195724
PCT Pub. Date: Nov. 16, 2017

(65) Prior Publication Data
US 2019/0150011 A1    May 16, 2019

(30) Foreign Application Priority Data

May 11, 2016 (JP) .............................. JP2016-095467
Sep. 20, 2016 (JP) .............................. JP2016-182987

(51) Int. Cl.
*H04W 24/10* (2009.01)
*H04W 16/28* (2009.01)
(Continued)

(52) U.S. Cl.
CPC .............. *H04W 24/10* (2013.01); *H04B 7/04* (2013.01); *H04B 7/0452* (2013.01);
(Continued)

(58) Field of Classification Search
CPC ..... H04W 24/10; H04W 76/27; H04W 16/28; H04W 74/0833; H04W 92/20;
(Continued)

(56) References Cited

U.S. PATENT DOCUMENTS

2010/0304682 A1   12/2010  Choi et al.
2014/0112184 A1*   4/2014  Chai ................... H04L 41/0853
                                                              370/252
(Continued)

FOREIGN PATENT DOCUMENTS

CN      102882612     1/2013
CN      103024751     4/2013
(Continued)

OTHER PUBLICATIONS

International Search Report dated Jul. 25, 2017 in PCT/JP2017/017367 filed on May 8, 2017.
(Continued)

*Primary Examiner* — Melvin C Marcelo
(74) *Attorney, Agent, or Firm* — Oblon, McClelland, Maier & Neustadt, L.L.P.

(57) ABSTRACT

Provided is a communication system capable of suppressing, under communication environment including a plurality of cells, degradation in communication quality and decrease in communication rate and communication capacity due to interference from the other cells. Each of the cells includes a plurality of antenna elements, and performs radio communication with a communication terminal device through the antenna elements. Each of the cells notifies the other cells of settings for measuring channel information on a channel for performing radio communication of its own cell. Each of the cells may notify a communication terminal device being served thereby of the settings for measuring the channel information of its own cell. Here, the communica-
(Continued)

tion terminal device measures the channel information based on the settings notified from each of the cells, and reports a result of the measured channel information to a corresponding one of the cells when the result satisfies a predetermined reporting condition.

2 Claims, 71 Drawing Sheets

(51) Int. Cl.
H04W 92/20 (2009.01)
H04B 7/04 (2017.01)
H04B 17/336 (2015.01)
H04W 76/27 (2018.01)
H04B 7/0452 (2017.01)
H04B 7/06 (2006.01)
H04W 74/08 (2009.01)

(52) U.S. Cl.
CPC .......... H04B 7/0626 (2013.01); H04B 17/336 (2015.01); H04W 16/28 (2013.01); H04W 74/0833 (2013.01); H04W 76/27 (2018.02); H04W 92/20 (2013.01)

(58) Field of Classification Search
CPC ...... H04B 17/336; H04B 7/04; H04B 7/0452; H04B 7/0626
See application file for complete search history.

(56) References Cited

U.S. PATENT DOCUMENTS

| 2014/0204765 | A1 | 7/2014 | Chai et al. |
| 2014/0362720 | A1 | 12/2014 | Kim et al. |
| 2015/0131553 | A1 | 5/2015 | Centonza et al. |
| 2017/0033904 | A1* | 2/2017 | Stirling-Gallacher ............ H04L 5/0023 |
| 2017/0034808 | A1 | 2/2017 | Ouchi et al. |
| 2017/0055190 | A1 | 2/2017 | Takano |

FOREIGN PATENT DOCUMENTS

| JP | 2014-530551 A | 11/2014 |
| WO | WO 2015/043196 A1 | 4/2015 |
| WO | WO 2015/098880 A1 | 7/2015 |
| WO | WO 2015/162299 A1 | 12/2015 |

OTHER PUBLICATIONS

3GPP TS 36.300 V13.0.0 (Jun. 2015), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", Jun. 2015; 254 pages.
3GPP TSG-SA1 #42, S1-083461, "LS on HNB/HeNB Open Access Mode", Seoul, South Korea, Oct. 13-17, 2008, 2 pages.
3GPP TR 36.814 V9.0.0 (Mar. 2010), "3rd Generation Partnership Project; Technical Specification Group Radio Access Network; Evolved Universal Terrestrial Radio Access (E-UTRA); Further advancements for E-UTRA physical layer aspects (Release 9)", Mar. 2010, 104 pages.
3GPP TR 36.912 V10.0.0 (Mar. 2011), "3rd Generation Partnership Project; Technical Specification Group Radio Access Network; Feasibility study for Further Advancements for E-UTRA (LTE-Advanced) (Release 10)", Mar. 2011, 252 pages.
Popovski, P. et al., "Scenarios, requirements and KPIs for 5G mobile and wireless system", in Mobile and wireless communications Enablers for the Twenty-twenty Information Society (Project No. ICT-317669), Document No. ICT-317569-METIS/D1.1, Apr. 29, 2013, 84 pages, (https://www.metis2020.com/documents/deliverables/).
3GPP TS 36.211 V13.0.0 (Dec. 2015), "3rd Generation Partnership Project; Technical Specification Group Radio Access Network; Evolved Universal Terrestrial Radio Access (E-UTRA); Physical channels and modulation (Release 13)", Dec. 2015, 142 pages.
3GPP TR 36.897 V13.0.0 (Jun. 2015), "3rd Generation Partnership Project; Technical Specification Group Radio Access Network; Study on elevation beamforming / Full-Dimension (FD) Multiple input Multiple Output (MIMO) for LTE (Release 13)", Jun. 2015, 58 pages.
NTT DOCOMO, Inc, "Overall radio protocol and NW architecture for NR", R2-162573, 2016, 17 pages.
3GPP TR 36.842 V12.0.0 (Dec. 2013), "3rd Generation Partnership Project; Technical Specification Group Radio Access Network; Study on Small Cell enhancements for E-UTRA and E-UTRAN; Higher layer aspects (Release 12)", Dec. 2013, 71 pages.
Nokia et al., "Multi-connectivity considerations for New Radio"; 3GPP TSG-RAN WG2 Meeting #93bis, R2-162499, Dubrovnik, Croatia, Apr. 11-15, 2016, 3 pages.
"IMT Vision—Framework and overall objectives of the future development of IMT for 2020 and beyond", Recommendation ITU-R M.2083-0, ITU-R (Radiocommunication Sector of International Telecommunication Union (ITU)), Sep. 2015, 21 pages.
Huawei Technologies, "Vision on 5G Radio Access Technologies", 3GPP RAN workshop on 5G, RWS-150006, Phoenix, USA, Sep. 17-18, 2015, 18 pages.
Extended European Search Report dated Nov. 13, 2019 in Patent Application No. 17796085.3, 12 pages.
European Office Action dated Jul. 23, 2020 in European Patent Application No. 17 796 085.3.
Chinese Office Action dated Dec. 1, 2020 in Chinese Application No. 201780028146.9 (with Computer Generated English Translation).

* cited by examiner

F I G . 1
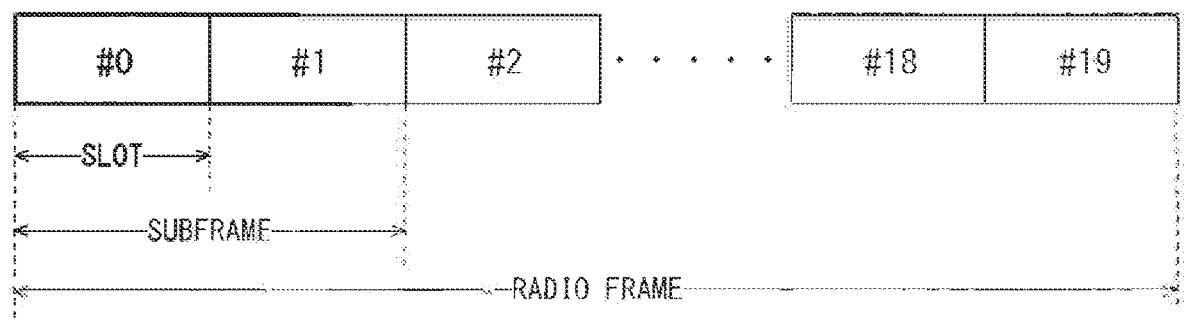

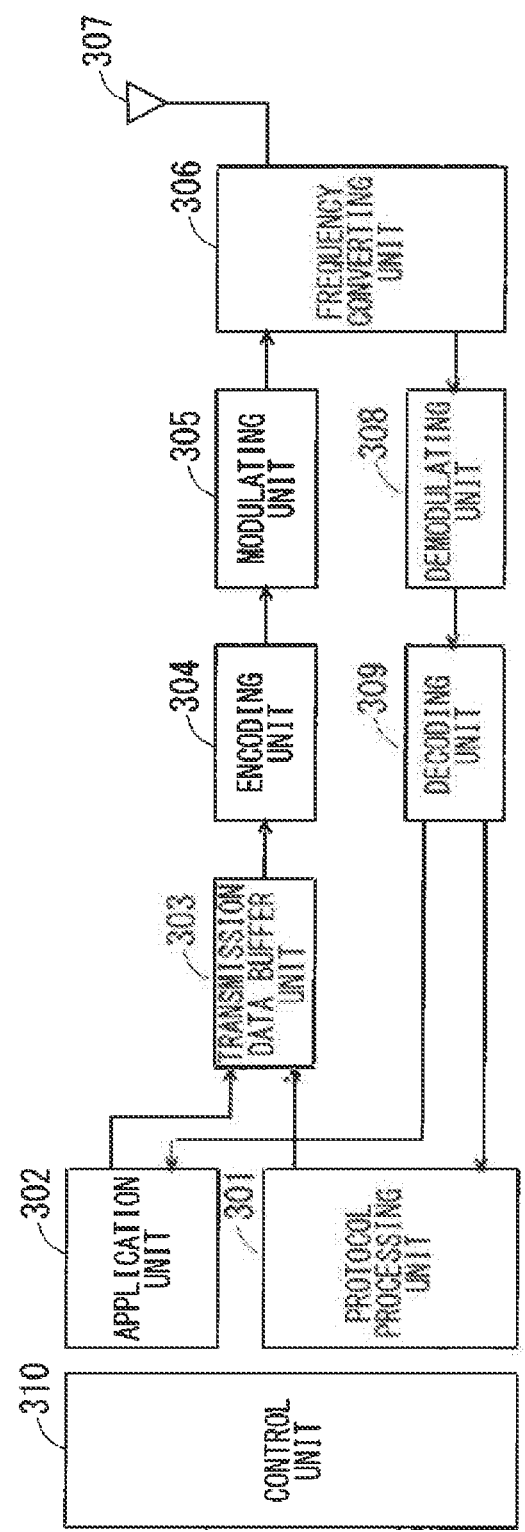

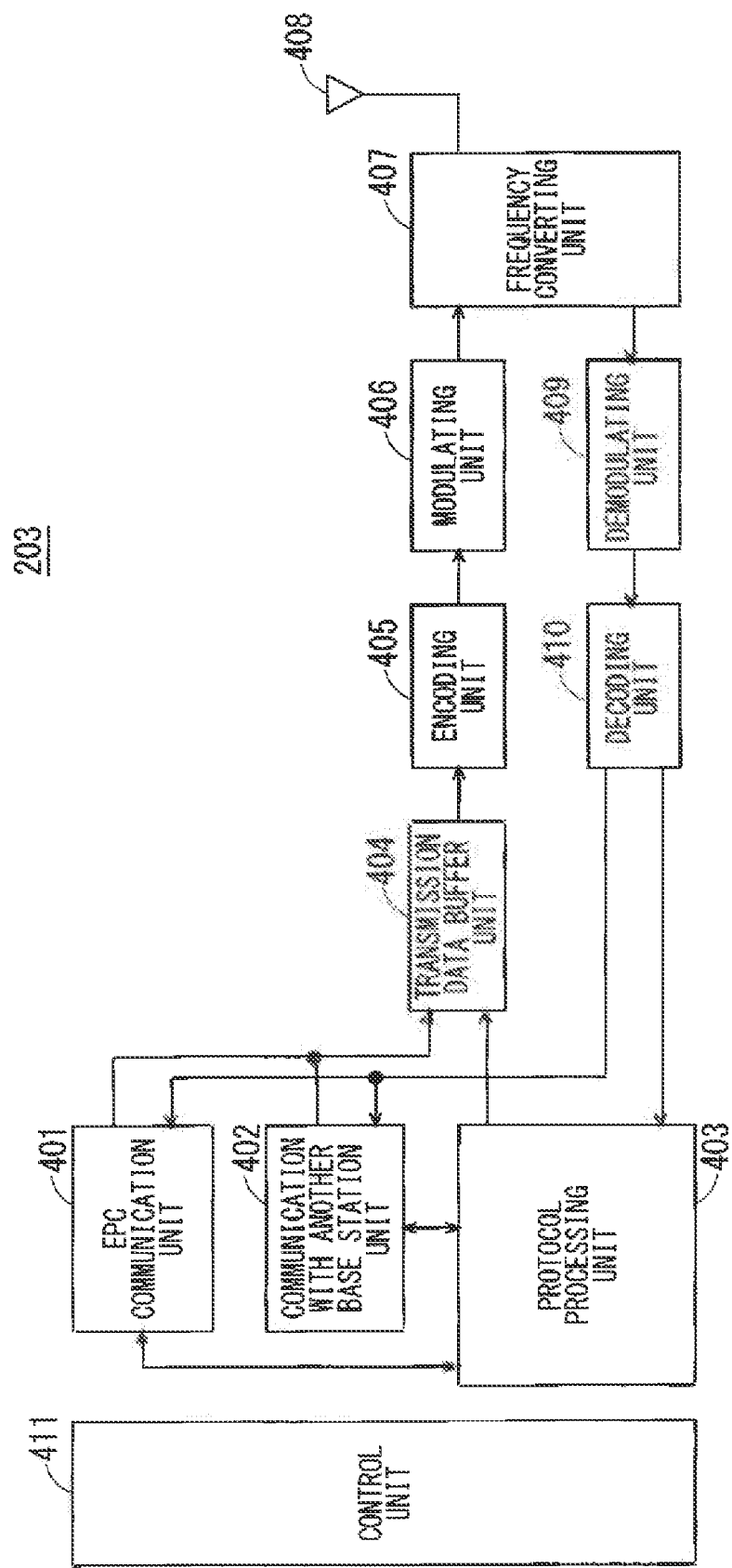

F I G. 5
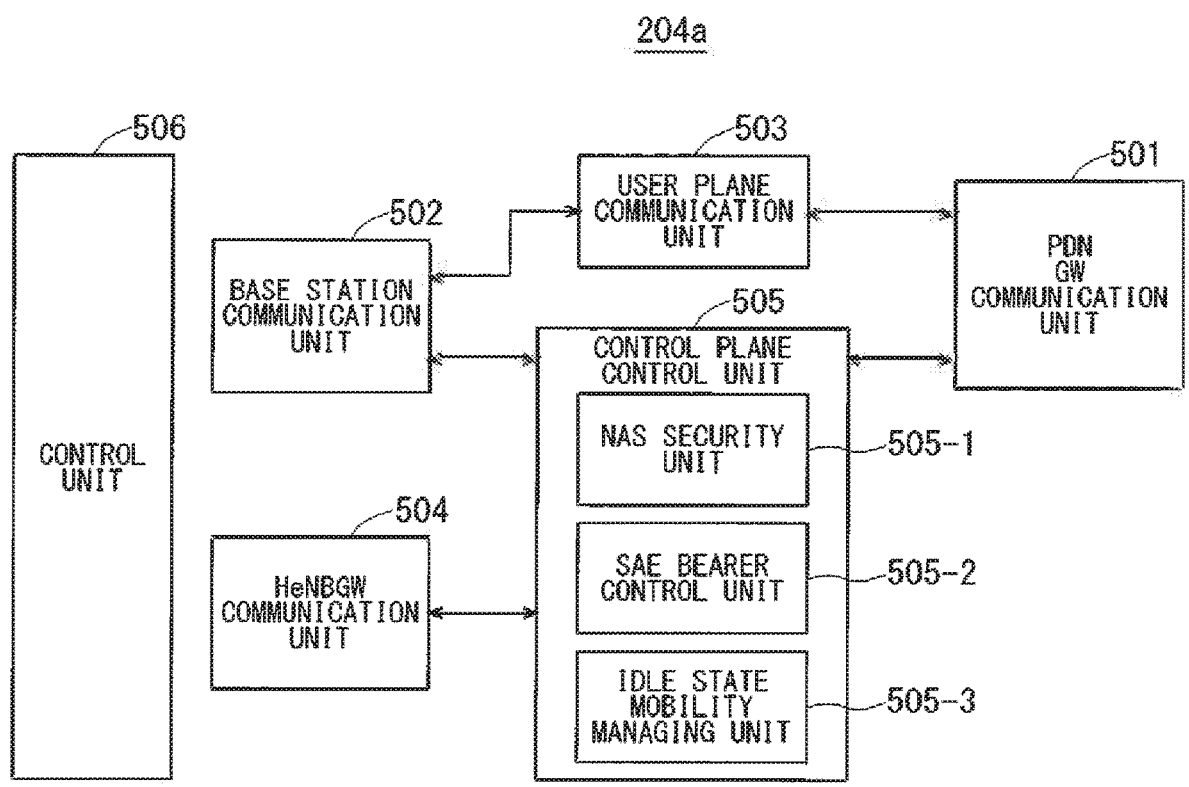

F I G . 6
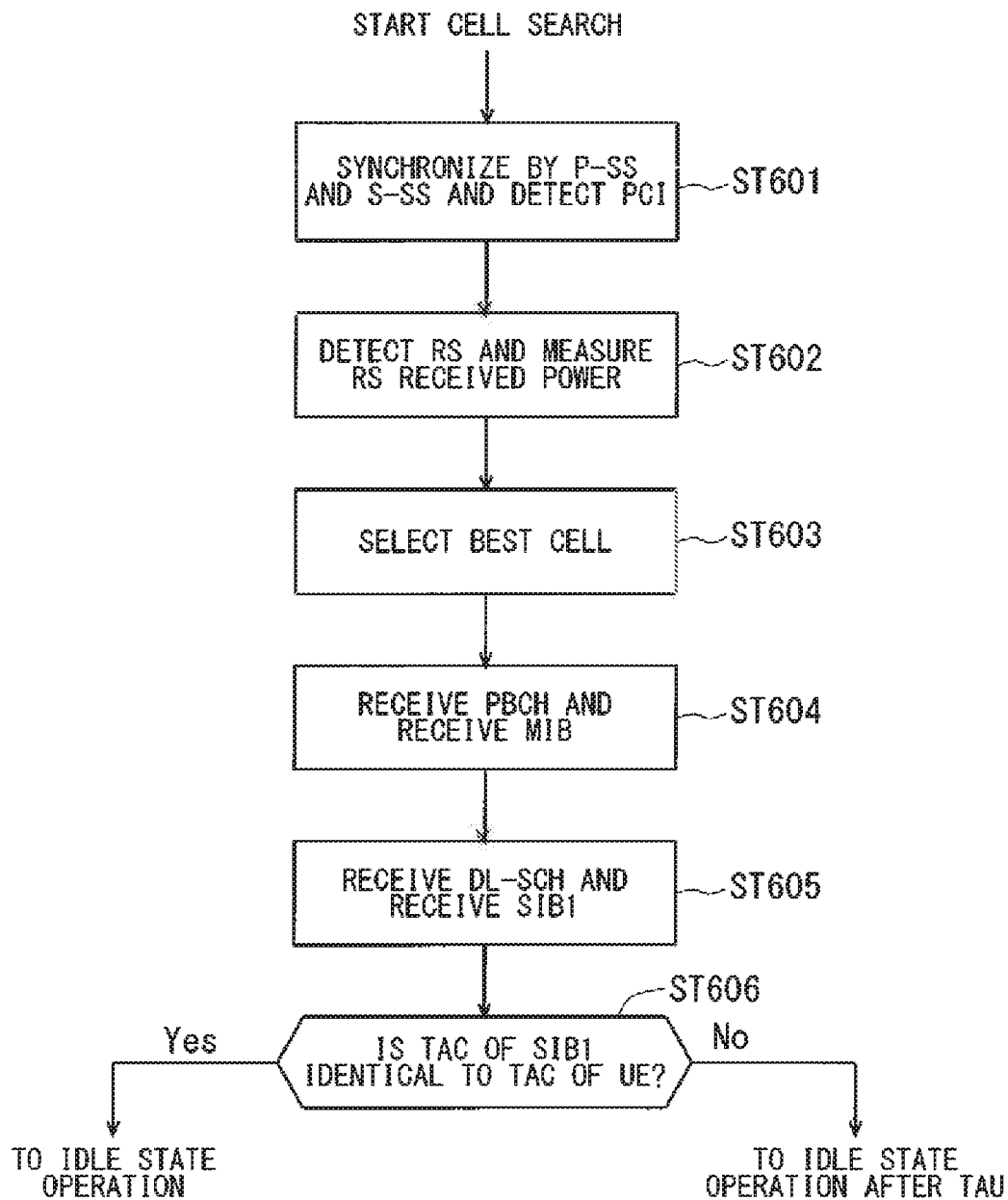

F I G. 1 0
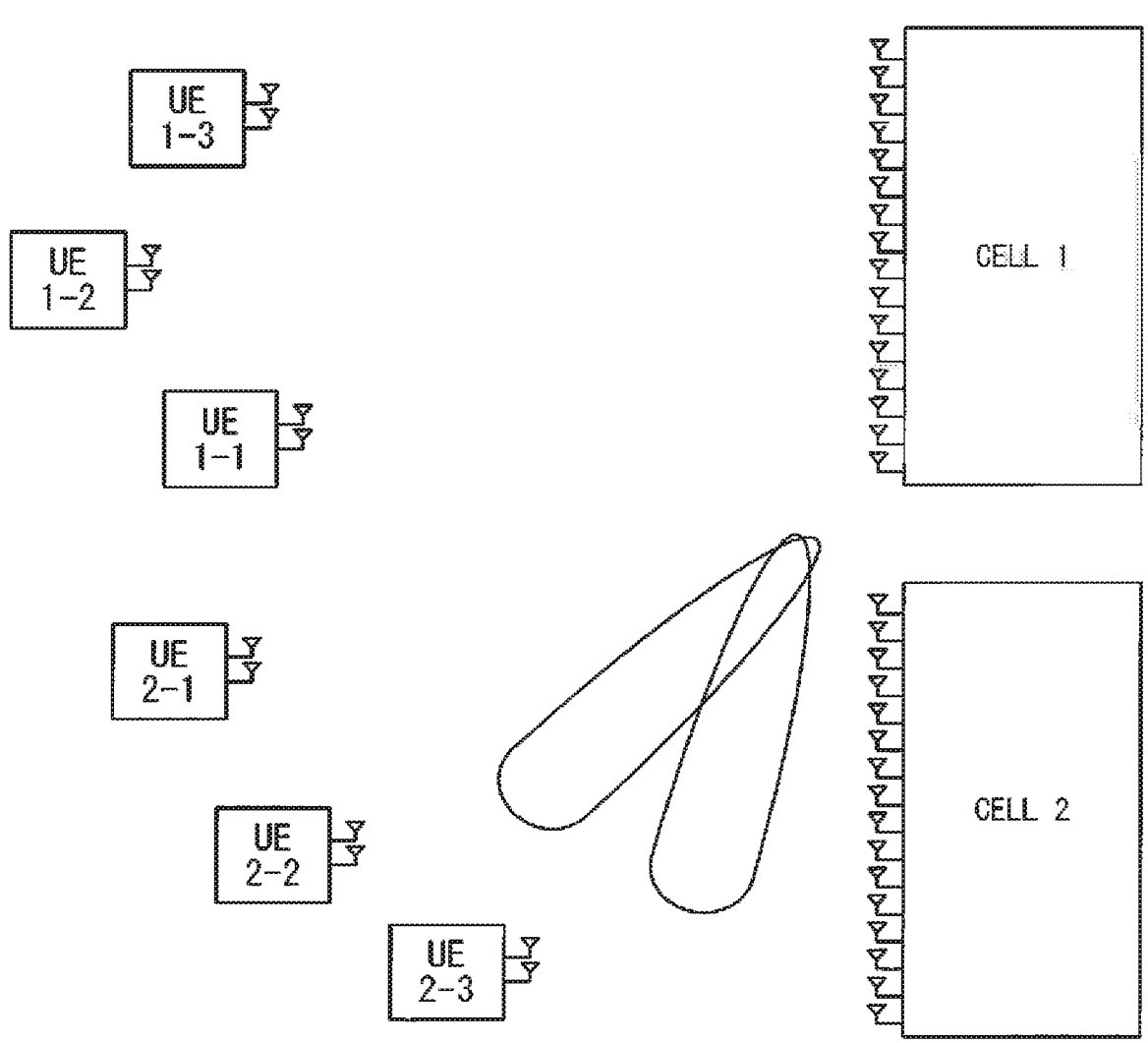

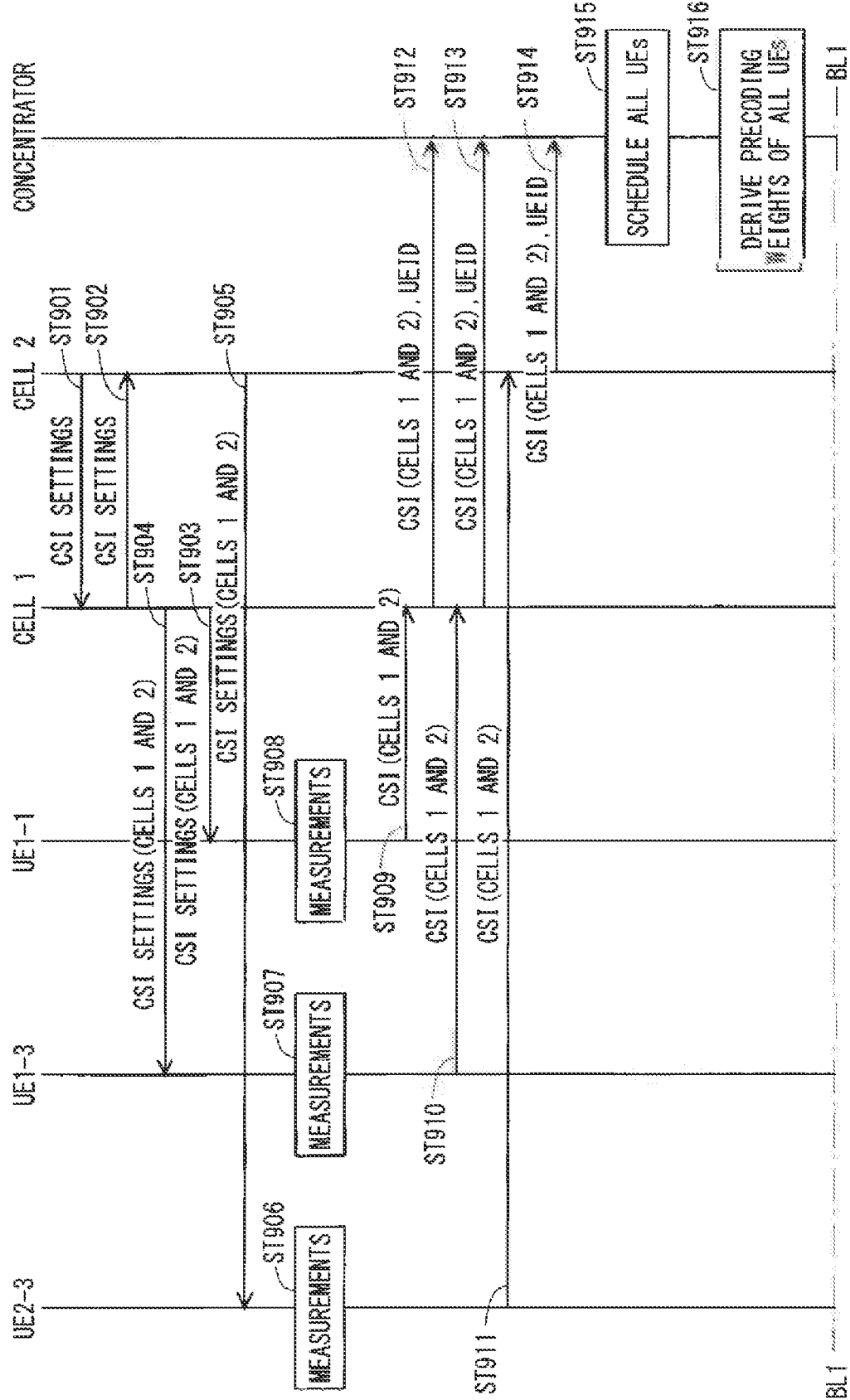

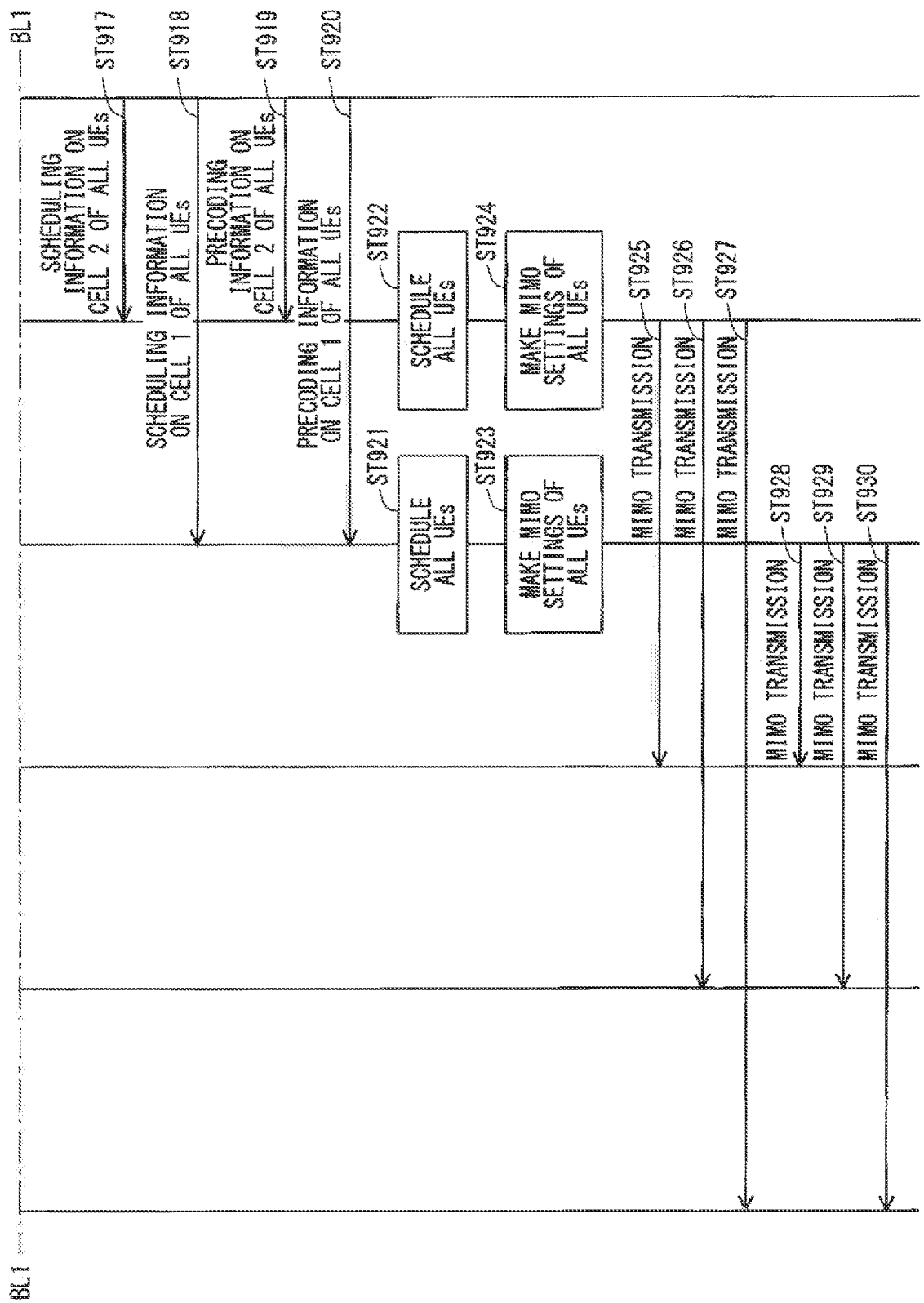

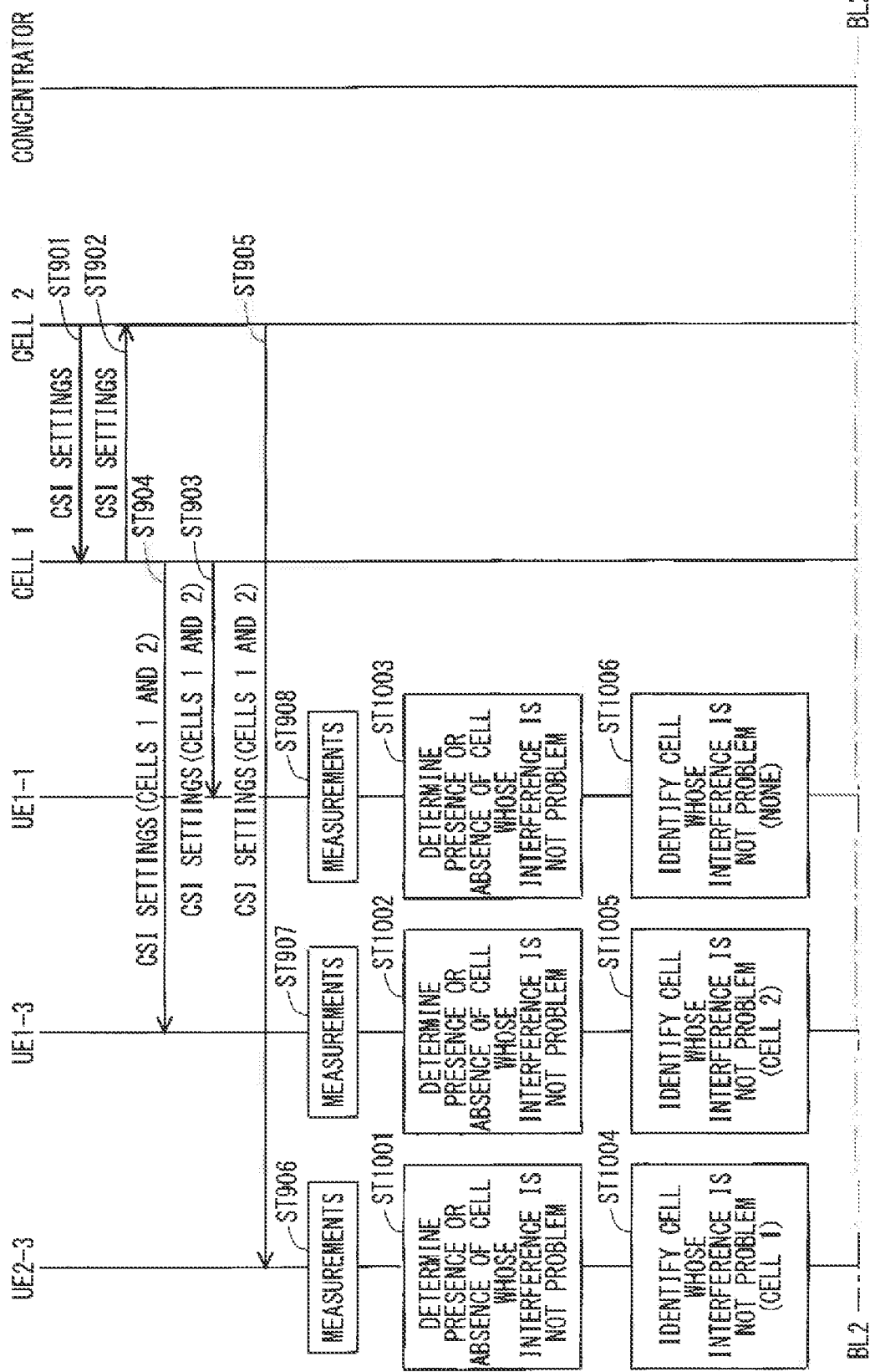
F I G. 13

F I G. 1 7
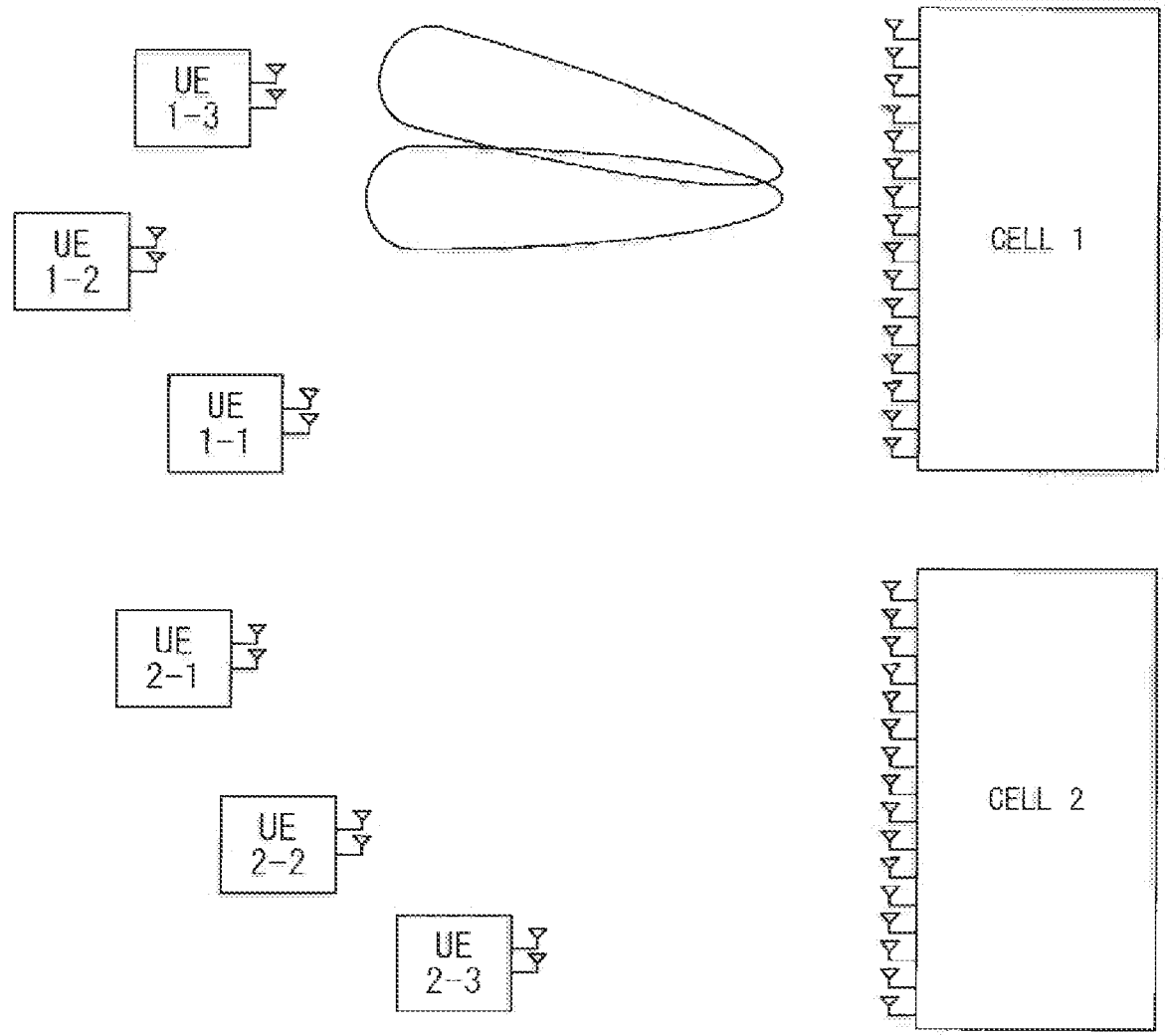

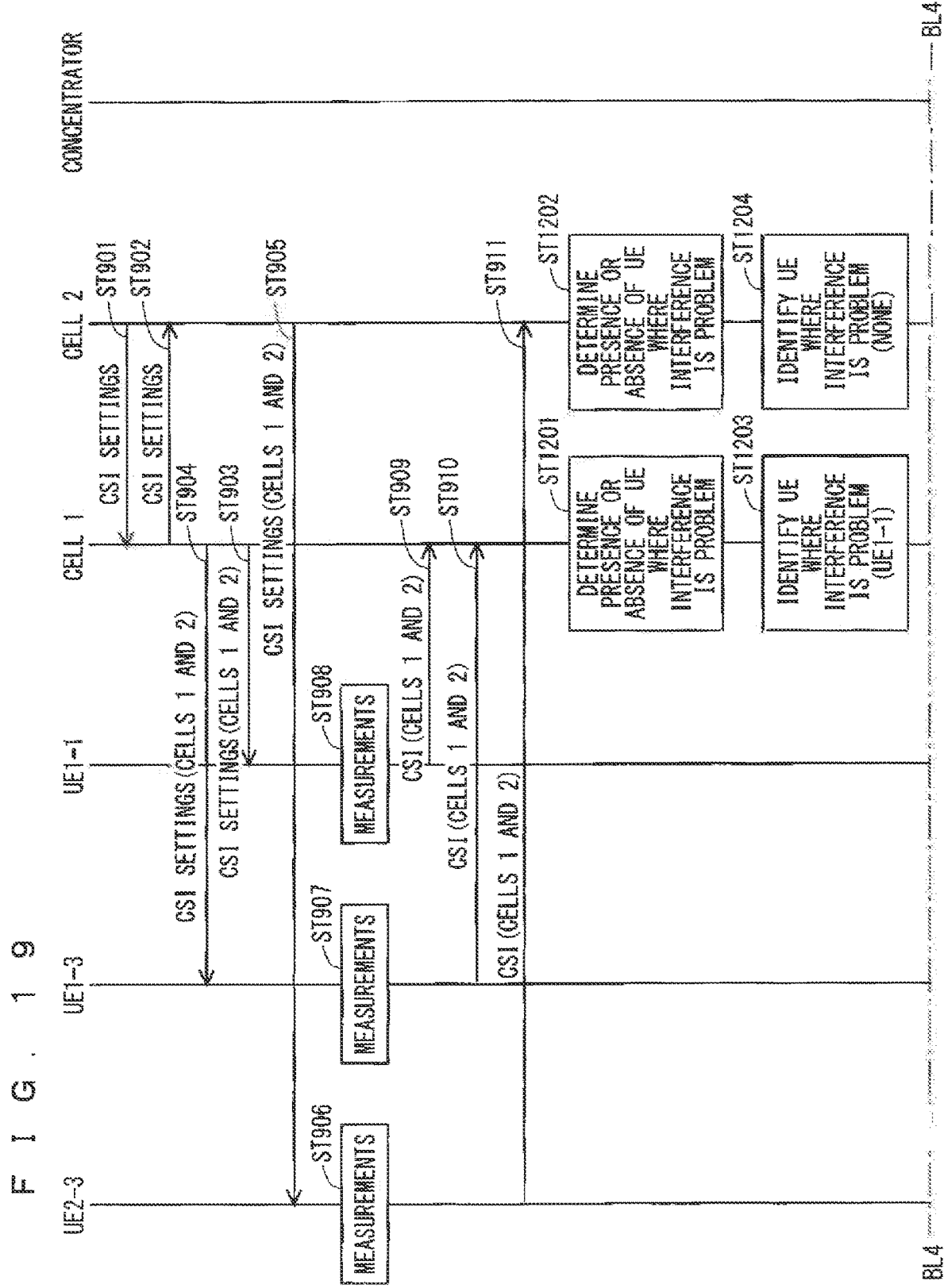

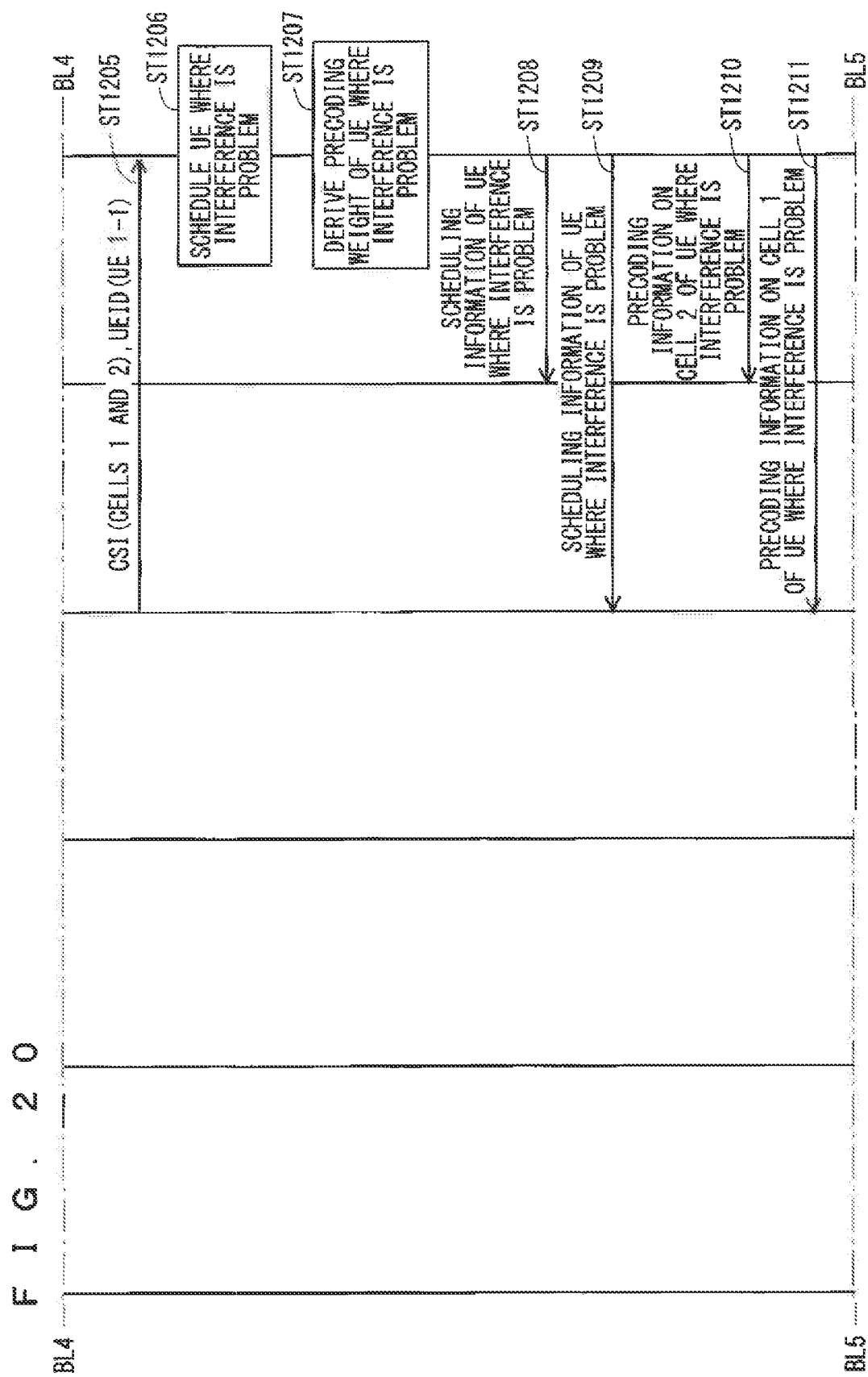
F I G. 2 0

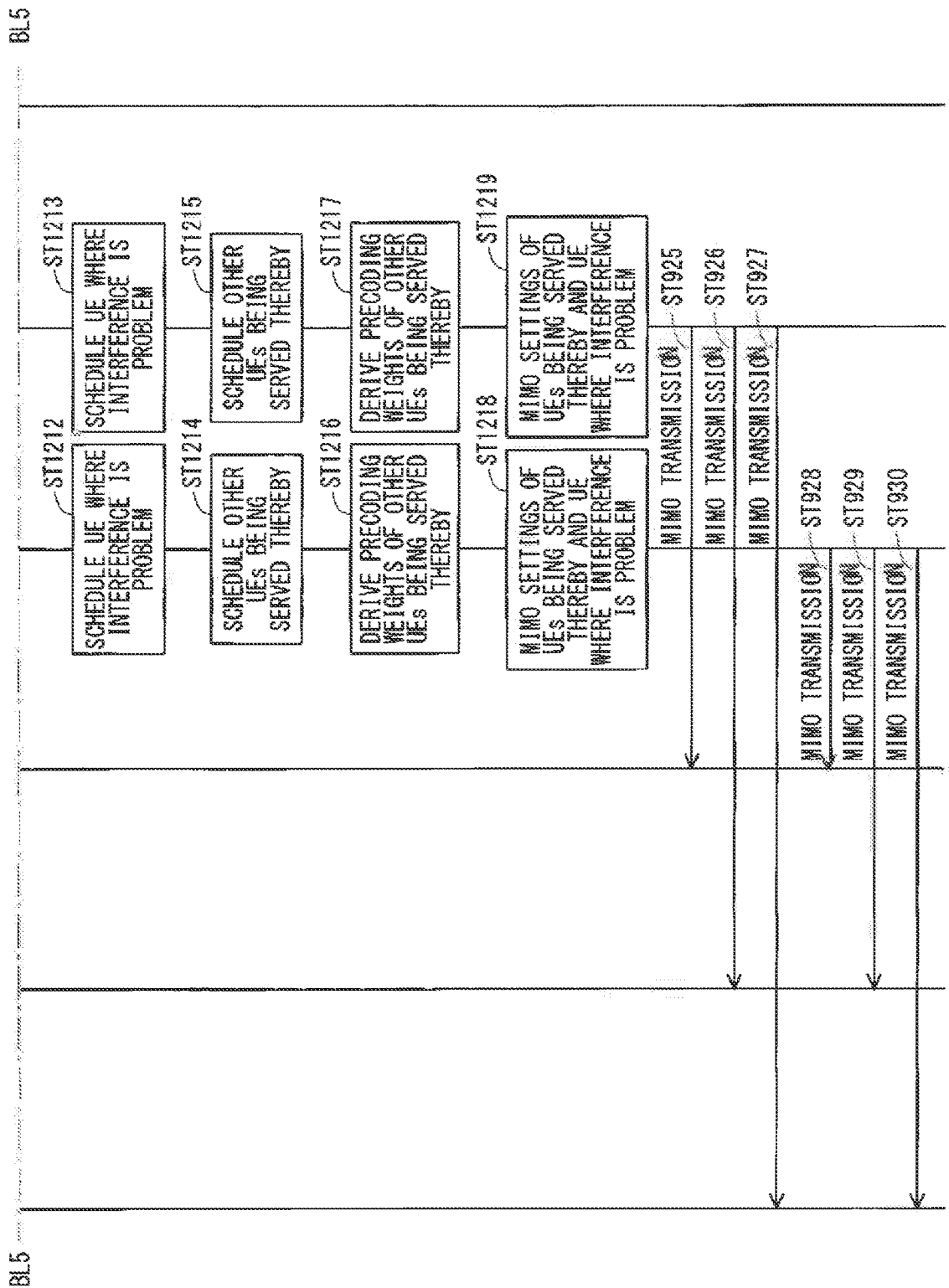

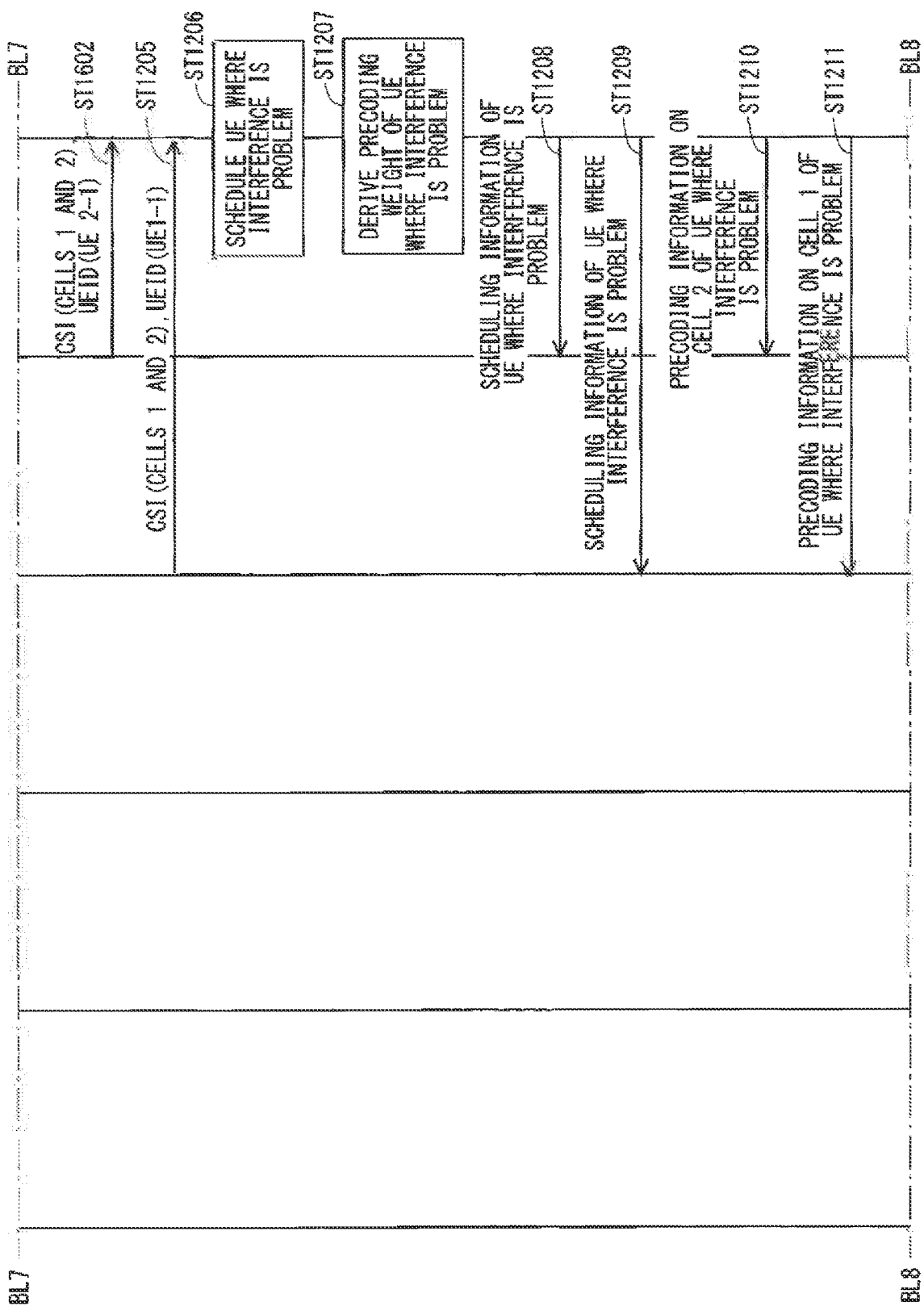
F I G. 29

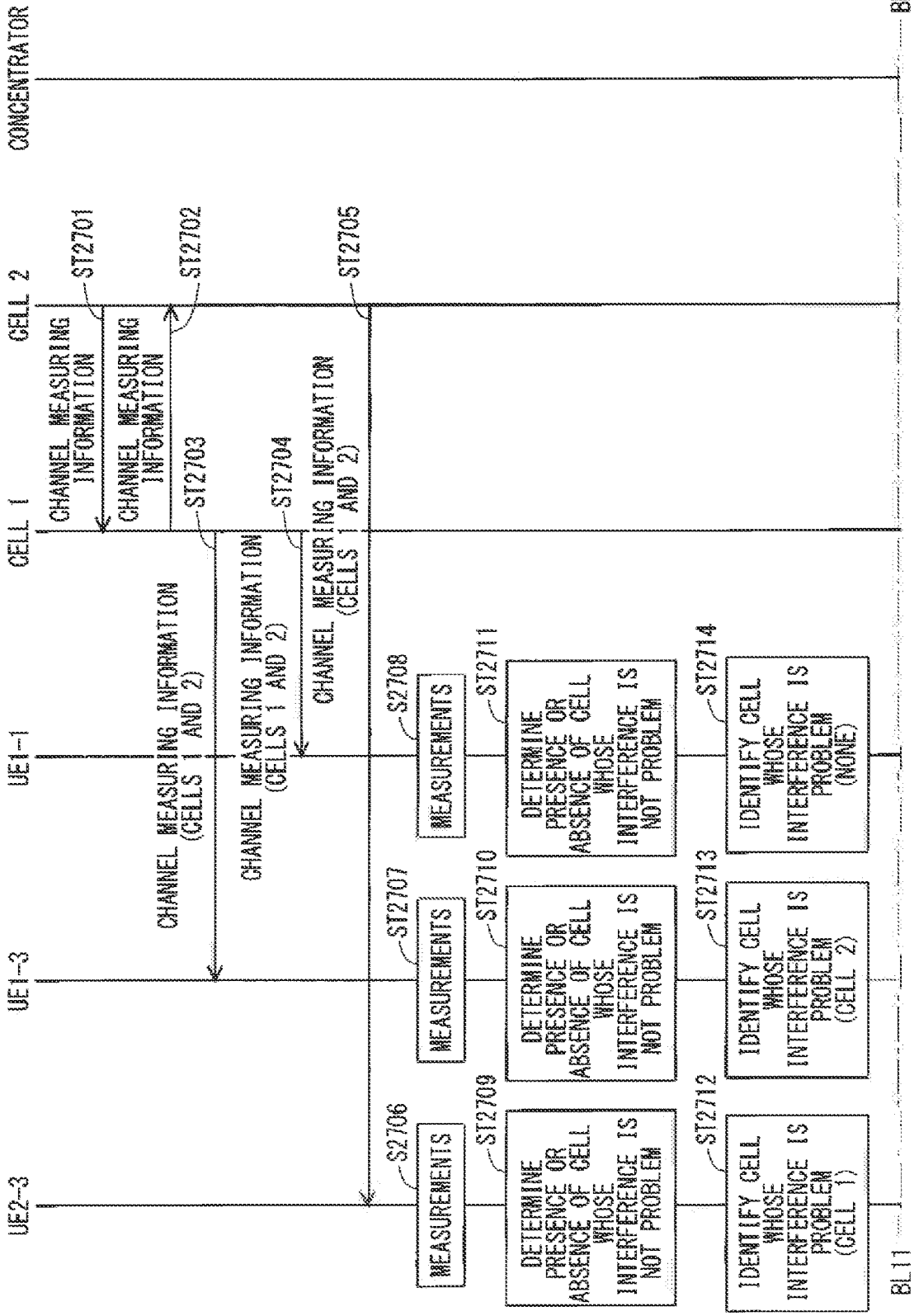
F I G. 36

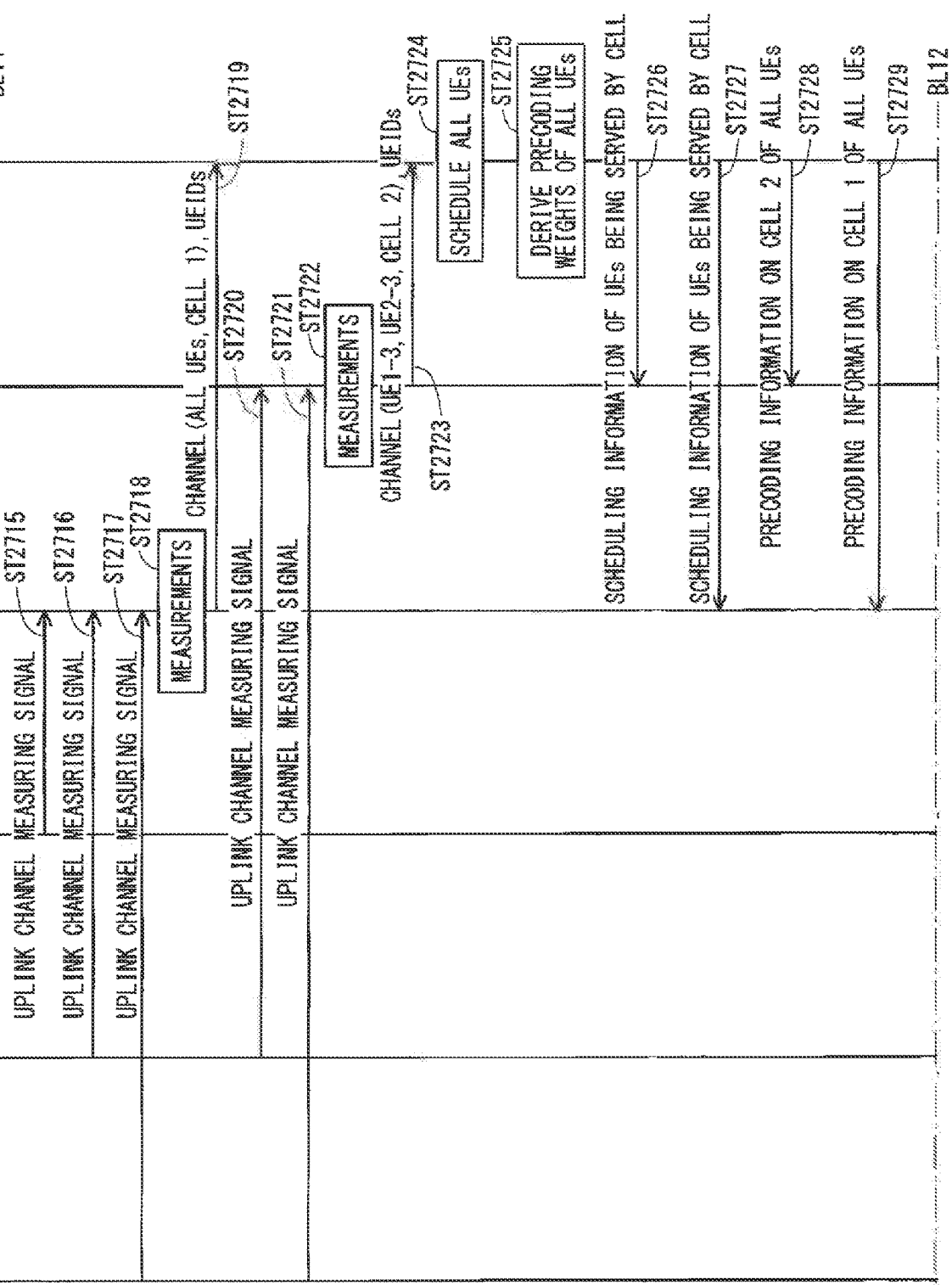

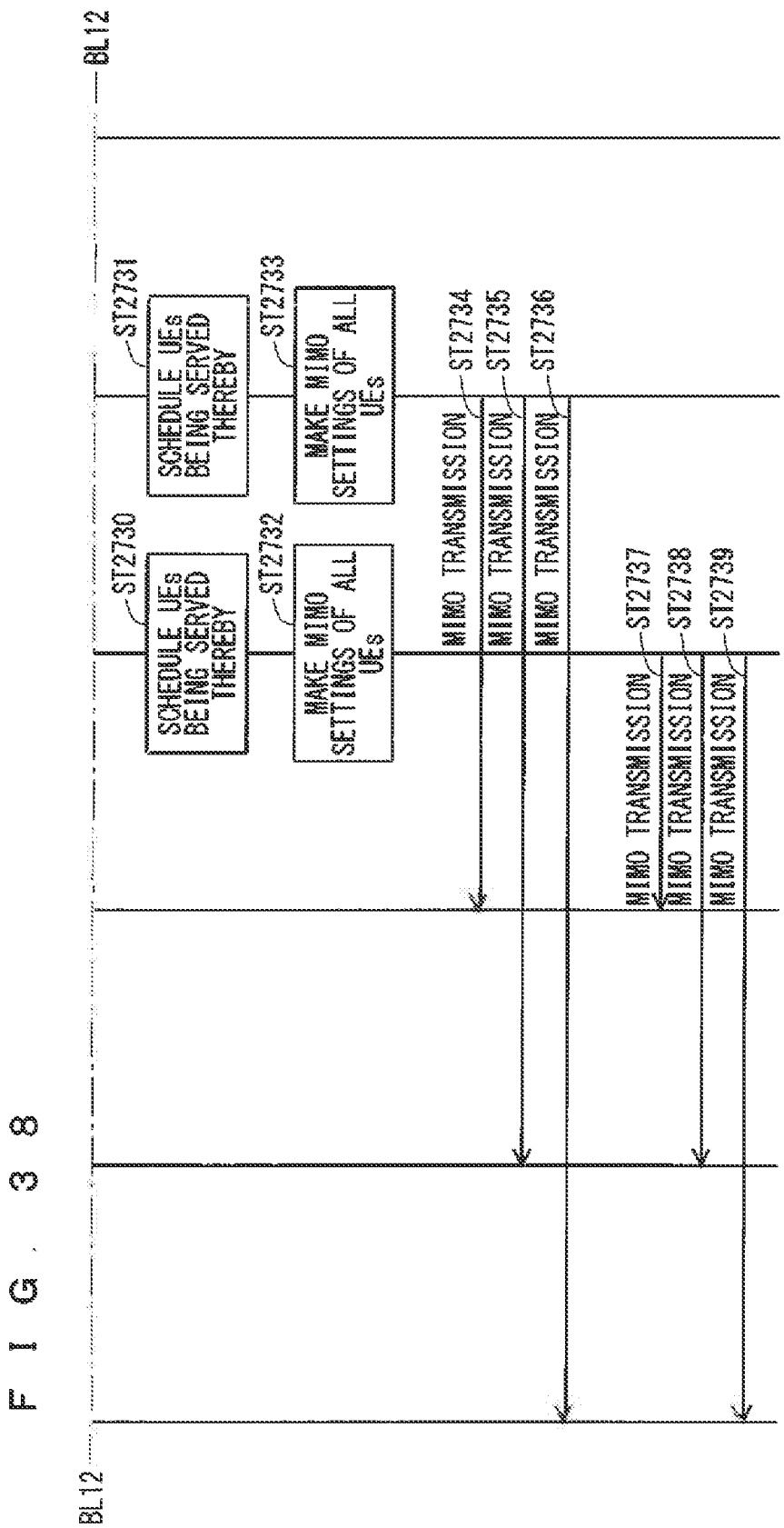

F I G . 3 9
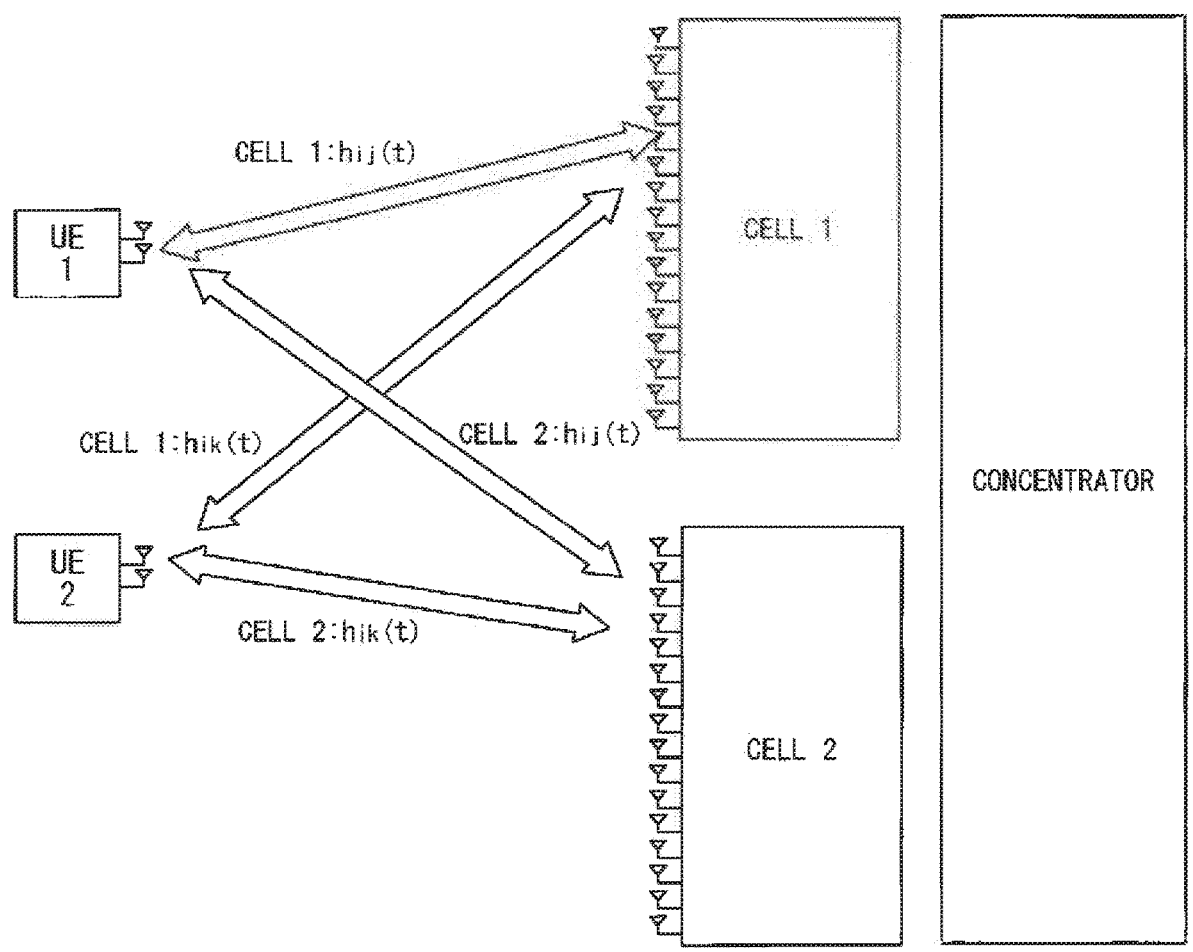

F I G . 4 0
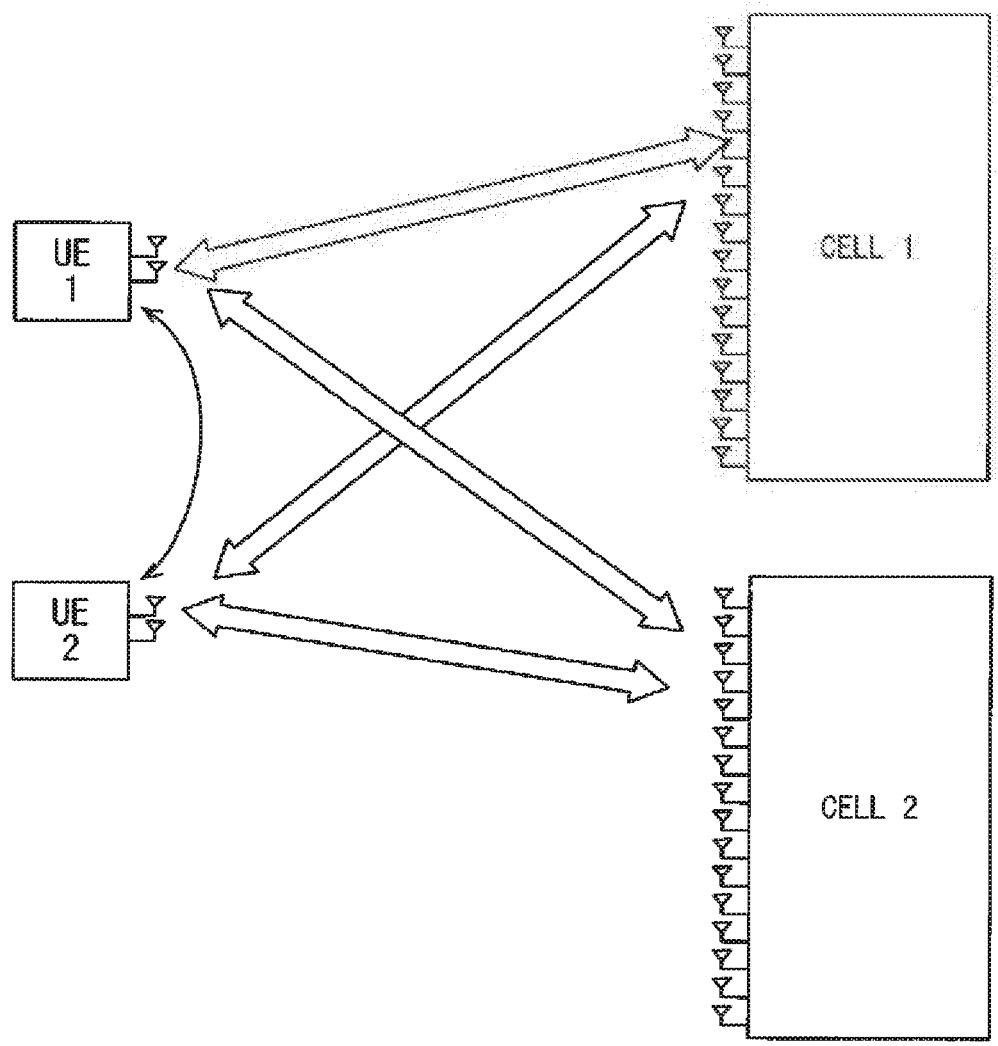

F I G. 4 1
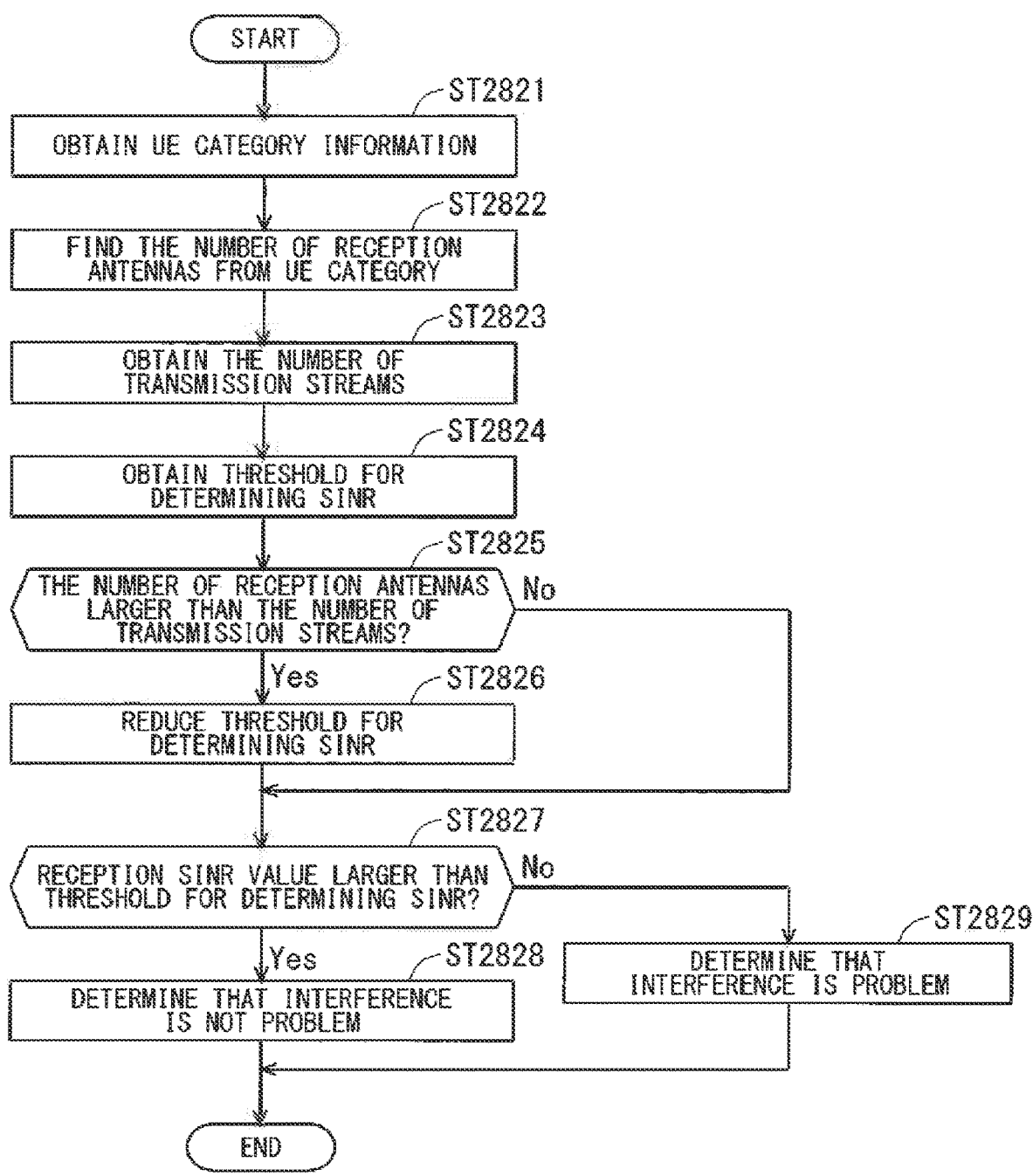

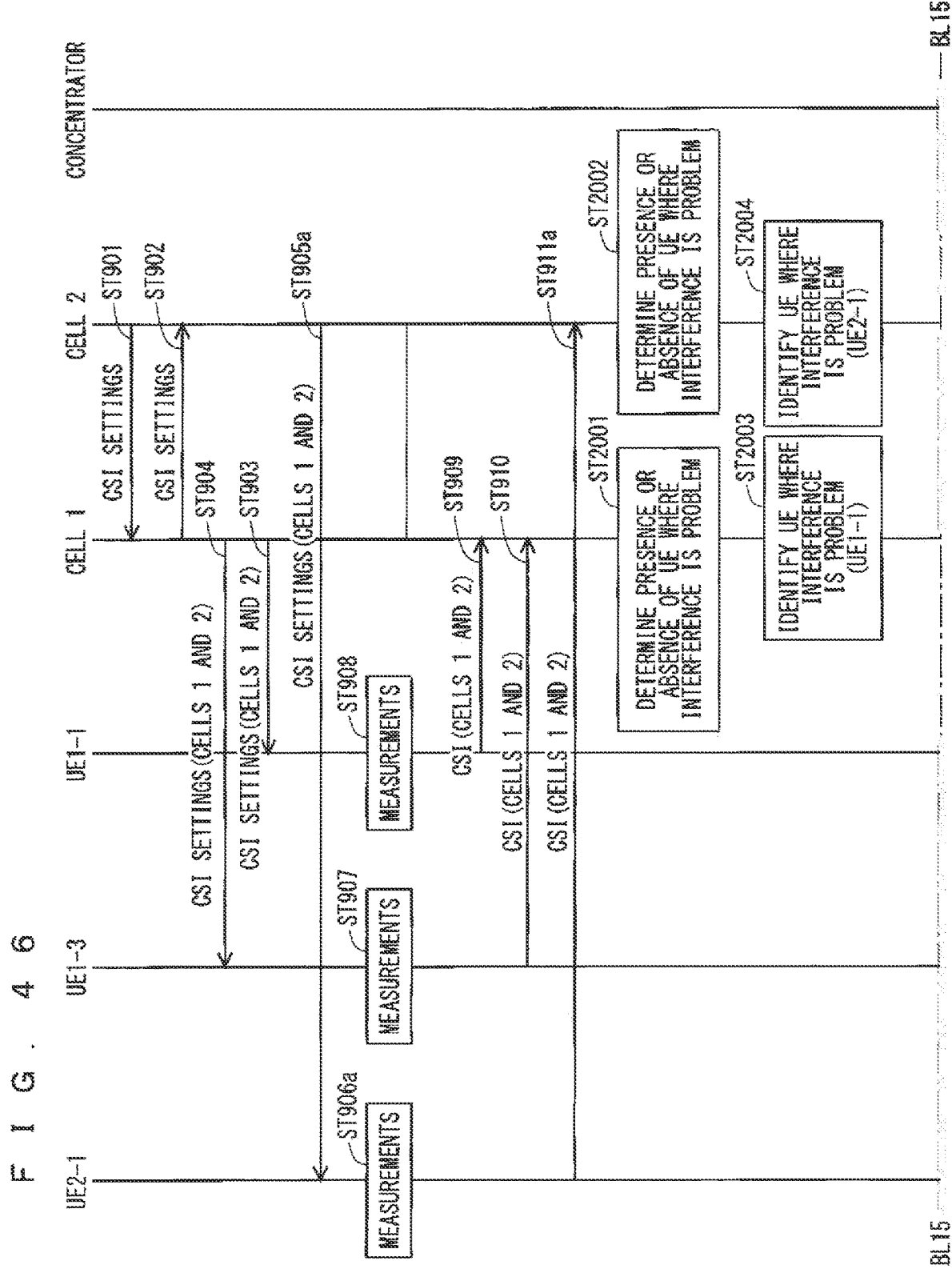

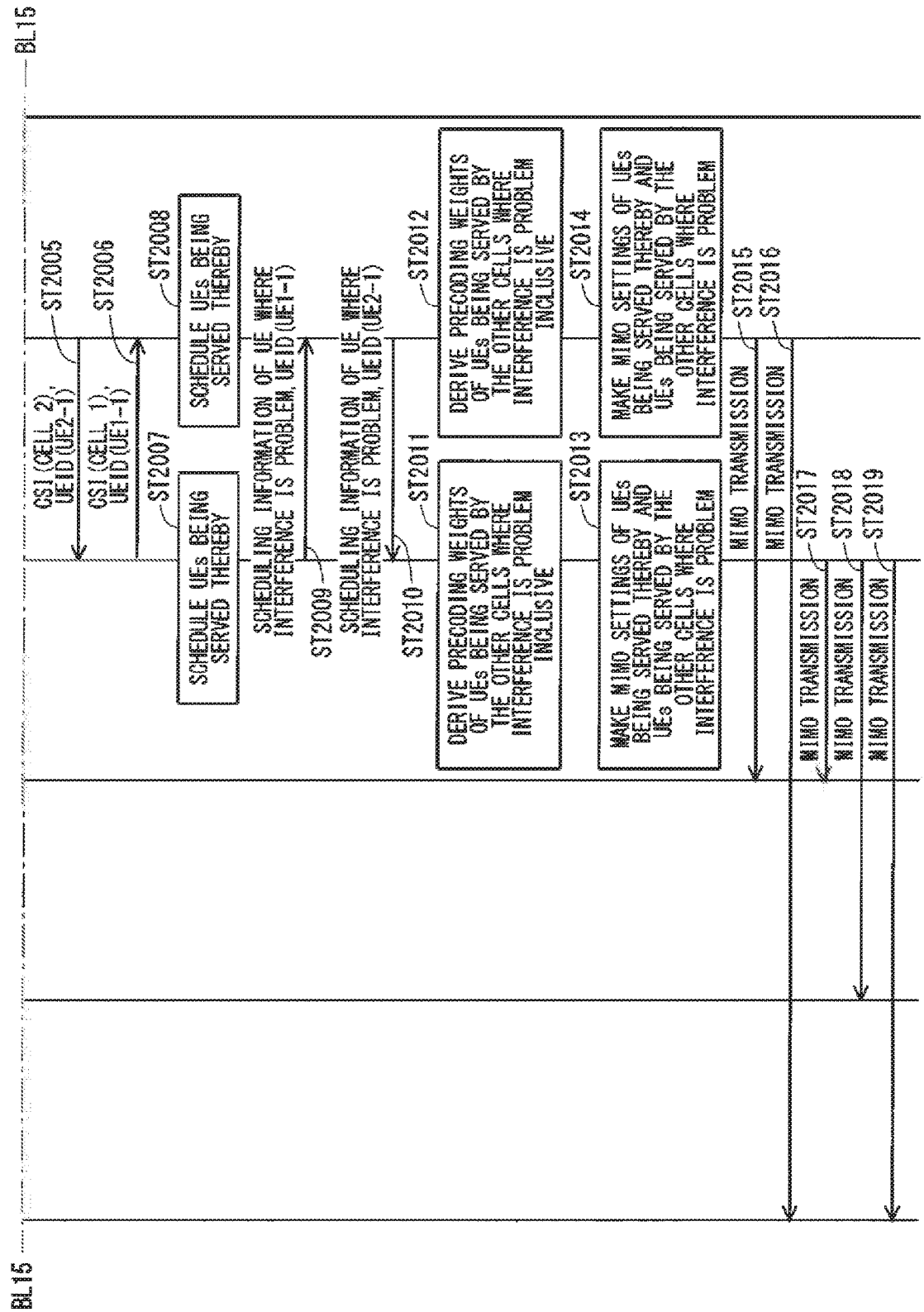
F I G. 4 7

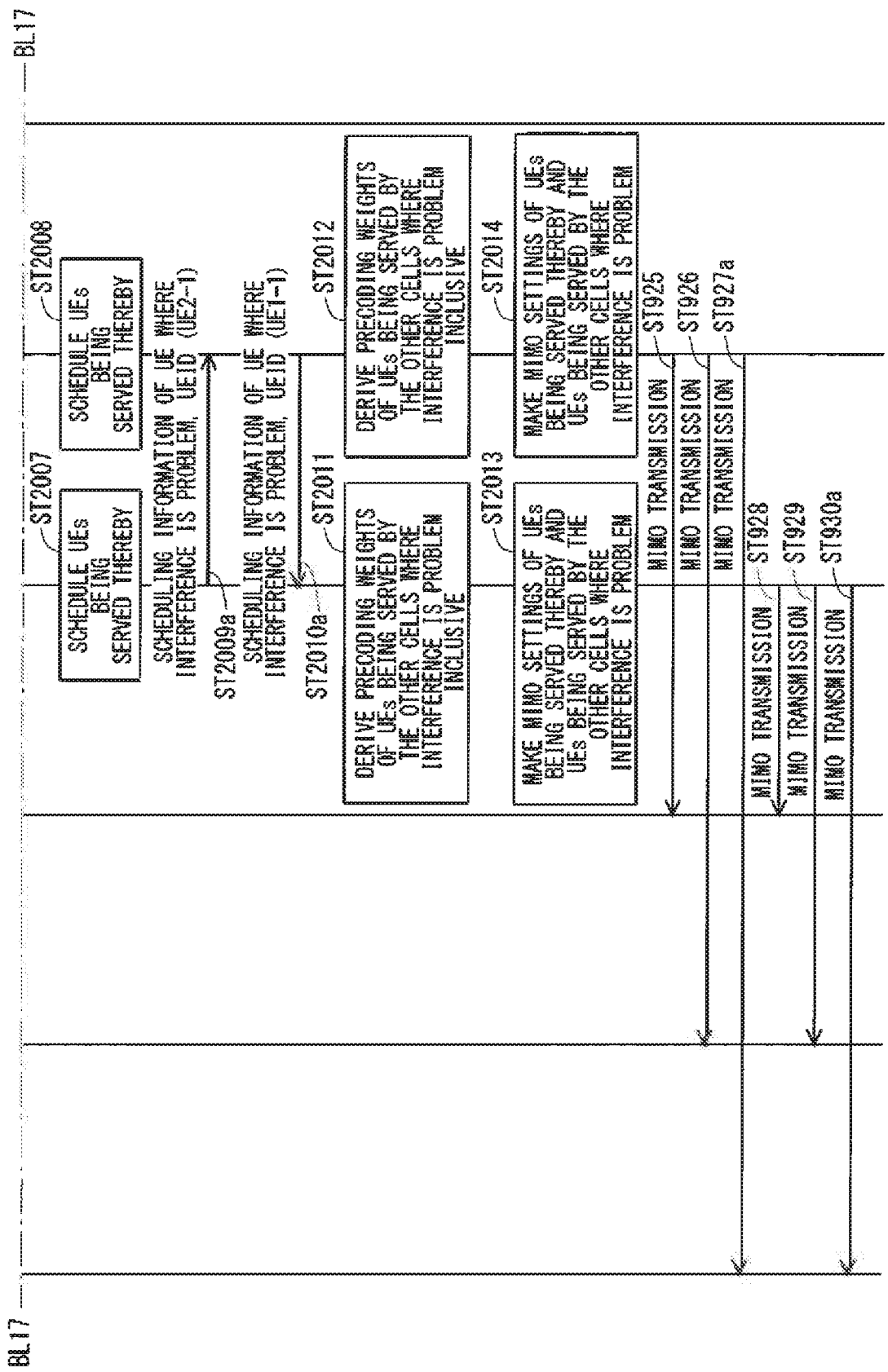

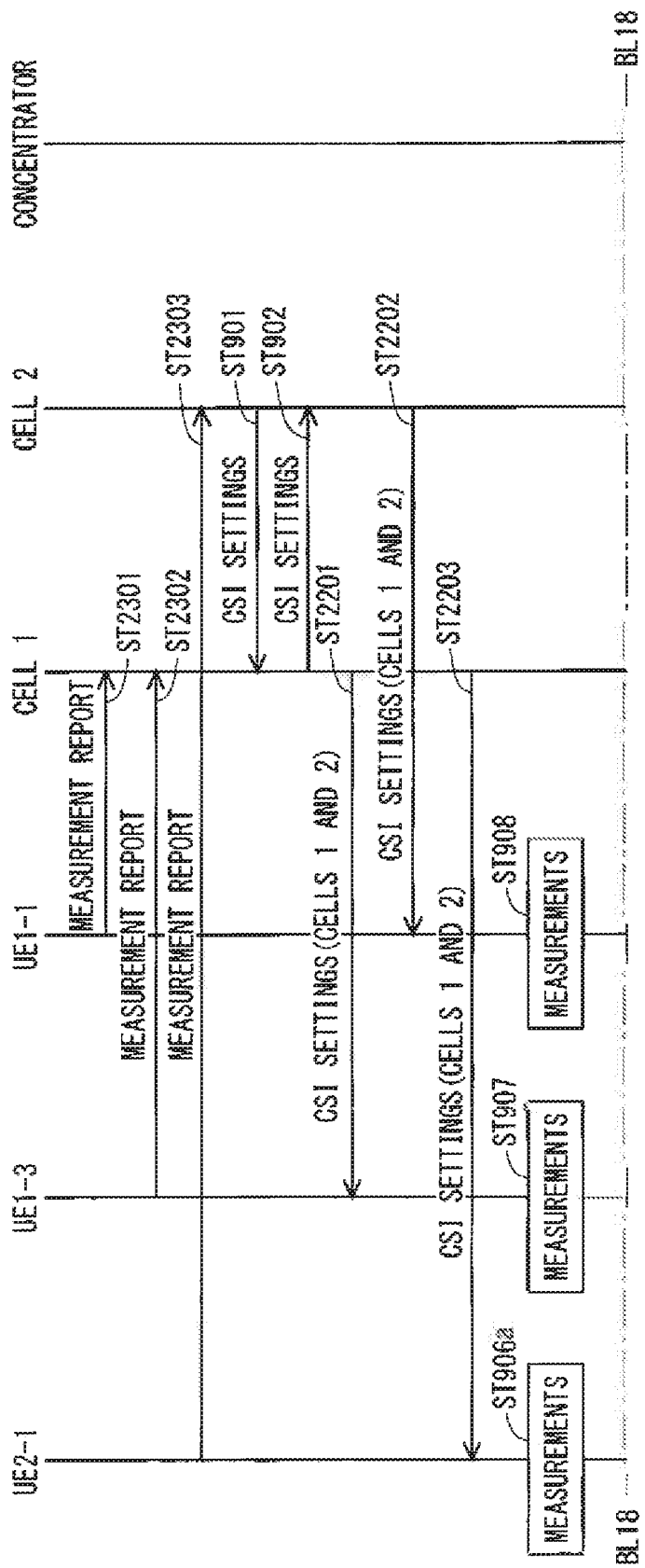
F I G. 5 2

F I G. 6 1

BL23

ST2007 SCHEDULE UEs BEING SERVED THEREBY
ST2008 SCHEDULE UEs BEING SERVED THEREBY
ST2009a SCHEDULING INFORMATION OF UE WHERE INTERFERENCE IS PROBLEM, UEID (UE2-1)
ST2010a SCHEDULING INFORMATION OF UE WHERE INTERFERENCE IS PROBLEM, UEID (UE1-1)
ST2011 DERIVE PRECODING WEIGHTS OF UEs BEING SERVED BY THE OTHER CELLS WHERE INTERFERENCE IS PROBLEM INCLUSIVE
ST2012 DERIVE PRECODING WEIGHTS OF UEs BEING SERVED BY THE OTHER CELLS WHERE INTERFERENCE IS PROBLEM INCLUSIVE
ST2013 MAKE MIMO SETTINGS OF UEs BEING SERVED THEREBY AND UEs BEING SERVED BY THE OTHER CELLS WHERE INTERFERENCE IS PROBLEM
ST2014 MAKE MIMO SETTINGS OF UEs BEING SERVED THEREBY AND UEs BEING SERVED BY THE OTHER CELLS WHERE INTERFERENCE IS PROBLEM
ST2015 MIMO TRANSMISSION
ST2016 MIMO TRANSMISSION
ST2017 MIMO TRANSMISSION
ST2018 MIMO TRANSMISSION
ST2019 MIMO TRANSMISSION

BL23

COMMUNICATION SYSTEM

TECHNICAL FIELD

The present invention relates to a communication system in which radio communication is performed between a communication terminal device such as a user equipment device and a base station device.

BACKGROUND ART

The 3rd generation partnership project (3GPP), the standard organization regarding the mobile communication system, is studying communication systems referred to as long term evolution (LTE) regarding radio sections and system architecture evolution (SAE) regarding the overall system configuration including a core network and a radio access network, which will be hereinafter collectively referred to as a network as well (for example, see Non-Patent Documents 1 to 12). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The decisions by 3GPP regarding the frame configuration in the LTE system described in Non-Patent Document 1 (Chapter 5) will be described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station device (hereinafter may be simply referred to as a "base station") to a communication terminal device (hereinafter may be simply referred to as a "communication terminal") such as a user equipment device (hereinafter may be simply referred to as a "user equipment"). A BCH transport block is mapped to four subframes within a 40 ms interval. There is no explicit signaling indicating 40 ms timing.

A physical control format indicator channel (PCFICH) is a channel for downlink transmission from a base station to a communication terminal. The PCFICH notifies the number of orthogonal frequency division multiplexing (OFDM) symbols used for PDCCHs from the base station to the communication terminal. The PCFICH is transmitted per subframe.

A physical downlink control channel (PDCCH) is a channel for downlink transmission from a base station to a communication terminal. The PDCCH notifies the resource allocation information for downlink shared channel (DL-SCH) being one of the transport channels described below, resource allocation information for a paging channel (PCH) being one of the transport channels described below, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a communication terminal. A downlink shared channel (DL-SCH) that is a transport channel and a PCH that is a transport channel are mapped to the PDSCH.

A physical multicast channel (PMCH) is a channel for downlink transmission from a base station to a communication terminal. A multicast channel (MCH) that is a transport channel is mapped to the PMCH.

A physical uplink control channel (PUCCH) is a channel for uplink transmission from a communication terminal to a base station. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) is a channel for uplink transmission from a communication terminal to a base station. An uplink shared channel (UL-SCH) that is one of the transport channels is mapped to the PUSCH.

A physical hybrid ARQ indicator channel (PHICH) is a channel for downlink transmission from a base station to a communication terminal. The PHICH carries Ack/Nack that is a response signal to uplink transmission. A physical random access channel (PRACH) is a channel for uplink transmission from the communication terminal to the base station. The PRACH carries a random access preamble.

A downlink reference signal (RS) is a known symbol in the LTE communication system. The following five types of downlink reference signals are defined: a cell-specific reference signal (CRS), an MBSFN reference signal, a data demodulation reference signal (DM-RS) being a UE-specific reference signal, a positioning reference signal (PRS), and a channel state information reference signal (CSI-RS). The physical layer measurement objects of a communication terminal include reference signal received power (RSRP).

The transport channels described in Non-Patent Document 1 (Chapter 5) will be described. A broadcast channel (BCH) among the downlink transport channels is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a communication terminal for enabling the communication terminal to save power. The DL-SCH is mapped to the physical downlink shared channel (PDSCH).

The paging channel (PCH) supports DRX of the communication terminal for enabling the communication terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ will be described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method will be described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "AcK" to the transmitter. The transmitter that has received "Ack" transmits the next data.

The logical channels described in Non-Patent Document 1 (Chapter 6) will be described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a communication terminal. The PCCH that is a logical channel is mapped to the paging channel (PCH) that is a transport channel.

A common control channel (CCCH) is a channel for transmission control information between communication terminals and a base station. The CCCH is used in the case where the communication terminals have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a communication terminal. The MCCH is used only by a communication terminal during reception of the MBMS. The MCCH is mapped to the multicast channel (MCH) that is a transport channel.

A dedicated control channel (DCCH) is a channel that transmits dedicated control information between a communication terminal and a network on a point-to-point basis. The DCCH is used when the communication terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated communication terminal. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a communication terminal. The MTCH is a channel used only by a communication terminal during reception of the MBMS. The MTCH is mapped to the multicast channel (MCH).

CGI represents a cell global identifier. ECGI represents an E-UTRAN cell global identifier. A closed subscriber group (CSG) cell is introduced in the LTE, and the long term evolution advanced (LTE-A) and universal mobile telecommunication system (UMTS) described below.

The closed subscriber group (CSG) cell is a cell in which subscribers who are allowed use are specified by an operator (hereinafter, also referred to as a "cell for specific subscribers"). The specified subscribers are allowed to access one or more cells of a public land mobile network (PLMN). One or more cells to which the specified subscribers are allowed access are referred to as "CSG cell(s)". Note that access is limited in the PLMN.

The CSG cell is part of the PLMN that broadcasts a specific CSG identity (CSG ID) and broadcasts "TRUE" in a CSG indication. The authorized members of the subscriber group who have registered in advance access the CSG cells using the CSG ID that is the access permission information.

The CSG ID is broadcast by the CSG cell or cells. A plurality of CSG IDs exist in the LTE communication system. The CSG IDs are used by communication terminals (UEs) for making access from CSG-related members easier.

The locations of communication terminals are tracked based on an area composed of one or more cells. The locations are tracked for enabling tracking the locations of communication terminals and calling communication terminals, in other words, incoming calling to communication terminals even in an idle state. An area for tracking locations of communication terminals is referred to as a tracking area.

3GPP is studying base stations referred to as Home-NodeB (Home-NB; HNB) and Home-eNodeB (Home-eNB; HeNB). HNB/HeNB is a base station for, for example, household, corporation, or commercial access service in UTRAN/E-UTRAN. Non-Patent Document 2 discloses three different modes of the access to the HeNB and HNB. Specifically, an open access mode, a closed access mode, and a hybrid access mode are disclosed.

Further, 3GPP is pursuing specifications standard of long term evolution advanced (LTE-A) as Release 10 (see Non-Patent Documents 3 and 4). The LTE-A is based on the LTE radio communication system and is configured by adding several new techniques to the system.

Carrier aggregation (CA) is studied for the LTE-A system, in which two or more component carriers (CCs) are aggregated to support wider transmission bandwidths up to 100 MHz. Non-Patent Document 1 describes the CA.

In the case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCell is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 1.

The traffic flow of a mobile network is on the rise, and the communication rate is also increasing. It is expected that the communication rate will be further increased when the operations of the LTE and the LTE-A are fully initiated.

Furthermore, 3GPP is studying the use of small eNBs (hereinafter also referred to as "small-scale base station devices") configuring small cells to satisfy tremendous traffic in the future. In an example technique under study, etc., a large number of small eNBs will be installed to configure a large number of small cells, thus increasing spectral efficiency and communication capacity. The specific techniques include dual connectivity (abbreviated as DC) in which a UE communicates with two eNBs through connection thereto. Non-Patent Document 1 describes the DC.

Among eNBs that perform dual connectivity (DC), one of them may be referred to as a master eNB (abbreviated as MeNB), and the other may be referred to as a secondary eNB (abbreviated as SeNB).

For increasingly sophisticated mobile communications, the fifth generation (hereinafter also referred to as "5G") radio access system is studied, whose service is aimed to be launched in 2020 and afterward. For example, in the Europe, an organization named METIS summarizes the requirements for 5G (see Non-Patent Document 5).

Among the requirements in the 5G radio access system are a system capacity 1000 times as high as, a data transmission rate 100 times as high as, a data latency one tenth (¹/₁₀) as low as, and simultaneously connected communication terminals 100 times as many as those in the LTE system, to further reduce the power consumption and device cost.

To satisfy such requirements, increasing the transmission capacity of data using broadband frequencies, and increasing the transmission rate of data through increase in the spectral efficiency are being studied. To realize these, the techniques enabling the spatial multiplexing such as the Multiple Input Multiple Output (MIMO) and the beamforming using a multi-element antenna are being studied.

The MIMO also continues to be studied under the LTE-A. Full Dimension (FD)-MIMO using two dimensional antenna arrays are under study from the Release 13 as an extension of the MIMO. Non-Patent Document 7 describes the FD-MIMO.

PRIOR-ART DOCUMENTS

Non-Patent Documents

Non-Patent Document 1: 3GPP TS36.300 V13.0.0
Non-Patent Document 2: 3GPP S1-083461
Non-Patent Document 3: 3GPP TR 36.814 V9.0.0
Non-Patent Document 4: 3GPP TR 36.912 V10.0.0
Non-Patent Document 5: "Scenarios, requirements and KPIs for 5G mobile and wireless system", [online], Apr. 30, 2013, ICT-317669-METIS/D1.1, [Searched on Jan. 25, 2016], Internet <https://www.metis2020.com/documents/deliverables/>
Non-Patent Document 6: 3GPP TS36.211 V13.0.0
Non-Patent Document 7: 3GPP TR36.897 V13.0.0
Non-Patent Document 8: 3GPP R2-162573
Non-Patent Document 9: 3GPP TR36.842 V12.0.0
Non-Patent Document 10: 3GPP R2-162499
Non-Patent Document 11: "Recommendation ITU-R M.2083-0(09/2015)", [online], September, 2015, [Searched on Apr. 27, 2016], Internet <https://www.itu.int/dms_pubrec/itu-r/rec/m/R-REC-M.2083-0-201509-I!!PDF-E.pdf>
Non-Patent Document 12: 3GPP RWS-150006

SUMMARY

Problems to be Solved by the Invention

With the conventional technique of the MIMO, a cell determines a codebook in consideration of only an antenna port of its own cell to perform the MIMO with the UE. Here, a cell to which the UE is not connected or a cell that is not communicating is not considered. Thus, under a communication environment in the presence of a plurality of cells, interference occurs from the cell to which the UE is not connected or the cell that is not communicating.

Since the MIMO is performed within the same cell by assigning the presumably optimal transmission weight to the UEs being served by the cell, the UEs being served by the other cells may receive intense interference. Thus, the interference from the other cells degrades the communication quality, and reduces the communication rate. Moreover, the communication capacity for a system will decrease.

The object of the present invention is to provide a communication system capable of suppressing, under a communication environment in the presence of a plurality of cells, degradation in the communication quality and decrease in the communication rate and in the communication capacity due to interference from the other cells.

Means to Solve the Problems

A communication system according to the present invention includes a plurality of cells configuring one or more base station devices, and a communication terminal device capable of radio communication with each of the cells, wherein each of the cells includes a plurality of antenna elements, and performs the radio communication with the communication terminal device through the plurality of antenna elements, and each of the cells notifies the other cells of settings for measuring channel information on a channel for performing the radio communication of its own cell.

Effects of the Invention

The communication system according to the present invention includes a plurality of cells configuring one or more base station devices, and a communication terminal device capable of radio communication with each of the cells. Each of the cells performs the radio communication with the communication terminal device through a plurality of antenna elements included in the cell. Each of the cells notifies the other cells of settings for measuring channel information of its own cell. Consequently, each of the cells can recognize the settings for measuring the channel information of the other cells. Since each of the cells can reduce interference from the other cells, the cell can suppress degradation in the communication quality and decrease in the communication rate and in the communication capacity due to the interference from the other cells.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of a radio frame for use in an LTE communication system.

FIG. 3 is a block diagram showing the configuration of a user equipment 202 shown in FIG. 2, which is a communication terminal according to the present invention.

FIG. 4 is a block diagram showing the configuration of a base station 203 shown in FIG. 2, which is a base station according to the present invention.

FIG. 5 is a block diagram showing the configuration of an MME according to the present invention.

FIG. 6 is a flowchart showing an outline from a cell search to an idle state operation performed by a communication terminal (UE) in the LTE communication system.

FIG. 10 illustrates an example structure of the communication system when the SU-MIMO is performed with a UE 2-3 being served by a cell 2.

FIG. 11 illustrates an example sequence on a method for performing the SU-MIMO using a plurality of cells.

FIG. 12 illustrates the example sequence on the method for performing the SU-MIMO using the plurality of cells.

FIG. 13 illustrates another example sequence on a method for performing the SU-MIMO using a plurality of cells.

FIG. 17 is a conceptual diagram illustrating the method for performing the SU-MIMO only with a UE where interference is a problem.

FIG. 19 illustrates another example sequence on the method for performing the SU-MIMO using a plurality of cells.

FIG. 20 illustrates the other example sequence on the method for performing the SU-MIMO using the plurality of cells.

FIG. 21 illustrates the other example sequence on the method for performing the SU-MIMO using the plurality of cells.

FIG. 29 illustrates the example sequence on the method for performing the MU-MIMO only with the UEs where interference is a problem, using the plurality of cells.

FIG. 36 illustrates an example sequence on a method for performing the SU-MIMO in a channel estimating method according to the sixth modification of the first embodiment of the present invention.

FIG. 37 illustrates the example sequence on the method for performing the SU-MIMO in the channel estimating method according to the sixth modification of the first embodiment of the present invention.

FIG. 38 illustrates the example sequence on the method for performing the SU-MIMO in the channel estimating method according to the sixth modification of the first embodiment of the present invention.

FIG. 39 schematically illustrates correlations between UE antennas.

FIG. 40 illustrates a method performed by the UE for detecting whether interference is a problem.

FIG. 41 is a flowchart illustrating operations to be performed in blocks in an interference determining unit.

FIG. 46 illustrates a sequence on a method for performing the MU-MIMO with the UEs being served by the other cells where interference from its own cell is a problem inclusive.

FIG. 47 illustrates the sequence on the method for performing the MU-MIMO with the UEs being served by the other cells where interference from its own cell is a problem inclusive.

FIG. 51 illustrates the example sequence on the method for performing the MU-MIMO with the UEs where interference is a problem inclusive for each cell and forming beams from the non-serving cell through the HO.

FIG. 52 illustrates another example sequence on the method for performing the MU-MIMO with the UEs where interference is a problem inclusive for each cell and forming beams from the non-serving cell through the HO.

FIG. 61 illustrates the other example sequence on the method for performing the MU-MIMO with the UEs being served by the other cells where interference from its own cell is a problem inclusive.

DESCRIPTION OF EMBODIMENTS

First Embodiment

Figure 2:
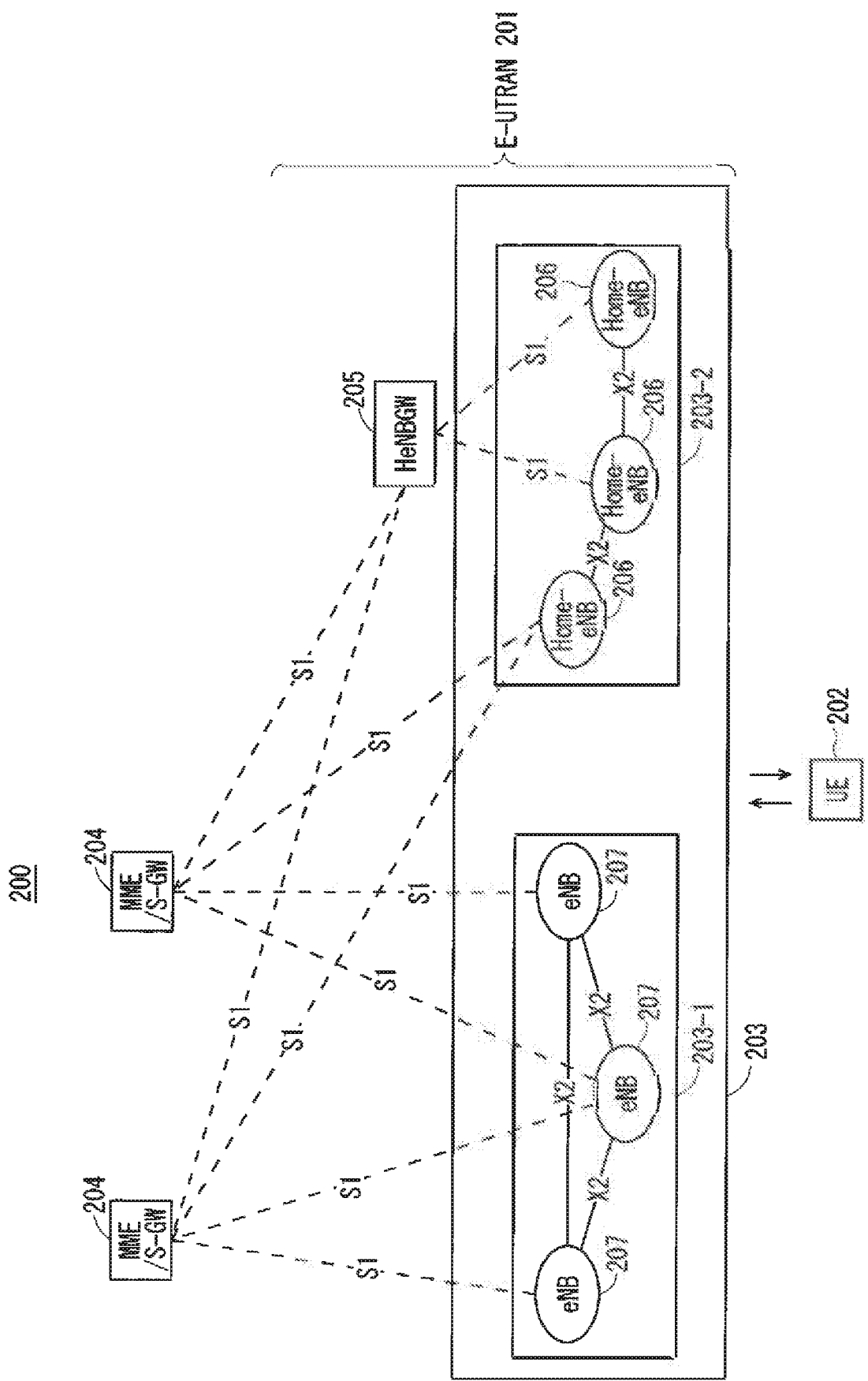
FIG. 2 is a block diagram showing the overall configuration of an LTE communication system 200 under discussion of 3GPP.

FIG. 2 is a block diagram showing an overall configuration of an LTE communication system 200, which is under discussion of 3GPP. FIG. 2 will be described. A radio access network is referred to as an evolved universal terrestrial radio access network (BE-UTRAN) 201. A user equipment device (hereinafter, referred to as a "user equipment (UE)") 202 that is a communication terminal device is capable of radio communication with a base station device (hereinafter, referred to as a "base station (E-UTRAN Node B: eNB)") 203 and transmits and receives signals through radio communication.

Here, the "communication terminal device" covers not only a user equipment device such as a movable mobile phone terminal device, but also an unmovable device such as a sensor. In the following description, the "communication terminal device" may be simply referred to as a "communication terminal".

The E-UTRAN is composed of one or a plurality of base stations 203, provided that a control protocol for the user equipment 202 such as a radio resource control (RRC), and user planes such as a packet data convergence protocol (PDCP), radio link control (RLC), medium access control (MAC), or physical layer (PHY) are terminated in the base station 203.

The control protocol radio resource control (RRC) between the user equipment 202 and the base station 203 performs broadcast, paging, RRC connection management, and the like. The states of the base station 203 and the user equipment 202 in RRC are classified into RRC_IDLE and RRC_CONNECTED.

In RRC_IDLE, public land mobile network (PLMN) selection, system information (SI) broadcast, paging, cell re-selection, mobility, and the like are performed. In RRC_CONNECTED, the user equipment has RRC connection and is capable of transmitting and receiving data to and from a network. In RRC_CONNECTED, for example, handover (HO) and measurement of a neighbor cell are performed.

The base stations 203 are classified into eNBs 207 and Home-eNBs 206. The communication system 200 includes an eNB group 203-1 including a plurality of eNBs 207 and a Home-eNB group 203-2 including a plurality of Home-eNBs 206. A system, composed of an evolved packet core (EPC) being a core network and an E-UTRAN 201 being a radio access network, is referred to as an evolved packet system (EPS). The EPC being a core network and the E-UTRAN 201 being a radio access network may be collectively referred to as a "network".

The eNB 207 is connected to an MME/S-GW unit (hereinafter, also referred to as an "MME unit") 204 including a mobility management entity (MME), a serving gateway (S-GW), or an MME and an S-GW by means of an S1 interface, and control information is communicated between the eNB 207 and the MME unit 204. A plurality of MME units 204 may be connected to one eNB 207. The eNBs 207 are connected to each other by means of an X2 interface, and control information is communicated between the eNBs 207.

The Home-eNB 206 is connected to the MME unit 204 by means of an S1 interface, and control information is communicated between the Home-eNB 206 and the MME unit 204. A plurality of Home-eNBs 206 are connected to one MME unit 204. Or, the Home-eNBs 206 are connected to the MME units 204 through a Home-eNB gateway (HeNBGW) 205. The Home-eNB 206 is connected to the HeNBGW 205 by means of an S1 interface, and the HeNBGW 205 is connected to the MME unit 204 by means of an S1 interface.

One or a plurality of Home-eNBs 206 are connected to one HeNBGW 205, and information is communicated therebetween through an S1 interface. The HeNBGW 205 is connected to one or a plurality of MME units 204, and information is communicated therebetween through an S1 interface.

The MME units 204 and HeNBGW 205 are entities of higher layer, specifically, higher nodes, and control the connections between the user equipment (UE) 202 and the eNB 207 and the Home-eNB 206 being base stations. The MME units 204 configure an EPC being a core network. The base station 203 and the HeNBGW 205 configure the B-UTRAN 201.

Further, 3GPP is studying the configuration below. The X2 interface between the Home-eNBs 206 is supported. In other words, the Home-eNBs 206 are connected to each other by means of an X2 interface, and control information is communicated between the Home-eNBs 206. The HeNBGW 205 appears to the MME unit 204 as the Home-eNB 206. The HeNBGW 205 appears to the Home-eNB 206 as the MME unit 204.

The interfaces between the Home-eNBs 206 and the MME units 204 are the same, which are the S1 interfaces, in both cases where the Home-eNB 206 is connected to the MME unit 204 through the HeNBGW 205 and it is directly connected to the MME unit 204.

The base station device 203 may configure a single cell or a plurality of cells. Each cell has a range predetermined as a coverage in which the cell can communicate with the user equipment 202 and performs radio communication with the user equipment 202 within the coverage. In the case where one base station device 203 configures a plurality of cells, every cell is configured so as to communicate with the user equipment 202.

FIG. 3 is a block diagram showing the configuration of the user equipment 202 of FIG. 2 that is a communication terminal according to the present invention. The transmission process of the user equipment 202 shown in FIG. 3 will be described. First, a transmission data buffer unit 303 stores the control data from a protocol processing unit 301 and the user data from an application unit 302. The data stored in the transmission data buffer unit 303 is passed to an encoding unit 304 and is subjected to an encoding process such as error correction. There may exist the data output from the transmission data buffer unit 303 directly to a modulating unit 305 without the encoding process. The data encoded by the encoding unit 304 is modulated by the modulating unit 305. The modulated data is converted into a baseband signal, and the baseband signal is output to a frequency converting unit 306 and is then converted into a radio transmission frequency. After that, a transmission signal is transmitted from an antenna 307 to the base station 203.

The user equipment 202 executes the reception process as follows. The radio signal from the base station 203 is received through the antenna 307. The received signal is converted from a radio reception frequency into a baseband signal by the frequency converting unit 306 and is then demodulated by a demodulating unit 308. The demodulated data is passed to a decoding unit 309 and is subjected to a decoding process such as error correction. Among the pieces of decoded data, the control data is passed to the protocol processing unit 301, and the user data is passed to the application unit 302. A series of processes by the user equipment 202 is controlled by a control unit 310. This means that, though not shown in FIG. 3, the control unit 310 is connected to the individual units 301 to 309.

FIG. 4 is a block diagram showing the configuration of the base station 203 of FIG. 2 that is a base station according to the present invention. The transmission process of the base station 203 shown in FIG. 4 will be described. An EPC communication unit 401 performs data transmission and reception between the base station 203 and the EPC (such as the MME unit 204), HeNBGW 205, and the like. A communication with another base station unit 402 performs data transmission and reception to and from another base station. The EPC communication unit 401 and the communication with another base station unit 402 each transmit and receive information to and from a protocol processing unit 403. The control data from the protocol processing unit 403, and the user data and the control data from the EPC communication unit 401 and the communication with another base station unit 402 are stored in a transmission data buffer unit 404.

The data stored in the transmission data buffer unit 404 is passed to an encoding unit 405 and is then subjected to an encoding process such as error correction. There may exist the data output from the transmission data buffer unit 404 directly to a modulating unit 406 without the encoding process. The encoded data is modulated by the modulating unit 406. The modulated data is converted into a baseband signal, and the baseband signal is output to a frequency converting unit 407 and is then converted into a radio transmission frequency. After that, a transmission signal is transmitted from an antenna 408 to one or a plurality of user equipments 202.

The reception process of the base station 203 is executed as follows. A radio signal from one or a plurality of user equipments 202 is received through the antenna 408. The received signal is converted from a radio reception frequency into a baseband signal by the frequency converting unit 407, and is then demodulated by a demodulating unit 409. The demodulated data is passed to a decoding unit 410 and is then subjected to a decoding process such as error correction. Among the pieces of decoded data, the control data is passed to the protocol processing unit 403, the EPC communication unit 401, or the communication with another base station unit 402, and the user data is passed to the EPC communication unit 401 and the communication with another base station unit 402. A series of processes by the base station 203 is controlled by a control unit 411. This means that, though not shown in FIG. 4, the control unit 411 is connected to the individual units 401 to 410.

FIG. 5 is a block diagram showing the configuration of the MME according to the present invention. FIG. 5 shows the configuration of an MME 204*a* included in the MME unit 204 shown in FIG. 2 described above. A PDN GW communication unit 501 performs data transmission and reception between the MME 204*a* and the PDN GW. A base station communication unit 502 performs data transmission and reception between the MME 204*a* and the base station 203 by means of the S1 interface. In the case where the data received from the PDN GW is user data, the user data is passed from the PDN GW communication unit 501 to the base station communication unit 502 via a user plane communication unit 503 and is then transmitted to one or a plurality of base stations 203. In the case where the data received from the base station 203 is user data, the user data is passed from the base station communication unit 502 to the PDN GW communication unit 501 via the user plane communication unit 503 and is then transmitted to the PDN GW.

In the case where the data received from the PDN GW is control data, the control data is passed from the PDN GW communication unit 501 to a control plane control unit 505. In the case where the data received from the base station 203 is control data, the control data is passed from the base station communication unit 502 to the control plane control unit 505.

A HeNBGW communication unit 504 is provided in the case where the HeNBGW 205 is provided, which performs data transmission and reception between the MME 204*a* and the HeNBGW 205 by means of the interface (IF) according to an information type. The control data received from the HeNBGW communication unit 504 is passed from the HeNBGW communication unit 504 to the control plane control unit 505. The processing results of the control plane control unit 505 are transmitted to the PDN GW via the PDN GW communication unit 501. The processing results of the control plane control unit 505 are transmitted to one or a plurality of base stations 203 by means of the S1 interface via the base station communication unit 502, and are transmitted to one or a plurality of HeNBGWs 205 via the HeNBGW communication unit 504.

The control plane control unit 505 includes a NAS security unit 505-1, an SAE bearer control unit 505-2, and an idle state mobility managing unit 505-3, and performs an overall process for the control plane. The NAS security unit 505-1 provides, for example, security of a non-access stratum (NAS) message. The SAE bearer control unit 505-2 manages, for example, a system architecture evolution (SAE) bearer. The idle state mobility managing unit 505-3 performs, for example, mobility management of an idle state (LTE-IDLE state, which is merely referred to as idle as well), generation and control of a paging signal in the idle state, addition, deletion, update, and search of a tracking area of one or a plurality of user equipments 202 being served thereby, and tracking area list management.

The MME 204*a* distributes a paging signal to one or a plurality of base stations 203. In addition, the MME 204*a* performs mobility control of an idle state. When the user equipment is in the idle state and an active state, the MME 204*a* manages a list of tracking areas. The MME 204*a* begins a paging protocol by transmitting a paging message to the cell belonging to a tracking area in which the UE is registered. The idle state mobility managing unit 505-3 may manage the CSG of the Home-eNBs 206 to be connected to the MME 204*a*, CSG IDs, and a whitelist.

An example of a cell search method in a mobile communication system will be described next. FIG. 6 is a flowchart showing an outline from a cell search to an idle state operation performed by a communication terminal (UE) in the LTE communication system. When starting a cell search, in Step ST601, the communication terminal synchronizes slot timing and frame timing by a primary synchronization signal. (P-SS) and a secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In Step ST602, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is derived from the PCI specified in Step ST601, so that the RS can be detected and the RS received power can be measured.

In Step ST603, next, the user equipment selects the cell having the best RS received quality, for example, the cell having the highest RS received power, that is, the best cell, from one or more cells that have been detected up to Step ST602.

In Step ST604, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST605, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST606, next, the communication terminal compares the TAC of the SIB1 received in Step ST605 with the TAC portion of a tracking area identity (TAI) in the tracking area list that has already been possessed by the communication terminal. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST606 shows that the TAC received in Step ST605 is identical to the TAC included in the tracking area list, the user equipment enters an idle state operation in the cell. If the comparison shows that the TAC received in Step ST605 is not included in the tracking area list, the communication terminal requires a core network (EPC) including MME and the like to change a tracking area through the cell for performing tracking area update (TAU).

The device configuring a core network (hereinafter, also referred to as a "core-network-side device") updates the tracking area list based on an identification number (such as UE-ID) of a communication terminal transmitted from the communication terminal together with a TAU request signal. The core-network-side device transmits the updated tracking area list to the communication terminal. The communication terminal rewrites (updates) the TAC list of the communication terminal based on the received tracking area list. After that, the communication terminal enters the idle state operation in the cell.

Widespread use of smartphones and tablet terminal devices explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of macro eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell having a relatively wide coverage, such as a cell configured by a conventional eNB, and a "macro eNB" refers to an eNB configuring a macro cell. A "small cell" refers to a cell having a relatively narrow coverage, such as a downsized cell, and a "small eNB" refers to an eNB configuring a small cell.

The macro eNB may be, for example, a "wide area base station" described in Non-Patent Document 7.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 7.

Figure 7:
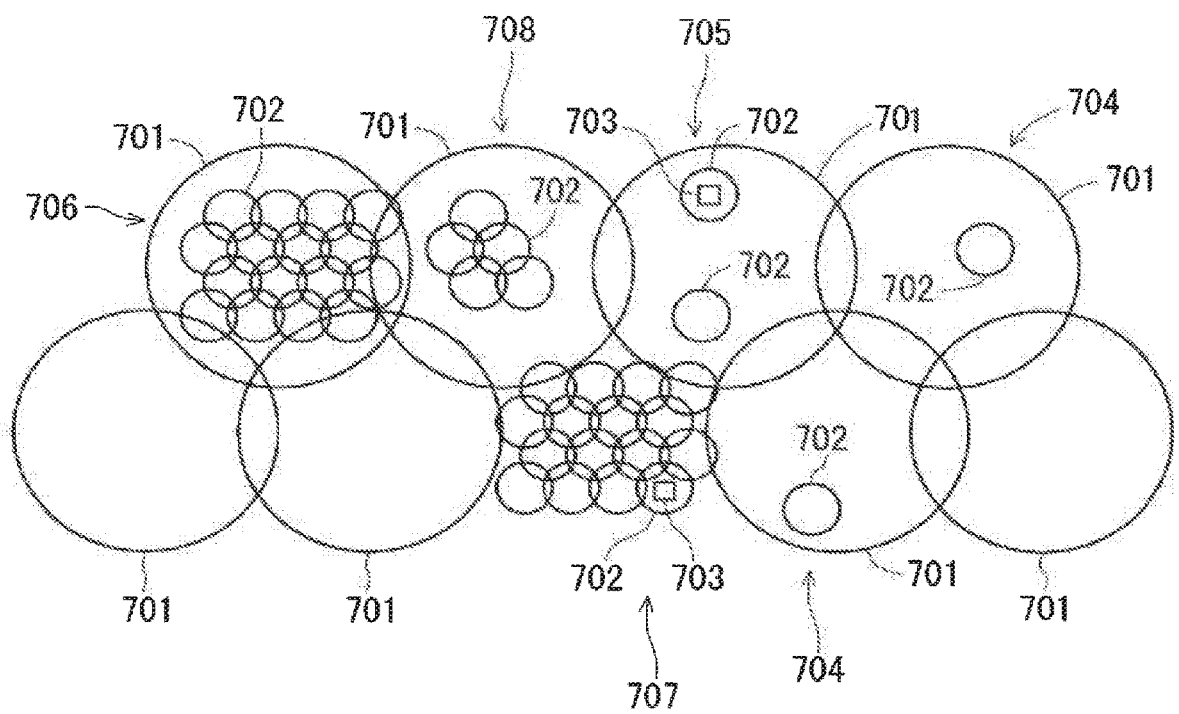
FIG. 7 shows the concept of a cell configuration when macro eNBs and small eNBs coexist.

FIG. 7 shows the concept of the cell configuration in which macro eNBs and small eNBs coexist. The macro cell configured by a macro eNB has a relatively-wide-range coverage 701. A small cell configured by a small eNB has a coverage 702 whose range is narrower than that of the coverage 701 of a macro eNB (macro cell).

When a plurality of eNBs coexist, the coverage of the cell configured by an eNB may be included in the coverage of the cell configured by another eNB. In the cell configuration shown in FIG. 7, as indicated by a reference "704" or "705", the coverage 702 of the small cell configured by a small eNB may be included in the coverage 701 of the macro cell configured by a macro eNB.

As indicated by the reference "705", the coverages 702 of a plurality of, for example, two small cells may be included in the coverage 701 of one macro cell. A user equipment (UE) 703 is included in, for example, the coverage 702 of the small cell and performs communication via the small cell.

In the cell configuration shown in FIG. 7, as indicated by a reference "706", the coverage 701 of the macro cell configured by a macro eNB may overlap the coverages 702 of the small cells configured by small eNBs in a complicated manner.

As indicated by a reference "707", the coverage 701 of the macro cell configured by a macro eNB may not overlap the coverages 702 of the small cells configured by small eNBs.

Further, as indicated by a reference "708", the coverages 702 of a large number of small cells configured by a large number of small eNBs may be configured in the coverage 701 of one macro cell configured by one macro eNB.

The conventional LTE and LTE-A define the Multiple Input Multiple Output (MIMO) systems. The MIMO is known as a technique for enabling a plurality of signals to be transmitted at the same frequency and with the same timing through spatial multiplexing of the signals to increase the spectral efficiency. There are various methods for calculating a transmission weight. For example, the LTE and the LTE-A introduce a method in which a cell side holds, in advance, a table for transmission weights that is called a codebook to select one of the transmission weights from the codebook with reference to the feedback information from a communication terminal.

Aside from the method, a study has been conducted on Introduction of a method for measuring channel information between a cell and a communication terminal and calculating a transmission weight from the channel information as necessary without using the codebook, as the next generation communication systems. The method enables derivation of a transmission weight with higher precision through calculation thereof from the channel information obtained from a channel state information reference signal (CSI-RS) received by the communication terminal or a sounding reference signal (SRS) received by a base station. This transmission weight will be referred to as a precoding weight.

A method for selecting a codebook is determined by a one-to-one correspondence between a cell and a communication terminal. Thus, a problem with influence of interference with communication terminals served by the other cells will arise. Table 6.3.4.2.3-2 in chapter 6.3.4 of Non-Patent Document 6 shows an example of the codebook. This table shows the example when the cell has 4 antenna ports. A precoding matrix indicator (PMI) and a rank indicator (RI) are found based on the CSI measured by the communication terminal. The transmission weight to be applied to the MIMO is determined through feedback of the found table to the cell side.

In the conventional MIMO, the cell determines a codebook for the UEs being served thereby in consideration of the antenna port solely for its own cell. Here, a cell to which the UE is not connected or a cell that is not communicating is not considered. Thus, under a communication environment in the presence of a plurality of cells, interference occurs from the cell to which the UE is not connected or the cell that is not communicating. When the presumably optimal transmission weight is assigned to the UEs being served by a cell within the same cell, the UEs being served by the other cells may receive intense interference. Thus, the interference from the other cells degrades the communication quality, and reduces the communication rate. Moreover, the communication capacity for a system will decrease. The first embodiment will disclose a method for solving such problems.

The MIMO is performed using a plurality of cells. The MIMO is performed between a plurality of cells and the UEs being served by the cells. When the MIMO is performed, the precoding is performed with the UEs being served by a plurality of cells using the plurality of cells. According to the first embodiment, single user-MIMO (SU-MIMO) is performed as the MIMO.

Figure 8:
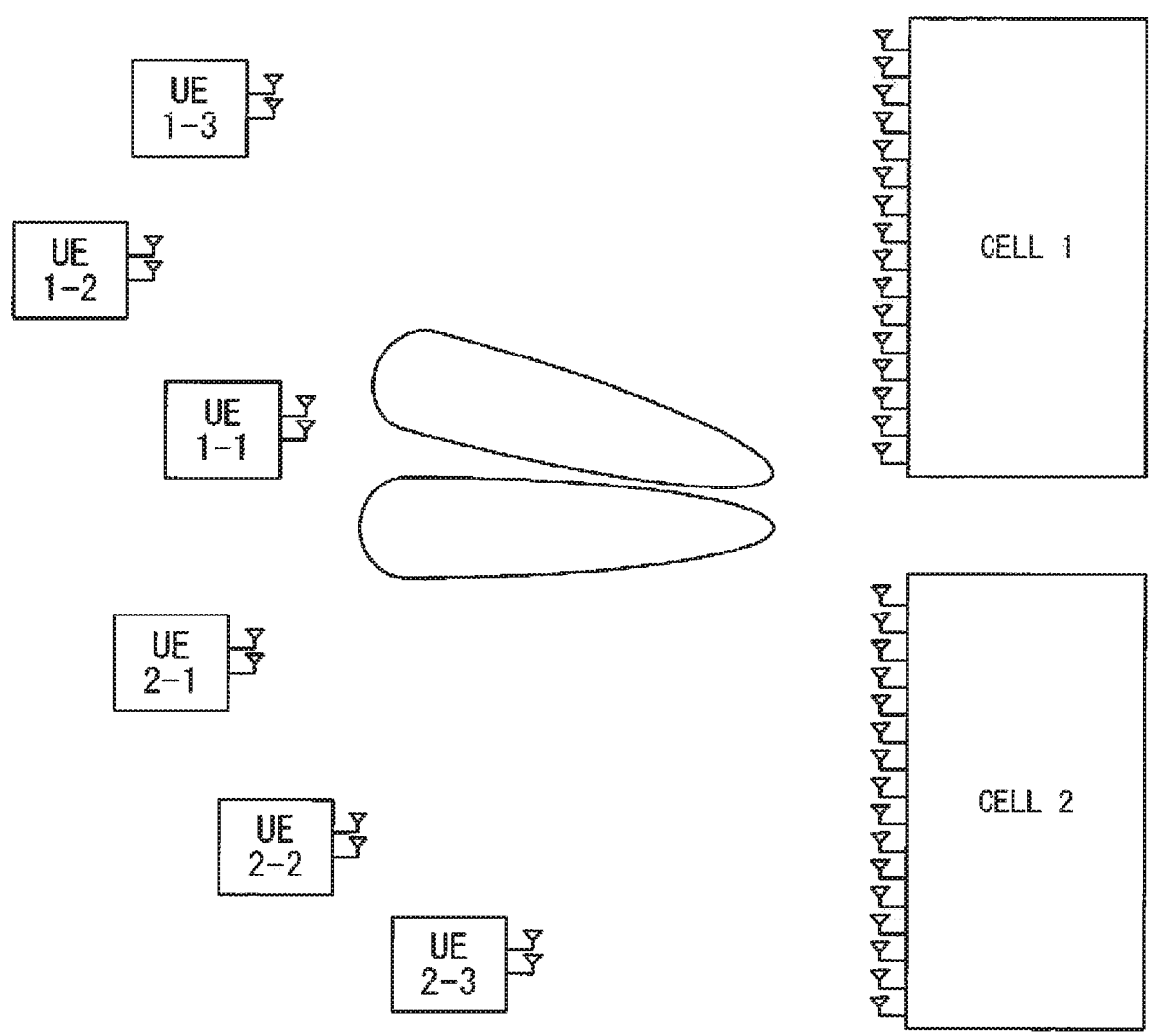
FIG. 8 illustrates an example structure of a communication system when the SU-MIMO is performed with a UE 1-1 being served by a cell 1.
Figure 9:
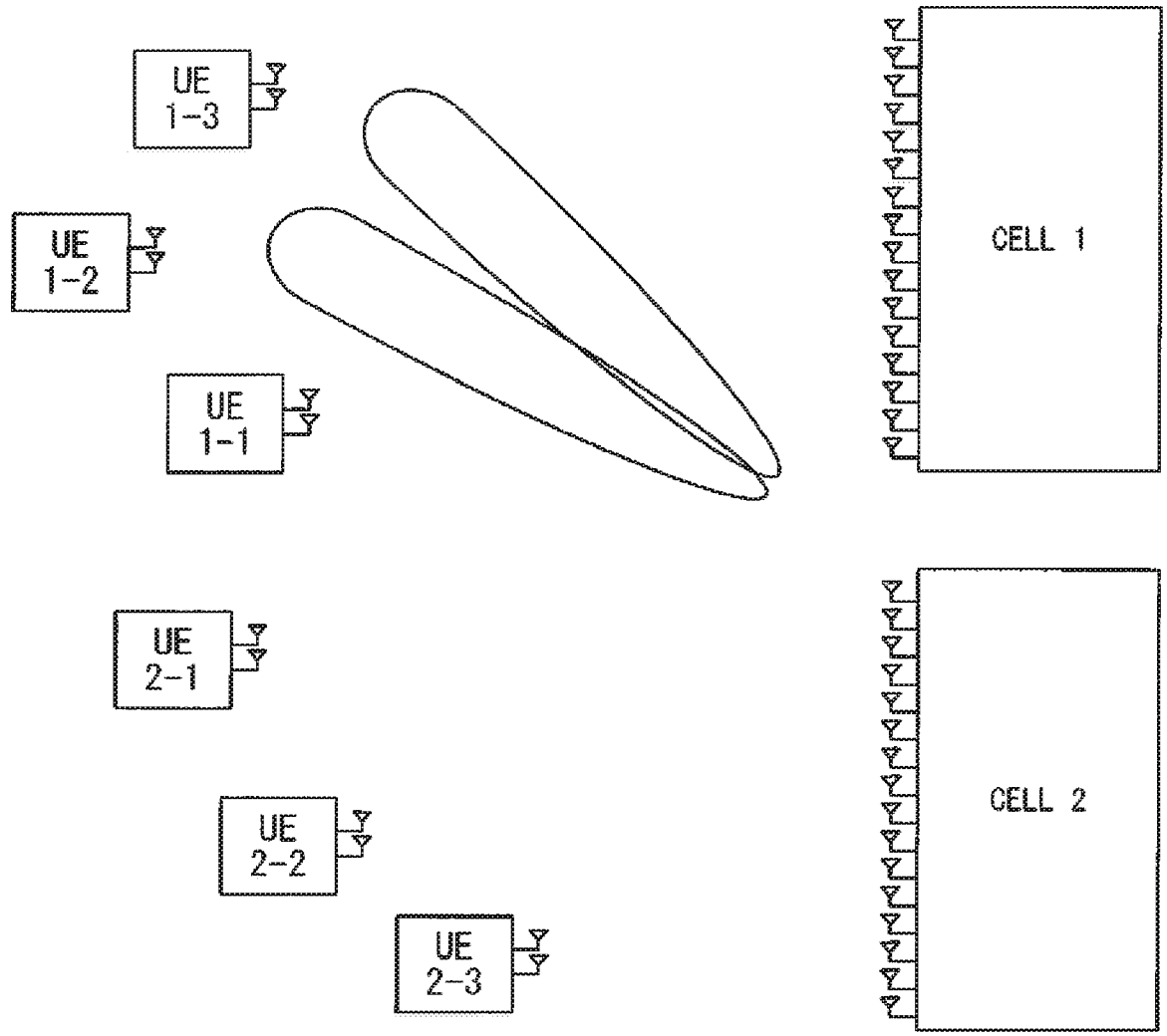
FIG. 9 illustrates an example structure of the communication system when the SU-MIMO is performed with a UE 1-3 being served by the cell 1.

FIGS. 8 to 10 are conceptual diagrams illustrating a method for performing the SU-MIMO using a plurality of cells. FIGS. 8 to 10 illustrate the adoption of two cells of a cell 1 and a cell 2. A UE 1-*n* (n is a natural number) is a UE being served by the cell 1, and a UE 2-*m* (m is a natural number) is a UE being served by the cell 2. The MIMO is performed with each of the UEs being served by the cells 1 and 2, using the cells 1 and 2. Different resources on the frequency axis and the time axis (hereinafter may be referred to as "f-t resources") are allocated to the UEs. When the f-t resources allocated to the UEs are different, the UEs may be allocated to the same time.

FIG. 8 illustrates an example structure of a communication system when the SU-MIMO is performed with the UE 1-1 being served by the cell 1. The precoding is performed with the UE 1-1 on a plurality of layers using the cells 1 and 2 to form beams. A different stream is transmitted to the UE 1-1 for each of the layers. Since the precoding maintains the orthogonality between the beams formed for each of the layers, the UE 1-1 can receive a plurality of the transmitted streams. Thus, the SU-MIMO is performed with the UE 1-1 using the cells 1 and 2.

In the example illustrated in FIG. 8, the SU-MIMO is performed using the cells 1 and 2. Consequently, the precoding is performed with the UE 1-1 in consideration of the transmission not only from the cell 1 but also from the cell 2. Since the interference from the cell 2 to the UE 1-1 can be reduced more than that when the SU-MIMO is performed only with the cell 1, the interference from the non-serving cell to the UE can be reduced.

FIG. 9 illustrates an example structure of the communication system when the SU-MIMO is performed with the UE 1-3 being served by the cell 1. FIG. 10 illustrates an example structure of the communication system when the SU-MIMO is performed with the UE 2-3 being served by the cell 2. Performing the SU-MIMO with each of the UEs using the cells 1 and 2 enables reduction in the interference from a non-serving cell to the UE.

A specific example structure of the communication system when the SU-MIMO is performed using a plurality of cells will be disclosed. A cell notifies the surrounding cells of settings for measuring the channel information of its own cell (hereinafter may be referred to as "CSI settings"). The cell may notify the identifier of its own cell together with the CSI settings, or include the identifier of its own cell in the CSI settings to notify the identifier. This enables the cell upon receipt of the CSI settings to recognize for which cell the CSI settings are. Consequently, the cell can recognize the CSI settings of the surrounding cells.

The CSI settings are, for example, information on a signal for measuring the channel information for each cell. The signal for measuring the channel information for each cell may be a signal with a known sequence. The CSI settings may be information on the known sequence of the signal for measuring the channel information for each cell. The CSI settings may be, for example, information on a reference signal (CSI-RS) for each antenna port of a cell.

The CSI settings may include mapping information on the signal for measuring the channel information for each cell. Examples of the mapping information include an insertion position and an insertion period of a frequency and a time, etc., a transmission power, and an offset power value relative to a reference transmission power value.

The CSI settings may include information for measuring the channel information (hereinafter may be referred to as "channel measuring information"). Examples of the channel measuring information include the number of filtering operations, a filtering duration, and a measuring period.

The CSI settings may include information for reporting a result of the measured channel information. Examples of the information for reporting the result of the measured channel information include report timing and a reporting period.

The CSI settings may include information on a method for estimating a channel. The information on a method for estimating a channel that is included in the CSI settings may include information on an estimate to be used for the estimation. The estimate may be an instantaneous value. The estimate may be an average for a constant duration during which filtering has been performed. The CSI settings may include information on cross-correlation with signals of a serving cell. The CSI settings may include information indicating which one of the CSI-RS and the SRS is used. The information on cross-correlation with signals of the serving cell that is found from the measurement result may be replaced with an estimate for a channel.

The method for estimating a channel is a method for estimating the channel information. Here, the channel information is distortion information on phase and amplitude of a signal given in a space between a cell and a communication terminal. The channel information is derived using a signal with a known sequence, for example, a reference signal such as the CSI-RS and the SRS. Methods for deriving the channel information include two methods: a measuring method using the CSI-RS (downlink) and a measuring method using the SRS (uplink). Out of these, Non-Patent Document 6 describes the measuring method using the CSI-RS. Non-Patent Document 13 describes the measuring method using the SRS.

A serving cell is a system cell that establishes a radio link with a radio communication terminal. The signals of the serving cell are signals generally received from the serving cell. The signals include data channels, control channels, RSs. and all the signals. The signals are RSs if nothing is particularly specified. In FIGS. 8 to 10, a serving cell of the UE 1-$n$ (n is a natural number) is the cell 1. A serving cell of the UE 2-$m$ (m is a natural number) is the cell 2.

The information on cross-correlation with signals of the serving cell is information indicating a cross-correlation between the channel information between a serving cell and a communication terminal connected to the serving cell and the channel information between a non-serving cell and the communication terminal. For example, the information on cross-correlation with signals of the serving cell in FIGS. 8 to 10 is a correlation value between the channel Information between the cell 1 and the UE 1-1 and the channel information between the cell 2 and the UE 1-1.

When the channel information is estimated using the RS, the information on cross-correlation with signals of the serving cell corresponds to correlation information between a receiving vector of the RS transmitted from a serving cell and received by a UE and a receiving vector of the RS transmitted from a non-serving cell and received by the UE.

The CSI settings may be notified via the X2 interface. When a cell is installed or when the CSI settings are updated, the CSI settings may be notified to the surrounding cells. The CSI settings may be included in an existing message. For example, the CSI settings may be included in an "X2 SETUP REQUEST" message and notified via the message when a cell is installed. The CSI settings may also be included in an "eNB Configuration Update" message and notified via the message when the CSI settings are updated. Including the CSI settings in an existing message eliminates the need for providing a new message, and enables simplification of communication control between cells and reduction in the signaling load between the cells. The X2 interface allows for a notification with lower latency.

The CSI settings may be notified via the S1 interface. When a cell is installed or when the CSI settings are updated, the CSI settings may be notified to the surrounding cells. The CSI settings may be notified through a core network node, for example, an MME. The CSI settings may be included in an existing message to be notified. The CSI settings may be included in, for example, an "S1 SETUP REQUEST" message, an "eNB Configuration Update" message, an "eNB Configuration Transfer" message, an "MME Direct Information Transfer" message, etc. to be notified. Including the CSI settings in an existing message eliminates the need for providing a new message, and enables simplification of communication control between cells and reduction in the signaling load between the cells.

Each of the cells may make the CSI settings. Consequently, the settings can be made according to the number of antenna ports of its own cell and a use state of resources.

As an alternative method, a node with a function of concentrating control over a plurality of cells may make the CSI settings of each of the cells. Hereinafter, the node with the function of concentrating control over a plurality of cells will be referred to as a "concentrator". The eNB may have the function. When the eNB has the function, the eNB plays a role as the concentrator. The MME may have the function of the concentrator. Here, the S1 interface is used.

In the next generation communication systems, dividing base stations into a Centralized Unit (CU) and Distributed Units (DUs) is under study (see Non-Patent Document 8). In such a case, the base stations, that is, either the CU or the DUs may have the function. Alternatively, the CU may have a part of the function, and the DUs may have the other parts of the function. For example, when the MIMO is performed using a plurality of cells in one of the DUs, the DU may have the function. For example, when the MIMO is performed using cells in a different one of the DUs, the CU may have the function. Consequently, even when the CU and the DUs are separately arranged, the MIMO can be performed using a plurality of cells.

When the concentrator makes the CSI settings of each of the cells, the concentrator notifies the cells being served thereby of the CSI settings of the cell. The concentrator may notify the identifier of each of the cells together with the CSI settings, or include the identifier in the CSI settings to notify the identifier. This enables the cell upon receipt of the CSI settings to recognize for which cell the CSI settings are.

As an alternative method, operation administration and maintenance (OAM) may make the CSI settings of each of the cells. When the OAM makes the CSI settings of each of the cells, the OAM notifies the cells being served thereby of the CSI settings of the cell. The OAM may notify the identifier of each of the cells together with the CSI settings, or include the identifier in the CSI settings to notify the identifier. This enables the cell upon receipt of the CSI settings to recognize for which cell the CSI settings are.

A cell notifies the UEs being served thereby of the CSI settings of its own cell. The cell also notifies the UEs being served thereby of the CSI settings of the surrounding cells. The cell may broadcast the CSI settings as the broadcast information. Alternatively, the cell may notify the UE of the CSI settings via dedicated signaling.

A group of cells capable of the MIMO may be set. Alternatively, a pair of cells capable of the MIMO may be set. The group of cells capable of the MIMO or the pair of cells capable of the MIMO will be hereinafter referred to as a MIMO cell. The OAM may determine the MIMO cell. Alternatively, the concentrator may determine the MIMO cell. The OAM or the concentrator notifies the MIMO cell of identifiers of cells included in the MIMO cell. Consequently, each of the cells included in the MIMO cell can recognize with which cell the MIMO can be performed. Each of the cells included in the MIMO cell can also recognize cells to which the CSI settings are notified.

The cell to which the CSI settings are notified may be limited to a cell capable of the MIMO with its own cell. The cells to which the CSI settings are notified may be limited to the MIMO cells. The cell capable of the MIMO may be changed for each UE. Consequently, the amount of signaling for making the CSI settings between the cells can be reduced.

Upon receipt of the CSI settings of a serving cell and the CSI settings of the surrounding cells from the serving cell, the UE measures the channel information with the CSI settings. The UE notifies the serving cell of a result of the measured channel information. When the signal for measuring the channel information is the CSI-RS, the UE notifies the CSI as the measurement result.

The channel information found from the CSI-RS or the SRS may be a complex matrix with size of a product of the number of transmission antenna ports of the relevant cell and the number of reception antennas of the relevant UE.

The UE may notify the serving cell of the result of the measured channel information via the RRC signaling. The RRC signaling enables the transmission at a lower error rate under the retransmission control.

As an alternative method, an L1/L2 control channel may be used. For example, the PUCCH may be used under the LTE. With the L1/L2 control channel, the transmission latency can be reduced. Thus, the channel information measured by the UE can be notified to the serving cell earlier, and reflected on the MIMO earlier.

Consequently, the serving cell can obtain the results of the measured channel information of its own cell and the surrounding cells from the UEs being served thereby.

Upon obtainment of the results of the measured channel information of its own cell and the surrounding cells from the UEs being served thereby, the cell notifies the results of the measured channel information to a node for scheduling and precoding. A node for scheduling and a node for precoding may be separately provided. When the node for scheduling and the node for precoding are separately provided, the cell may notify both the node for scheduling and the node for precoding of the results of the measured channel information from the UEs being served thereby.

Assume that the node for scheduling and precoding is a concentrator.

When one eNB configuring the cells that perform the MIMO in a coordinated manner is a concentrator, the result of the measured channel information is notified between eNBs. The result of the measured channel information may be notified via the X2 interface. Alternatively, the result of the measured channel information may be notified via the S1 interface. The result of the measured channel information may be notified through a core network node, for example, an MME. Alternatively, the result of the measured channel information may be included in an existing message of the X2 interface or the S1 interface to be notified. Here, the method disclosed as the method for notifying the CSI settings may be applied. Consequently, the same advantages as those of the method disclosed as the method for notifying the CSI settings can be produced.

When obtaining, from a cell being served by a concentrator, results of the measured channel information on a serving cell and the surrounding cells of the UEs being served by its own cell, the concentrator schedules all the UEs being served by a plurality of cells that perform the MIMO in a coordinated manner. The scheduling includes allocation of the f-t resources and the modulation and coding scheme (MCS). In the SU-MIMO, one UE is scheduled per f-t resource. The concentrator schedules all the UEs, which can facilitate the execution of the SU-MIMO.

The concentrator that schedules all the UBs being served by a plurality of cells that perform the MIMO in a coordinated manner performs the precoding with all the UEs being served by the plurality of cells that perform the MIMO in a coordinated manner. Specifically, the concentrator derives precoding weights using the results of the measured channel information of the UEs that are obtained from the cells being served thereby. Consequently, the concentrator can perform the precoding for the SU-MIMO using a plurality of cells.

The concentrator notifies each of the cells that perform the MIMO in a coordinated manner of a result of the scheduling. Here, the concentrator may notify the scheduling information of each of the cells.

The concentrator notifies each of the cells that perform the MIMO in a coordinated manner of a result of the precoding. Here, the concentrator notifies precoding information an each of the cells.

Consequently, transmission from each of the cells that perform the MIMO in a coordinated manner to all the UEs becomes possible.

When one eNB configuring the cells that perform the MIMO in a coordinated manner is a concentrator, the scheduling information or the precoding information is notified between eNBs. The scheduling information or the precoding information may be notified via the X2 interface. Alternatively, the scheduling information or the precoding information may be notified via the S1 interface. The scheduling information or the precoding information may be notified through a core network node, for example, an MME. Alternatively, the scheduling information or the precoding information may be included in an existing message of the X2 interface or the S1 interface to be notified. Alternatively, the method disclosed as the method for notifying the CSI settings may be applied. Consequently, the same advantages as those of the method disclosed as the method for notifying the CSI settings can be produced.

Each of the cells schedules all the UEs with the scheduling information notified from the concentrator.

Each of the cells sets the MIMO to all the UBs with the precoding information notified from the concentrator.

The MIMO settings may include calculation of a precoding weight by the concentrator based on the CSI measured by each of the target UEs. The MIMO settings may include information in which transmission data streams are associated with the calculated precoding weights. The MIMO settings may include information in which transmission data is associated with the transmission target UE. The MIMO settings may include information obtained by multiplying a precoding weight by the transmission data. The MIMO settings may include settings for modulation schemes for transmission data streams. The MIMO settings may include a coding rate. The MIMO settings may include settings for the number of transmission streams with rank adaptation.

The rank adaptation indicates the number of data streams that are calculated from the channel information and that can be transmitted.

A cell performs DL transmission to all the UEs for SU-MIMO transmission. The cell performs DL transmission to UEs not being served thereby. Conventionally, the cell does not perform the DL transmission to the UEs not being served thereby. The cell enables the SU-MIMO using a plurality of cells through the DL transmission even to the UBs not being served thereby. Consequently, the UE can reduce the interference from a non-serving cell.

The cell notifies the UEs being served thereby of scheduling information on a downlink physical channel (PDSCH) for the DL transmission. The scheduling information may be notified via an L1/L2 control channel. For example, a PDCCH or an EPDCCH may be used.

The cell may apply a UE-specific reference signal dedicated to the UE, such as a DM-RS, as a downlink physical channel (PDSCH) for the DL transmission for the UEs not being served thereby to perform the DL transmission to the UEs not being served thereby. Conventionally, a reference signal for each cell (CRS) has been used as the PDSCH. Application of the UE-dedicated reference signal enables the UE to receive the PDSCH from a non-serving cell.

A serving cell may determine the UE-dedicated reference signal. The serving cell notifies the UE of information on the UE-dedicated reference signal. The information on the UE-dedicated reference signal may be notified via the RRC signaling. The information on the UE-dedicated reference signal may be notified via dedicated signaling because the information is UE-dedicated information.

Alternatively, the information may be notified via the MAC signaling. Alternatively, the information may be notified via the L1/L2 control channel. This enables the dynamic application with less latency.

A concentrator may determine the UE-dedicated reference signal. The concentrator notifies the UE of information on the UE-dedicated reference signal through the serving cell. The concentrator determines UE-dedicated reference signals, which enables allocation of the UE-dedicated reference signals to a plurality of cells without any overlap. Thus, it is possible for the UE to eliminate erroneous receipt of the PDSCH transmitted to another UE.

The serving cell notifies the UEs being served thereby of a cell identifier of a non-serving cell. The UE can receive a signal from the non-serving cell with the identifier. If an identifier of the serving cell is identical to the identifier of the non-serving cell, the notification may be omitted. Without any notification of the identifier of the non-serving cell, the UE may consider the identifier of the non-serving cell to be the same as the identifier of the serving cell.

FIGS. 11 to 12 illustrate an example sequence on a method for performing the SU-MIMO using a plurality of cells. FIGS. 11 and 12 are connected across a location of a border BL1. FIGS. 11 to 12 illustrate one example of performing the SU-MIMO using the cells 1 and 2. FIGS. 11 to 12 also illustrate processes to be performed by the UE 1-1 and the UE 1-3 that are being served by the cell 1 and the UE 2-3 being served by the cell 2.

In Step ST901, the cell 2 notifies the CSI settings of its own cell to the cell 1 that is the surrounding cell.

In Step ST902, the cell 1 notifies the CS settings of its own cell to the cell 2 that is the surrounding cell.

In Step ST903, the cell 1 notifies the UE 1-1 being served thereby of the CSI settings of its own cell and the CSI settings of the cell 2.

In Step ST904, the cell 1 notifies the UE 1-3 being served thereby of the CSI settings of its own cell and the CSI settings of the cell 2.

In Step ST905, the cell 2 notifies the UE 2-3 being served thereby of the CSI settings of its own cell and the CSI settings of the cell 1.

Upon receipt of the CSI settings of the serving cell and the surrounding cell, the UE 2-3, the UE 1-3, and the UE 1-1 measure the channel information with the CSI settings in Step ST906, Step ST907, and Step ST908, respectively. The UEs measure the channel information of not only the serving cell but also the surrounding cell, that is, the non-serving cell.

In Step ST909, the UE 1-1 notifies the cell 1 that is the serving cell of the results of the measured channel information of the cells 1 and 2.

In Step ST910, the UE 1-3 notifies the cell 1 that is the serving cell of the results of the measured channel information of the cells 1 and 2.

In Step ST911, the UE 2-3 notifies the cell 2 that is the serving cell of the results of the measured channel information of the cells 1 and 2.

In Step ST912, the cell 1 notifies the concentrator of the results of the measured channel information of the cells 1 and 2 obtained from the UE 1-1 being served thereby, together with a UEID that is an identifier of the UE.

In Step ST913, the cell 1 notifies the concentrator of the results of the measured channel information of the cells 1 and 2 obtained from the UE 1-3 being served thereby, together with a UEID that is an identifier of the UE.

In Step ST914, the cell 2 notifies the concentrator of the results of the measured channel information of the cells 1 and 2 obtained from the UE 2-3 being served thereby, together with a UEID that is an identifier of the UE.

Upon obtainment of the results of the measured channel information of the cells 1 and 2 from the UBs being served by the cells 1 and 2 in Step ST912, Step ST913, and Step ST914, the concentrator performs a process in Step ST915. In Step ST915, the concentrator schedules all the UEs being served by the cells 1 and 2.

Upon obtainment of the results of the measured channel information of the cells 1 and 2 from the UEs being served by the cells 1 and 2 in Step ST912, Step ST913, and Step ST914, the concentrator performs a process in Step ST916. In Step ST916, the concentrator derives precoding weights of all the UEs being served by the cells 1 and 2.

In Step ST917, the concentrator notifies the cell 2 of scheduling information on the cell 2 of all the UEs being served by the cells 1 and 2.

In Step ST918 of FIG. 12, the concentrator notifies the cell 1 of scheduling information on the cell 1 of all the UEs being served by the cells 1 and 2.

In Step ST919, the concentrator notifies the cell 2 of precoding information on the cell 2 of all the UEs being served by the cells 1 and 2.

In Step ST920, the concentrator notifies the cell 1 of precoding information on the cell 1 of all the UEs being served by the cells 1 and 2.

In Step ST921, the cell 1 schedules all the UEs with the scheduling information received in Step ST918.

In Step ST922, the cell 2 schedules all the UEs with the scheduling information received in Step ST917.

In Step ST923, the cell 1 makes the MIMO settings of all the UEs with the precoding information received in Step ST920.

In Step ST924, the cell 2 makes the MIMO settings of all the UEs with the preceding information received in Step ST919.

In Step ST925, the cell 2 performs the SU-MIMO transmission to the UE 1-1 according to the scheduling in Step ST922 and the MIMO settings made in Step ST924.

In Step ST926, the cell 2 performs the SU-MIMO transmission to the UE 1-3 according to the scheduling in Step ST922 and the MIMO settings made in Step ST924.

In Step ST927, the cell 2 performs the SU-MIMO transmission to the UE 2-3 according to the scheduling in Step ST922 and the MIMO settings made in Step ST924.

In Step ST928, the cell 1 performs the SU-MIMO transmission to the UE 1-1 according to the scheduling in Step ST921 and the MIMO settings made in Step ST923.

In Step ST929, the cell 1 performs the SU-MIMO transmission to the UE 1-3 according to the scheduling in Step ST921 and the MIMO settings made in Step ST923.

In Step ST930, the cell 1 performs the SU-MIMO transmission to the UE 2-3 according to the scheduling in Step ST921 and the MIMO settings made in Step ST923.

In this manner, a plurality of cells, that is, the cells 1 and 2 herein perform the SU-MIMO transmission to the UE 1-1, the UE 1-3, and the UE 2-3.

The method disclosed in the first embodiment enables precoding using a plurality of cells. The plurality of cells and the UEs being served by the cells can perform the SU-MIMO. When the SU-MIMO is performed, the precoding can be performed with the UEs being served by a plurality of cells using the plurality of cells.

The SU-MIMO with the result of the measured channel information of the surrounding cell other than the serving cell of the UE can reduce the interference from the surrounding cell other than the serving cell. Reduction in the interference from the surrounding cell can increase the communication quality for the UE. Moreover, the communication capacity for a system can be increased. Particularly, outstanding advantages can be produced in a situation where there are many small cells and the interference between the cells increases.

First Modification of First Embodiment

The first embodiment discloses the method for performing the SU-MIMO in consideration of a plurality of cells. The first embodiment merely discloses the method for performing the SU-MIMO in consideration of a plurality of cells, and does not mention selection of a communication terminal (UE) to be subjected to the SU-MIMO. Efficiently selecting the target UE is necessary to sufficiently obtain the advantages of the MIMO using a plurality of cells. Without selecting the UE, the amount of information to be notified from the UE to the cell will be enormous. The UE needs to measure the CSI of not only the serving cell but also another cell that is the non-serving cell, and report the results. Thus, the following five problems (1) to (5) will arise:

(1) the power consumption of the UE will be increased; (2) enormous amounts of uplink f-t resources are required to report the measurement results; (3) resources for data will decrease; (3) the precoding computation will increase and be complicated: and (5) the scheduling of many UEs will be complicated.

To solve such problems, a solution according to the first modification of the first embodiment will be disclosed hereinafter.

The UE determines the presence or absence of a cell whose interference is a problem, from a result of the measured CSI. The UE does not notify a cell of the result of the measured CSI of a cell whose interference is not a problem.

No notification of the result of the measured CSI to the cell can reduce the uplink f-t resources.

If the interference with the UE is not a problem, the cell does not notify the concentrator of the result of the measured CSI. If the result of the measured CSI is not notified, the concentrator derives a precoding weight with a predetermined value. Here, the predetermined value may be, for example, a value with an amplitude of 0. The result of the measured CSI of a cell whose interference is not a problem may not be considered in deriving a precoding weight by its exclusion from the calculation.

As described in the first embodiment, the target UEs being served by each cell other than the UEs whose interference is a problem may be scheduled not through a process of transmitting information to the concentrator but through an independent process in the cell. Here, a plurality of cells perform, in a coordinated manner, the SU-MIMO with the UE 1-1 being served by its own cell whose interference is a problem, whereas each of the cells performs normal SU-MIMO with the UE where interference from the other cells is not a problem.

The UE needs to identify a cell whose interference is not a problem. Information measured on the UE side is available as a method for identifying the cell whose interference is not a problem. Here, the downlink reference signal received power (RSRP), the Reference Signal Received Quality (RSRQ), or a signal-to-interference-plus-noise power ratio (abbreviated as SINR) each of which can be measured from the CSI-RS may be used. The size of an eigenvalue found from a matrix of the measured channel information may be used. When the measured value is smaller than a predetermined threshold, it may be determined that interference is not a problem. CSI-interference measurement (CSI-IM) or CSI-RS (zero power) may be used as a signal to be measured when the UE identifies a cell whose interference is a problem. Alternatively, the CRS may be used.

The predetermined threshold may be statically predetermined, or notified from the serving cell to the UE. The predetermined threshold may be broadcast via a broadcast channel, or may be individually signaled. When it is determined that interference is not a problem, the UE may transmit information indicating no interference.

Figure 14:
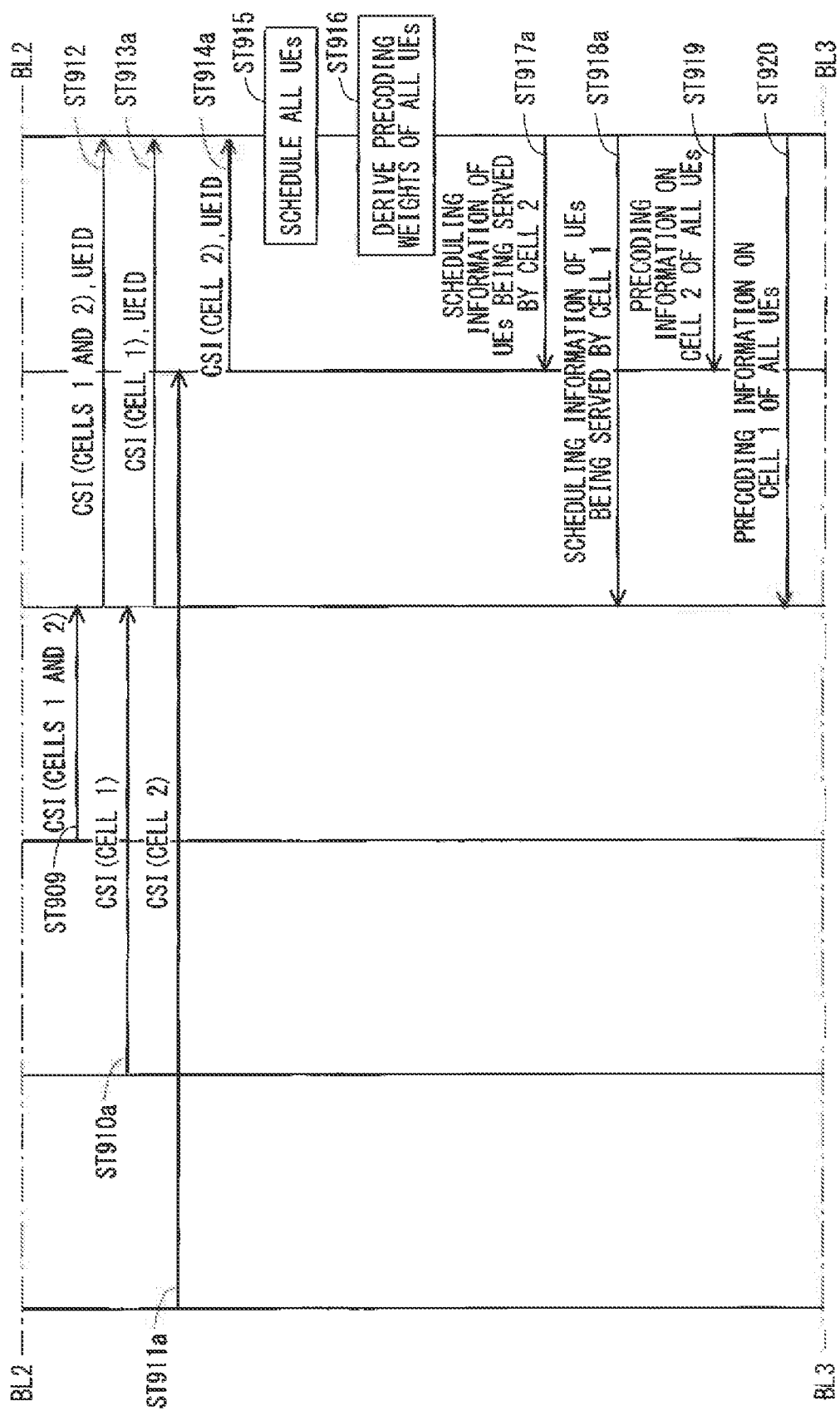
FIG. 14 illustrates the other example sequence on the method for performing the SU-MIMO using the plurality of cells.
Figure 15:
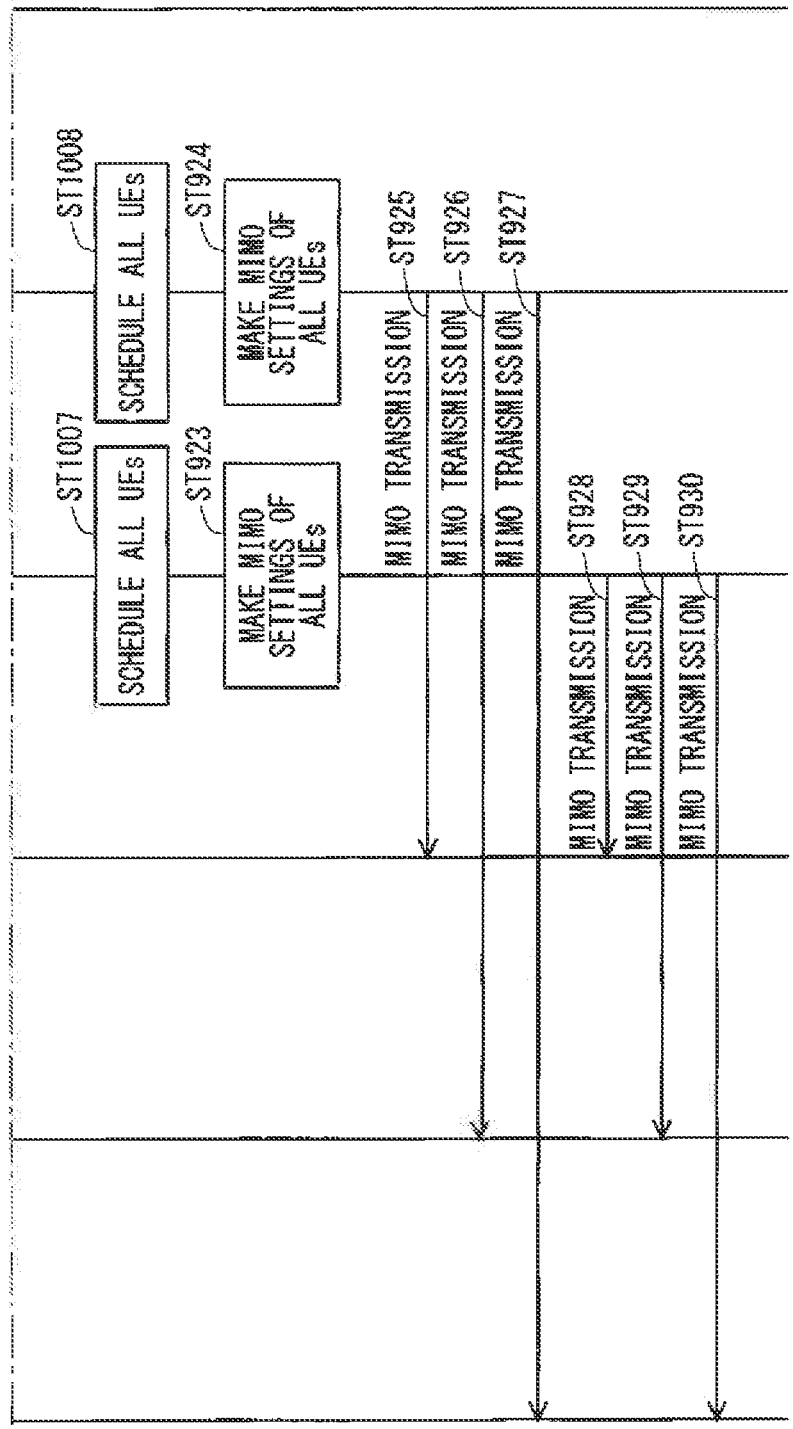
FIG. 15 illustrates the other example sequence on the method for performing the SU-MIMO using the plurality of cells.

FIGS. 13 to 15 illustrate another example sequence on the method for performing the SU-MIMO using a plurality of cells. FIGS. 13 and 14 are connected across a location of a border BL2. FIGS. 14 and 15 are connected across a location of a border BL3. FIGS. 13 to 15 illustrate performing the SU-MIMO using the cells 1 and 2. FIGS. 13 to 15 also illustrate processes to be performed by the UE 1-1 and the UE 1-3 that are being served by the cell 1 and the UE 2-3 being served by the cell 2. Since the sequence illustrated in FIGS. 13 to 15 includes the same Steps as those in the sequence illustrated in FIGS. 11 and 12, the same step numbers will be assigned to the same Steps and the common description thereof will be omitted.

In Step ST1001 after the processes in Steps ST901 to ST908, the UE 2-3 determines the presence or absence of a cell whose interference is not a problem from the measurement result obtained in Step ST906.

In Step ST1002, the UE 1-3 determines the presence or absence of a cell whose interference is not a problem from the measurement result obtained in Step ST907.

In Step ST1003, the UE 1-1 determines the presence or absence of a cell whose interference is not a problem from the measurement result obtained in Step ST908.

In Step ST1004, the UE 2-3 identifies the cell 1 as the cell whose interference is not a problem.

In Step ST1005, the UE 1-3 identifies the cell 2 as the cell whose interference is not a problem.

In Step ST1006, the UE 1-1 identifies the absence of the cell whose interference is not a problem.

Next in Step ST910a after the process in Steps ST909 of FIG. 14, the UE 1-3 notifies the cell 1 that is the serving cell of the result of the measured channel information of the cell 1.

In Step ST911a, the UE 2-3 notifies the cell 2 that is the serving cell of the result of the measured channel information of the cell 2.

In Step ST913a, the cell 1 notifies the concentrator of the result of the measured channel information of the cell 1 obtained from the UE 1-3 being served thereby, together with a UEID that is an identifier of the UE.

In Step ST914a, the cell 2 notifies the concentrator of the result of the measured channel information of the cell 2 obtained from the UE 2-3 being served thereby, together with a UEID that is an identifier of the UE.

Next, processes in Steps ST915 and ST916 will be performed.

In Step ST917a, the concentrator notifies the cell 2 of scheduling information of the UEs being served by the cell 2.

In Step ST918a, the concentrator notifies the cell 1 of scheduling information of the UEs being served by the cell 1.

Next, processes in Steps ST919 and ST920 will be performed. The CSI measured by the UEs is notified from the cells to the concentrator in this order. Then, the concentrator schedules all the UEs being served by a plurality of cells, and derives precoding weights of the UEs. The derived precoding weights are notified to each of the cells.

In Step ST1007 of FIG. 15, the cell 1 schedules the UEs being served thereby, based on the scheduling information notified from the concentrator in Step ST918a.

In Step ST1008, the cell 2 schedules the UEs being served thereby, based on the scheduling information notified from the concentrator in Step ST917a.

Next, processes in Stops ST923 and ST924 will be performed.

Then in Steps ST925 to ST930, the MIMO transmission is performed to the UEs being served thereby, similarly as FIG. 12.

Consequently, the uplink f-t resources for reporting the results of the measured CSI can be reduced. Decrease in the resources for the UL data that are necessary for transmitting the CSI can be suppressed. Decrease in the number of the target UEs can reduce complexity of deriving precoding weights and scheduling the UEs.

Second Modification of First Embodiment

The processes of performing the SU-MIMO in consideration of a plurality of cells require a process of precoding with all the UEs being served by the plurality of cells inclusive, which complicates the processes. This causes an increase in power consumption of base stations, an increase in circuit scale, and an increase in control latency. Since the number of target UEs is many, a problem with complexity in the scheduling will arise.

To solve such problems, a solution according to the second modification of the first embodiment will be disclosed hereinafter.

The first modification of the first embodiment discloses the method for performing the SU-MIMO in consideration of a plurality of cells. The UE selects a communication terminal subjected to the SU-MIMO according to the first modification of the first embodiment. The second modification will disclose a method in which a cell selects a UE where interference is a problem, based on information from the UE. Not the UE but the cell makes the selection, thus enabling reduction in the computational load of the UE. Moreover, the amount of information to be used for notification between the cell and the concentrator can be reduced.

Methods for determining the UE subjected to the SU-MIMO include the determination methods performed by a cell and by a concentrator or a high-level node.

The method for determining the UE subjected to the SU-MIMO may be the determination method by measuring the reception quality such as the RSRP, the RSRQ, or the SINR with the downlink CSI-RS. Here, when the measured value is smaller than a predetermined threshold, it may be determined that interference is not a problem.

The determination may be made from an eigenvalue corresponding to each UE and found from the measured channel information. The determination may be made from a measurement result of CSI-RS (non-zero power) from the UE. Alternatively, the determination may be made by finding a magnitude of interference occurring in the other UBs with a signal, based on a measurement result of CSI-IM from the UE. The determination may be made from a measurement result of CSI-RS (zero power). The determination may be made from a measurement result of CRS.

When interference is not a problem according to the measurement result, the UE may transmit information indicating no interference.

The determination may be made by measuring not the downlink CSI but the uplink SRS in a serving cell and a non-serving cell to measure which cell interferes with which UE.

The cell side or the concentrator side may determine the UE where interference is a problem, unlike the first modification of the first embodiment.

When a notification from the UE indicates that a magnitude of interference is larger than a threshold, the cell will be an interfering cell. Here, a predetermined threshold may be statically predetermined or notified from the concentrator to the cell. When it is determined that interference is not a problem, the cell may notify the concentrator of no interference.

Figure 16:
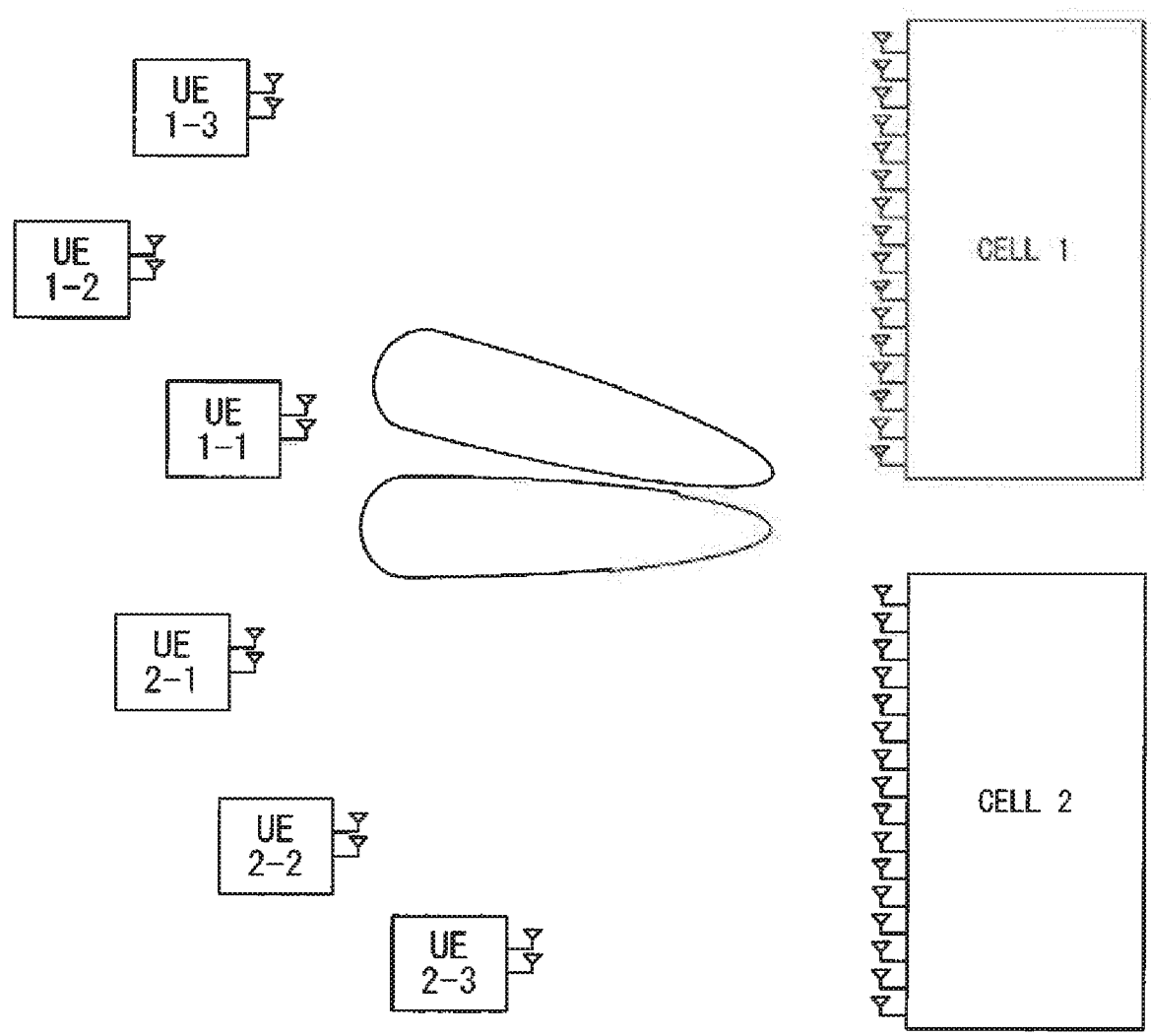
FIG. 16 is a conceptual diagram illustrating a method for performing the SU-MIMO only with a UE where interference is a problem.
Figure 18:
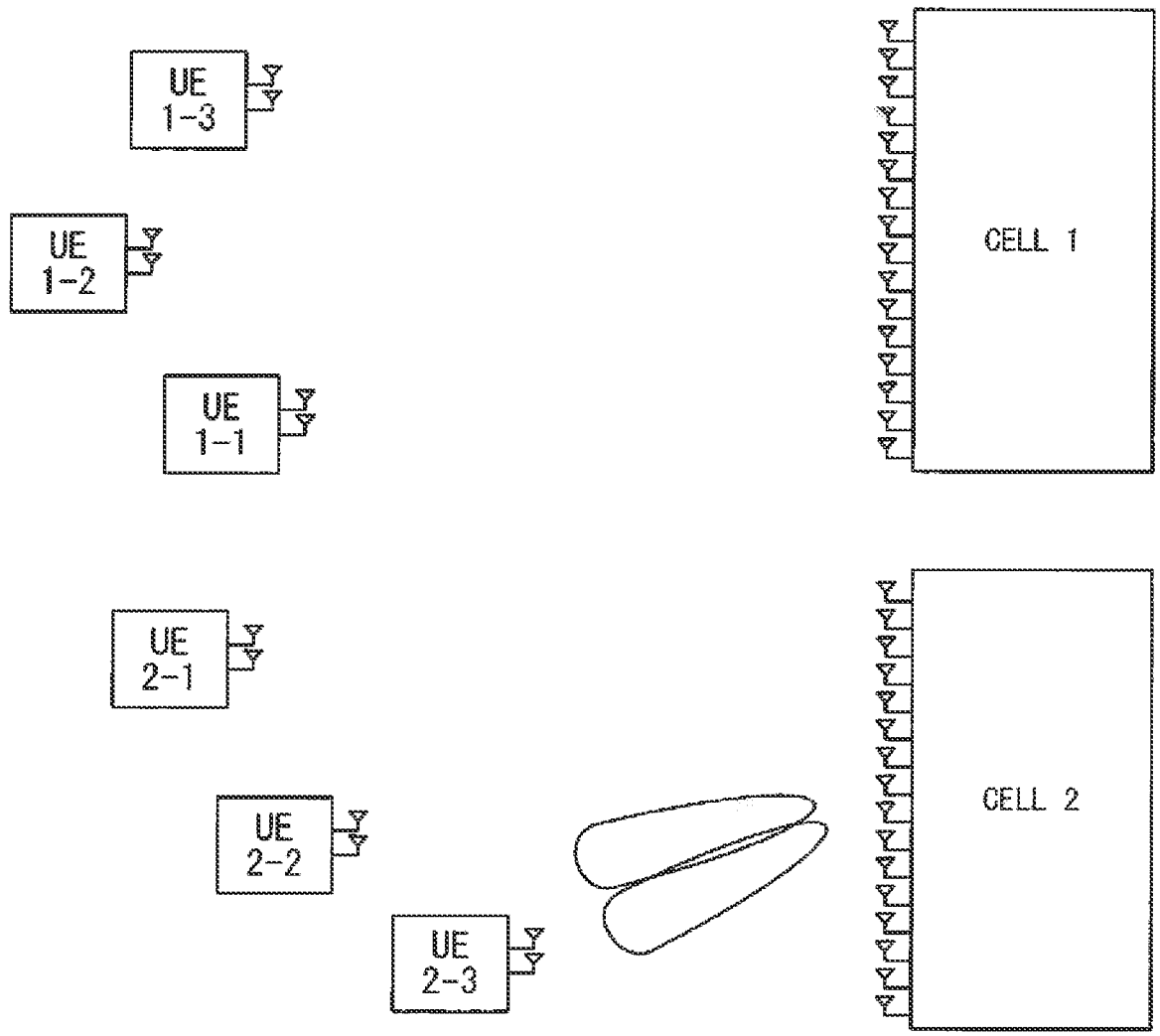
FIG. 18 is a conceptual diagram illustrating the method for performing the SU-MIMO only with a UE where interference is a problem.

FIGS. 16 to 18 are conceptual diagrams illustrating a method for performing the SU-MIMO only with the UE where interference is a problem. FIG. 16 illustrates that the cells 1 and 2 perform the SU-MIMO with the UE 1-1 in a coordinated manner after limiting of the UEs subjected to the SU-MIMO. FIG. 17 illustrates that the cell 1 performs the SU-MIMO only with the UE in its own cell. FIG. 18 illustrates that the cell 2 performs the SU-MIMO only with the UE in its own cell.

FIGS. 19 to 21 illustrate another example sequence on the method for performing the SU-MIMO using a plurality of cells. FIGS. 19 and 20 are connected across a location of a border BL4. FIGS. 20 and 21 are connected across a location of a border BL5. FIGS. 19 to 21 illustrate one example of performing the SU-MIMO using the cells 1 and 2. FIGS. 19 to 21 also illustrate processes to be performed by the UE 1-1 and the UE 1-3 that are being served by the cell 1 and the UE 2-3 being served by the cell 2. Since the sequence illustrated in FIGS. 19 to 21 includes the same Steps as those in the sequence illustrated in FIGS. 11 and 12, the same step numbers will be assigned to the same Steps and the common description thereof will be omitted.

The second modification differs from the first embodiment in that a cell determines the presence or absence of the UE where interference is a problem after the UE measures the CSI.

In Step ST1201 after the processes in Steps ST901 to ST911, the cell 1 determines the presence or absence of the UE where interference is a problem. The channel information to be broadcast from the UE as the CSI may be used for this determination. Alternatively, the RSRP, the RSRQ, or the SINR may be used.

In Step ST1202, the cell 2 determines the presence or absence of the UE where interference is a problem.

In Step ST1203, the cell 1 identifies the UE 1-1 as the UE where interference is a problem.

In Step ST1204, the cell 2 identifies the absence of the UE where interference is a problem.

Next in Step ST1205 of FIG. 20, the cell 1 broadcasts, to the concentrator, the CSI, and the UEID of the identified UE 1-1.

In Step ST1206, the concentrator schedules the UE where interference is a problem.

In Step ST1207, the concentrator derives a precoding weight of the UE where interference is a problem.

In Step ST1208, the concentrator broadcasts, to the cell 2, the scheduling information of the UE where interference is a problem.

In Step ST1209, the concentrator broadcasts, to the cell 1, the scheduling information of the UE where interference is a problem.

In Step ST1210, the concentrator broadcasts, to the cell 2, the precoding information on the cell 2 of the UE where interference is a problem.

In Step ST1211, the concentrator broadcasts, to the cell 1, the precoding information on the cell 1 of the UE where interference is a problem.

In Step ST1212, the cell 1 schedules the UE where interference is a problem.

In Step ST1213, the cell 2 schedules the UE where interference is a problem.

In Step ST214, the cell 1 schedules the other UE being served thereby.

In Step ST1214, the cell 1 schedules the other UEs being served thereby.

In Step ST1215, the cell 2 schedules the other UEs being served thereby.

Since the other UEs are UEs where interference is not a problem, the SU-MIMO is independently performed in each of the cells. Here, the scheduling is performed also in consideration of the necessity of applying different RBs between the MIMO using a plurality of cells and the MIMO using a single cell, by the scheduling.

In Step ST1216, the cell 1 derives precoding weights of the other UEs being served by the cell 1.

In Step ST1217, the cell 2 derives precoding weights of the other UEs being served by the cell 2.

In Step ST1218, the cell 1 makes the MIMO settings of the UEs being served thereby and the UE where interference is a problem.

In Step ST1219, the cell 2 makes the MIMO settings of the UEs being served thereby and the UE where interference is a problem.

The processes in Steps in FIGS. 19 to 21 enable the SU-MIMO in consideration of a plurality of cells, and the MIMO with the UEs in its own cell which are not interfered by the other cells.

The MIMO in consideration of a plurality of cells can be performed only with the UE where interference is a problem. The precoding process can be limited only to the UE where interference is a problem. Thus, the complexity in the precoding process can be reduced. The power consumption of the base stations, the circuit scale, and the control latency can be reduced.

Third Modification of First Embodiment

With the conventional technique of the MIMO, a cell determines a codebook in consideration of only an antenna port of its own cell to perform the MIMO with the UE. Here, a cell to which the UE is not connected or a cell that is not communicating is not considered. Thus, under a communication environment in the presence of a plurality of cells, interference occurs from the cell to which the UE is not connected or the cell that is not communicating.

Since the MIMO is performed within the same cell by assigning the presumably optimal transmission weight to the UBs being served by the cell, the UEs being served by the other cells may receive intense interference. Thus, the interference from the other cells degrades the communication quality, and reduces the communication rate. Moreover, the communication capacity for a system will decrease.

The object of the third modification is to provide a communication system capable of solving such problems and suppressing, under a communication environment in the presence of a plurality of cells, degradation in the communication quality and decrease in the communication rate and in the communication capacity due to interference from the other cells.

To solve the problems, a solution according to the third modification of the first embodiment will be disclosed hereinafter.

The third modification will disclose a modification of the first embodiment of performing the SU-MIMO in consideration of a plurality of cells. The third modification is not based on the SU-MIMO in which the MIMO using a plurality of cells is restricted to one UE, but based on MU-MIMO in consideration of a plurality of users.

Figure 22:
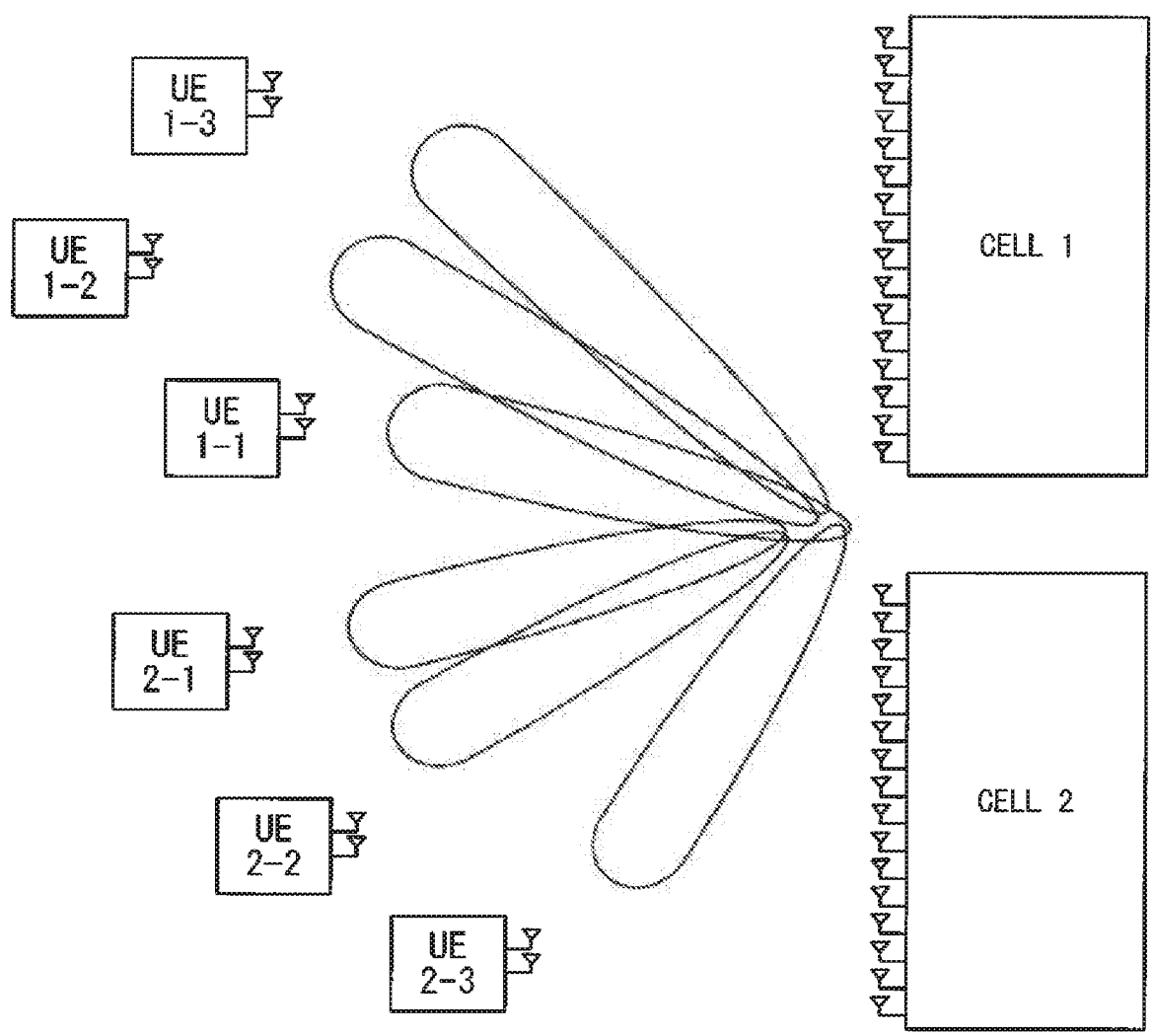
FIG. 22 is a conceptual diagram illustrating a method for performing the MU-MIMO with UEs being served by a plurality of cells in consideration of the plurality of cells.

FIG. 22 is a conceptual diagram illustrating a method for performing the MU-MIMO with the UEs being served by a plurality of cells in consideration of the plurality of cells. As illustrated in FIG. 22, a plurality of cells of the cells 1 and 2 perform the MU-MIMO in a coordinated manner. The same method as that on the SU-MIMO according to the first embodiment may be applied. The cell 2 transmits the PDSCH using a UE-specific reference signal with the resources scheduled by the cell 1. Similarly, the cell 1 transmits the PDSCH using a UE-specific reference signal with the resources scheduled by the cell 2. Each of the UBs receives the PDSCH using the UE-specific reference signal with the resources scheduled by the serving cell.

When a codebook is used, both the cell 1 to be a serving cell and the cell 2 to be a non-serving cell need to notify the PCIs to the UEs. The UEs receive the PDSCH through knowledge of a transmission weight used in the precoding, with the PCIs of the cells 1 and 2.

Figure 23:
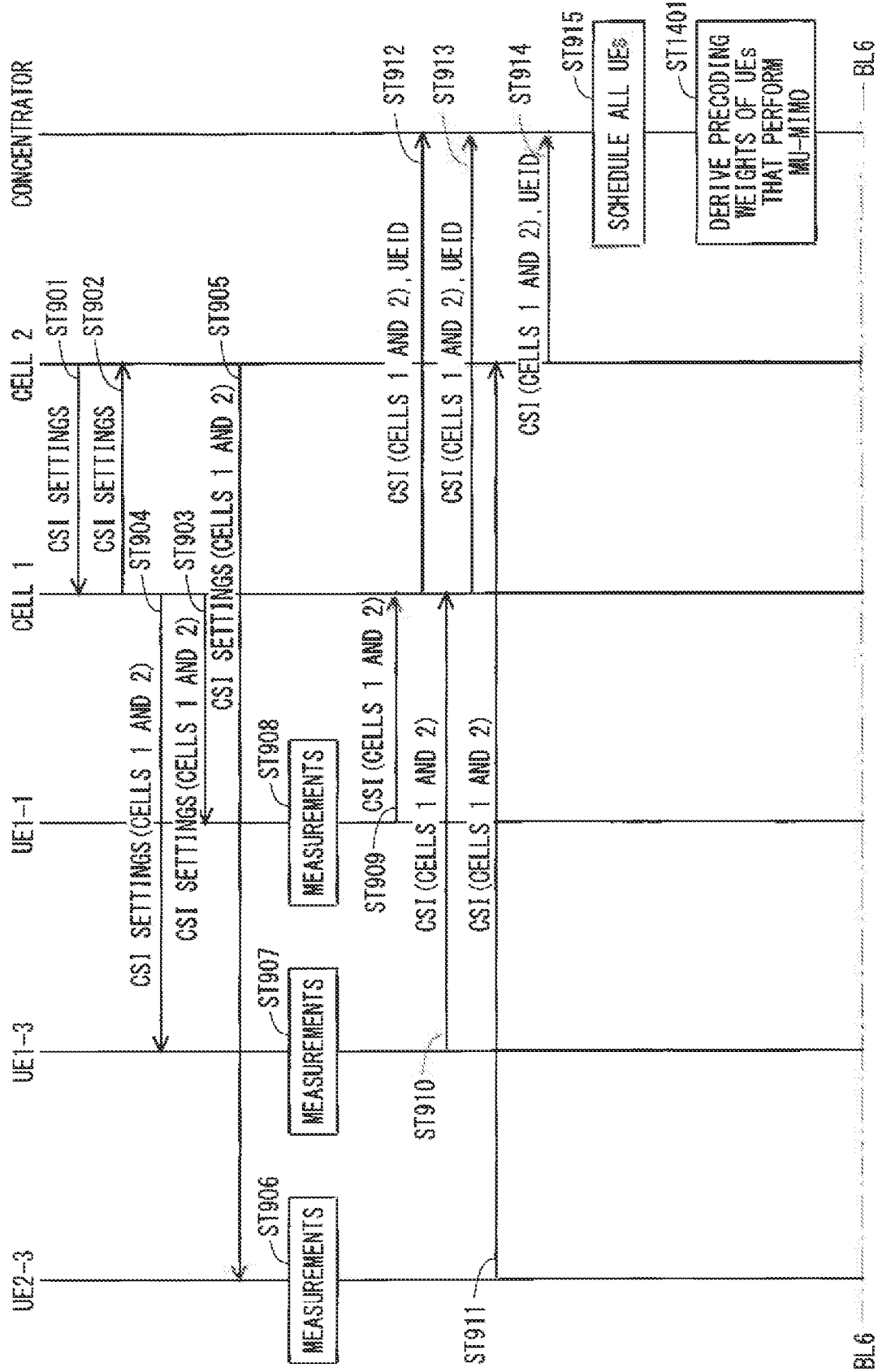
FIG. 23 illustrates an example sequence on a method for performing the MU-MIMO with the UEs where interference is a problem inclusive, using a plurality of cells.
Figure 24:
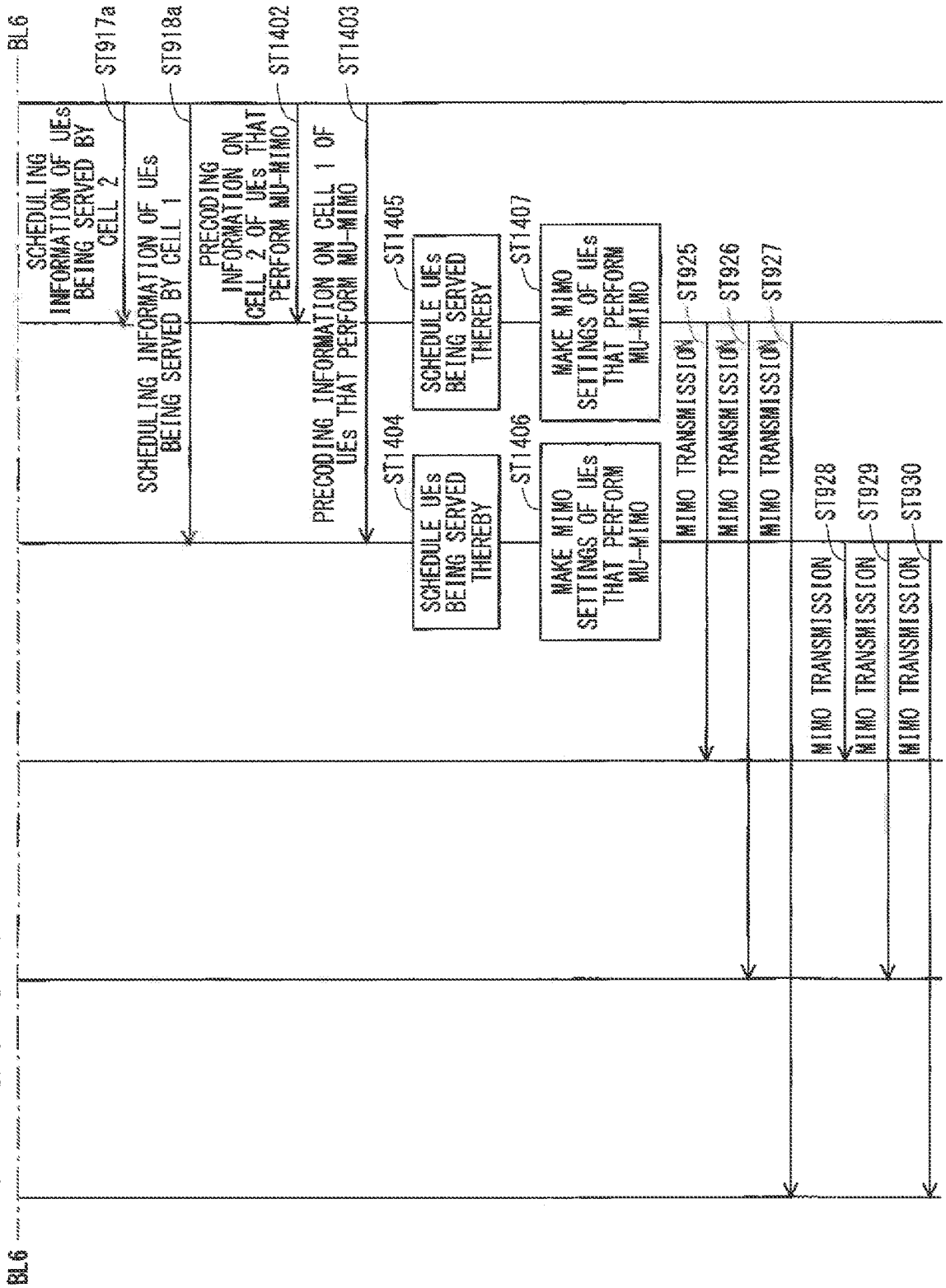
FIG. 24 illustrates the example sequence on the method for performing the MU-MIMO with the UEs where interference is a problem inclusive, using the plurality of cells.

FIGS. 23 and 24 illustrate an example sequence on a method for performing the MU-MIMO with the UEs where interference is a problem inclusive, using a plurality of cells. FIGS. 23 and 24 are connected across a location of a border BL6. Since the sequence illustrated in FIGS. 23 and 24 includes the same Steps as those in the sequence illustrated in FIGS. 11 and 12 and the sequence illustrated in FIGS. 13 to 15, the same step numbers will be assigned to the same Steps and the common description thereof will be omitted.

The processes in Steps ST901 to ST915 will be performed similarly as those in FIG. 11.

In Step ST1401, the concentrator derives precoding weights of the UEs that perform the MU-MIMO.

In Step ST1402 of FIG. 24, the concentrator notifies the cell 2 of the precoding information on the cell 2 of the UEs that perform the MU-MIMO.

In Step ST1403, the concentrator notifies the cell 1 of the precoding information on the cell 1 of the UEs that perform the MU-MIMO.

In Step ST1404, the cell 1 schedules the UEs being served by the cell 1.

In Step ST1405, the cell 2 schedules the UEs being served by the cell 2.

In Step ST1406, the cell 1 makes the MIMO settings of the UEs that perform the MU-MIMO.

In Step ST1407, the cell 2 makes the MIMO settings of the UBs that perform the MU-MIMO.

With application of the precoding information derived for the MU-MIMO, the MU-MIMO in consideration of a plurality of cells can be performed.

The MU-MIMO is possible by the precoding using a plurality of cells. The MU-MIMO in consideration of the channel information from the cells other than the serving cell enables reduction in the interference from the other cells. Reduction in the interference from the other cells can increase the communication quality. Moreover, the communication capacity for a system can be increased. Particularly, the outstanding advantages can be produced in a situation where there are many small cells and the interference between the cells increases.

Fourth Modification of First Embodiment

The processes of performing the MU-MIMO in consideration of a plurality of cells require a process of precoding with all the UEs being served by the plurality of cells inclusive, which complicates the processes. This causes an increase in power consumption of the base stations, an increase in circuit scale, and an increase in control latency. Since the number of target UEs is many, a problem with complexity in the scheduling will arise.

To solve such problems, a solution according to the fourth modification of the first embodiment will be disclosed hereinafter.

The fourth modification will disclose a modification of the first embodiment of performing the MU-MIMO in consideration of a plurality of cells. The fourth modification will disclose the MU-MIMO in consideration of a plurality of users.

The presence of a plurality of UEs being served by a cell increases the amount of processing in the MU-MIMO, and complicates the processing. Thus, limiting the application of the MU-MIMO in consideration of a plurality of cells to the UEs being served by each of the cells where interference is a problem can reduce the processing of the cell or a concentrator.

A serving cell can perform the MU-MIMO with the UEs where interference from a non-serving cell is not a problem, in consideration of only its own cell. Thus, the number of UEs subjected to the MIMO using a plurality of cells can be reduced.

The serving cell performs the DL transmission to the UEs where interference is not a problem, in consideration of only its own cell. The serving cell may perform the MU-MIMO. Here, the serving cell performs precoding in consideration of not a plurality of cells but only its own cell.

The method for determining the UEs subjected to the MU-MIMO using a plurality of cells is the same as that according to the second modification of the first embodiment. Allocating the same f-t resources to the MIMO in consideration of a plurality of cells and to the MIMO in consideration of its own cell makes it difficult to maintain the mutual orthogonality. Thus, different f-t resources are used.

Although the MU-MIMO is performed in the presence of a plurality of the UEs being served by a cell, the MU-MIMO is unnecessary in the presence of only one UE being served by the cell. Thus, the MU-MIMO is switched to the SU-MIMO.

Each of the cells schedules the UEs being served thereby after the UEs subjected to the MU-MIMO using a plurality of cells are determined. Each of the cells notifies the concentrator of the scheduling information of the target UEs. Here, the information may be transmitted to the UEs through the concentrator. Upon receipt of the scheduling information, a coordinated cell notifies the concentrator of the UEs whose scheduling has been made with the same f-t resources. The CSI is also notified here.

The concentrator performs the MU-MIMO with the UEs that use the same f-t resources.

When the base station determines, upon receipt of the capability information of the UE for determination of the UEs subjected to the MU-MIMO, that a UE is loaded with an interference cancellation algorithm, the UE may be excluded from the MU-MIMO.

Figure 25:
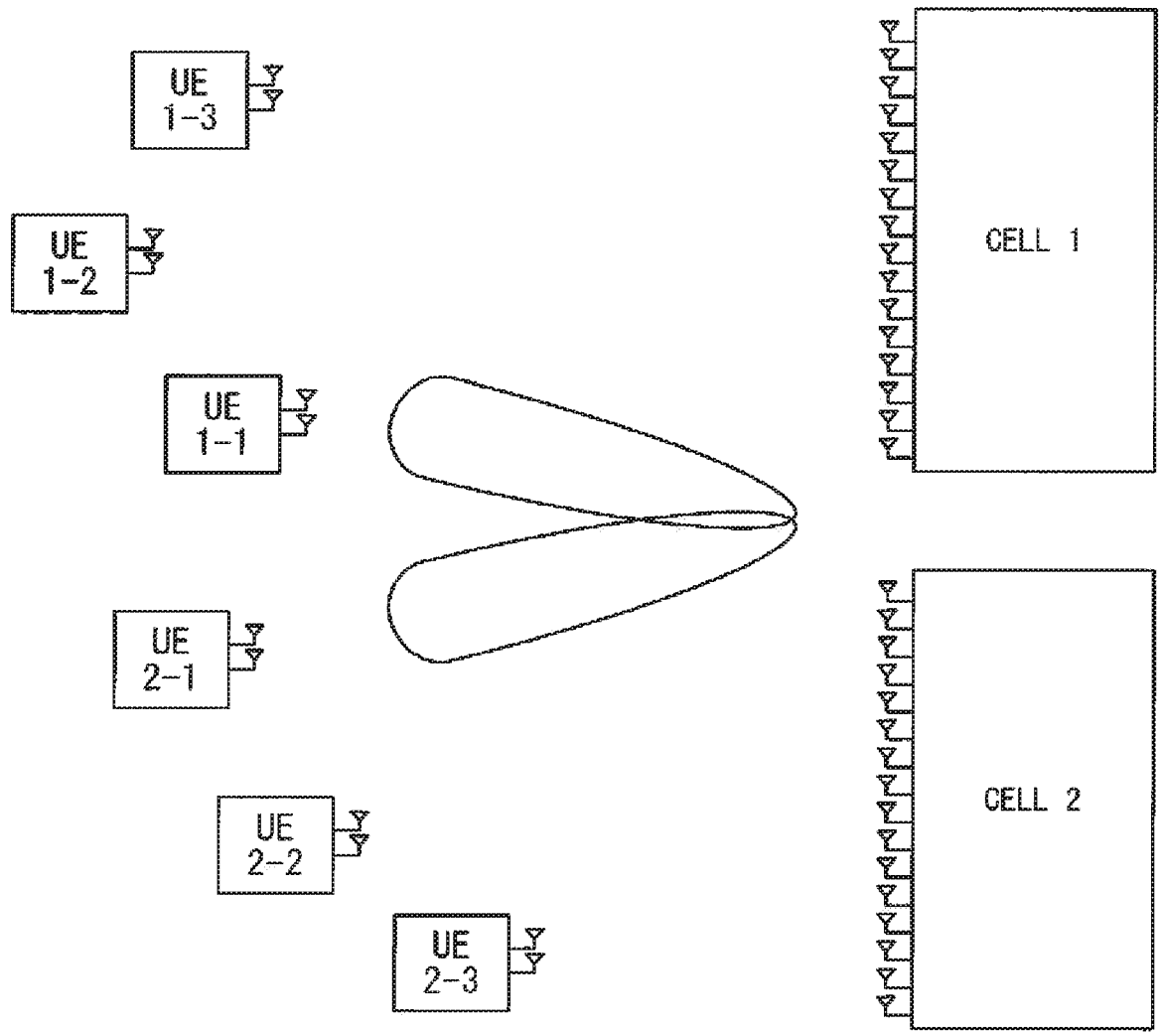
FIG. 25 is an example conceptual diagram illustrating a method for performing the MU-MIMO only with the UEs where interference is a problem, using a plurality of cells.
Figure 26:
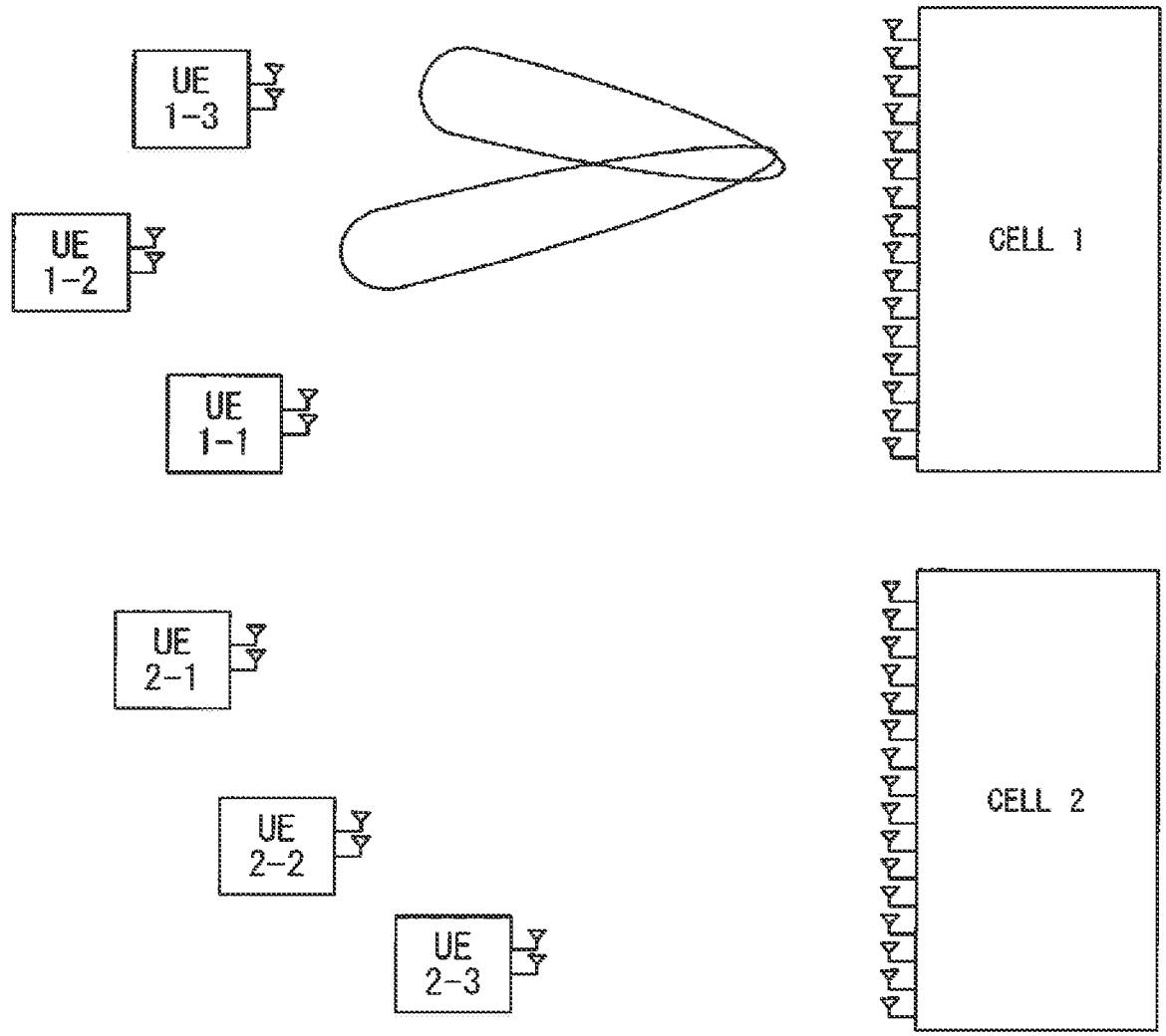
FIG. 26 is an example conceptual diagram illustrating a method for performing the MU-MIMO only with the UEs where interference is a problem, using a plurality of cells.
Figure 27:
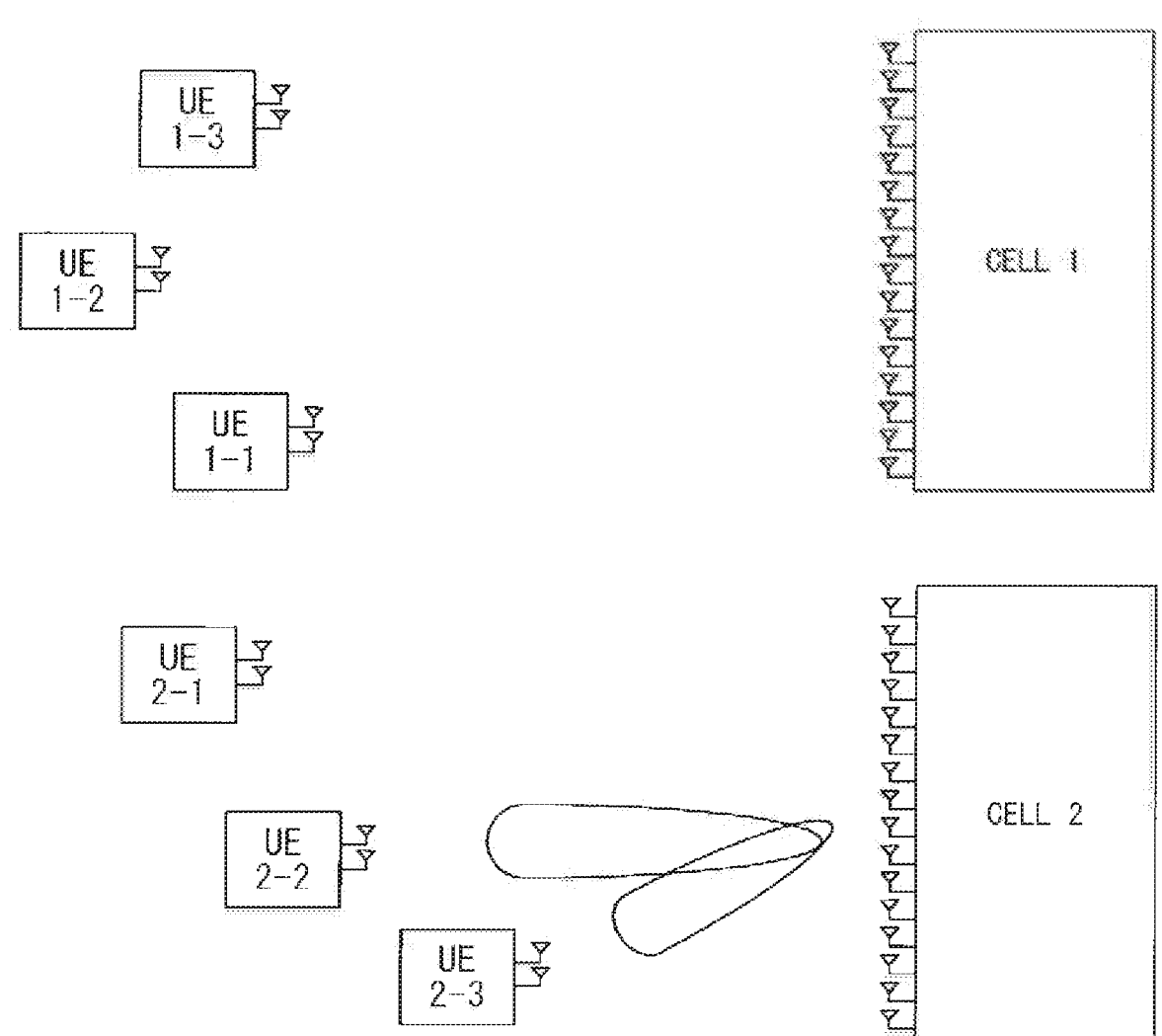
FIG. 27 is an example conceptual diagram illustrating a method for performing the MU-MIMO only with the UBs where interference is a problem, using a plurality of cells.

FIGS. 25 to 27 are example conceptual diagrams illustrating a method for performing the MU-MIMO only with the UEs where interference is a problem, using a plurality of cells. FIG. 25 illustrates that the cells 1 and 2 perform the MU-MIMO with the UE 1-1 and the UE 2-1 in a coordinated manner after limiting of the UEs subjected to the MU-MIMO. FIG. 26 illustrates that the cell 1 performs the MU-MIMO with the UE 1-2 and the UE 1-3 alone. FIG. 27 illustrates that the cell 2 performs the MU-MIMO with the UE 2-2 and the UE 2-3 alone.

Figure 28:
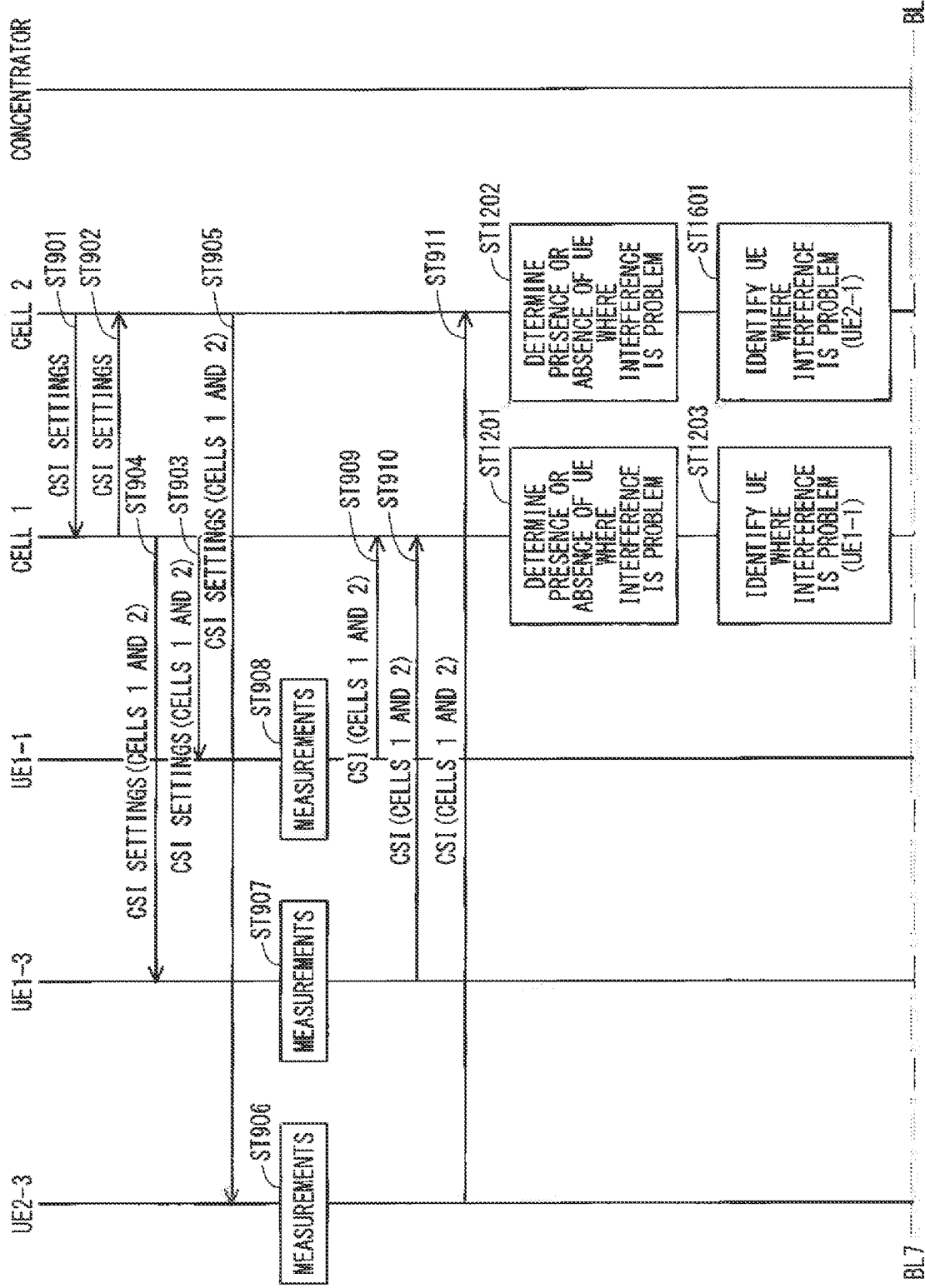
FIG. 28 illustrates an example sequence on a method for performing the MU-MIMO only with the UEs where interference is a problem, using a plurality of cells.
Figure 30:
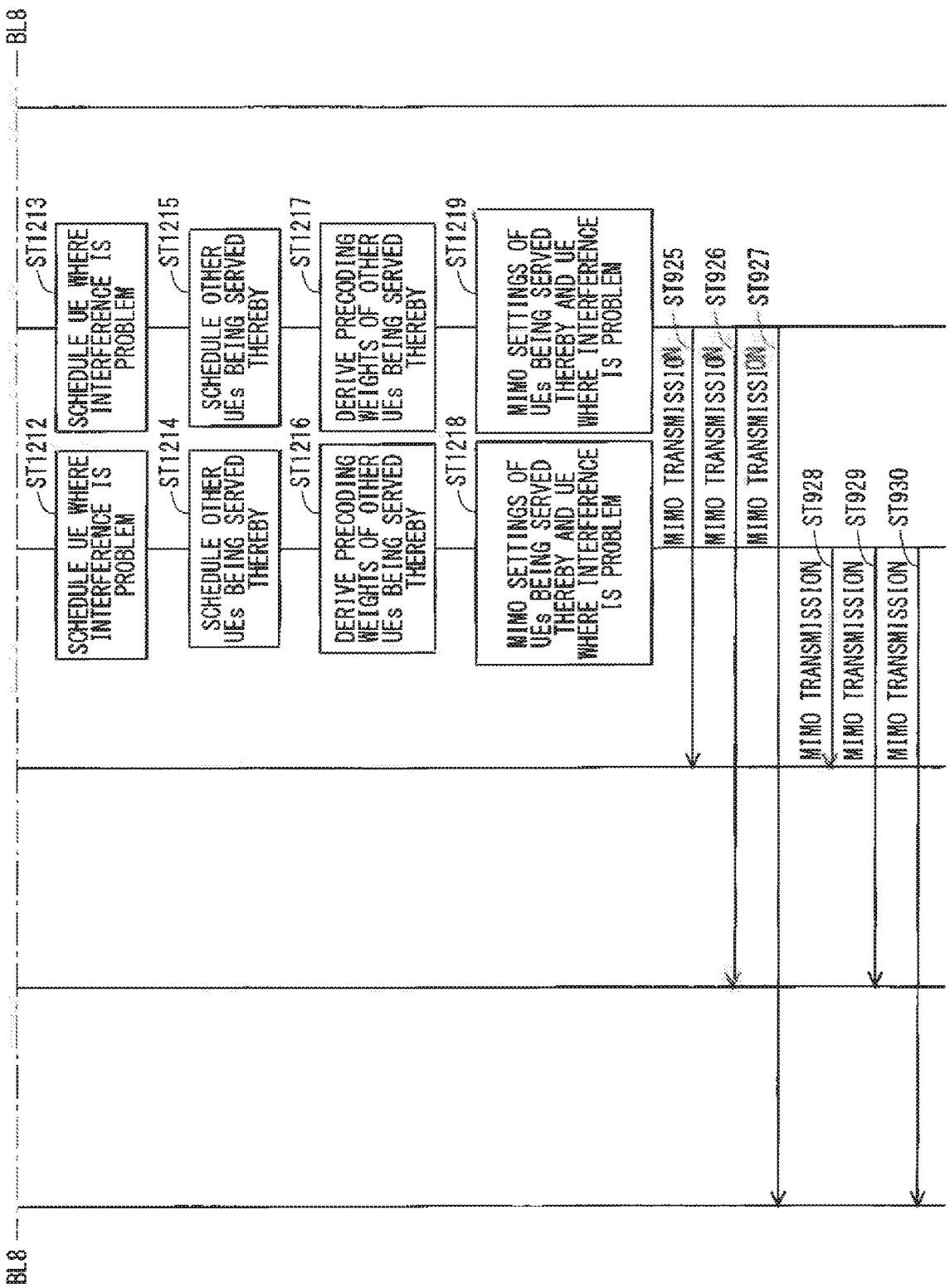
FIG. 30 illustrates the example sequence on the method for performing the MU-MIMO only with the UEs where interference is a problem, using the plurality of cells.

FIGS. 28 to 30 illustrate an example sequence on the method for performing the MU-MIMO only with the UEs where interference is a problem, using a plurality of cells. FIGS. 28 and 29 are connected across a location of a border BL7. FIGS. 29 and 30 are connected across a location of a border BL8. Since the sequence illustrated in FIGS. 28 to 30 includes the same Steps as those in the sequence illustrated in FIGS. 11 and 12 and the sequence illustrated in FIGS. 19 to 21, the same step numbers will be assigned to the same Steps and the common description thereof will be omitted.

In Step ST1601, the cell 2 identifies the UE 2-1 as the UE where interference is a problem.

In Step ST1602, the cell 2 broadcasts, to the concentrator, the CSI, and the UEID of the identified UE.

The fourth modification differs from the third modification of the first embodiment in that the third modification relates to the SU-MIMO and the fourth modification relates to the MU-MIMO. When transmission antennas have a degree of freedom in the MU-MIMO, the UEs as many as the transmission antennas at the maximum can be considered.

Performing the MIMO in consideration of a plurality of cells only with the UEs where interference is a problem enables limiting the precoding process in consideration of a plurality of cells that will have a heavy load to the UEs where interference is a problem. Thus, the complexity in the precoding process can be reduced. The power consumption of the base stations, the circuit scale, and the control latency can be reduced.

The MU-MIMO in consideration of a plurality of cells can increase the transmission rate of a system.

Fifth Modification of First Embodiment

The processes of performing the MU-MIMO in consideration of a plurality of cells require a process of precoding with all the UEs being served by the plurality of cells inclusive, which complicates the processes. This causes an increase in power consumption of the base stations, an increase in circuit scale, and an increase in control latency. Since the number of target UEs is many, a problem with complexity in the scheduling will arise.

To solve such problems, the fifth modification will hereinafter disclose a solution different from that according to the fourth modification of the first embodiment.

Limiting the application of the MU-MIMO in consideration of a plurality of cells to the UEs where interference from a non-serving cell is a problem can reduce the amount of processing.

A serving cell performs the MU-MIMO with the UEs where interference from a non-serving cell is not a problem, in consideration of only its own cell. The UE may determine whether interference is a problem by itself. Alternatively, the CSI and the UEID may be notified, and the concentrator may make the determination.

The method for determining the target UEs is the same as that according to the second modification of the first embodiment. Each cell is notified of the measured CSI from the UEs, and identifies, based on the CSI, the UEs where interference from a non-serving cell is a problem.

Each cell is notified of the CSI, and schedules the UEs being served thereby with the CSI. Since disuse of the concentrator reduces the processing latency, each cell can make the flexible scheduling. The concentrator only calculates the precoding weight in consideration of a plurality of cells.

Figure 31:
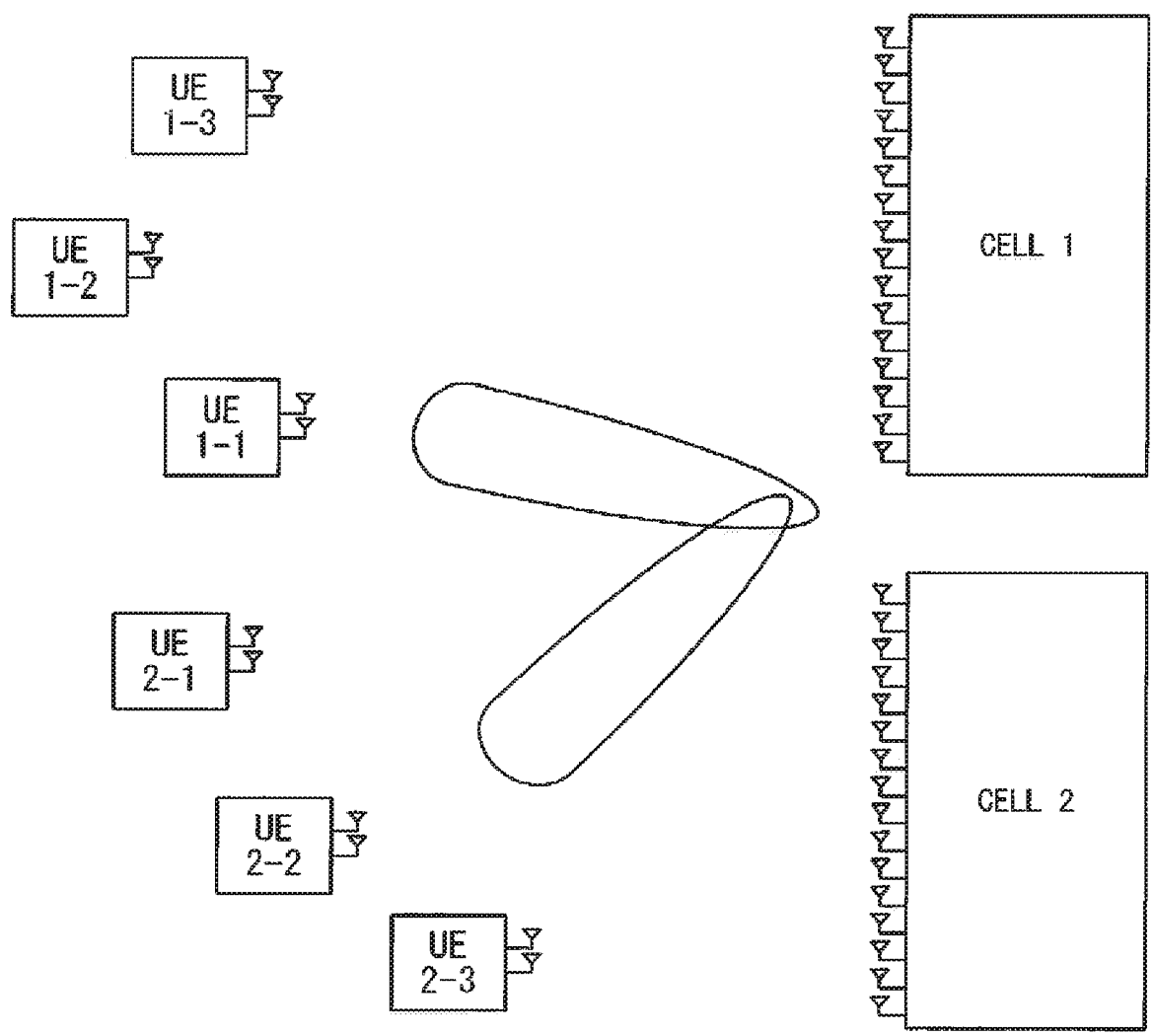
FIG. 31 is another example conceptual diagram illustrating the method for performing the MU-MIMO only with the UEs where interference is a problem, using a plurality of cells.
Figure 32:
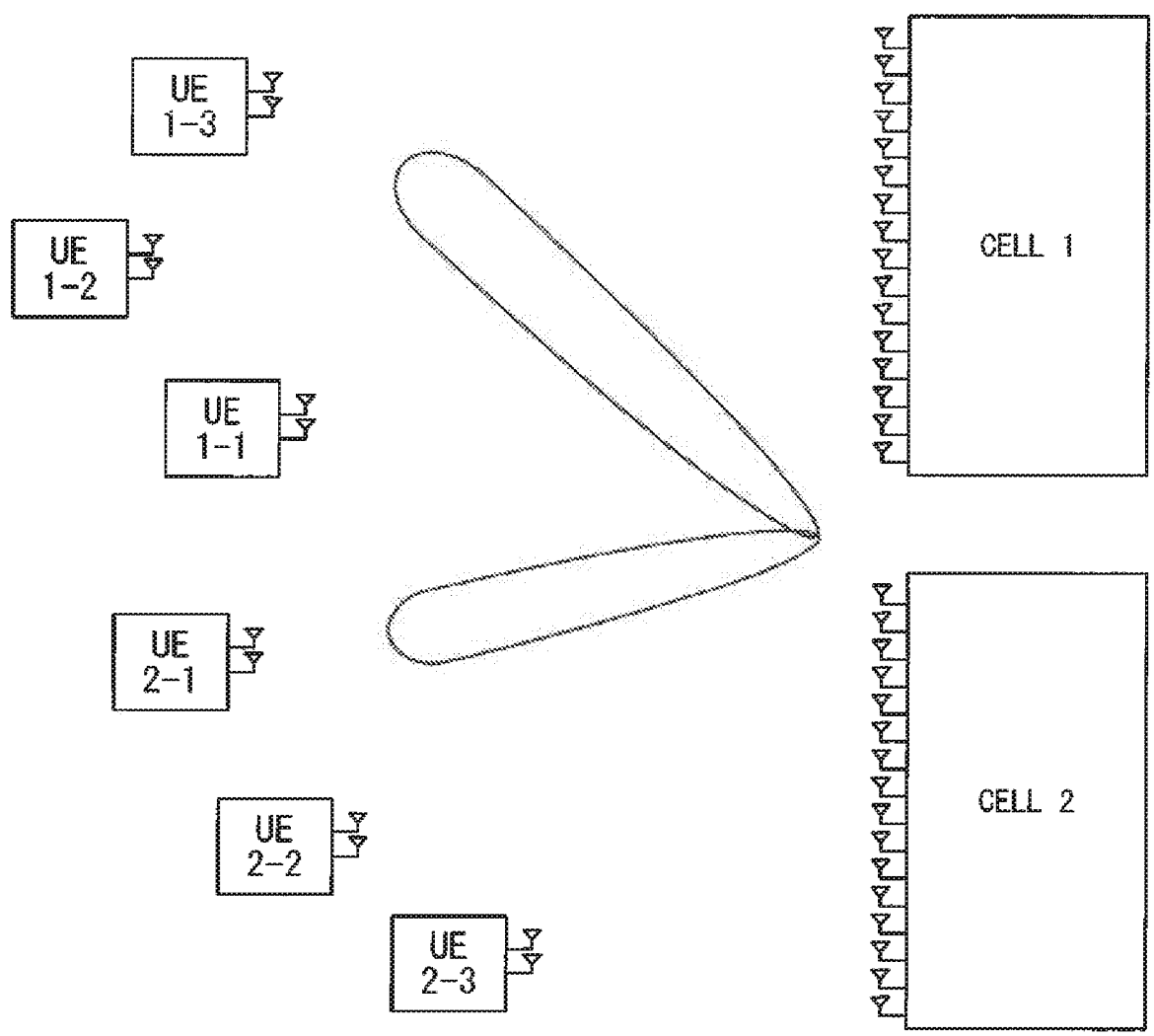
FIG. 32 is another example conceptual diagram illustrating the method for performing the MU-MIMO only with the UEs where interference is a problem, using a plurality of cells.

FIGS. 31 and 32 are conceptual diagrams illustrating another example method for performing the MU-MIMO only with the UEs where interference is a problem, using a plurality of cells. FIG. 31 illustrates that the cells 1 and 2 perform the MU-MIMO with the UE 1-1 and the UE 2-2 in a coordinated manner after limiting of the UEs subjected to the MU-MIMO. FIG. 32 illustrates that the cells 1 and 2 perform the MU-MIMO with the UE 2-1 and the UE 1-3 in a coordinated manner.

Figure 33:
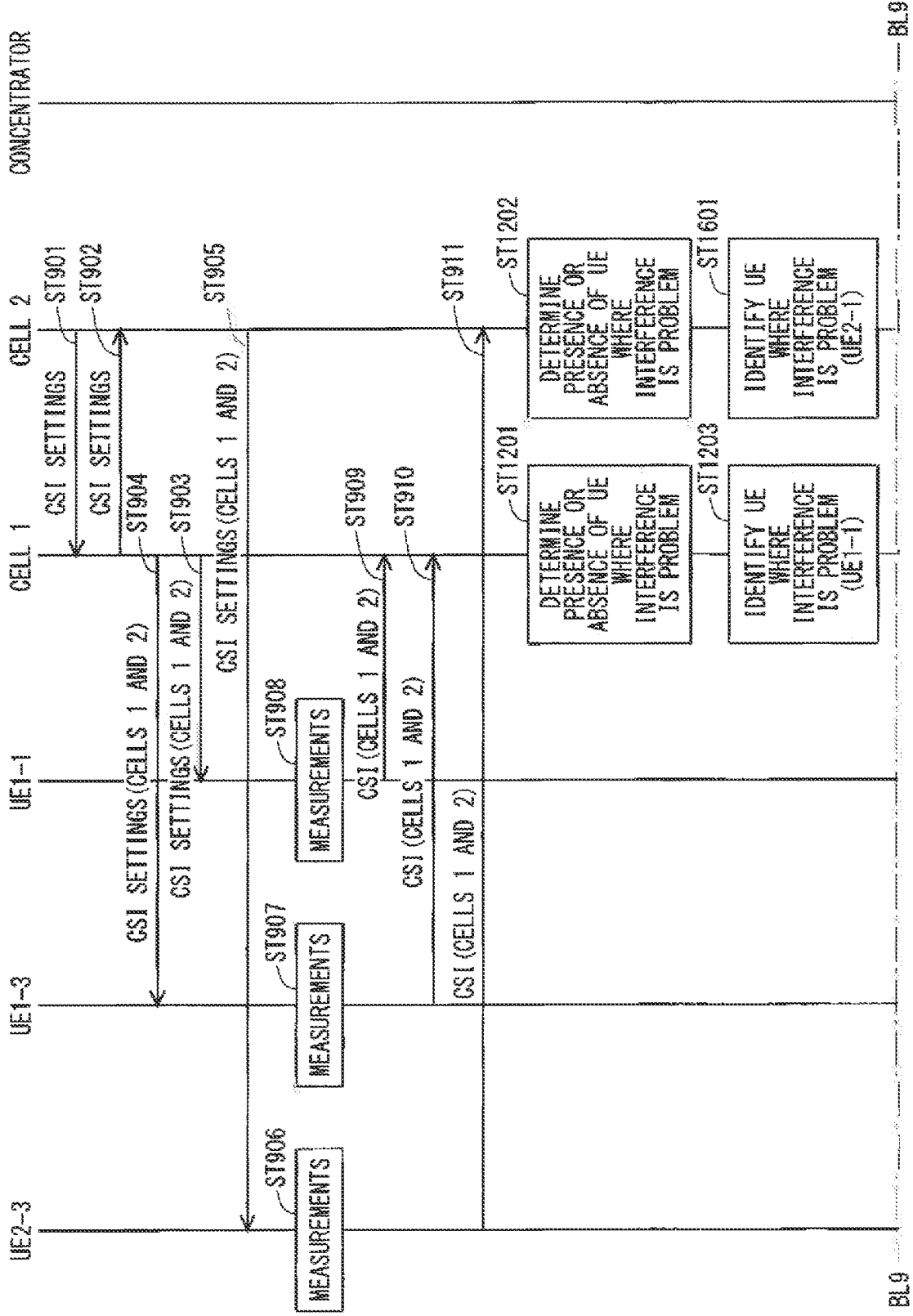
FIG. 33 illustrates another example sequence on the method for performing the MU-MIMO only with the UEs where interference is a problem, using a plurality of cells.
Figure 34:
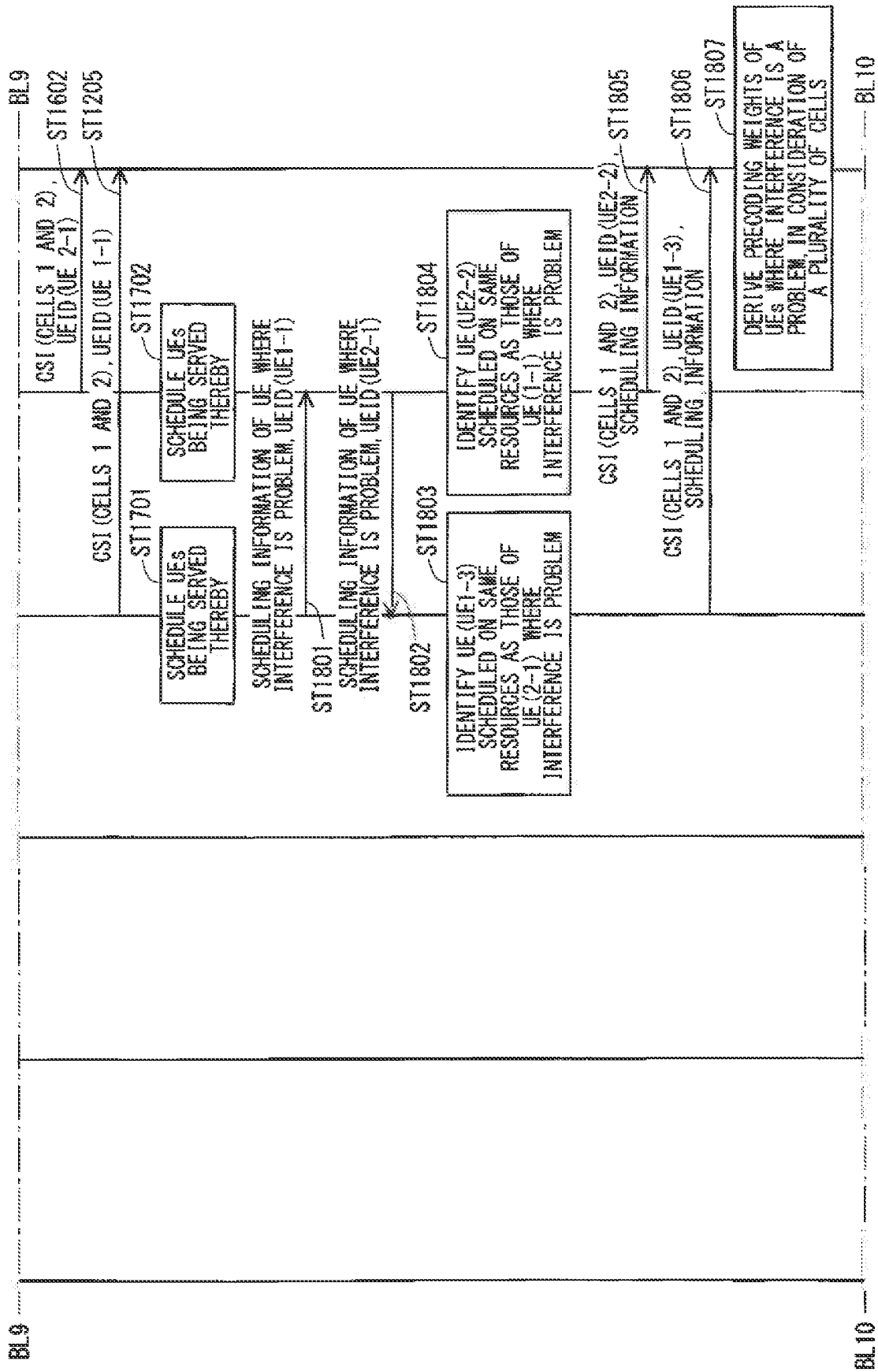
FIG. 34 illustrates the other example sequence on the method for performing the MU-MIMO only with the UEs where interference is a problem, using the plurality of cells.
Figure 35:
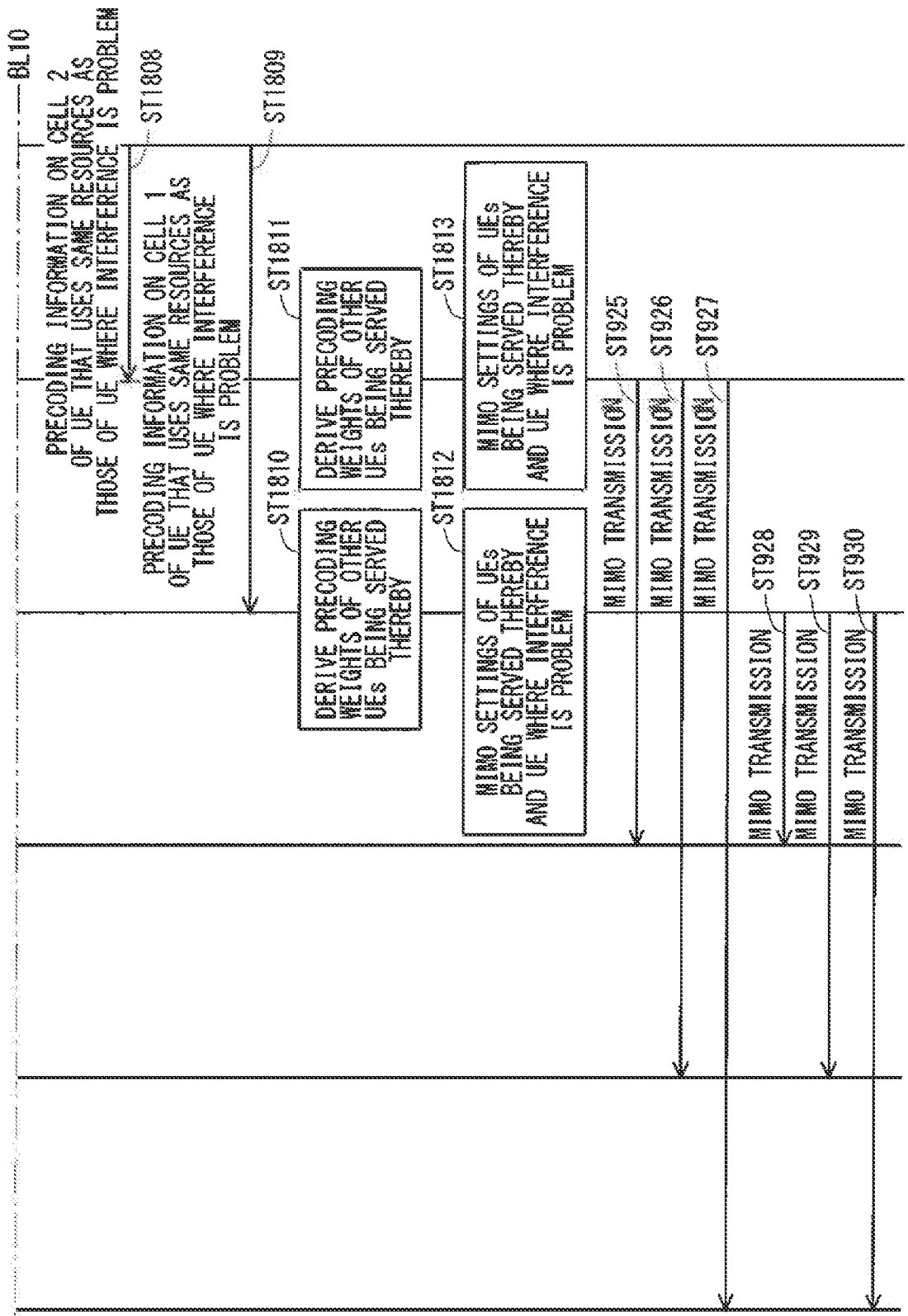
FIG. 35 illustrates the other example sequence on the method for performing the MU-MIMO only with the UEs where interference is a problem, using the plurality of cells.

FIGS. 33 to 35 illustrate another example sequence on the method for performing the MU-MIMO only with the UEs where interference is a problem, using a plurality of cells. FIGS. 33 and 34 are connected across a location of a border BL9. FIGS. 34 and 35 are connected across a location of a border BL10. Since the sequence illustrated in FIGS. 33 to 35 includes the same Steps as those in the sequence illustrated in FIGS. 11 and 12 and the sequence illustrated in FIGS. 19 to 21, the same step numbers will be assigned to the same Steps and the common description thereof will be omitted.

The fifth modification differs from the fourth modification of the first embodiment in that each cell schedules the UEs being served thereby and performs processing without routing through any upper layer such as the concentrator.

In Step ST1701, the cell 1 schedules the UEs being served by the cell 1.

In Step ST1702, the cell 2 schedules the UEs being served by the cell 2.

In Step ST1801, the cell 1 broadcasts, to the cell 2, the scheduling information of the UE where interference is a problem and the UEID of the identified UE 1-1.

In Step ST1802, the cell 2 broadcasts, to the cell 1, the scheduling information of the UE where interference is a problem and the UEID of the identified UE 2-1.

In Step ST1803, the cell 1 identifies the UE 1-3 as the UE that is scheduled on the same resources as those of the UE 2-1 where interference is a problem.

In Step ST1804, the cell 2 identifies the UE 2-2 as the UE that is scheduled on the same resources as those of the UE 1-1 where interference is a problem.

In Step ST1805, the cell 2 notifies the concentrator of the CSI, the UEID of the identified UE 2-2, and the scheduling information.

In Step ST1806, the cell 1 notifies the concentrator of the CSI, the UEID of the identified UE 1-3, and the scheduling information.

In Step ST1807, the concentrator derives precoding weights of the UEs where interference is a problem, in consideration of a plurality of cells.

In Step ST1808, the concentrator notifies the cell 2 of the precoding information on the cell 2 of the UE that uses the same resources as those of the UE where interference is a problem.

In Step ST1809, the concentrator notifies the cell 1 of the precoding information on the cell 1 of the UE that uses the same resources as those of the UE where interference is a problem.

In Step ST1810, the cell 1 derives precoding weights of the other UEs being served by the cell 1.

In Step ST1811, the cell 2 derives precoding weights of the other UEs being served by the cell 2.

In Step ST1812, the cell 1 makes the MIMO settings of the UEs being served thereby and the UE where interference is a problem.

In Step ST1813, the cell 2 makes the MIMO settings of the UEs being served thereby and the UE where interference is a problem.

In addition to the advantages of the fourth modification of the first embodiment, each of the cells can schedule the UEs being served thereby in the fifth modification. Since each of the cells makes an independent judgment, the flexible scheduling is possible depending on a state of a channel.

Sixth Modification of First Embodiment

In the first embodiment, the cell estimates the uplink channel information from a known signal, for example, the SRS. In the sixth modification, when the uplink and the downlink are operated at the same frequency as in the Time Division Duplex (TDD), the downlink channel information is estimated using a duality between uplink and downlink channel characteristics based on an estimation result of the uplink channel information. The method for estimating the downlink channel information (hereinafter may be referred to as a "channel estimating method") is effective, particularly when the uplink transmission and the downlink transmission are based on the TDD. The channel estimating method according to the sixth modification will be specifically described hereinafter.

A serving cell notifies the UEs being served thereby of the channel measuring information of its own cell. The serving cell notifies the UEs being served thereby of the channel measuring information on a cell that performs the MIMO in a coordinated manner. For example, when the serving cell is the cell 1 and the cell that performs the MIMO in a coordinated manner is the cell 2, the cell 1 notifies the UEs being served thereby of the channel measuring information on its own cell 1 and the channel measuring information on the cell 2.

The serving cell adjusts the scheduling of the UEs to enable estimation of the channel information with ease. For example, the serving cell adjusts the transmission timing of each of the UEs so that the SRSs of the UEs do not coincide with the same frequency and the same timing. When the SRSs are signals that can be demultiplexed in the code division multiplex (CDM), the serving cell may adjust the scheduling so that a plurality of UEs corresponding to the number of the demultiplexed signals can transmit the SRSs simultaneously.

The UEs transmit, according to the scheduling notified from the serving cell, the SRSs to the cells 1 and 2 based on the cell IDs obtained from the channel measuring information, the scheduling information, and synchronization information. The cell IDs herein are identification information of the cells.

The UE may transmit a cell-specific sounding reference signal different for each cell to which the signal is to be transmitted. If the transmission timing to the cell 1 is different from that to the cell 2, a known signal transmitted by the UE may be a UE-specific signal. The known signal transmitted by the UE may be a UE-specific sounding reference signal different for each UE.

FIGS. 36 to 38 illustrate an example sequence on a method for performing the SU-MIMO in the channel estimating method according to the sixth modification of the first embodiment of the present invention. FIGS. 36 and 37 are connected across a location of a border BL11. FIGS. 37 and 38 are connected across a location of a border BL12.

FIGS. 36 to 38 illustrate a sequence for performing the SU-MIMO using a plurality of cells, specifically, the cells 1 and 2. FIGS. 36 to 38 illustrate processes to be performed by the UE 1-1 and the UE 1-3 that are being served by the cell 1 and the UE 2-3 being served by the cell 2.

In Step ST2701, the cell 2 notifies the cell 1 of the channel measuring information.

In Step ST2702, the cell 1 notifies the cell 2 of the channel measuring information.

In Step ST2703, the cell 1 notifies the UE 1-3 being served thereby of the channel measuring information of the cells 1 and 2.

In Step ST2704, the cell 1 notifies the UE 1-1 being served thereby of the channel measuring information of the cells 1 and 2.

In Step ST2705, the cell 2 notifies the UE 2-3 being served thereby of the channel measuring information of the cells 1 and 2.

Examples of the channel measuring information include the number of filtering operations, a filtering duration, and a measuring period. The channel measuring information includes scheduling information for the UE to measure the SRS.

The UE 2-3, the UE 1-3, and the UE 1-1 measure the downlink channel information with the received channel measuring information in Step ST2706, Step ST2707, and Step ST2708, respectively. The UEs measure the downlink channel information of not only the serving cell but also the surrounding cell, that is, the non-serving cell.

In Step ST2709, the UE 2-3 determines the presence or absence of a cell whose interference is not a problem from the measurement result obtained in Step ST2706.

In Step ST2710, the UE 1-3 determines the presence or absence of a cell whose interference is not a problem from the measurement result obtained in Step ST2707.

In Step ST2711, the UE 1-1 determines the presence or absence of a cell whose interference is not a problem from the measurement result obtained in Step ST2708.

In Step ST2712, the UE 2-3 identifies a cell whose interference is a problem, based on the result determined in Step ST2709. In the example illustrated in FIGS. 36 to 38, the UE 2-3 identifies the cell 1 as the cell whose interference is a problem.

In Step ST2713, the UE 1-3 identifies a cell whose interference is a problem, based on the result determined in Step ST2710. In the example illustrated in FIGS. 36 to 38, the UE 1-3 identifies the cell 2 as the cell whose interference is a problem.

In Step ST2714, the UE 1-1 identifies a cell whose interference is a problem, based on the result determined in Step ST2711. In the example illustrated in FIGS. 36 to 38, the UE 1-1 identifies the absence of the cell whose interference is a problem.

In the sixth modification, the UEs measure the SRS as the uplink channel information, based on the scheduling information notified by the channel measuring information in Steps ST2706, ST2707, and ST2708.

Each of the UEs transmits, to the cells 1 and 2, the measured SRS as a signal for measuring the uplink channel information (hereinafter may be referred to as an "uplink channel measuring signal"). The cells 1 and 2 measure the uplink channel information from the SRS received from each of the UEs, and estimate the downlink channel information from the measured uplink channel information using a duality. Specifically, the cells 1 and 2 estimate the downlink channel information through processes from Steps ST2715 to ST2723.

In Step ST2715, the UE 1-1 notifies the cell 1 of the SRS measured in Step ST2708 as an uplink channel measuring signal.

In Step ST2716, the UE 1-3 notifies the cell 1 of the SRS measured in Step ST2707 as an uplink channel measuring signal.

In Step ST2717, the UE 2-3 notifies the cell 1 of the SRS measured in Step ST2706 as an uplink channel measuring signal.

In Step ST2718, the cell 1 measures the uplink channel information from the uplink channel measuring signals notified from the UEs, specifically, the SRSs. The cell 1 also estimates the downlink channel information from the measured uplink channel information using a duality.

In Step ST2719, the cell 1 notifies the concentrator of the result of the measured channel information, together with UEIDs that are identifiers of the UEs. The result of the measured channel information includes results of the measured uplink channel information that is the channel information of all the UEs, and a result of the estimated downlink channel information that is the channel information of the cell 1.

In Step ST2720, the UE 1-3 notifies the cell 2 of the SRS measured in Step ST2707 as a channel measuring signal.

In Step ST2721, the UE 2-3 notifies the cell 2 of the SRS measured in Step ST2706 as the uplink channel measuring signal.

In Step ST2722, the cell 2 measures the uplink channel information from the uplink channel measuring signals notified from the UE 1-3 and the UE 2-3, specifically, the SRSs. Furthermore, the cell 2 estimates the downlink channel information from the measured uplink channel information using a duality.

In Step ST2723, the cell 2 notifies the concentrator of the result of the measured channel information, together with UEID that are identifiers of the UEs. The result of the measured channel information includes results of the measured uplink channel information that is the channel information of the UE 1-3 and the UE 2-3, and a result of the estimated downlink channel information that is the channel information of the cell 2.

In Step ST2724, the concentrator schedules all the UEs being served by the cells 1 and 2.

In Step ST2725, the concentrator derives precoding weights of all the UEs being served by the cells 1 and 2 from the results of the measured channel information notified from the cells 1 and 2.

In Step ST2726, the concentrator notifies the cell 2 of the scheduling information of the UBs being served by the cell 2.

In Step ST2727, the concentrator notifies the cell 1 of the scheduling information of the UEs being served by the cell 1.

In Step ST2728, the concentrator notifies the cell 2 of the precoding information on the cell 2 of all the UEs being served by the cells 1 and 2.

In Step ST2729, the concentrator notifies the cell 1 of the precoding information on the cell 1 of all the UEs being served by the cells 1 and 2.

In Step ST2730, the cell 1 schedules the UEs being served thereby, based on the scheduling information notified from the concentrator in Step ST2727.

In Step ST2731, the cell 2 schedules the UEs being served thereby, based on the scheduling information notified from the concentrator in Step ST2726.

In Step ST2732, the cell 1 makes the MIMO settings of all the UEs being served by the cells 1 and 2 with the precoding information received in Step ST2729.

In Step ST2733, the cell 2 makes the MIMO settings of all the UEs being served by the cells 1 and 2 with the precoding information received in Step ST2728.

In Step ST2734, the cell 2 performs the SU-MIMO transmission to the UE 1-1 according to the scheduling in Step ST2731 and the MIMO settings made in Step ST2733.

In Step ST2735, the cell 2 performs the SU-MIMO transmission to the UE 1-3 according to the scheduling in Step ST2731 and the MIMO settings made in Step ST2733.

In Step ST2736, the cell 2 performs the SU-MIMO transmission to the UE 2-3 according to the scheduling in Step ST2731 and the MIMO settings made in Step ST2733.

In Step ST2737, the cell 1 performs the SU-MIMO transmission to the UE 1-1 according to the scheduling in Step ST2730 and the MIMO settings made in Step ST2732.

In Step ST2738, the cell 1 performs the SU-MIMO transmission to the UE 1-3 according to the scheduling in Step ST2730 and the MIMO settings made in Step ST2732.

In Step ST2739, the cell 1 performs the SU-MIMO transmission to the UE 2-3 according to the scheduling in Step ST2730 and the MIMO settings made in Step ST2732.

Consequently, a plurality of cells, that is, the cells 1 and 2 herein perform the SU-MIMO transmission to the UE 1-1, the UE 1-3, and the UE 2-3.

In the sixth modification, the UEs measure the channel information of the surrounding cells to enable the coordinated MIMO between the cells, similarly as the first embodiment. Thus, the UEs can reduce the interference from the surrounding cells other than the serving cell, thus enabling increase in the communication quality.

The sixth modification is effective when the interference between cells may increase, particularly when there are many small cells. In other words, since the interference between cells can be reduced with application of the sixth modification even when the interference between cells may increase, particularly when there are many small cells, the communication quality can be increased.

Although a downlink signal to be transmitted by the cell is used for estimating the channel information in the first embodiment, the downlink signal need not be used for estimating the channel information in the sixth modification. Thus, the overhead can be reduced, which can increase the throughput.

Seventh Modification of First Embodiment

In the first modification of the first embodiment, the UE determines a cell whose interference is not a problem, and the UE where interference is not a problem does not transmit the channel information to reduce the amount of calculation by the cell and the concentrator. The seventh modification will disclose conditions to be considered for determining the presence or absence of interference based on the SINR in the first modification of the first embodiment.

The cell determines the presence or absence of interference using the channel measuring information for measuring the channel information. A signal for measuring the channel information for each cell is a signal with a known sequence. The CSI-RS is used as the signal. A reference signal for each antenna port of a cell, specifically, mapping information of the CSI-RS is used as information on the signal for each cell. Examples of the mapping information include an insertion position and an insertion period of a frequency and a time, etc., a transmission power, and an offset power value relative to a reference transmission power value.

The cross-correlation with signals of the serving cell may be used instead of the channel measuring information to estimate the channel information. The channel information of an interference component may be measured with the CSI-IM of a serving cell.

The base station may determine whether interference is a problem in precoding scheme. For example, the precoding using a codebook may be performed similarly as in the conventional LTE and LTE-A. Non-linear precoding may be performed based on the channel information. When the non-linear precoding is performed, a signal with higher interference suppression capabilities may have a lower threshold for determining the SINR.

The UE may determine whether interference is a problem, using a positional relationship between UEs. In an environment in the presence of a plurality of UEs, the cell finds a correlation between antennas of the UEs (hereinafter may be referred to as "UE antennas") with the downlink channel information. In the seventh modification, each of the UEs includes a plurality of UE antennas. Each cell also includes a plurality of antennas of a base station (hereinafter may be referred to as "base station antennas"). FIG. 39 schematically illustrates correlations between the UE antennas. A correlation $R_{jk}$ between a UE antenna j and a UE antenna k is found from the following Equation (1), using a UE antenna i as a transmission antenna and the UE antenna j and the UE antenna k as reception antennas.

[Math 1]

$$R_{jk} = E\left[\sum_i h_{ij}(t)h_{ik}^*(t)\right] \quad (1)$$

Here, $h_{ij}(t)$ indicates the downlink channel information from the transmission antenna i to the reception antenna j. $h^*_{ik}(t)$ indicates a complex conjugate of $h_{ik}(t)$. $h_{ik}(t)$ indicates the downlink channel information from the transmission antenna i to the reception antenna k. E indicates an operator for averaging values varying with time t.

When the correlation $R_{jk}$ between the UE antennas is larger than or equal to a predetermined threshold and the UEs to which the two UE antennas with the correlation $R_{jk}$ are connected are different, the UEs are scheduled to perform the MIMO separately. Consequently, the communication quality can be increased.

The concentrator may calculate the correlation $R_{jk}$ between the UE antenna j and the UE antenna k, The scheduling may be performed to minimize the interference within its own cell, using an antenna pattern of the antennas of the base station. The correlation may be weakened by changing the directivity of the antennas of the base station.

The UE may detect whether interference is a problem. FIG. 40 illustrates a method performed by the UE for detecting whether interference is a problem. As illustrated in FIG. 40, the UE 1 measures an uplink signal of the UE 2. When the signal of the UE 2 received by the UE 1 is larger than or equal to a predetermined threshold, the UE 1 requests the cells to make a difference between the scheduling of the UE 2 and the scheduling of the UE 1 in transmitting the next uplink signal. The UE 1 and the UE 2 may be reversed.

Whether interference is a problem may be determined by the interference suppression capabilities of the UE. The threshold for determining the SINR will be reduced for the UE with higher interference suppression capabilities, using, for example, the number of reception antennas, the signal processing capabilities, and the category of the UE as parameters. The interference suppression capabilities of the UE may be notified by the SRS.

The sequence on the method for performing the SU-MIMO using a plurality of cells is illustrated in FIGS. 13 to 15. In the seventh modification, blocks in a unit for determining whether interference is a problem (hereinafter may be referred to as an "interference determining unit") are operated based on SINR criteria.

FIG. 41 is a flowchart illustrating operations to be performed in the blocks in the interference determining unit.

In Step ST2821, the UE obtains the UE category information. In Step ST2822, the UE finds the number of reception antennas from the UE category. In Step ST2823, the UE obtains the number of transmission streams. In Step ST2824, the UE obtains a threshold for determining the SINR.

In Step ST2825, the UE determines whether the number of reception antennas is larger than the number of transmission streams. When the UE determines that the number of reception antennas is larger than the number of transmission streams, the process proceeds to Step ST2826. When the UE determines that the number of reception antennas is not larger than the number of transmission streams, the process proceeds to Step ST2827. The number of reception antennas is determined by the UE category notified from the UE.

In Step ST2826, the threshold for determining the SINR is reduced. Upon end of the process in Step ST2826, the process proceeds to Step ST2827.

In Step ST2827, the UE determines whether the reception SINR is larger than the threshold for determining the SINR. When the UE determines that the reception SINR is larger than the threshold for determining the SINR, the process proceeds to Step ST2828. When the UE determines that the reception SINR is not larger than the threshold for determining the SINR, the process proceeds to Step ST2829.

In Step ST2828, the UE determines that interference is not a problem. Upon end of the process in Step ST2828, the entire procedure will be ended.

In Step ST2829, the UE determines that interference is a problem. Upon end of the process in Step ST2829, the entire procedure will be ended.

With increase in precision of determining the presence or absence of the influence of the interference between cells through the processes in the flowchart illustrated in FIG. 41, only the UE where interference is actually a problem can be taken even with the same cell capacity, and the load of the base station can be reduced.

Eighth Modification of First Embodiment

Similarly as the sixth modification of the first embodiment, the cell obtains the uplink channel information from the SRS to estimate the downlink channel information using a duality. The UE transmits the SRS to the cells 1 and 2. When the SRS to be transmitted by the UE includes a cell 1-specific signal or a cell 2-specific signal, the same f-t resources may be used for the SRS for the cells 1 and 2.

Figure 42:
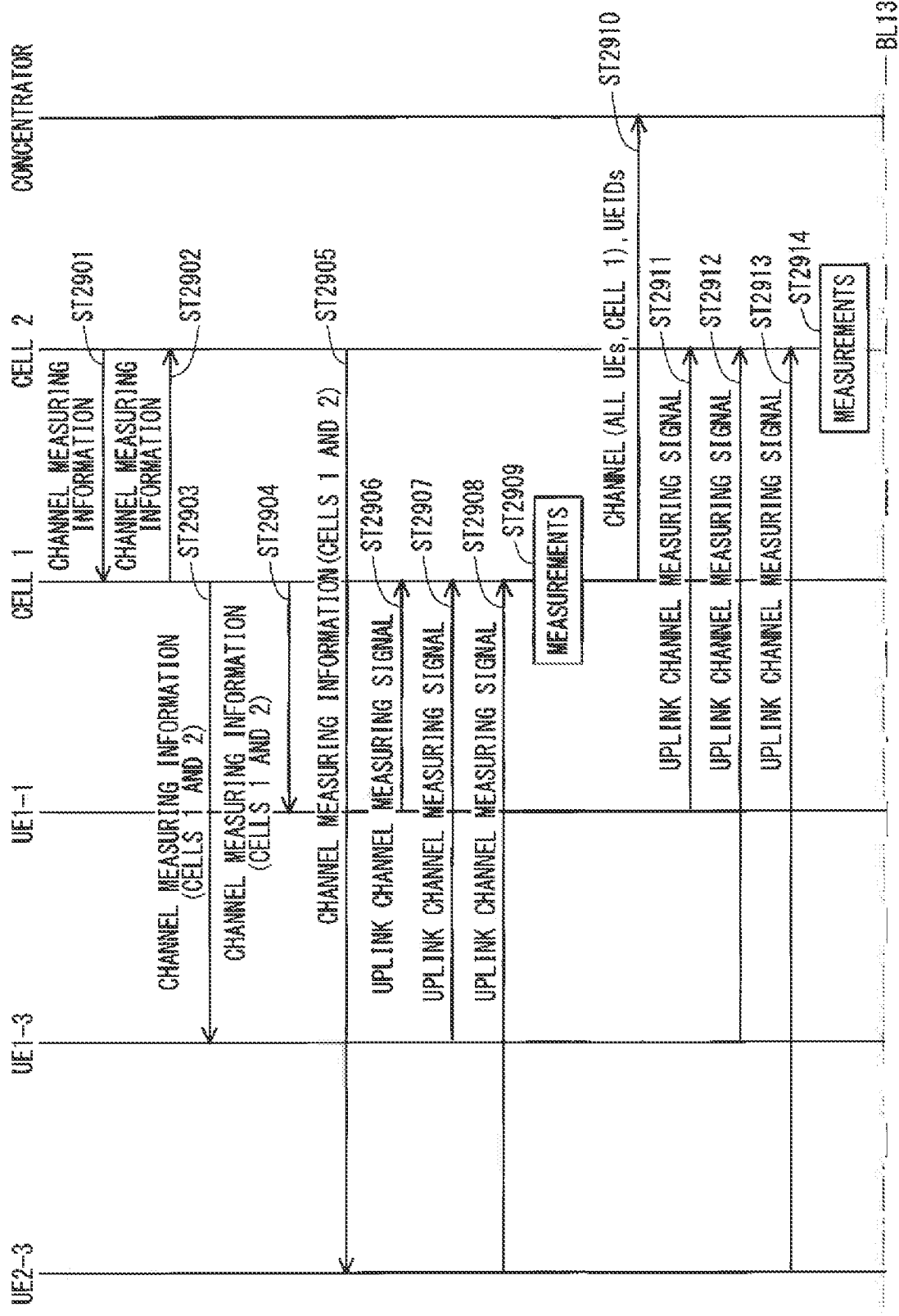
FIG. 42 illustrates an example sequence for performing the SU-MIMO in the channel estimating method according to the eighth modification of the first embodiment of the present invention.
Figure 43:
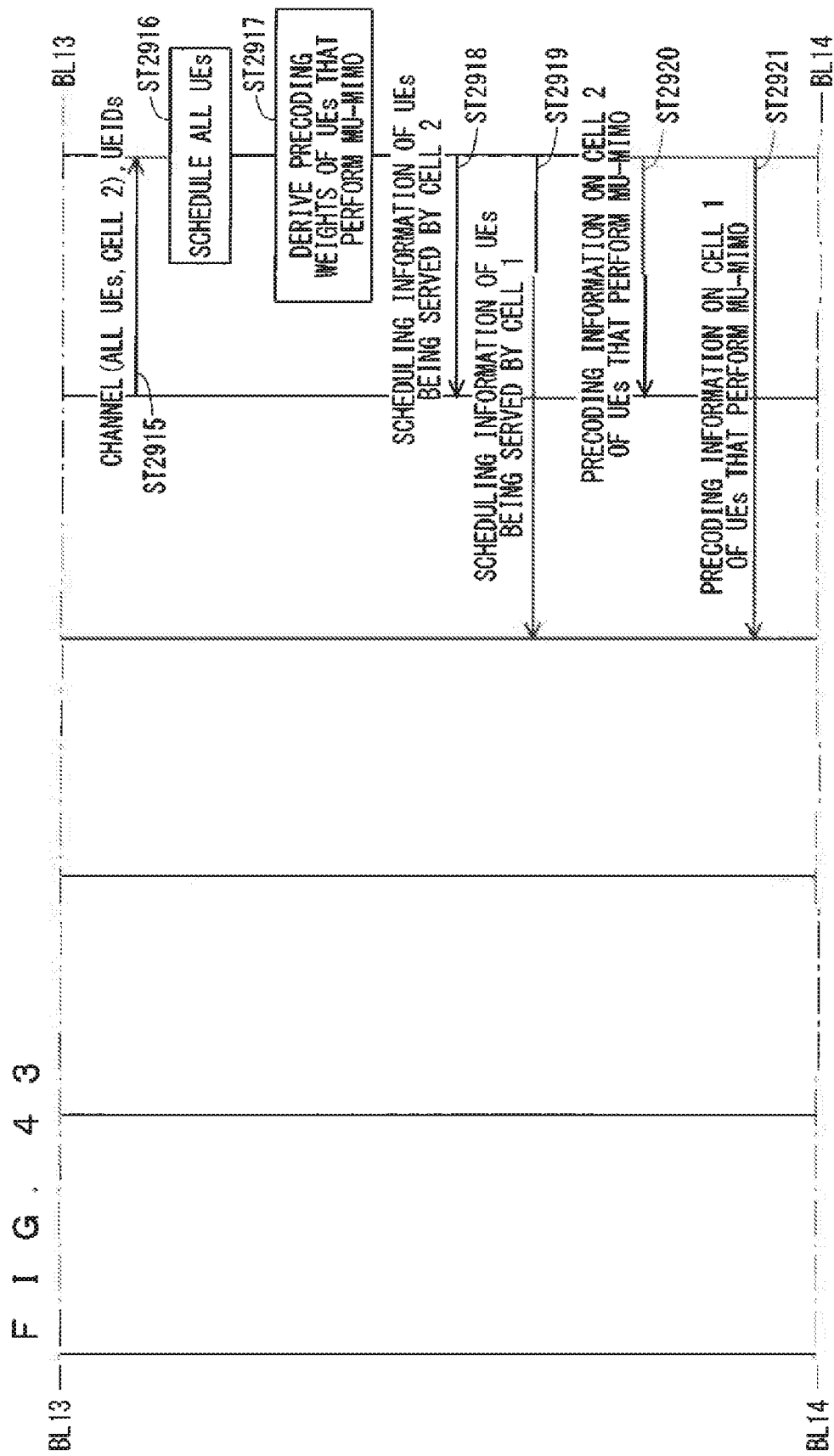
FIG. 43 illustrates the example sequence for performing the SU-MIMO in the channel estimating method according to the eighth modification of the first embodiment of the present invention.
Figure 44:
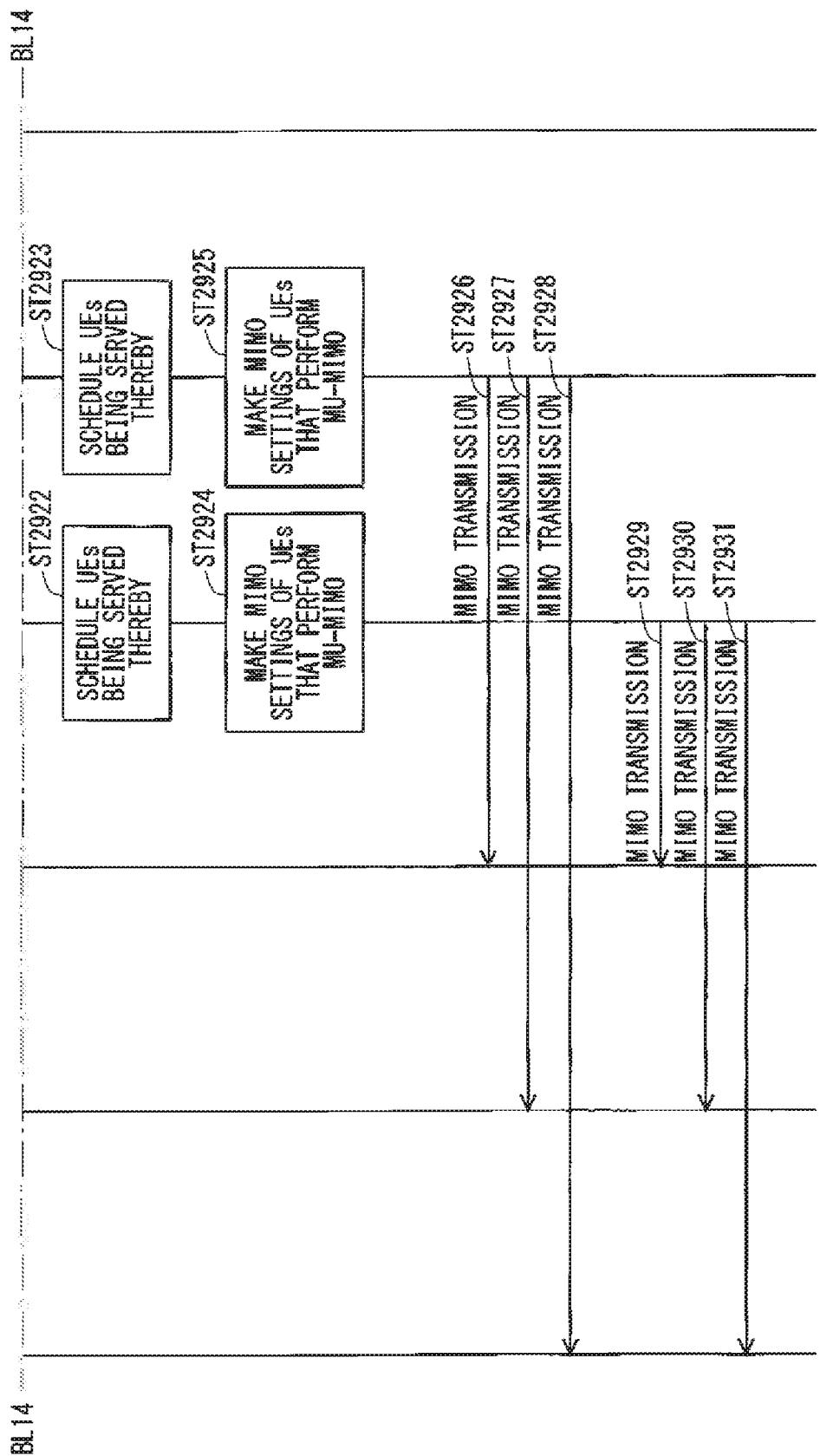
FIG. 44 illustrates the example sequence for performing the SU-MIMO in the channel estimating method according to the eighth modification of the first embodiment of the present invention.

FIGS. 42 to 44 illustrate an example sequence for performing the SU-MIMO in the channel estimating method according to the eighth modification of the first embodiment of the present invention. FIGS. 42 and 43 are connected across a location of a border BL13. FIGS. 43 and 44 are connected across a location of a border BL14.

In Step ST2901, the cell 2 notifies the cell 1 of the channel measuring information.

In Step ST2902, the cell 1 notifies the cell 2 of the channel measuring information.

In Step ST2903, the cell 1 notifies the UE 1-3 being served thereby of the channel measuring information.

In Step ST2904, the cell 1 notifies the UE 1-1 being served thereby of the channel measuring information.

In Step ST2905, the cell 2 notifies the UE 2-3 being served thereby of the channel measuring information.

In Step ST2906, the UE 1-1 notifies the cell 1 of an uplink channel measuring signal.

In Step ST2907, the UE 1-3 notifies the cell 1 of an uplink channel measuring signal.

In Step ST2908, the UE 2-3 notifies the cell 1 of an uplink channel measuring signal.

In Step ST2909, the cell 1 measures the SRS based on the uplink channel measuring signals notified from the UEs to derive the uplink channel information. The cell 1 estimates the downlink channel information based on the derived uplink channel.

In Step ST2910, the cell 1 notifies the concentrator of the results of the measured channel information of all the UEs and the result of the measured channel information of the cell 1, together with UEIDs that are identifiers of the UEs.

In Step ST2911, the UE 1-1 notifies the cell 2 of the uplink channel measuring signal.

In Step ST2912, the UE 1-3 notifies the cell 2 of the uplink channel measuring signal.

In Step ST2913, the UE 2-3 notifies the cell 2 of the uplink channel measuring signal.

In Step ST2914, the cell 2 measures the SRS based on the uplink channel measuring signals notified from the UEs to derive the uplink channel information. The cell 2 estimates the downlink channel information based on the derived uplink channel.

In Step ST2915, the cell 2 notifies the concentrator of the results of the measured channel information of all the UEs and the result of the measured channel information of the cell 2, together with the UEIDs that are identifiers of the UEs.

In Step ST2916, the concentrator schedules all the UEs being served by the cells 1 and 2.

In Step ST2917, the concentrator derives precoding weights of the UEs that perform the MU-MIMO.

In Step ST2918, the concentrator notifies the cell 2 of scheduling information of the UEs being served by the cell 2.

In Step ST2919, the concentrator notifies the cell 1 of scheduling information of the UEs being served by the cell 1.

In Step ST2920, the concentrator notifies the cell 2 of the precoding information on the cell 2 of the UEs that perform the MU-MIMO.

In Step ST2921, the concentrator notifies the cell 1 of the precoding information on the cell 1 of the UEs that perform the MU-MIMO.

In Step ST2922, the cell 1 schedules the UEs being served thereby, based on the scheduling information notified from the concentrator in Step ST2919.

In Step ST2923, the cell 2 schedules the UEs being served thereby, based on the scheduling information notified from the concentrator in Step ST2918.

In Step ST2924, the cell 1 makes the MIMO settings of the UEs that perform the MU-MIMO with the precoding information received in Step ST2921.

In Step ST2925, the cell 2 makes the MIMO settings of the UEs that perform the MU-MIMO with the precoding information received in Step ST2920.

In Step ST2926, the cell 2 performs the MIMO transmission to the UE 1-1 according to the scheduling in Step ST2923 and the MIMO settings made in Step ST2925.

In Step ST2927, the cell 2 performs the MIMO transmission to the UE 1-3 according to the scheduling in Step ST2923 and the MIMO settings made in Step ST2925.

In Step ST2928, the cell 2 performs the MIMO transmission to the UE 2-3 according to the scheduling in Step ST2923 and the MIMO settings made in Step ST2925.

In Step ST2929, the cell 1 performs the MIMO transmission to the UE 1-1 according to the scheduling in Step ST2922 and the MIMO settings made in Step ST2924.

In Step ST2930, the cell 1 performs the MIMO transmission to the UE 1-3 according to the scheduling in Step ST2922 and the MIMO settings made in Step ST2924.

In Step ST2931, the cell 1 performs the MIMO transmission to the UE 2-3 according to the scheduling in Step ST2922 and the MIMO settings made in Step ST2924.

Consequently, a plurality of cells, that is, the cells 1 and 2 herein perform the SU-MIMO transmission to the UE 1-1, the UE 1-3, and the UE 2-3.

In the eighth modification, the UEs measure the channel information of the surrounding cells to enable the coordinated MIMO between the cells, similarly as the first embodiment and the sixth modification of the first embodiment. Thus, the UEs can reduce the interference from the surrounding cells other than the serving cell, thus enabling increase in the communication quality.

The eighth modification is effective when the interference between cells may increase, particularly when there are many small cells. In other words, since the interference between cells can be reduced with application of the eighth modification even when the interference between cells may increase, particularly when there are many small cells, the communication quality can be increased.

Although a downlink signal to be transmitted by the cell is used for estimating the channel information in the first embodiment, the downlink signal need not be used for estimating the channel information in the eighth modification, similarly as the sixth modification of the first embodiment. Thus, the overhead can be reduced, which can increase the throughput.

Second Embodiment

In the conventional MIMO, a cell performs the MIMO with the UEs being served thereby in consideration of only an antenna port of its own cell as described in the first embodiment. Thus, under a communication environment in the presence of a plurality of cells, a problem with interference from a cell to which the UE is not connected or a cell that is not communicating occurs.

The first embodiment discloses the method for performing the MIMO using a plurality of cells to solve such a problem. However, the MIMO using a plurality of cells requires a process of precoding with all the antenna ports of the plurality of cells inclusive, which complicates the processes. The complexity in the processes causes an increase in power consumption of the base stations, an increase in circuit scale, and an increase in control latency. The second embodiment will disclose a method for solving such problems.

The MIMO is performed with the UEs being served by the other cells inclusive for each cell. In performing the MIMO, the cell performs the precoding with the UEs being served by the other cells inclusive. The UEs being served by the other cells may be UEs being served by the other cells where interference from its own cell is a problem. Performing the MIMO with the UEs being served by the other cells where interference is a problem inclusive can reduce the interference with the UEs. Thus, reduction in the interference from the surrounding cells can increase the communication quality for the UEs.

According to the second embodiment, multi user-MIMO (MU-MIMO) is performed as the MIMO.

The precoding is performed so that the serving cell of the UE where interference from the other cells is a problem forms beams for the UE and a non-serving cell thereof forms a null for the UE. In other words, the cell performs the precoding to form beams when the UE where interference from the other cells is a problem is the UE being served thereby and to form a null when the UE is not the UE being served thereby. The non-serving cell may be a cell that interferes with the UE.

Figure 45:
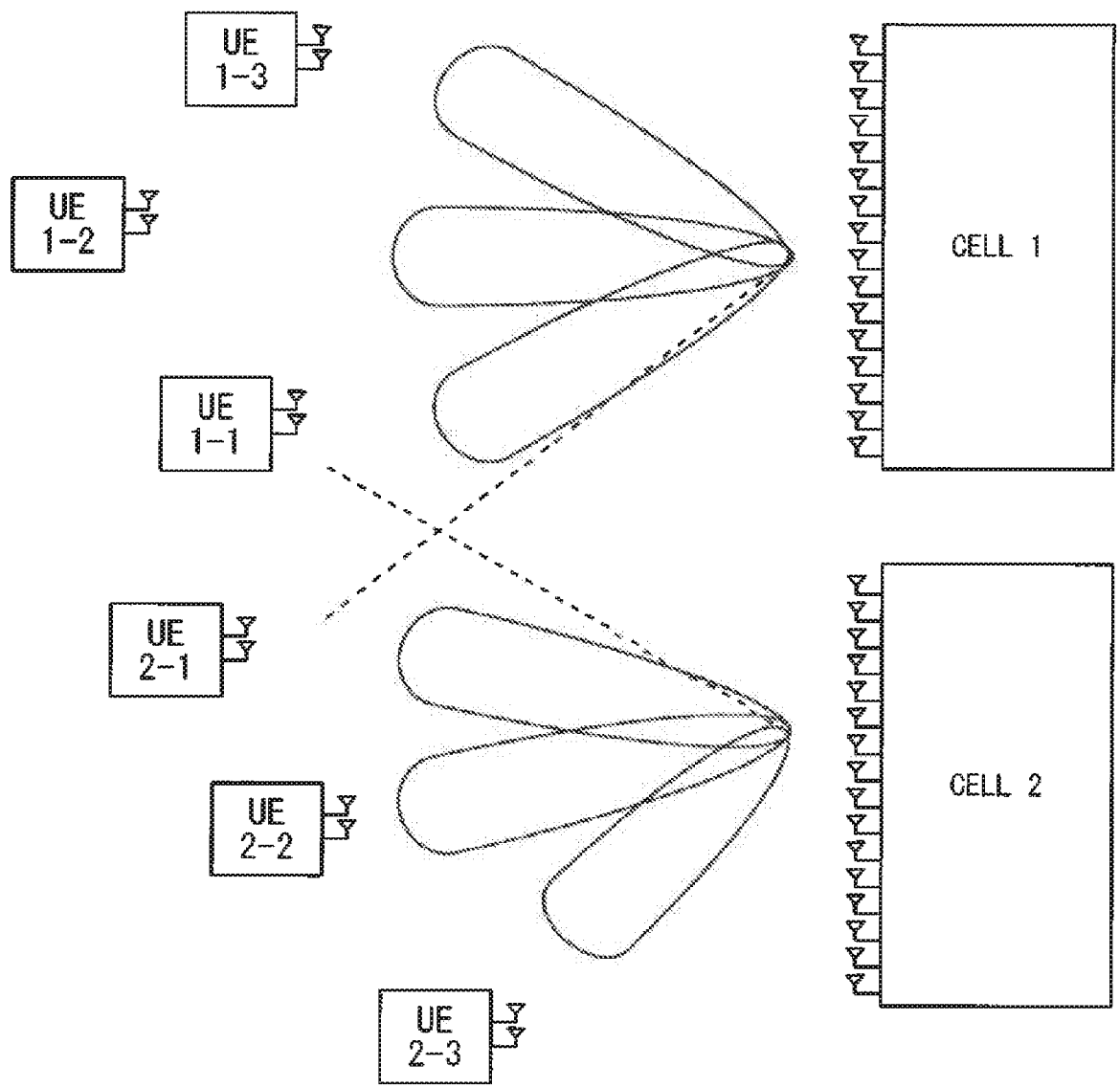
FIG. 45 is a conceptual diagram illustrating a method for performing the MU-MIMO with the UEs being served by the other cells where interference from its own cell is a problem inclusive.

FIG. 45 is a conceptual diagram illustrating a method for performing the MU-MIMO with the UEs being served by the other cells where interference from its own cell is a problem inclusive. FIG. 45 illustrates the adoption of two cells of the cells 1 and 2. A UE 1-$n$ (n is a natural number) is a UE being served by the cell 1, and a UE 2-$m$ (m is a natural number) is a UE being served by the cell 2. The UE 1-1 is a UE where interference from the cell 2 is a problem. The UE 2-1 is a UE where interference from the cell 1 is a problem.

The cell 1 performs the MIMO with the UEs being served by the cell 1 and with the UBE being served by the cell 2 where interference from its own cell is a problem, that is, the UE 2-1. The precoding is performed with the UE 1-1, the UE 1-2, the UE 1-3, and the UE 2-1 on a plurality of layers using the cell 1 to form beams. Different streams are transmitted for each of the layers. In the MU-MIMO, the same f-t resources may be allocated to the UEs. Since the precoding maintains the orthogonality between the beams formed on each of the layers, each of the UEs can receive the transmitted streams. A plurality of layers may be allocated to one UE.

The cell 1 performs the precoding to form beams for the UE 1-1, the UE 1-2, and the UE 1-3 that are the UEs being served by the cell 1, and to form a null for the UE 2-1 that is the UE being served by another cell. Since the UE 2-1 that is the UE being served by another cell is a UE where interference from its own cell is a problem, the interference with the UE can be reduced by forming a null for the UE.

The cell 2 performs the MIMO with the UEs being served by the cell 2 and with the UE being served by the cell 1 where interference from its own cell is a problem, that is, the UE 1-1. The precoding is performed with the UE 2-1, the UE 2-2, the UE 2-3, and the UE 1-1 on a plurality of layers using the cell 2 to form beams. Different streams are transmitted for each of the layers. In the MU-MIMO, the same f-t resources may be allocated to the UEs. Since the precoding maintains the orthogonality between the beams formed on each of the layers, each of the UEs can receive the transmitted streams. A plurality of layers may be allocated to one UE.

The cell 2 performs the precoding to form beams for the UE 2-1, the UE 2-2, and the UE 2-3 that are the UEs being served by the cell 2, and to form a null for the UE 1-1 that is the UE being served by another cell. Since the UE 1-1 that is the UE being served by another cell is a UE where interference from its own cell is a problem, the interference with the UE can be reduced by forming a null for the UE.

Performing the MIMO with the UEs being served by the other cells where interference from its own cell is a problem inclusive can reduce the interference with the UEs being served by the other cells.

The cell has difficulties in performing the MIMO with all the UEs being served by the other cells inclusive. This is because the number of the UEs being served by the other cells is enormous. Thus, which UEs should be included in the MIMO among the UEs being served by the other cells is a problem. The second embodiment will disclose a method for determining the UEs to be included in the MIMO among the UEs being served by the other cells.

The cell may perform the MIMO with the UEs where interference from its own cell is a problem inclusive among the UEs being served by the other cells.

The following (1) to (3) will be disclosed as example nodes that determine the UEs where interference from its own cell is a problem among the UEs being served by the other cells:

(1) a serving cell of the UBs where interference is a problem;

(2) a cell that interferes with the UEs where interference is a problem; and (3) the UEs where interference is a problem.

In the example of (1), the serving cell of the UEs where interference from its own cell is a problem determines the UEs among the UBs being served by the other cells. The serving cell may determine the UEs where interference from the other cells is a problem.

In the example of (2), the UEs where interference from its own cell is a problem among the UEs being served by the other cells are determined by its own cell. A non-serving cell may determine the UEs where interference from its own cell is a problem.

A specific example of performing, for each cell, the MU-MIMO with the UEs being served by the other cells inclusive will be disclosed.

A cell notifies the surrounding cells of settings for measuring the channel information of its own cell. The method disclosed in the first embodiment may be applied to a method relevant to this. Consequently, the cell can recognize the CSI settings of the surrounding cells.

The cell notifies the UEs being served thereby of the CSI settings of its own cell. Furthermore, the cell notifies the UEs being served thereby of the CSI settings of the surrounding cells. The cell may broadcast the CSI settings as the broadcast information. Alternatively, the cell may notify each of the UEs separately of the CSI settings via dedicated signaling.

Upon receipt of the CSI settings of the serving cell and the CSI of the surrounding cells from the serving cell, the UEs measure the channel information with the CSI settings.

The UEs notify the serving cell of results of the measured channel information when a node that determines the UEs where interference from its own cell is a problem among the UEs being served by the other cells is the serving cell of the UBs where interference is a problem or a cell that interferes with the UEs where interference is a problem. When the signal for measuring the channel information is the CSI-RS, the CSI is notified as the measurement results. The results of the measured channel information may include a result of a measured magnitude of interference. The method disclosed in the first embodiment may be applied to a method for notifying the results of the measured channel information from the UEs to the serving cell.

Consequently, the serving cell can obtain the results of the measured channel information of its own cell and the surrounding cells from the UEs being served thereby.

Upon obtainment of the results of the measured channel information of its own cell and the surrounding cells from the UEs being served thereby, the cell determines the UEs where interference from the other cells is a problem when the node that determines the UEs where interference from its own cell is a problem among the UEs being served by the other cells is the serving cell of the UEs where interference is a problem.

The cell obtains information on a magnitude of interference from the other cells, which is transmitted from the UEs being served by its own cell. The information on a magnitude of interference from the other cells may include an identifier of a cell and a result of a measured magnitude of interference from the cell.

The information on a magnitude of interference from the other cells may be results of the measured channel information from the other cells that are obtained from the UEs being served by its own cell.

The cell determines the UEs where interference from the other cells is a problem, using the results of the measured magnitude of interference from the other cells that are transmitted from the UEs being served by its own cell.

The method disclosed in the second modification of the first embodiment may be applied to a method for determining the UEs where interference is a problem.

The cell identifies an interfering cell with the results of the measured magnitudes of interference of the UEs from the other cells.

The method disclosed in the second modification of the first embodiment for determining an interfering cell may be applied to a method for determining an interfering cell.

The cell schedules the UEs being served thereby. The scheduling includes allocation of the f-t resources and the MCS. In the MU-MIMO, a plurality of UEs may be scheduled per f-t resource.

A cell notifies a cell that interferes with the UEs where interference is a problem of the interference with the UEs. The cell may request the cell that interferes with the UEs where interference is a problem to perform the MU-MIMO with the UEs. The cell may request the cell that interferes with the UEs where interference is a problem to form a null for the UEs.

The cell notifies the cell that interferes with the UEs where interference is a problem of the scheduling information of the UEs. The cell may also notify identifiers of the UEs. The cell may notify the identifiers of the UEs and the scheduling information of the UEs in association with one another. The cell may make the notification with inclusion of such information in one message. Consequently, the cell that interferes with the UEs where interference is a problem can obtain the scheduling information of the UBE. The interfering cell can recognize, for example, to which f-t resources the UEs are allocated.

The cell notifies the cell that interferes with the UEs of the results of the measured channel information of the UEs for the interfering cell. The cell may also notify the identifiers of the UEs. The cell may notify the identifiers of the UEs and the measurement results of the UEs in association with one another. The cell may make the notification with inclusion of such information in one message. The cell may also notify an identifier of the cell that interferes with the UE. Consequently, the cell that interferes with the UEs where interference is a problem can obtain the results of the measured channel information of the UEs.

The cell may notify the scheduling information of the UEs where interference is a problem and the results of the measured channel information together. The cell may notify such information together with the identifiers of the UEs. The cell may notify the identifiers of the UEs, the scheduling information of the UEs, and the measurement result of the UEs in association with one another. The cell may make the notification with inclusion of such information in one message. The cell may also notify an identifier of the cell that interferes with the UE. Consequently, the amount of messages to be notified between the cells can be reduced. The signaling load between the cells can also be reduced.

The information may be notified between the cells configured by different eNBs via the X2 interface. Alternatively, the information may be notified via the S1 interface. The information may be notified through a core network node, for example, an MME. Alternatively, the information may be included in an existing message of the X2 interface or the S1 interface to be notified. The method disclosed as the method for notifying the CSI settings according to the first embodiment may be applied. Thus, the lame advantages as those according to the first embodiment can be produced.

The cell that interferes with the UEs being served by the other cells can perform the MIMO with the UEs inclusive by obtaining the results of the measured channel information between its own cell and the UEs.

The cell schedules the UEs being served thereby. The cell that interferes with the UEs being served by the other cells determines the UEs being served thereby to be allocated to the same f-t resources, with the obtained scheduling information of the UEs.

The cell derives precoding weights of the UEs being served thereby and the UEs being served by the other cells where interference is a problem to be allocated to the same f-t resources inclusive.

The cell derives the precoding weights with the results of the measured channel information of its own cell to be transmitted from the UEs being served thereby, and with the results of the measured channel information of its own cell to be transmitted from the UEs being served by the other cells.

The cell performs the MIMO with the UEs being served thereby and the UEs being served by the other cells where interference is a problem, using the derived precoding weights.

The following will disclose a case where a node that determines the UEs where interference from its own cell is a problem among the UEs being served by the other cells is a cell that interferes with the UE where interference is a problem. When the node is the cell that interferes with the UEs where interference is a problem, the cell that has obtained the results of the measured channel information of its own cell and the surrounding cells from the UEs being served thereby notifies the surrounding cells of the measurement results. The cell may notify, in association with one another, the identifiers of the UEs that have made the measurements, information indicating of which cell the measurement results are, for example, the identifier of the cell subjected to the measurement, and the identifier of its own cell, that is, the identifier of the serving cell of the UEs that have made the measurements. The cell may make the notification with inclusion of such information in one message.

The cell schedules the UEs being served thereby. The scheduling includes allocation of the f-t resources and the MCS. The cell notifies the surrounding cells of a result of the scheduling of the UEs being served thereby. The cell may make the notification in association with, for example, the measurement results of the UEs being served thereby. The cell may make the notification with inclusion of such results in one message.

The information may be notified between the cells configured by different eNBs via the X2 interface. Alternatively, the information may be notified via the S1 interface. The information may be notified through a core network node, for example, an MME. Alternatively, the information may be included in an existing message of the X2 interference or the S1 interface to be notified. The method disclosed as the method for notifying the CSI settings according to the first embodiment may be applied. Thus, the same advantages as those according to the first embodiment can be produced.

When obtaining, from the surrounding cells, the results of the measured channel information of the serving cell and the surrounding cells of the UEs being served by the surrounding cells, a cell determines the UBs where interference from its own cell is a problem.

The cell obtains information on a magnitude of interference from its own cell that is transmitted from the UEs being served by the other cells. The information on a magnitude of interference from its own cell may include an identifier of a cell and a result of a measured magnitude of interference from its own cell.

The information on a magnitude of interference from its own cell may be results of the measured channel information of the serving cell and the surrounding cells of the UEs being served by the surrounding cells, which are obtained from the surrounding cells.

The cell determines the UE where interference from its own cell is a problem, using the results of the measured magnitude of interference from its own cell that are transmitted from the UEs being served by the other cells.

The method disclosed in the second modification of the first embodiment may be applied to a method for determining the UE where interference is a problem.

The cell identifies the serving cell of the UE as well as determining the UE where interference is a problem. The cell may use the identifier of the serving cell of the UE that has been obtained from the surrounding cells and notified together with the result of the measured channel information of the UE.

The cell that determines a UE where interference is a problem determines the UEs being served thereby to be allocated to the same f-t resources, with the scheduling information of the UE that is obtained from the serving cell of the UE.

The cell derives precoding weights of the UEs being served thereby and the UEs being served by the other cells where interference is a problem to be allocated to the same f-t resources inclusive.

The cell derives the precoding weights with the results of the measured channel information of its own cell to be transmitted from the UEs being served thereby and the results of the measured channel information of its own cell to be transmitted from the UEs being served by the other cells.

The cell performs the MIMO with the UEs being served thereby and the UEs being served by the other cells where interference is a problem, using the derived precoding weights.

In the aforementioned methods, the cell notifies the surrounding cells of a result of the scheduling of the UEs being served thereby. Here, the processes from the scheduling to deriving of the precoding weights can be performed in a short period of time.

As an alternative method, the cell that determines the UE where interference is a problem may notify the serving cell of the UE of a request for the scheduling information of the UE. The cell may notify the UE where interference is a problem and the scheduling information of the UE in association with each other.

Upon obtainment of the request for the scheduling information of the UE where interference is a problem, the cell may notify the scheduling information of the UE to the cell that has made the request. The cell may also notify the identifier of its own cell. Upon obtainment of the request for the scheduling information of the UE, the cell may notify the scheduling information of the UE to the cell that has transmitted the request.

Consequently, the cell that determines the UE where interference is a problem can obtain the scheduling information of the UE. The number of UEs whose scheduling information needs to be notified from each cell to the surrounding cells can be reduced more substantially than that by the aforementioned methods. The amount of signaling between the cells can also be reduced.

The following will disclose a case where the node that determines the UE where interference from its own cell is a problem among the UEs being served by the other cells is the UE.

The UE determines whether interference from a non-serving cell is a problem. The UE derives a magnitude of interference from the non-serving cell, and determines, from the magnitude of interference, whether its own UE has a problem with interference from the non-serving cell. The magnitude of interference from the non-serving cell may be a result of the measured channel information from the non-serving cell. The CSI settings for the surrounding cells that are obtained from the serving cell may be used for measuring the channel information.

The method disclosed in the second modification of the first embodiment for determining the UE where interference is a problem may be applied to a method in which the UE determines whether its own UE has a problem with interference from the non-serving cell.

Determining by the UE whether the UE has a problem with interference from the non-serving cell may be statically determined in, for example, a standard. Alternatively, the serving cell may request the UEs being served thereby to determine whether interference from a non-serving cell is a problem. A message for the request may be notified. The serving cell may notify the UEs being served thereby of setting information for the request. The setting information may be included in a message for the request to be notified. The setting information may include a kind of a reference signal for measuring a magnitude of interference and a threshold for the magnitude of interference, etc. As such, the request of the serving cell enables the UE to determine whether interference from a non-serving cell is a problem, according to states of the cell and the UE flexibly as appropriate.

The request message and the setting information may be included in the broadcast information to be broadcast, as a notification method thereof. Alternatively, the request message and the setting information may be notified via dedicated signaling.

The UEs being served thereby may be UEs that are in an RRC connected state with the serving cell, or any UEs among the UEs that are in an RRC connected state. Limiting the number of UEs can reduce the amount of signaling in making a notification via dedicated signaling.

The UE that has determined whether interference from a non-serving cell is a problem may notify the serving cell of a result of the determination. The result of the determination may be notified to the serving cell in association with the identifier of the non-serving cell. Consequently, the serving cell can recognize from which cell the interference is a problem.

The UE may measure the channel information from the non-serving cell, and notify the serving cell of a result of the measurement. The UE may notify the serving cell of the identifier of the non-serving cell, the result of the determination on whether interference from the non-serving cell is a problem, and the result of the measured channel information of the non-serving cell in association with one another. Consequently, the serving cell can obtain the result of the measured channel information between the UE where interference is a problem and the cell that interferes with the UE.

As an alternative method, the UE that has determined whether interference from a non-serving cell is a problem may notify the serving cell of only the result of the measured channel information of the non-serving cell whose interference is a problem. The UE may notify the identifier of the non-serving cell whose interference is a problem and the result of the measured channel information of the non-serving cell in association with each other. Limiting, to the non-serving cell whose interference is a problem, the information to be notified from the UE to the serving cell can substantially reduce the amount of information to be notified between the UE and the serving cell. The signaling load on radio interface can also be substantially reduced. Since the UE where interference from a non-serving cell is not a problem need not notify the serving cell of the result of the measured channel information of the non-serving cell, the power consumption of the UE can be reduced.

The method disclosed in the first embodiment for notifying the result of the measured channel information from the UE to the serving cell may be applied to a method for notifying the information from the UE to the serving cell.

Upon obtainment of the identifier of the UE where interference is a problem, the identifier of the cell that interferes with the UE, and the result of the measured channel information from the UE, the serving cell notifies the cell that interferes with the UE of the identifier of the UE and the channel information of the cell that interferes with the UE. The serving cell may also notify the cell identifier of its own cell.

The methods applied when a node that determines the UE where interference from its own cell is a problem among the UEs being served by the other cells is a serving cell of the UE where interference is a problem may be applied to: a method in which a cell schedules the UEs being served thereby; a method in which the cell notifies a cell that interferes with the UE where interference is a problem of the scheduling information of the UE; a method in which the cell notifies the cell that interferes with the UE where interference is a problem of the result of the measured channel information of the UE for the interfering cell; and a method in which a cell that interferes with the UEs being served by the other cells performs the MIMO with the UEs inclusive.

Consequently, the cell that interferes with the UEs being served by the other cells may perform the MIMO with the UEs inclusive even when a node that determines the UE where interference from its own cell is a problem among the UEs being served by the other cells is a UE.

The disclosure is a method in which the serving cell requests the UEs being served thereby to determine whether interference from a non-serving cell is a problem.

As an alternative method, the surrounding cells may issue the requests to the serving cell as a replacement for the request from the serving cell to the UEs being served thereby. In other words, the cell may request the surrounding cells to request the UEs being served thereby to determine whether interference from a non-serving cell is a problem. Upon receipt of the request, the cells request the UEs being served thereby to determine whether interference from a non-serving cell is a problem. The cell allows the surrounding cells to determine the presence or absence of the UE where interference from its own cell is a problem and identify the UE. Consequently, the cell can take measures for reducing the interference with the UE with which its own cell interferes.

The method disclosed in the first embodiment may be applied to the MIMO settings for performing the MIMO by a cell with the UEs being served thereby and the UEs being served by the other cells where interference from its own cell is a problem inclusive. The cell performs the precoding to form a null for the UEs being served by the other cells where interference from its own cell is a problem.

Consequently, the cell that interferes with the UEs being served by the other cells can perform the MIMO with the UEs inclusive. Performing the MIMO to form a null for the UEs enables the cell to reduce the interference with the UEs being served by the other cells.

The serving cell of the UE where interference is a problem may perform the MIMO to form beams for the UEs.

The precoding is performed so that the serving cell of the UE where interference from the other cells is a problem forms beams for the UE and a non-serving cell thereof forms a null for the UE. In other words, the cell performs the precoding to form beams when the UE where interference from the other cells is a problem is the UE being served thereby, and to form a null when the UE is not the UE being served thereby. The non-serving cell may be a cell that interferes with the UEs.

Performing the MIMO so that the serving cell forms beams for the UE and an interfering cell forms a null for the UE can reduce the interference from the non-serving cell, and increase the communication quality from the serving cell. Thus, higher-speed transmission is possible.

FIGS. 46 and 47 illustrate a sequence on a method for performing the MU-MIMO with the UEs being served by the other cells where interference from its own cell is a problem inclusive. FIGS. 46 and 47 are connected across a location of a border BL15.

FIGS. 46 and 47 illustrate an example in which the cell 1 performs the MU-MIMO with the UEs being served by the cell 1 that is its own cell and with the UE 2-1 that is the UE being served by the cell 2 where interference from the cell 1 is a problem. FIGS. 46 and 47 also illustrate that the cell 2 performs the MU-MIMO with the UE being served by the cell 2 that is its own cell and with the UE 1-1 that is the UE being served by the cell 1 where interference from the cell 2 is a problem.

FIGS. 46 and 47 also illustrate processes to be performed by the UE 1-1 and the UE 1-3 that are being served by the cell 1 and the UE 2-3 being served by the cell 2. FIGS. 46 and 47 also illustrate that the node that determines the UE where interference from its own cell is a problem among the UEs being served by the other cells is the serving cell of the UE where interference is a problem.

Since the sequence illustrated in FIGS. 46 and 47 includes the same Steps as those in the sequence illustrated in FIGS. 11 and 12, the same step numbers will be assigned to the same Steps and the common description thereof will be omitted.

In Step ST905$a$, the cell 2 notifies the UE 2-1 being served thereby of the CSI settings of its own cell and the CSI settings of the cell 1.

Upon receipt of the CSI settings of the serving cell and the surrounding cell, the UE 2-1 measures the channel information with the CSI settings in Step ST906$a$.

In Step ST911$a$, the UE 2-1 notifies the cell 2 that is the serving cell of the results of the measured channel information of the cells 1 and 2.

In Step ST2001, the cell 1 determines the UE where interference is a problem, with the results of the measured channel information of the cells 1 and 2 that are obtained from the UE 1-1 and the UE 1-3 that are being served thereby. The cell 1 determines whether a magnitude of interference from the cell 2 is a problem, with the results of the measured channel information of the cell 2 that are obtained from the UE 1-1 and the UE 1-3.

A predetermined magnitude of interference is introduced to make the determination. The predetermined magnitude of interference may be a threshold for the magnitude of interference to make the determination. When a magnitude of interference exceeds the threshold, it is determined that interference is a problem. When a magnitude of interference is lower than or equal to the threshold, it is determined that interference is not a problem. The predetermined magnitude of interference may be statically predetermined in, for example, a standard. Alternatively, a core network node may notify the cell of the predetermined magnitude of interference. Alternatively, the OAM may make the notification to the cell. Alternatively, the concentrator may make the notification to the cell.

Here, a case where the UE 1-1 receives, from the cell 2, the interference higher than the predetermined magnitude of interference will be described.

In Step ST2001, the cell 1 determines that interference is a problem when the magnitude of interference from the cell 2 that has bean obtained from each of the UEs exceeds the threshold. When the magnitude of interference is lower than or equal to the threshold, the cell 1 determines that interference is not a problem. Upon determination that the magnitude of Interference of the UE 1-1 exceeds the threshold in Step ST2001, the cell 1 identifies the UE 1-1 as the UE where interference is a problem in Step ST2003. The cell 1 stores the identified UE, that is, the UE identifier of the UE 1-1 herein, the interfering cell, that is, the identifier of the cell 2 herein, and the result of the measured channel information of the cell 2 in association with one another.

Similarly in Step ST2002, the cell 2 determines the UE where interference is a problem, with the results of the measured channel information of the cells 1 and 2 that are obtained from the UE 2-1 that is being served thereby. The cell 2 determines whether a magnitude of interference from the cell 1 is a problem, with the result of the measured channel information of the cell 1 that is obtained from the UE 2-1.

Here, a case where the UE 2-1 receives, from the cell 1, the interference higher than the predetermined magnitude of interference will be described.

In Step ST2002, the cell 2 determines that interference is a problem when a magnitude of interference from the cell 1 that has been obtained from the UE exceeds the threshold. When the magnitude of interference is lower than or equal to the threshold, the cell 2 determines that interference is not a problem. Upon determination that the magnitude of interference of the UE 2-1 exceeds the threshold in Step ST2002, the cell 2 identifies the UE 2-1 as the UE where interference is a problem in Step ST2004. The cell 2 stores the identified UE, that is, the UE identifier of the UE 2-1 herein, the interfering cell, that is, the identifier of the cell 1 herein, and the result of the measured channel information of the cell 1 in association with one another.

In Step ST2005, the cell 2 notifies the cell 1 that interferes with the UE 2-1 where interference is a problem of the UE identifier of the UE 2-1 where interference is a problem (UEID (UE 2-1)), and the result of the measured channel information of the cell 2 that has been obtained from the UE (CSI (cell 2)).

Similarly in Step ST2006, the cell 1 notifies the cell 2 that interferes with the UE 1-1 where interference is a problem of the UE identifier of the UE 1-1 where interference is a problem (UEID (UE 1-1)), and the result of the measured channel information of the cell 1 that has been obtained from the UE (CSI (cell 1)).

In Step ST2007, the cell 1 schedules the UEs being served thereby. In Step ST2008, the cell 2 schedules the UEs being served thereby.

In Step ST2009, the cell 1 notifies the cell 2 that interferes with the UE 1-1 where interference is a problem of the UE identifier of the UE 1-1 where interference is a problem (UEID (UE 1-1)), and the scheduling information of the UE.

Similarly in Step ST2010, the cell 2 notifies the cell 1 that interferes with the UE 2-1 where interference is a problem of the UE identifier of the UE 2-1 where interference is a problem (UEID (UE 2-1)), and the scheduling information of the UE.

In Step ST2011, the cell 1 determines the UEs that are scheduled on the same f-t resources as those on which the UE 2-1 is scheduled, from the scheduling information of the UE 2-1 that has been obtained from the cell 2, and derives precoding weights of these UEs.

The cell 1 performs the precoding to form beams for the UE 1-1 and the UE 1-3 that are being served thereby, and performs the precoding to form a null for the UE 2-1 that is the UE being served by another cell.

Similarly in Step ST2012, the cell 2 determines the UEs that are scheduled on the same f-t resources as those on which the UE 1-1 is scheduled, from the scheduling information of the UE 1-1 that has been obtained from the cell 1, and derives precoding weights of these UEs.

The cell 2 performs the precoding to form beams for the UE 2-1 that is the UE being served thereby, and performs the precoding to form a null for the UE 1-1 that is the UE being served by another cell.

In Step ST2013, the cell 1 makes the MIMO settings of the UE 1-1 and the UE 1-3 that are being served thereby, and the UE 2-1 that is the UE being served by another cell where interference is a problem.

Similarly in Step ST2014, the cell 2 makes the MIMO settings of the UE 2-1 that is the UE being served thereby, and the UE 1-1 that is the UE being served by another cell where interference is a problem.

In Step ST2015, the cell 2 performs the MU-MIMO transmission to the UE 1-1 according to the scheduling in Step ST2008 and the MIMO settings made in Step ST2014.

In Step ST2016, the cell 2 performs the MU-MIMO transmission to the UE 2-1 according to the scheduling in Step ST2008 and the MIMO settings made in Step ST2014.

In Step ST2017, the cell 1 performs the MU-MIMO transmission to the UE 1-1 according to the scheduling in Step ST2007 and the MIMO settings made in Step ST2013.

In Step ST2018, the cell 1 performs the MU-MIMO transmission to the UE 1-3 according to the scheduling in Step ST2007 and the MIMO settings made in Step ST2013.

In Step ST2019, the cell 1 performs the MU-MIMO transmission to the UE 2-1 according to the scheduling in Step ST2007 and the MIMO settings made in Step ST2013.

Consequently, the cell 1 can perform the MU-MIMO transmission to the UE 1-1 and the UE 1-3 that are being served thereby and to the UE 2-1 being served by another cell where interference from its own cell is a problem.

Furthermore, the cell 2 can perform the MU-MIMO transmission to the UE 2-1 being served thereby and to the UE 1-1 being served by another cell where interference from its own cell is a problem.

The method disclosed in the second embodiment enables the cell to perform the MU-MIMO with the UEs where interference from the other cells is a problem inclusive. Performing the MU-MIMO with the UEs in consideration of the channel information from the cells other than the serving cell enables reduction in the interference from the other cells. Reduction in the interference from the other cells can increase the communication quality. Moreover, the communication capacity for a system can be increased.

Particularly, the outstanding advantages can be produced in a situation where there are many small cells and the interference between the cells increases.

Moreover, the MIMO can be performed for each cell without any need for using a plurality of cells, when compared to the method disclosed in the first embodiment. Thus, only a process of precoding with an antenna port for each cell may be performed without any need for performing the process of precoding with all the antenna ports of a plurality of cells inclusive. This can facilitate the precoding process, and reduce an increase in power consumption of base stations, an increase in circuit scale, and an increase in control latency.

Since each of the cells can perform the MIMO, the scheduling of the UEs being served thereby is possible. The flexible scheduling depending on a state of each cell, for example, a radio propagation environment and a load, etc. is possible.

First Modification of Second Embodiment

The second embodiment discloses the method for performing the MIMO with the UEs where interference is a problem inclusive for each cell to address the problem with interference from the cell to which the UE is not connected or the cell that is not communicating. This method solves the problem by directing beams toward the UEs being served by a serving cell and directing a null to the UEs being served by a non-serving cell. The first modification will disclose a method for solving the problem described in the second embodiment, in a method for forming a null from the serving cell and forming beams from the non-serving cell.

A null is formed from the serving cell, and beams are formed from the non-serving cell. Each of the cells performs the precoding with the UEs being served by the other cells where interference is a problem inclusive. Furthermore, each of the cells derives precoding weights to form a null when the UEs where interference is a problem are the UEs being served thereby and to form beams when the UEs are not the UEs being served thereby.

Each of the cells performs the DL transmission. The example herein indicates the presence of two cells of the cells 1 and 2. Here, the cell 1 is a serving cell, and the cell 2 is a non-serving cell.

The cell 2 transmits the PDSCH using a UE-specific reference signal with the resources scheduled by the cell 1. Similarly, the cell 1 transmits the PDSCH using a UE-specific reference signal with the resources scheduled by the cell 2.

The UE receives the PDSCH using the UE-specific reference signal with the resources scheduled by the serving cell. A precoding weight may be derived from the CSI or using a codebook similarly as in the LTE/LTE-A. When a codebook is used, the cell 1 needs to notify the UE of PCIs of both the cells 1 and 2. The UE receives the PDSCHs using the PCIs.

Figure 48:
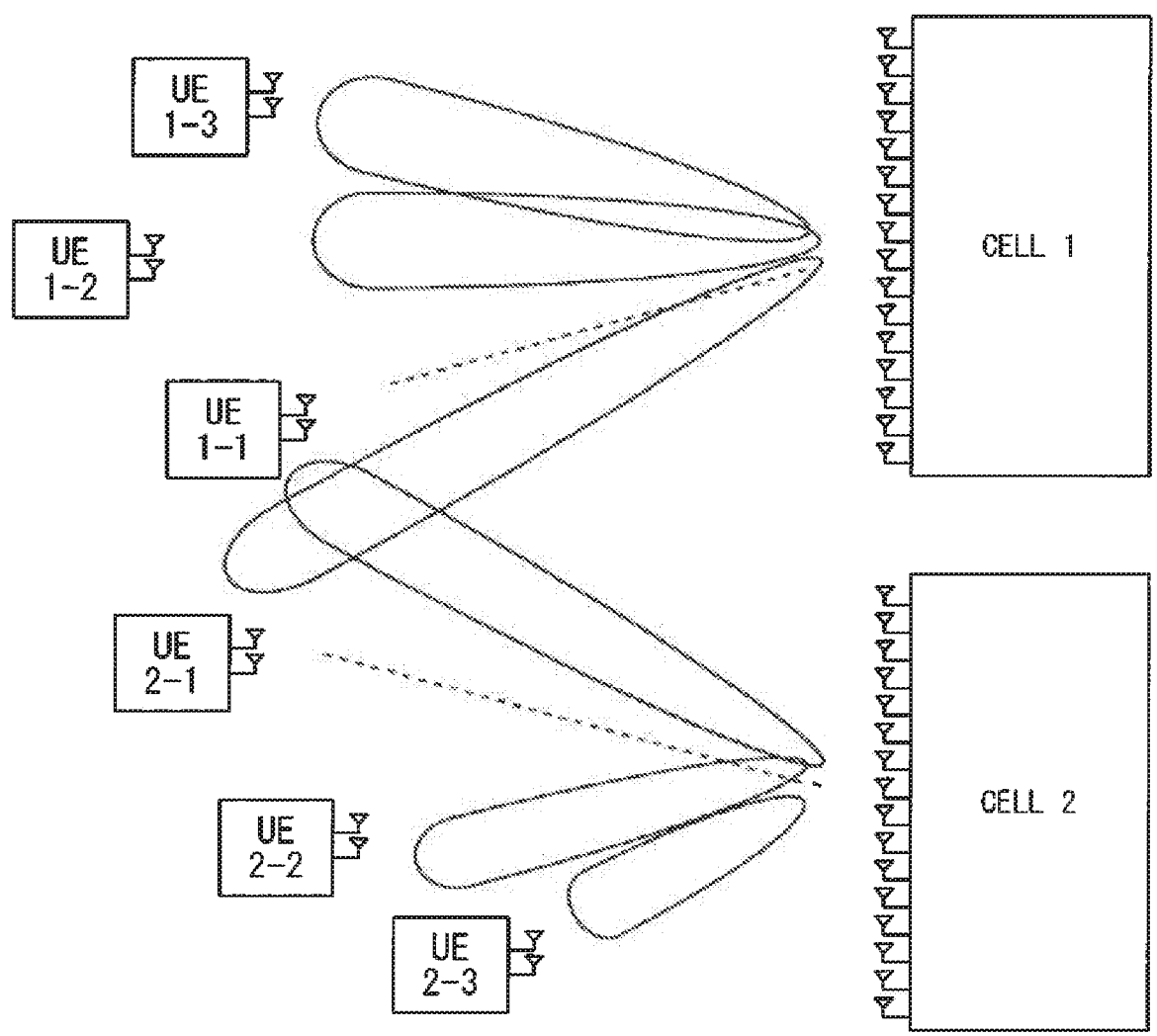
FIG. 48 illustrates an outline of a method for performing the MU-MIMO with the UEs where interference is a problem inclusive for each cell and forming beams from a non-serving cell.

FIG. 48 illustrates an outline of a method for performing the MU-MIMO with the UEs where interference is a problem inclusive for each cell and forming beams from a non-serving cell. FIG. 48 illustrates a method for forming a null from a serving cell and forming beams from a non-serving cell, for the UE where interference is a problem. Here, a UE 1-*n* (n is a natural number) is a UE being served by the cell 1, and a UE 2-*m* (m is a natural number) is a UE being served by the cell 2. In FIG. 48, the UE 1-1 and the UE 2-1 are UEs where interference is a problem. As illustrated in FIG. 48, the non-serving cell directs beams and the serving cell directs a null to the UE 1-1 and the UE 2-1 where interference will be a problem.

In addition to the advantages of the second embodiment, forming beams from the non-serving cell to perform communication enables higher-speed transmission when the communication quality of the UE where interference is a problem with the non-serving cell is superior to that of the UE with the serving cell.

FIGS. 46 and 47 illustrate the sequence when the serving cell directs beams and the non-serving cell directs a null to the UEs. The processes in the sequence illustrated in FIGS. 46 and 47 are identical to processes according to the first modification.

The first modification of the second embodiment differs from the second embodiment in that the beams are directed toward the UEs in the serving cell or toward the UEs in the non-serving cell in the processes of Steps ST2007 to ST2014 of FIG. 47.

The second embodiment discloses the method for directing a null from the non-serving cell to the UE where interference from the non-serving cell is a problem. The first modification of the second embodiment discloses a method for directing a null from the serving cell to the UEs where interference from the serving cell is a problem. In FIG. 48, the UE 1-1 and the UE 2-1 hold true for the first modification of the second embodiment, and the other UEs hold true for the second embodiment. The UEs measure the CSI from the serving cell and the non-serving cell. Application of the measurement results enables formulation of appropriate combinations of from which one of the serving cell and the non-serving cell data is received.

In FIG. 45, the beams are directed toward the UEs in the serving cell, and a null is directed to the UEs where interference from the non-serving cell is a problem. Here, the UE 1-1 and the UE 2-1 are UEs where interference is a problem. When the channel environment varies and it is determined that the characteristics of the UE 1-1 and the UE 2-1 upon receipt of the beams not from its own cell but from another cell are superior, the control for switching to the structure of the first modification of the second embodiment in FIG. 48 is possible. Conversely, the control for switching from FIG. 48 to FIG. 45 is also possible according to the channel environment.

Second Modification of Second Embodiment

The first modification of the second embodiment discloses the method for transmitting data from a non-serving cell to the UEs where interference is a problem. The second modification will disclose another method for transmitting data from the non-serving cell to the UEs where interference is a problem.

The UEs where interference is a problem are made to conduct a handover (HO) so that the non-serving cell transmits data. The serving cell makes the UEs where interference is a problem execute the HO to the non-serving cell. The HO allows the cell 2 to be the serving cell, and the UE 1-1 to receive a signal from the cell 2. Thus, the serving cell can initiate communication by forming beams.

Each of the cells performs the precoding with the UEs being served by the other cells where interference is a problem inclusive. Each of the cells derives precoding weights to form beams when the UEs where interference is a problem are the UEs being served thereby and to form a null when the UEs are not the UEs being served thereby, which allows for data transmission.

The non-serving call transmits data through the MIMO in the procedure described as the following (1) to (3).

(1) Before the HO, the UE 1-*n* is the UE being served by the cell 1, and the UE 2-*m* is the UE being served by the cell 2.

(2) The UE 1-1 and the UE 2-1 are the UEs where interference is a problem. The UE 1-1 is made to conduct the HO from the cell 1 to the cell 2.

(3) The UE 2-1 is made to conduct the HO from the cell 2 to the cell 1.

The procedure of (1) to (3) above enables the non-serving cell to form beams and the serving cell to form a null, for the UEs where interference is a problem.

Figure 49:
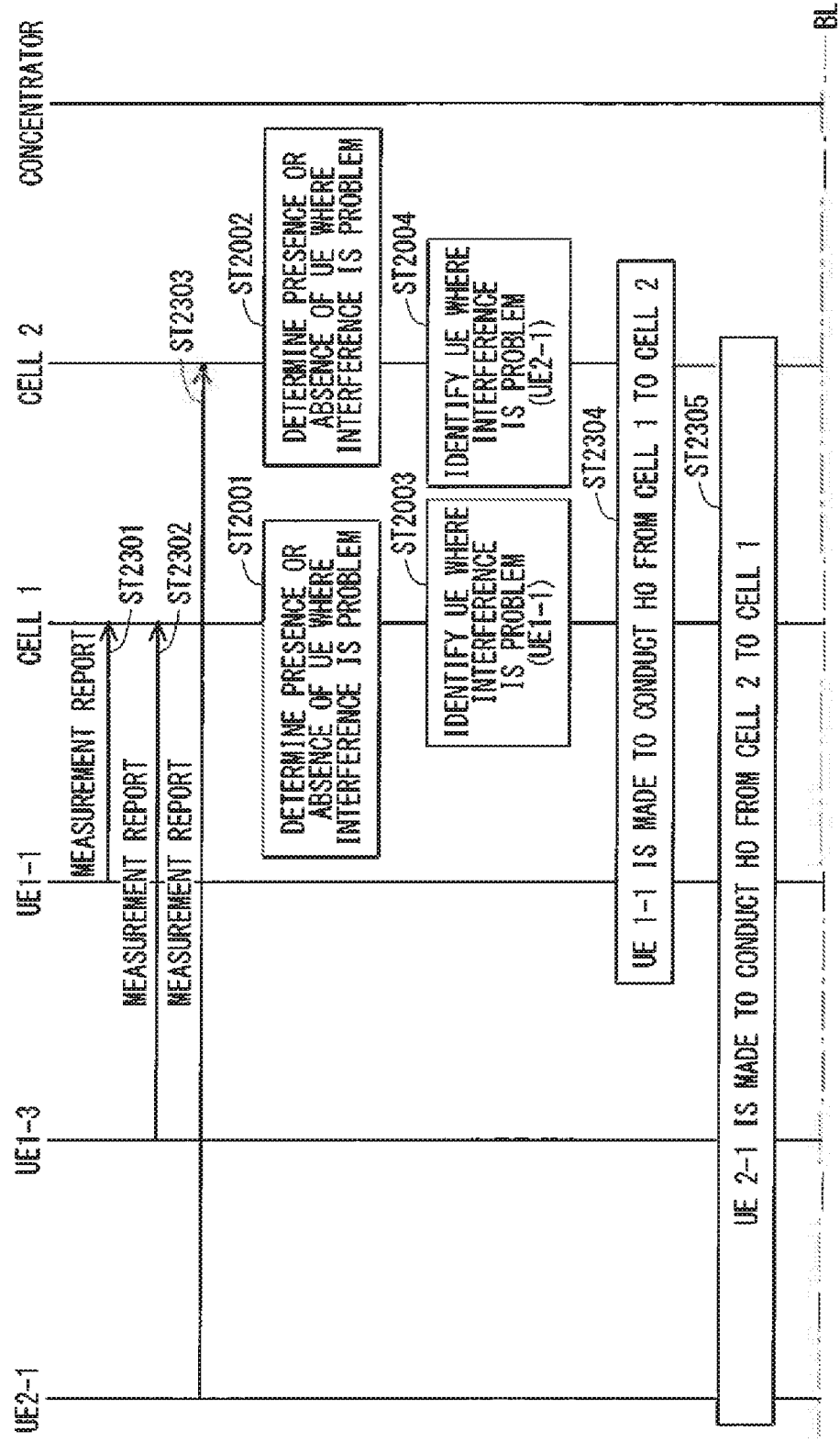
FIG. 49 illustrates an example sequence on a method for performing the MU-MIMO with the UEs where interference is a problem inclusive for each cell and forming beams from the non-serving cell through the HO.
Figure 50:
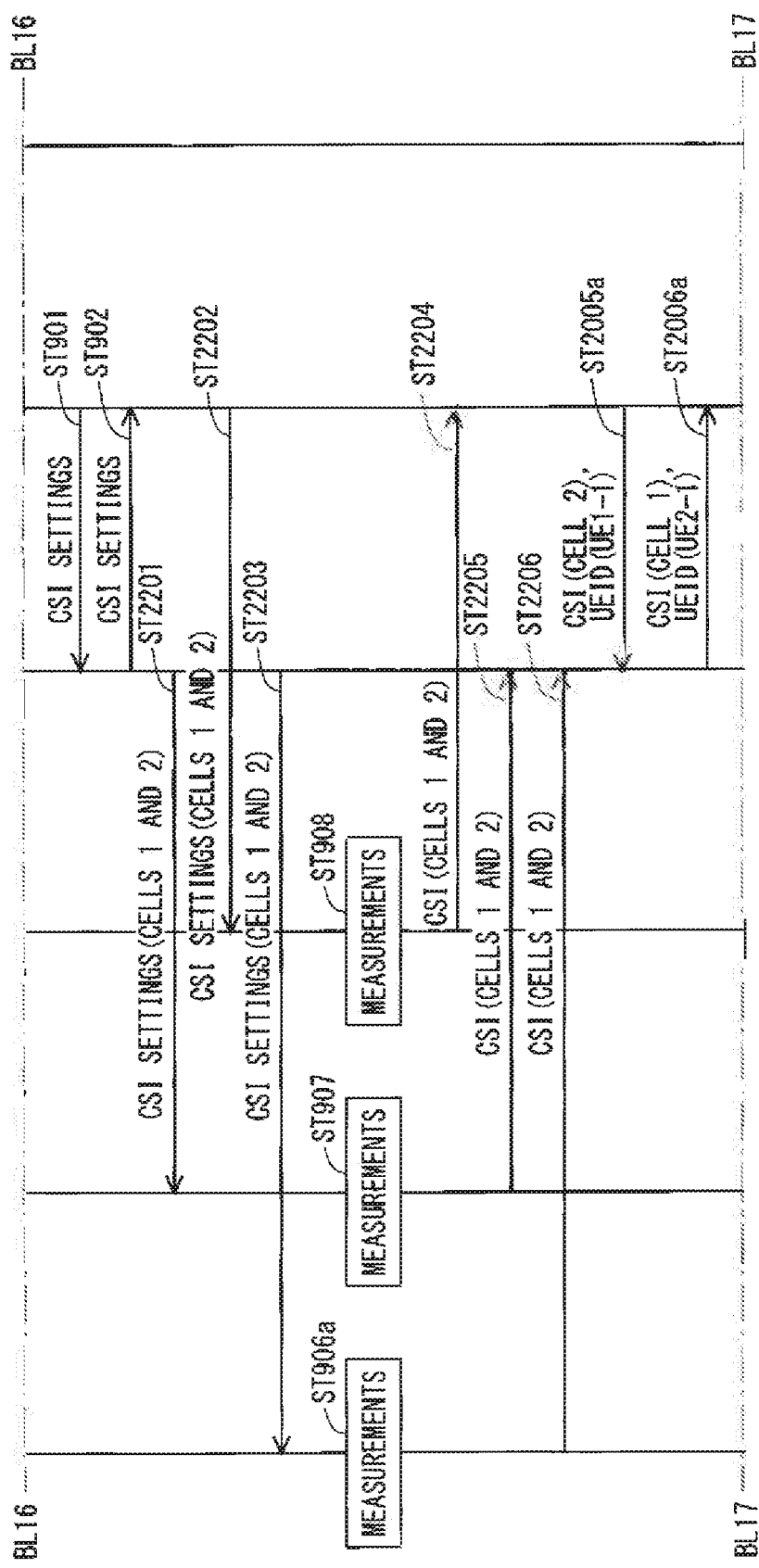
FIG. 50 illustrates the example sequence on the method for performing the MU-MIMO with the UEs where interference is a problem inclusive for each cell and forming beams from the non-serving cell through the HO.

FIGS. 49 to 51 illustrate an example sequence on a method for performing the MU-MIMO with the UEs where interference is a problem inclusive for each cell and forming beams from a non-serving cell through the HO. FIGS. 49 and 50 are connected across a location of a border BL16. FIGS. 50 and 51 are connected across a location of a border BL17. Since the sequence illustrated in FIGS. 49 to 51 includes the same Steps as those in the sequences illustrated in FIGS. 11 and 12, in FIGS. 19 to 21, and in FIGS. 46 and 47, the same step numbers will be assigned to the same Steps and the common description thereof will be omitted. In the sequence illustrated in FIGS. 49 to 51, the UE 1-1 makes measurements and notifies the cell 1 of a measurement report in Step ST2301 before the HO. In Step ST2302, the UE 1-3 makes measurements and notifies the cell 1 of a measurement report. In Step ST2303, the UE 2-1 makes measurements and notifies the cell 2 of a measurement report.

The process in Step ST2304 is performed after the cell 1 identifies the UE 1-1 as the UE where interference is a problem and the cell 2 identifies the UE 2-1 as the UE where interference is a problem.

In Step ST2304, the UE 1-1 is made to conduct the HO from the cell 1 to the cell 2. Next in Step ST2305, the UE 2-1 is made to conduct the HO from the cell 2 to the cell 1.

Since the UE belonging to the serving cell moves to the non-serving cell through the HO, the non-serving cell before the HO can direct beams.

In Step ST2201 of FIG. 50, the cell 1 notifies the UE 1-3 being served thereby of the CSI settings of its own cell and the CSI settings of the cell 2.

In Step ST2202, the cell 2 notifies the UE 1-1 being served thereby of the CSI settings of its own cell and the CSI settings of the cell 1.

In Step ST2203, the cell 1 notifies the UE 2-1 of the CSI settings of its own cell and the CSI settings of the cell 2.

In Step ST2204, the UE 1-1 notifies the cell 2 of the results of the measured channel information of the cells 1 and 2.

In Step ST2205, the UE 1-3 notifies the cell 1 of the results of the measured channel information of the cells 1 and 2.

In Step ST2206, the UE 2-1 notifies the cell 1 of the results of the measured channel information of the cells 1 and 2.

In Step ST2005a, the cell 2 notifies the cell 1 that interferes with the UE 1-1 where interference is a problem of the UE identifier of the UE 1-1 where interference is a problem (UEID (UE 1-1)), and the result of the measured channel information of the cell 2 that has been obtained from the UE (CSI (cell 2)).

In Step ST2006a, the cell 1 notifies the cell 2 that interferes with the UE 2-1 where interference is a problem of the UE identifier of the UE 2-1 where interference is a problem (UEID (UE 2-1)), and the result of the measured channel information of the cell 1 that has been obtained from the UE (CSI (cell 1)).

Next, processes in Steps ST2007 and ST2008 of FIG. 51 will be performed.

Next in Step ST2009a, the cell 1 notifies the cell 2 that interferes with the UE 2-1 where interference is a problem of the UE identifier of the UE 2-1 where interference is a problem (UEID (UE 2-1)), and the scheduling information of the UE.

In Step ST2010a, the cell 2 notifies the cell 1 that interferes with the UE 1-1 where interface is a problem of the UE identifier of the UE 1-1 where interference is a problem (UEID (UE 1-1)), and the scheduling information of the UE.

Next, processes in Steps ST2011 to ST2014 and Steps ST925 and ST926 will be performed.

In Step ST927a, the cell 2 performs the MU-MIMO transmission to the UE 2-1 according to the scheduling in Step ST2008 and the MIMO settings made in Step ST2014.

Next, processes in Steps ST928 and ST929 will be performed. Then in Step ST930a, the cell 1 performs the MU-MIMO transmission to the UE 2-1 according to the scheduling in Step ST2007 and the MIMO settings made in Step ST2013. Consequently, the processes in Steps ST925, ST926, ST927a, ST928, ST929, and ST930a enable the beams to be directed in the MIMO.

Figure 53:
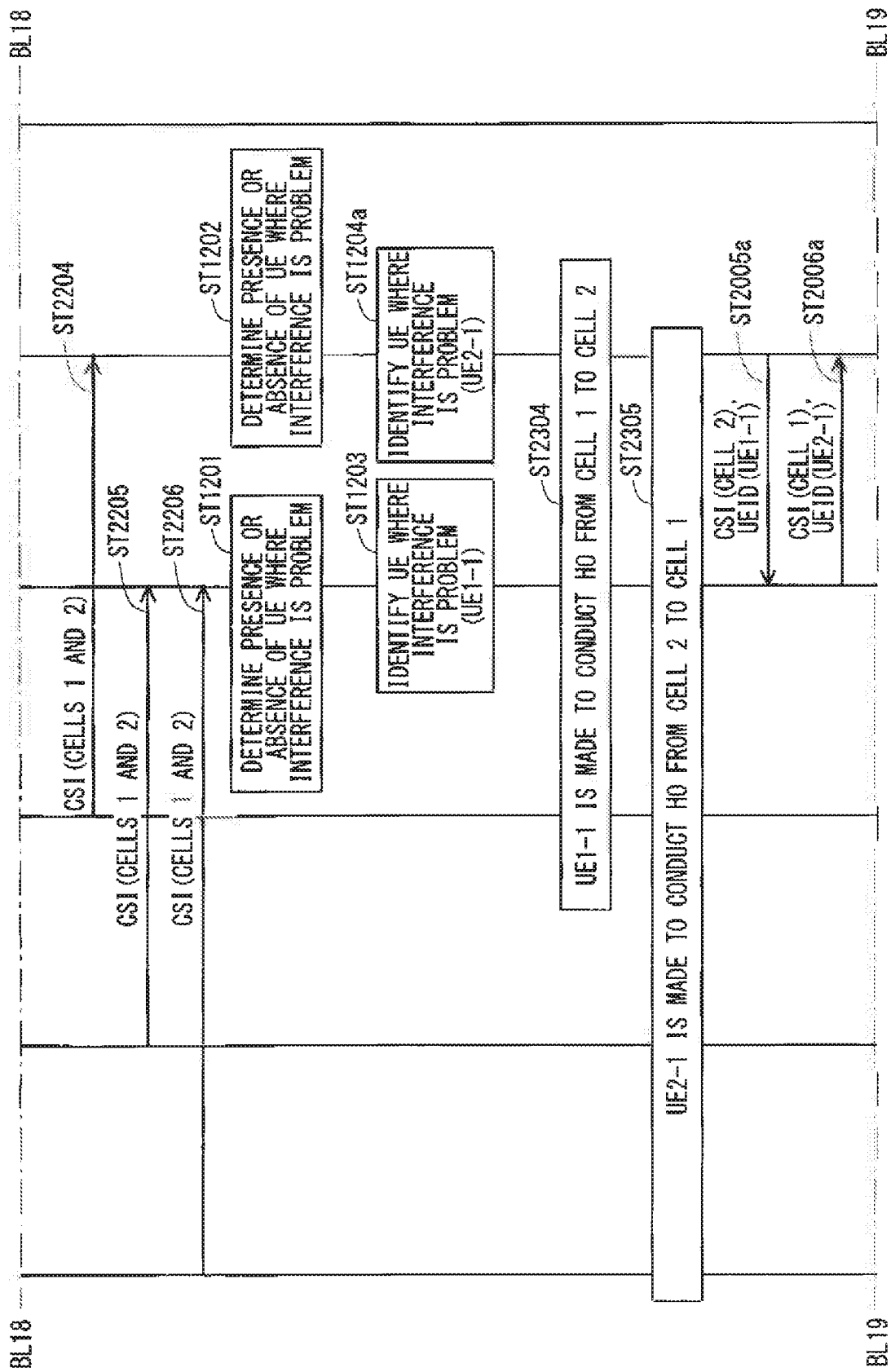
FIG. 53 illustrates the other example sequence on the method for performing the MU-MIMO with the UEs where interference is a problem inclusive for each cell and forming beams from the non-serving cell through the HO.
Figure 54:
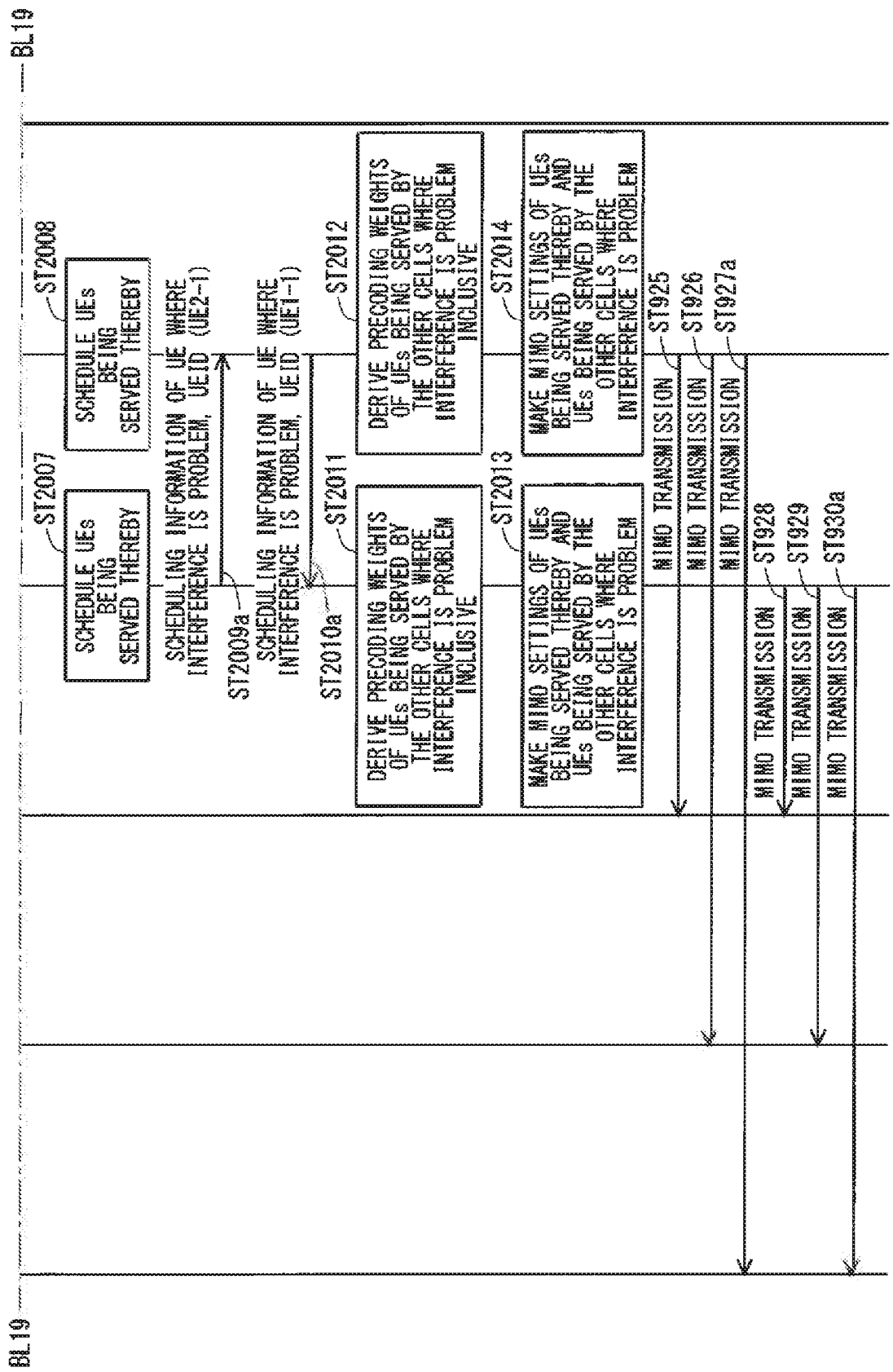
FIG. 54 illustrates the other example sequence on the method for performing the MU-MIMO with the UEs where interference is a problem inclusive for each cell and forming beams from the non-serving cell through the HO.

FIGS. 52 to 54 illustrate another example sequence on a method for performing the MU-MIMO with the UEs where interference is a problem inclusive for each cell and forming beams from a non-serving cell through the HO. FIGS. 52 and 53 are connected across a location of a border BL18. FIGS. 53 and 54 are connected across a location of a border BL19. Since the sequence illustrated in FIGS. 52 to 54 includes the same Steps as those in the sequence illustrated in FIGS. 11 and 12, the same step numbers will be assigned to the same Steps and the common description thereof will be omitted.

In Step ST2301 and Step ST2302, the UE 1-1 and the UE 1-3, respectively, make measurements and notify the cell 1 of measurement reports. In Step ST2303, the UE 2-1 makes measurements and notifies the cell 2 of a measurement report.

Through the measurements, surrounding cells are measured to generate a list of neighboring cells that can conduct the HO. The sequence illustrated in FIGS. 52 to 54 will be described on the assumption that the cell list would include the call 2.

After the UEs issue the measurement reports, the CSI settings are made in Steps ST901 to ST2206 as according to the first embodiment.

Next in Steps ST1201, ST1202, ST1203, and ST1204a, each of the cells identifies the UE where interference is a problem. Here, when the UE where interference is a problem can be made to conduct the HO to a non-serving cell, that is, when the non-serving cell is included in the list of neighboring cells, the UE is made to conduct the HO from the serving cell to the non-serving cell in Steps ST2304 and ST2305.

Next, processes in Steps ST2005a and ST2006a of FIG. 53 will be performed.

Then, processes in Steps ST2007, ST2008, ST2009a, ST2010a, ST2011 to ST2014, and Steps ST925, ST926, ST927a, ST928, ST929, and ST930a in FIG. 54 will be performed.

Consequently, the processes in Steps ST925, ST926, ST927a, ST928, ST929, and ST930a enable the beams to be directed in the MIMO.

Since the timing at which the communication terminals measure the CSI is close to the timing of the reports to the cell in the example sequence in FIGS. 49 to 51, the channel information with higher precision can be obtained as the channel information for performing the MIMO than that in the example sequence in FIGS. 52 to 54.

Since the timing at which the communication terminals make measurements is close to the timing at which the communication terminals measure the CSI in the example sequence in FIGS. 52 to 54, the terminal where interference is a problem can be determined with higher precision than that in the example sequence in FIGS. 49 to 51.

When the moving speed of the communication terminal is faster, the sequence can be switched to use the example sequence in FIGS. 49 to 51 to obtain the channel information with higher precision.

Although the CSI settings are notified to the UEs in the second modification, the CSI settings may be limited to those of the interfering cell. In other words, the cell to be measured by the UE can be limited to the interfering cell.

Here, whether the HO should be conducted may be determined at a measurement level included in the measurement report to be reported from the UE. Alternatively, the determination may be made by the RSRP or the RSRQ. Alternatively, the determination may be made by the SINR.

Since the data connection is disconnected once by the HO, the threshold may be set in consideration of a possible overhead. When it is determined not to conduct the HO, a method for forming beams from the serving cell and forming a null from the non-serving cell may be selected.

When the HO is selected and the UEs where interference is a problem are the UEs being served by each cell, the cell forms beams and transmits data in the MIMO. With the HO, the non-serving cell can direct beams toward the UEs where interference is a problem and transmit data. The serving cell can direct a null to the UEs.

Thus, the same operations as those according to the first modification of the second embodiment can be performed.

Third Modification of Second Embodiment

The first modification of the second embodiment discloses the method for forming beams from a non-serving cell for the UE where interference is a problem. The first modification of the second embodiment discloses the method for transmitting data from the non-serving cell to the UE where interference is a problem. As an alternative method, the second modification of the second embodiment discloses the method for transmitting data after the UE where interference is a problem is made to conduct the HO to the non-serving cell to transmit the data from the non-serving cell to the UE where interference is a problem.

The third modification will disclose another method for transmitting data from the non-serving cell to the UE where interference is a problem.

The UE where interference is a problem is connected to two cells. The UE where interference is a problem may be connected to two or more cells, not limited to two cells. This is effective when the UE receives interference from two or more cells. Connecting the UE where interference is a problem to two cells enables two interfering non-serving cells or more to transmit data to the UE where interference is a problem.

When the UE where interference is a problem is connected to at least two cells, the dual connectivity (abbreviated as DC, see Non-Patent Document 1) may be applied.

The cell sets the DC to the UEs being served thereby where interference is a problem, using a cell that interferes with the UEs. The SeNB set by the DC and configuring the interfering cell performs the MIMO with the UEs inclusive. The SeNB performs the precoding with the UEs inclusive when performing the MIMO.

The MeNB that sets the DC to the UEs being served thereby where interference is a problem performs the MIMO with the UEs inclusive. The MeNB performs the precoding with the UEs inclusive when performing the MIMO.

The serving cell configured by the MeNB performs the precoding to form a null for the UEs where interference is a problem. The interfering cell configured by the SeNB performs the precoding to form beams for the UEs where interference is a problem.

The serving cell configured by the MeNB does not transmit data to the UEs where interference is a problem. The interfering cell configured by the SeNB transmits data to the UEs where interference is a problem.

Consequently, the non-serving cell can transmit data to the UEs where interference is a problem.

Figure 55:
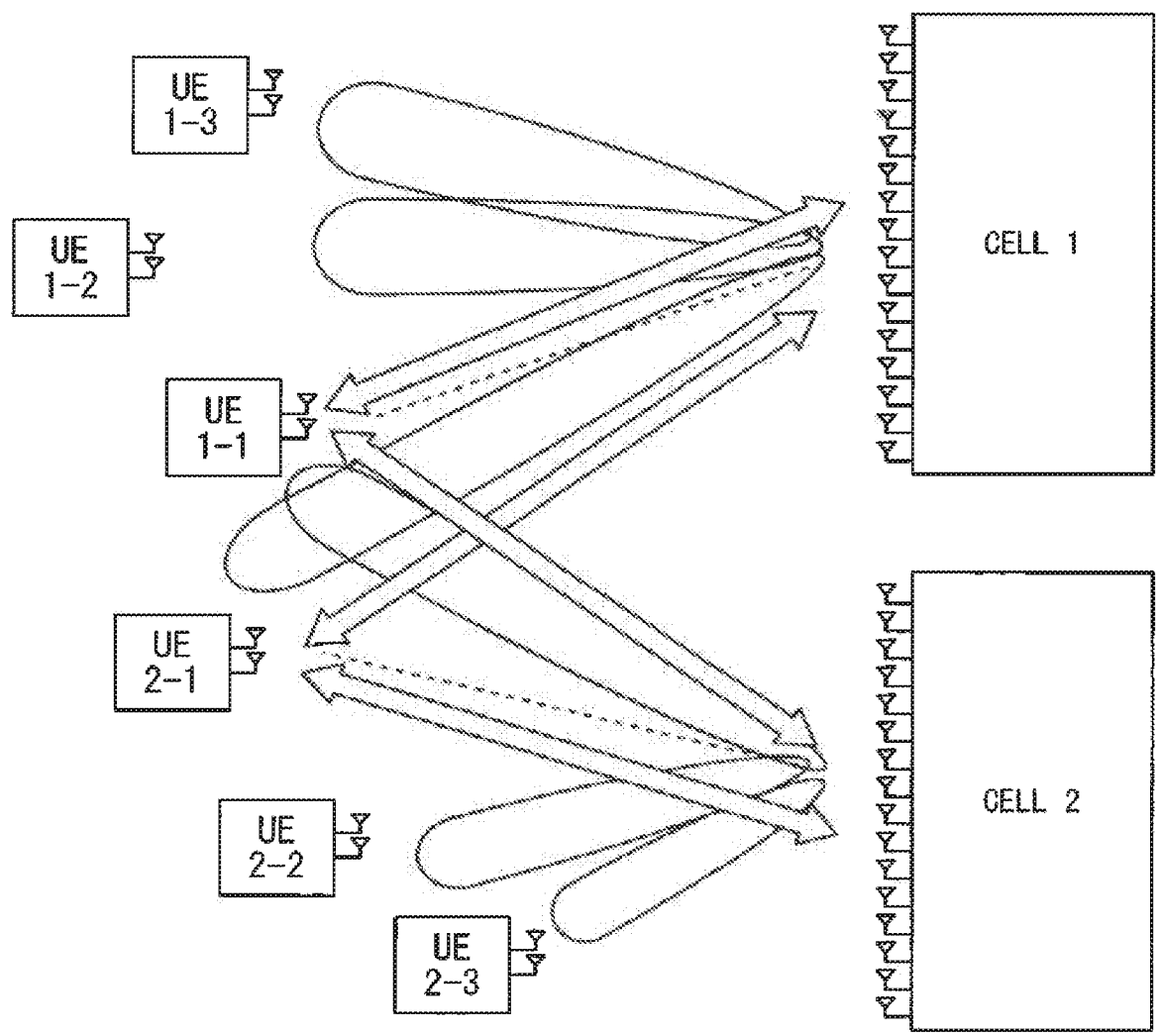
FIG. 55 is a conceptual diagram illustrating a method for performing the MU-MIMO with the UEs being served by the other cells where interference from its own cell is a problem inclusive.

FIG. 55 is a conceptual diagram illustrating a method for performing the MU-MIMO with the UEs being served by the other cells where interference from its own cell is a problem inclusive. FIG. 55 illustrates the adoption of two cells of the cells 1 and 2. A UE 1-*n* (n is a natural number) is a UE being served by the cell 1, and a UE 2-*m* (m is a natural number) is a UE being served by the cell 2. The UE 1-1 is a UE where interference from the cell 2 is a problem. The UE 2-1 is a UE where interference from the cell 1 is a problem. Since FIG. 55 is similar to FIG. 48, the differences will be mainly described.

The cell 1 sets the DC to the UE 1-1 that is the UE being served by the cell 1 where interference from the non-serving cell is a problem, using the cell 2. The cell 1 that is the serving cell sets the DC to the UE 1-1, using the cell 2 that is the interfering cell. The UE 1-1 to which the DC is set is connected to both the cells 1 and 2.

The cell 2 sets the DC to the UE 2-1 that is a UE being served by the cell 2 where interference from the non-serving cell is a problem, using the cell 1. The cell 2 that is the serving cell sets the DC to the UE 2-1, using the cell 1 that is the interfering cell. The UE 2-1 to which the DC is set is connected to both the cells 2 and 1.

The cell 1 performs the MIMO with the UE being served by the cell 2 where interference from its own cell is a problem, that is, with the UE 2-1. The precoding is performed with the UE 1-1, the UE 1-2, the UE 1-3, and the UE 2-1 on a plurality of layers using the cell 1 to form beams. Different streams are transmitted for each of the layers. In the MU-MIMO, the same f-t resources may be allocated to the UEs. Since the precoding maintains the orthogonality between the beams formed on each of the layers, each of the UEs can receive the transmitted streams. A plurality of layers may be allocated to one UE.

The cell 1 performs the precoding to form beams for the UE 1-2 and the UE 1-3 that are the UEs being served by the cell 1 and the UE 2-1 that is the UE being served by another cell. The cell 1 performs the precoding to form a null for the UE 1-1 that is the UE being served by the cell 1 where interference from another cell is a problem.

The UE 2-1 to which the cell 2 sets the DC using the cell 1 is connected to both the cells 1 and 2. Thus, the cell 1 can transmit data to the UE 2-1 for which beams have been formed.

Since the UE 1-1 that is the UE being served by the cell 1 is the UE where interference from its own cell is a problem, the interference with the UE can be reduced by forming a null for the UE.

The cell 2 performs the precoding to form beams for the UE 2-2 and the UE 2-3 that are the UEs being served by the cell 2 and the UE 1-1 that is the UE being served by another cell. The cell 2 performs the precoding to form a null for the UE 2-1 that is the UE being served by the cell 2 where interference from another cell is a problem.

The UE 1-1 to which the cell 1 sets the DC using the cell 2 is connected to both the cells 1 and 2. Thus, the cell 2 can transmit data to the UE 1-1 for which beams have been formed.

Since the UE 2-1 that is the UE being served by the cell 2 is the UE where interference from its own cell is a problem, the interference with the UE can be reduced by forming a null for the UE.

Performing the DC on the UEs being served by a cell where interference from another cell is a problem using the other interfering cell enables the interfering cell to transmit data to the UE for which beams have been formed.

Figure 56:
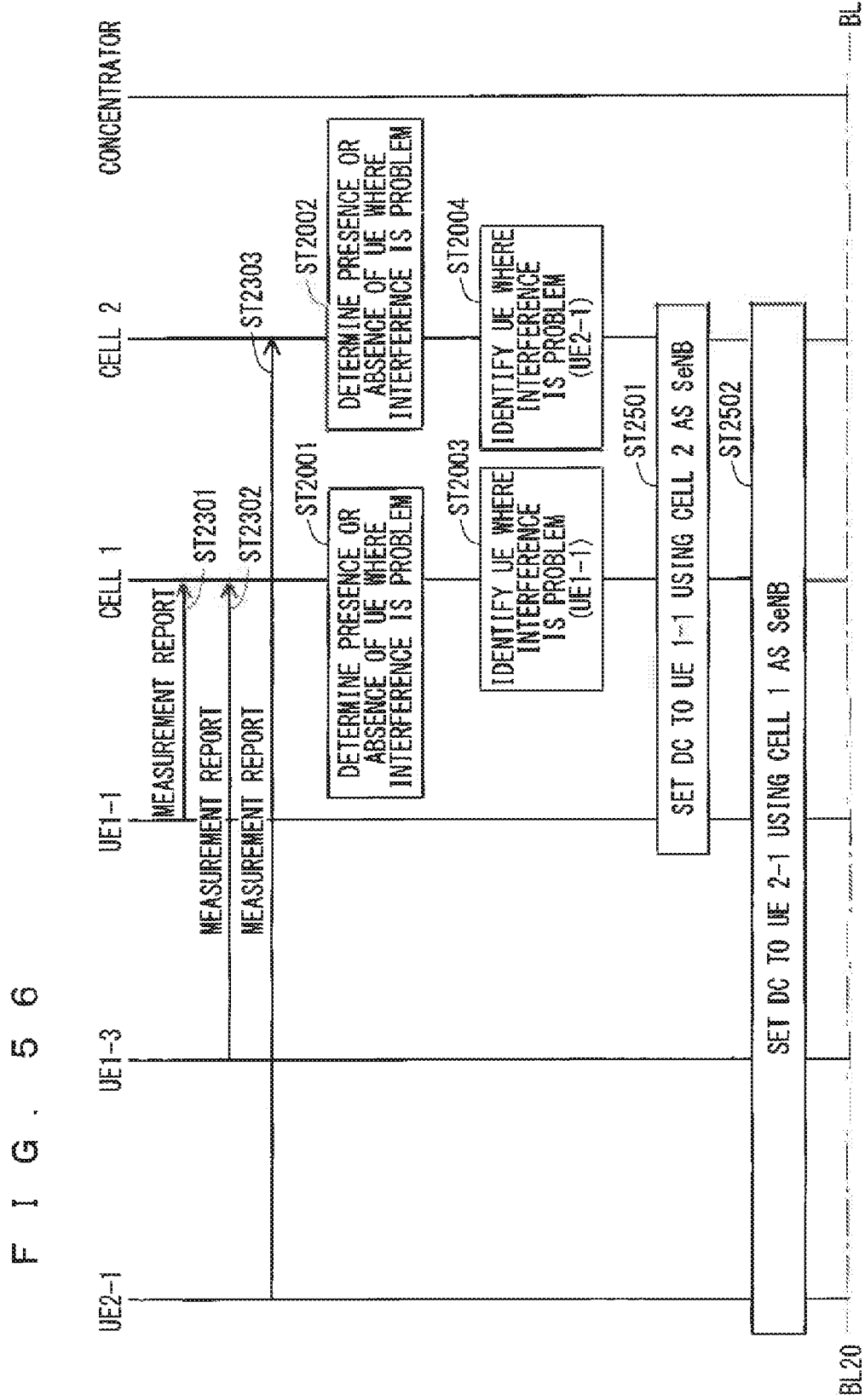
FIG. 56 illustrates an example sequence on a method for performing the MU-MIMO with the UEs being served by the other cells where interference from its own cell is a problem inclusive.
Figure 57:
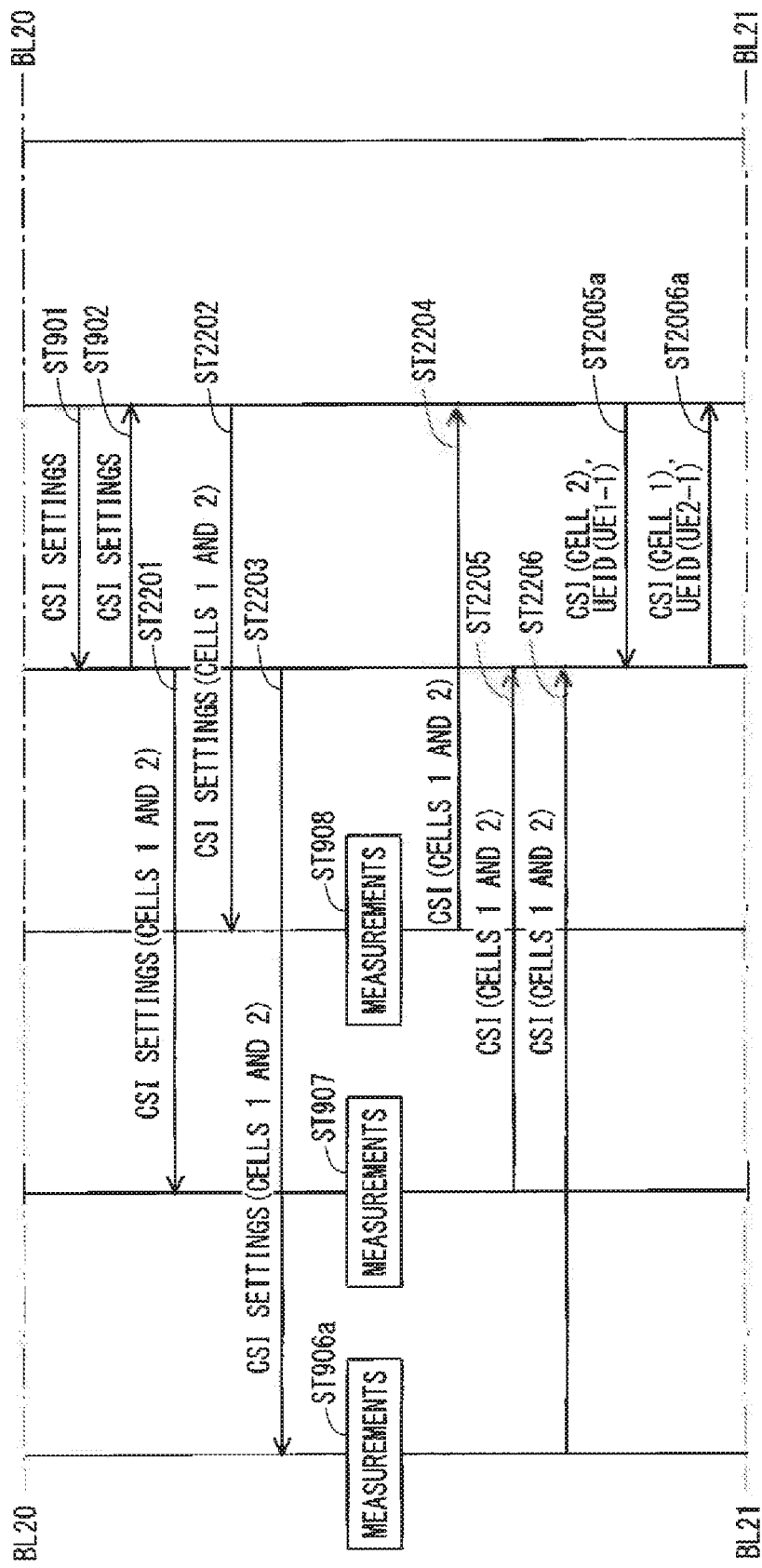
FIG. 57 illustrates the example sequence on the method for performing the MU-MIMO with the UEs being served by the other cells where interference from its own cell is a problem inclusive.
Figure 58:
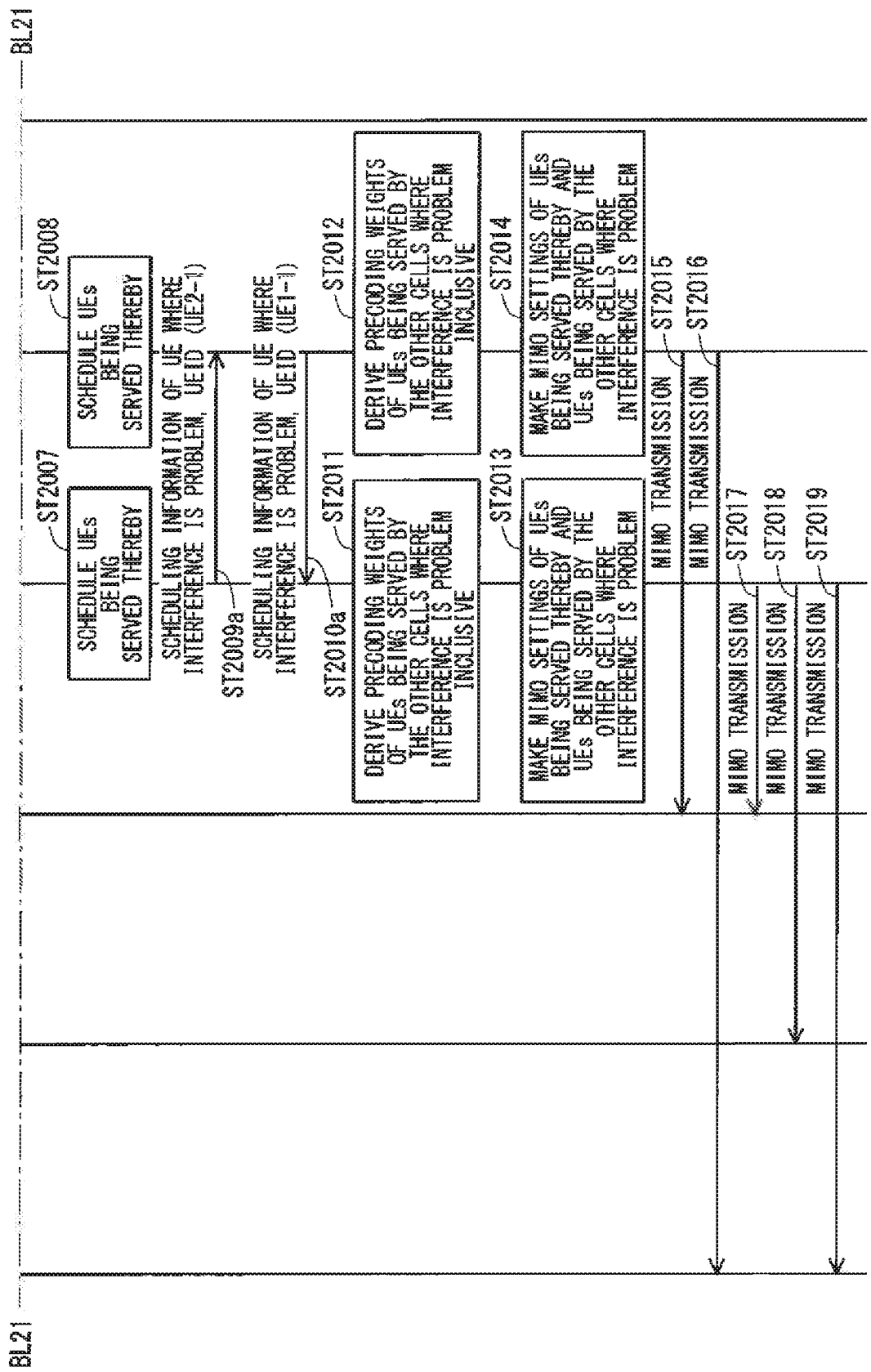
FIG. 58 illustrates the example sequence on the method for performing the MU-MIMO with the UEs being served by the other cells where interference from its own cell is a problem inclusive.

FIGS. 56 to 58 illustrate an example sequence on a method for performing the MU-MIMO with the UEs being served by the other cells where interference from its own cell is a problem inclusive. FIGS. 56 and 57 are connected across a location of a border BL20. FIGS. 57 and 58 are connected across a location of a border BL21. FIGS. 56 to 58 illustrate application of the DC.

Since the sequence illustrated in FIGS. 56 to 58 includes the same Steps as those in the sequences illustrated in FIGS. 11 and 12, in FIGS. 46 and 47, in FIGS. 49 to 51, and in FIGS. 52 to 54, the same step numbers will be assigned to the same Steps and the common description thereof will be omitted.

In Step ST2501, the cell 1 sets the DC to the UE 1-1 where interference is a problem, using the interfering cell 2. With the DC, the eNB configuring the cell 1 is set to the MeNB, and the eNB configuring the cell 2 is set to the SeNB.

In Step ST2502, the cell 2 sets the DC to the UE 2-1 where interference is a problem, using the interfering cell 1. With the DC, the eNB configuring the cell 2 is set to the MeNB, and the eNB configuring the cell 1 is set to the SeNB.

The DC is performed in the third modification, unlike the process of making the UE where interference is a problem conduct the HO to the interfering cell in Steps ST2304 and ST2305 of FIGS. 52 to 54. Consequently, the cell that interferes with the UEs being served by the other cells can transmit data to the UEs for which beams have been formed.

With application of the method disclosed in the third modification, the non-serving cell can transmit data to the UE where interference is a problem.

Although the third modification discloses application of the DC to connect the UE where interference is a problem to at least two cells, another method may be used. For example, a method such as the RRC diversity (see Non-Patent Document 9), etc. may be used. The multi-connectivity that is being studied in 3GGP (see Non-Patent Document 10) may be used.

As such, connecting one or more non-serving cells that interfere with the UE where, interference is a problem to the UE enables the one or more interfering cells to transmit data.

The one or more cells connected to the UE where interference is a problem may be serving cells of the UE.

The DC eliminates the need for performing the HO process on the UE where interference is a problem.

In the HO process, transmission of data between the UE and a HO-source cell is stopped, synchronization between the UE and a HO-target cell is established, and data is transmitted from the HO-target cell to the UE Thus, data is transmitted between the UE and only one cell. On the other hand, the dual connectivity is a method for transmitting data in synchronization with at least two cells.

Thus, application of the DC can eliminate influence of, for example, the latency in transmission of data and loss of the data that are caused by failure in transmitting the data, such as a HO failure during the HO process, and the latency caused by reconnection due to the HO failure.

Precoding may be performed to form beams from the serving cell for the UE where interference is a problem and form a null from the non-serving cell for the UE where interference is a problem. In other words, each cell may perform precoding to form beams for the UEs being served thereby where interference is a problem, and to form a null for the UEs not being served thereby.

The second embodiment discloses the method for transmitting data from the serving cell to the UE where interference is a problem, without transmitting data from the non-serving cell.

Application of the method for connecting at least two cells to the UE where interference is a problem, for example, the DC enables such transmission of data.

The method for forming beams from the serving cell for the UE where interference is a problem as disclosed in the second embodiment and the method for forming beams from the non-serving cell for the UE where interference is a problem as disclosed in the first modification of the second embodiment may be switched to be executed.

The methods may be switchable per time unit of performing the MIMO. Alternatively, the methods may be switchable per TTI, per subframe, or per slot. Alternatively, the methods may be switchable per symbol.

Making the methods to be switchable per TTI, per subframe, or per slot enables the methods to be switched per time unit of the f-t resources to which data is mapped. Thus, the cell from which data is transmitted in the MIMO can be changed per data. Consequently, the scheduling by the cell is facilitated.

Making the methods to be switchable per symbol enables, for example, switching between forming beams for a control channel or a control signal and forming beams for a data channel. The control channel or the control signal can be transmitted in the MIMO by forming beams from a serving cell, and data can be transmitted in the MIMO by forming beams from a non-serving cell. The cell that transmits the control channel or the control signal and the cell that transmits data are switchable.

As an alternative example, the methods may be switched between forming beams for a shared channel or a shared signal and forming beams for a dedicated channel or a dedicated signal. The shared channel or the shared signal can be transmitted in the MIMO by forming beams from a serving cell, and the dedicated channel or the dedicated signal can be transmitted in the MIMO by forming beams from a non-serving cell. The cell that transmits the control channel or the control signal and the cell that transmits data are switchable.

Making the methods to be switchable per symbol enables changing of a cell that forms beams appropriately according to a channel or a signal to perform the MIMO transmission. This enables flexible system operations.

The concentrator or the OAM may make the switching settings. When the concentrator makes the switching settings, the concentrator notifies the cells being served thereby of the switching setting information of each of the cells. When the OAM makes the switching settings, the OAM notifies the cells being served thereby of the switching setting information of each of the cells.

The switching setting information may include information indicating how the cell forms beams for the UE where interference is a problem. For example, the information may indicate whether the precoding is performed to form beams for the UEs being served thereby where interference is a problem or form a null for the UEs being served thereby where interference is a problem.

As an alternative method, the serving cell may make the switching settings. The eNB configuring the serving cell may make the switching settings. In the DC, the eNB is the MeNB. This is because the eNB configuring the serving cell before performing the DC is the MeNB. The serving cell may notify the cell that interferes with the UEs being served thereby where interference is a problem of the switching setting information. The switching setting information may be notified to the eNB configuring the interfering cell. In the DC, the eNB configuring the interfering cell is the SeNB.

The cell may request the other cells to make the switching settings. In response to the request, the cells may make the switching settings. The switching setting information may be notified to the cell that has requested the switching settings. The cell that interferes with the UE where interference is a problem may request the serving cell of the UE to make the switching settings. For example in the DC, the SeNB configuring the cell that interferes with the UE where interference is a problem may request the MeNB configuring the serving cell of the UE to make the switching settings.

Consequently, the switching settings can be requested according to a state of the cell that interferes with the UE where interference is a problem, which can reflect the state of the interfering cell on the switching settings.

The notification between the cells may be made via the X2 interface. The notification in the DC may be made via an X2-U interface. Alternatively, the notification may be made through a core network node, for example, an MME. Alternatively, the notification may be made via the S1 interface. Alternatively, the notification may be included in an existing message of the X2 interface or the S1 interface to be notified. The method disclosed as the method for notifying the CSI settings according to the first embodiment may be applied. Thus, the same advantages as those according to the first embodiment can be produced.

When the serving cell makes the switching settings, the concentrator or the OAM may notify the serving cell of an indicator for determining the switching settings. The indicator for determining the switching settings may be a threshold for a magnitude of interference from the interfering cell. When the threshold for the magnitude of interference exceeds a predetermined value, the non-saving cell may form beams and transmit data. When the threshold for the magnitude of interference is lower than or equal to the predetermined value, the serving cell may form beams and transmit data.

The threshold for the magnitude of interference for determining the switching settings may be different from the aforementioned magnitude of interference for determining the UE where interference is a problem. For example, the threshold for the magnitude of interference for determining the switching settings may be larger than a threshold for a magnitude of interference for determining the UE where interference is a problem.

It is possible to set which method for forming beams is applied when there are the UEs where interference is a problem.

The switching setting information may include synchronization information. The synchronization information may be information for synchronizing between the cells on which timing the settings are applied. Examples of the synchronization information include a system frame number (SFN), a radio frame number, a subframe number, a slot number, etc. Notifying such information to each cell can synchronize the switching.

The cell may notify the UEs being served thereby of the switching setting information. The switching setting information may be notified only to the UE whether interference is a problem. The switching setting information may be included in the broadcast information to be broadcast, or included in dedicated information to be notified via dedicated signaling. The RRC signaling or the MAC signaling may be used. Alternatively, an L1/L2 signal may be used.

The recognition of the switching settings by the UE can lead to recognition of the cell that forms beams. The cell from which data is transmitted can be recognized. Alternatively, the cell from which a control channel is transmitted can be recognized. Thus, the UE can recognize with an identifier of which cell or with the RNTI allocated from which cell the UE receives the data and the control channel.

Fourth Modification of Second Embodiment

The third modification of the second embodiment discloses the method for connecting the UE where interference is a problem to two cells as a method for making a non-serving cell transmit data to the UE where interference is a problem. The fourth modification will disclose another method for connecting the UE where interference is a problem to two cells to execute the MU-MIMO with the UE where interference is a problem inclusive for each cell.

The UE where interference is a problem is connected to two or more cells, so that the UE notifies each of the cells of the result of the measured channel information of the cells.

Although the UE notifies the serving cell of the result of the measured channel information of each of the cells according to the method disclosed in the third modification of the second embodiment, the UE notifies each of the cells of the result of the measured channel information of the cells in the fourth modification.

Figure 59:
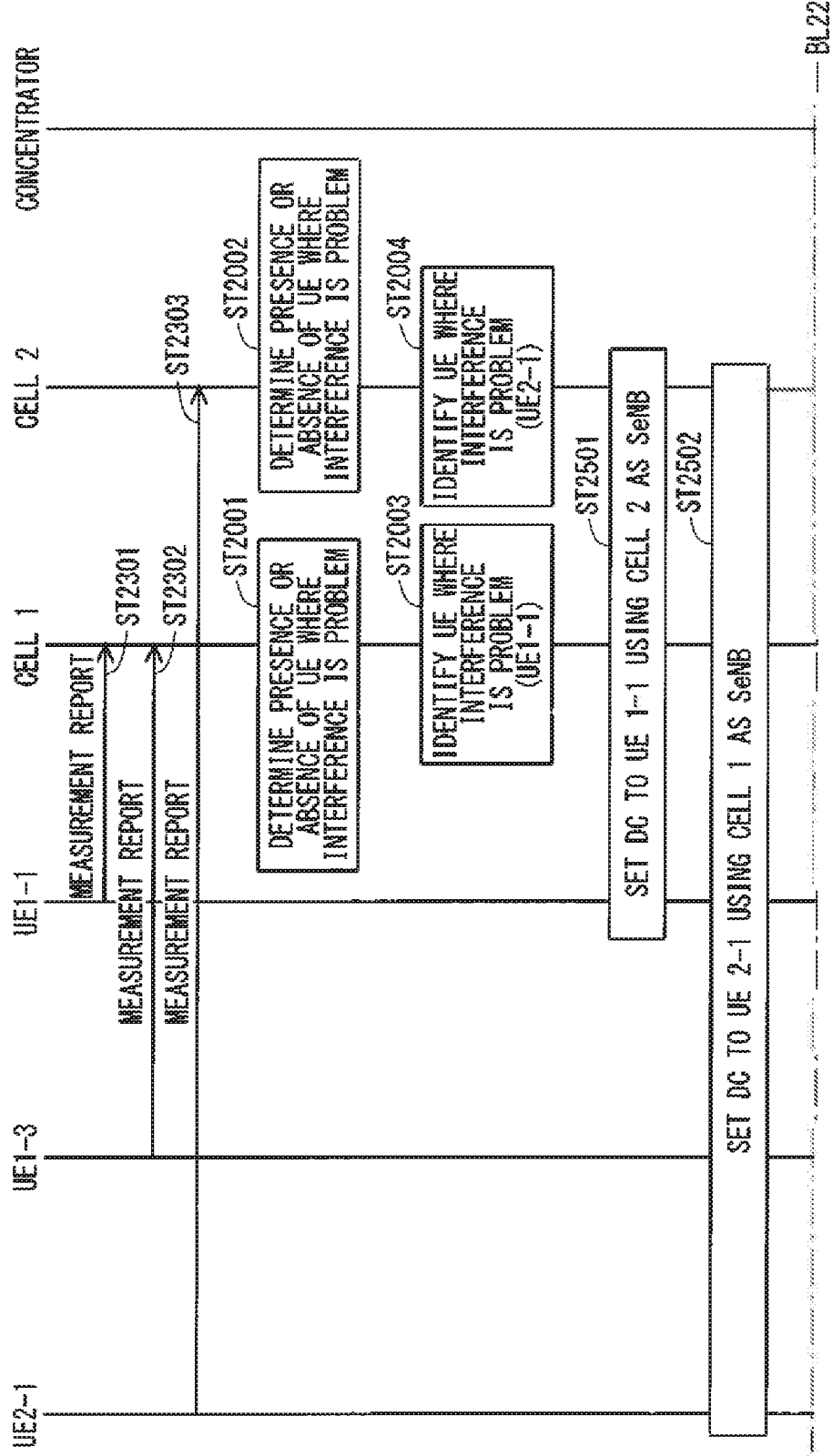
FIG. 59 illustrates another example sequence on the method for performing the MU-MIMO with the UEs being served by the other cells where interference from its own cell is a problem inclusive.
Figure 60:
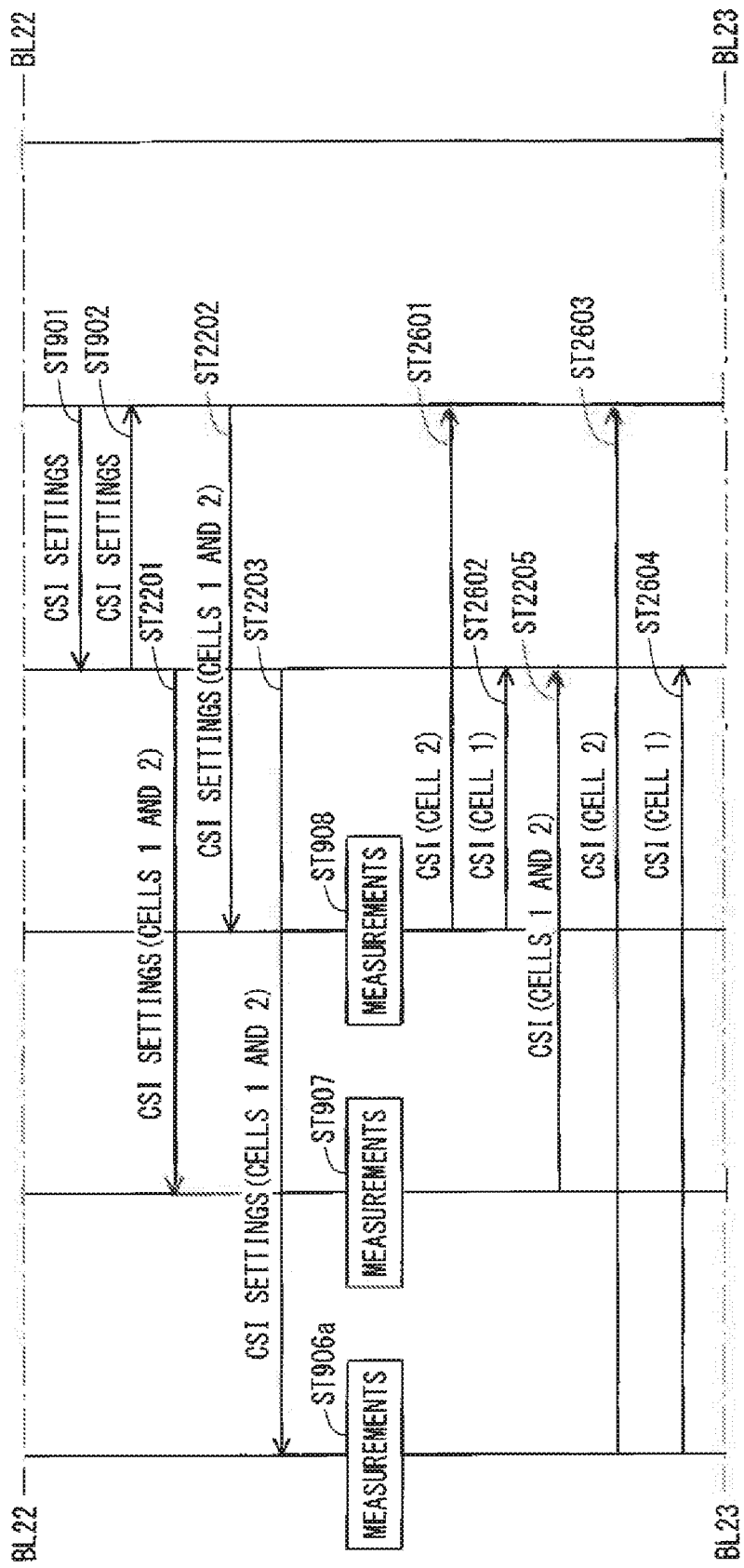
FIG. 60 illustrates the other example sequence on the method for performing the MU-MIMO with the UEs being served by the other cells where interference from its own cell is a problem inclusive.

FIGS. 59 to 61 illustrate another example sequence on a method for performing the MU-MIMO with the UEs being served by the other cells where interference from its own cell is a problem inclusive. FIGS. 59 and 60 are connected across a location of a border BL22. FIGS. 60 and 61 are connected across a location of a border BL23.

FIGS. 59 to 61 illustrate application of the DC. FIGS. 59 to 61 also illustrate a method in which the UEs where interference is a problem notify each cell of the results of the measured channel information of the cells.

Since the sequence illustrated in FIGS. 59 to 61 includes the same Steps as those in the sequences illustrated in FIGS. 11 and 12, in FIGS. 46 and 47, in FIGS. 49 to 51, and in FIGS. 52 to 54, the same step numbers will be assigned to the same Steps and the common description thereof will be omitted.

In Step ST2601, the UE 1-1 where interference is a problem notifies the cell 2 of the result of the measured channel information of the cell 2.

In Step ST2602, the UE 1-1 where interference is a problem notifies the cell 1 of the result of the measured channel information of the cell 1.

In Step ST2603, the UE 2-1 where interference is a problem notifies the cell 2 of the result of the measured channel information of the cell 2.

In Step ST2604, the UE 2-1 where interference is a problem notifies the cell 1 of the result of the measured channel information of the cell 1.

In Steps ST2005*a* and ST2006*a* of FIGS. 56 to 58, the cell notifies the interfering cell of information on the results of the measured channel information after obtaining the results from the UEs where interference is a problem.

However, the cell need not notify the interfering cell of information on the results of the measured channel information after obtaining the results from the UEs where interference is a problem as illustrated in FIGS. 59 to 61 according to the fourth modification. Since the UEs where interference is a problem notify each of the cells of the results of the measured channel information of the cells, the results of the measured channel information of the interfering cell are directly notified to the interfering cell without routing through the serving cell.

Application of the method disclosed in the fourth modification can eliminate the need for notifying information on the results of the measured channel information between the cells. Consequently, the cell can reflect the results of the channel information measured by the UEs to the execution of the MIMO with lower latency. The cell can reflect the results of the channel information measured by the UEs to deriving of precoding weights with lower latency.

Thus, the cell can increase the precision of the channel information of the UEs in deriving the precoding weights, and form beams with higher precision.

Consequently, the interference with the UEs that perform the MU-MIMO can be reduced, and the UEs can further accelerate the communication.

Since the UEs are connected to the cells 1 and 2 in the DC according to the fourth modification, not only communication from the MeNB through the MU-MIMO but also communication from the SeNB through the MU-MIMO are possible.

Fifth Modification of Second Embodiment

The methods for forming beams by the serving cell and forming a null by the other interring cells are disclosed as the methods for solving the problems described in the second embodiment. The fifth modification will disclose a method for transmitting data to the UE where interference is a problem without forming a null. The fifth modification differs from the second embodiment in that the serving cell and the non-serving cell perform joint transmission for transmitting, to the UEs where interference is a problem, the same data series together with the same f-t resources.

First, the serving cell performs the precoding with the UEs being served by the other cells where interference is a problem inclusive. Here, control is performed so that the same data series is transmitted to the UEs where interference is a problem. To transmit the same data series, the serving cell notifies the non-serving cell to transmit the same signal. Instead of the serving cell, the concentrator may make the notification.

Processes for the joint transmission are performed only for the UEs where interference is a problem. The base station determines interference.

The determination method based on the SINR described in the seventh modification of the first embodiment may be used to determine interference. Diversity reception after delay waves are equalized is possible as a reception method by the UE.

The example will be the equal gain combining or the maximum ratio combining (abbreviated as MRC) based on downlink CSI.

Figure 62:
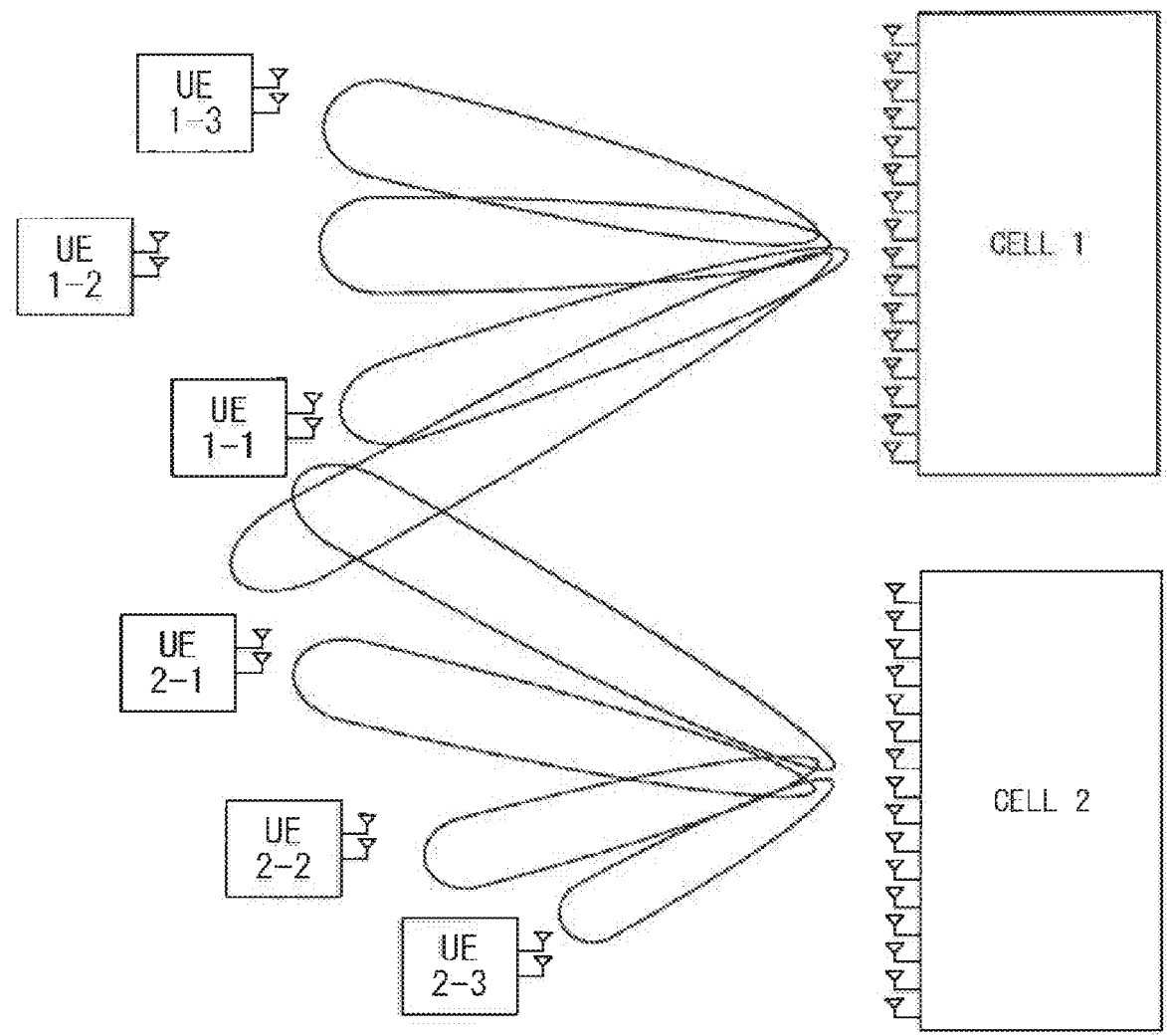
FIG. 62 illustrates an example structure of a communication system when the MU-MIMO is performed with the UEs being served by the other cells inclusive for each cell.

FIG. 62 illustrates an example structure of a communication system when the MU-MIMO is performed with the UEs being served by the other cells inclusive for each cell. In FIG. 62, the UE 1-1 and the UE 2-1 are UEs where interference is a problem. A serving cell and a non-serving cell form beams for the UEs where interference is a problem. The data series of the serving cell is the same as that of the non-serving cell.

In FIG. 62, the cell 1 performs the MIMO with the UE 2-1 inclusive, where the cell 1 is a non-serving cell for the UE 2-1. In FIG. 62, the cell 2 performs the MIMO with the UE 1-1 inclusive, where the cell 2 is a non-serving cell for the UE 1-1. Both the cells 1 and 2 direct beams toward the UE 1-1 and the UE 2-1. Thus, the same signals arrive at the UE 1-1 and the UE 2-1, and the signals can be regarded as delay waves. Equalizing the delay waves enables the diversity reception.

The methods according to the fifth modification for performing the MU-MIMO and the joint transmission with the UEs where interference is a problem inclusive for each cell can be executed in the sequence identical to that illustrated in FIGS. 46 and 47.

With the execution of the methods for performing the MU-MIMO and the joint transmission with the UEs where interference is a problem inclusive for each cell, the cell 1 can perform the MU-MIMO transmission to the UE 1-1 and the UE 1-3 that are being served thereby and to the UE 2-1 that is the UE being served by another cell where interference is a problem.

Furthermore, the cell 2 can perform the MU-MIMO transmission to the UE 2-1 being served thereby and to the UE 1-1 being served by another cell where interference from its own cell is a problem.

Upon receipt of data from the serving cell and the non-serving cell, the UBs where interference is a problem can obtain transmission diversity and array gain, and increase the signal quality at a receiving end of each of the UEs. The fifth modification produces the outstanding advantages particularly at a cell edge where interference between the cells is likely to be a problem and the received power is lower.

Sixth Modification of Second Embodiment

Although the second embodiment discloses the method for determining interference, the sixth modification will more specifically describe the method for determining the interference and disclose an example of determining the presence or absence of a problem with interference when the SINR is used as a threshold for the determination. The sixth modification will also disclose an example of determining interference when the channel information is measured from an uplink SRS and the downlink channel information is estimated from a result of the measurement.

Feedback from the UE on a downlink channel will be described. The cell notifies a UE of, as the channel measuring information, the cell IDs of the cells 1 and 2, scheduling information of a channel estimating signal, and synchronization information.

The UE measures the channels, the RSSIs, and the RSRPs of the cells 1 and 2 based on the channel measuring information.

A non-pre-coded CRS or a non-pro-coded CSI-RS is used for measuring the channel information, the RSSI, and the RSRP. The UE determines the reception SINR from the measured RSSI and RSRP. When a pro-coded CRS or a pre-coded CSI-RS is used for measuring the RSSI and the RSRP, the precision of determining interference can be increased. Averaging in a time direction may be used to determine the reception SINR.

After determining the reception SINR, the UE transmits the measured CSIs of the cells 1 and 2, the SINR of its own cell, and the UE category to each of the cells 1 and 2 using a UE-specific sequence. The UE category allows the cell to understand the number of UE antennas and the interference suppression capabilities including the signal processing capabilities. A SINR threshold for determining whether interference is a problem is reduced by a constant amount when it can be determined from the UE category that the number of reception antennas is larger than the number of transmission streams, similarly as the seventh modification of the first embodiment. When a reception SINR of the UE is smaller than a predetermined threshold, it is determined that the UE has a problem with interference.

The UE may determine whether interference is a problem. When the cells 1 and 2 notify the channel measuring information, the cells need to notify a threshold of the reception SINR together. The UE determines whether interference is a problem relative to the threshold of the reception SINR, and transmits a result of the determination to the cells.

Figure 63:
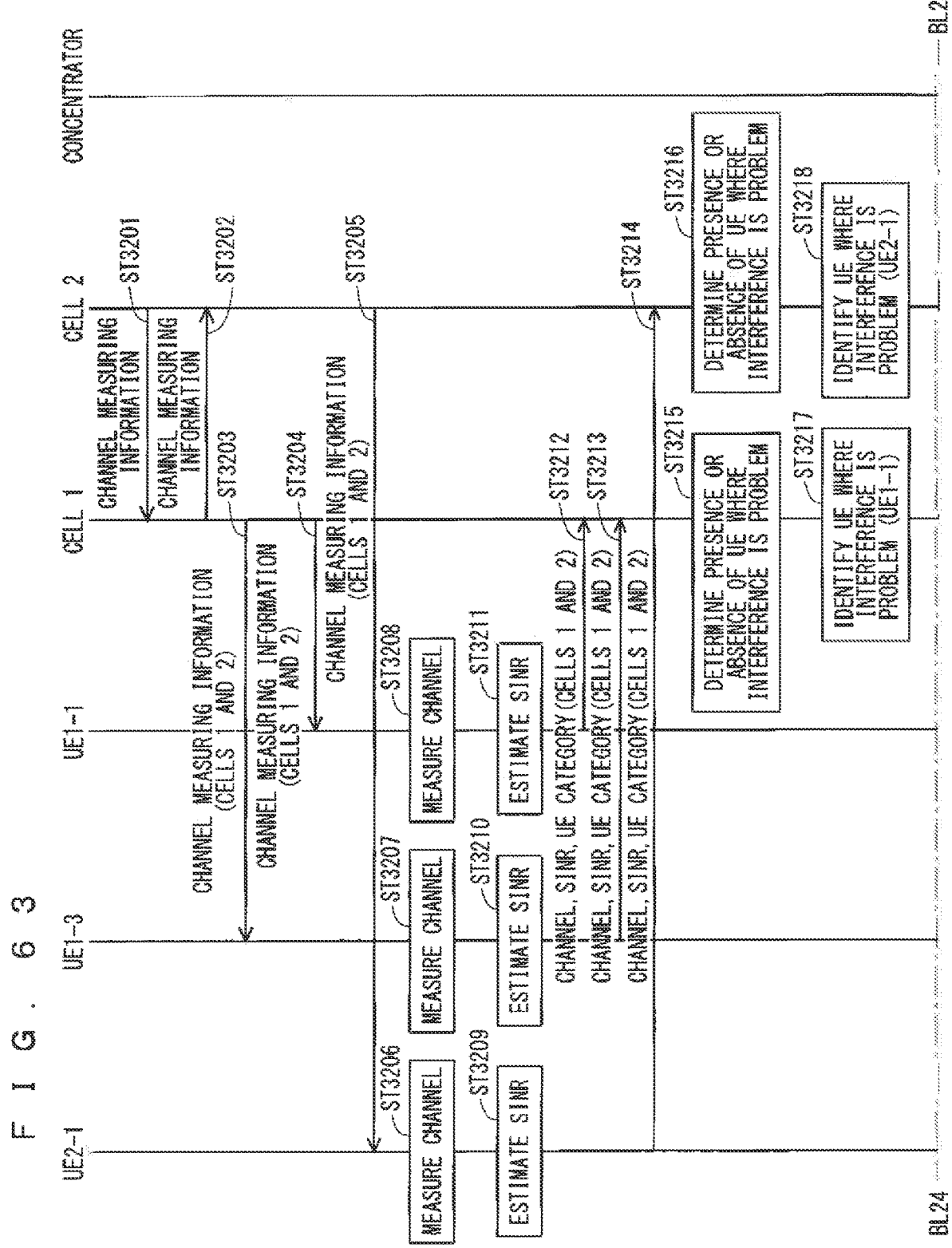
FIG. 63 illustrates an example sequence for performing the SU-MIMO with feedback of downlink channel information from the UEs.
Figure 64:
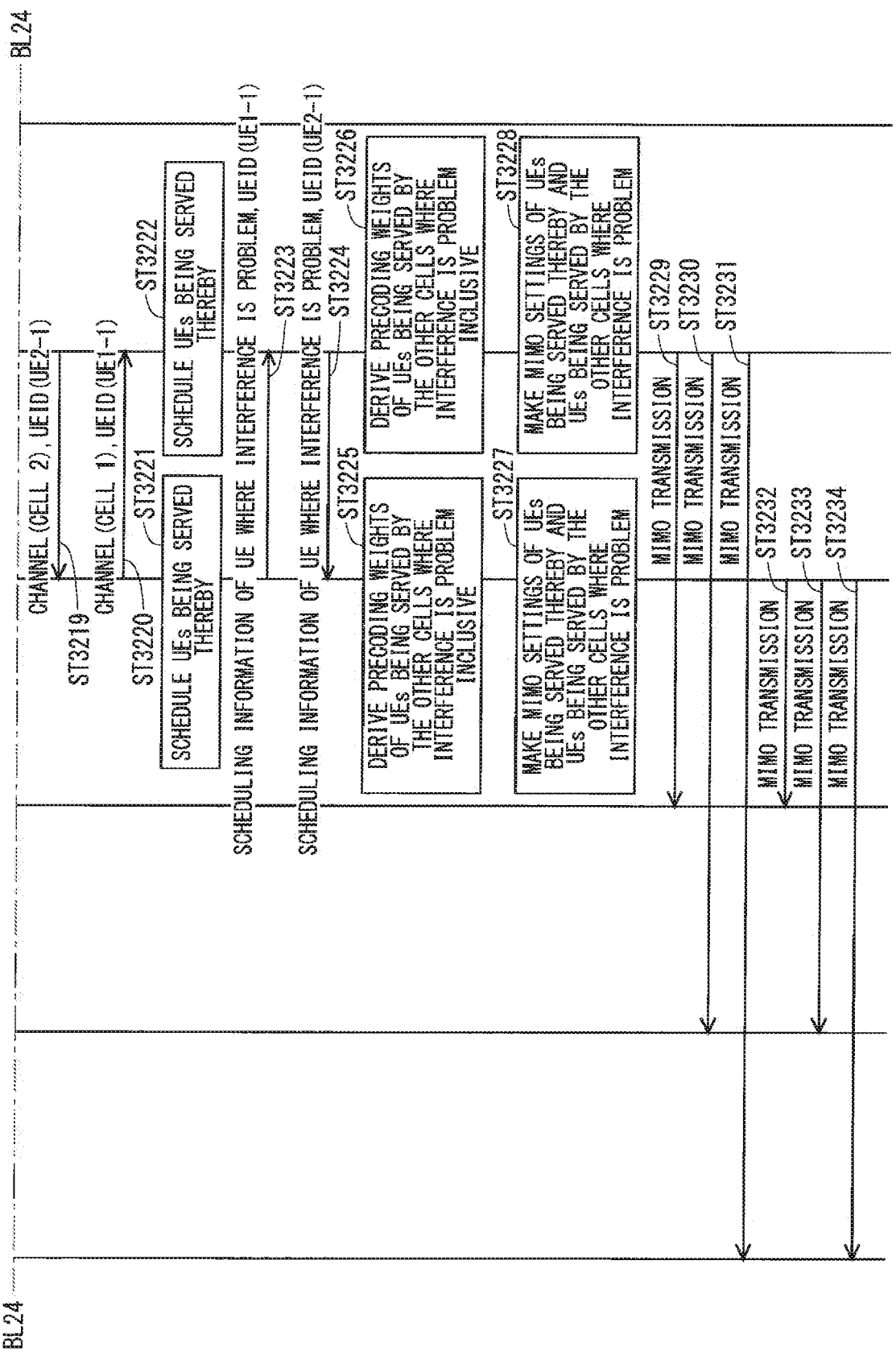
FIG. 64 illustrates the example sequence for performing the SU-MIMO with feedback of the downlink channel information from the UEs.

FIGS. 63 and 64 illustrate an example sequence for performing the SU-MIMO with feedback of the downlink channel information from the UEs. FIGS. 63 and 64 are connected across a location of a border BL24.

In Step ST3201, the cell 2 notifies the cell 1 of the channel measuring information.

In Step ST3202, the cell 1 notifies the cell 2 of the channel measuring information.

In Step ST3203, the cell 1 notifies the UE 1-3 being served thereby of the channel measuring information.

In Step ST3204, the cell 1 notifies the UE 1-1 being served thereby of the channel measuring information.

In Step ST3205, the cell 2 notifies the UE 2-1 being served thereby of the channel measuring information.

In Step ST3206, the UE 2-1 measures a channel, the RSSI, and the RSRP based on cell information in the channel measuring information received in Step ST3205.

In Step ST3207, the UE 1-3 measures a channel, the RSSI, and the RSRP based on cell information in the channel measuring information received in Step ST3203.

In Step ST3208, the UE 1-1 measures a channel, the RSSI, and the RSRP based on cell information in the channel measuring information received in Step ST3204.

In Step ST3209, the UE 2-1 estimates the SINR based on the RSSI and the RSRP measured in Step ST3206.

In Step ST3210, the UE 1-3 estimates the SINR based on the RSSI and the RSRP measured in Step ST3207.

In Step ST3211, the UE 1-1 estimates the SINR based on the RSSI and the RSRP measured in Step ST3208.

In Step ST3212, the UE 1-1 transmits the channel information, the SINR, and the UE category to the cell 1 that is the serving cell of the UE 1-1.

In Step ST3213, the UE 1-3 transmits the channel information, the SINR, and the UE category to the cell 1 that is the serving cell of the UE 1-3.

In Step ST3214, the UE 2-1 transmits the channel information, the SINR, and the UE category to the cell 2 that is the serving cell of the UE 2-1.

In Step ST3215, the cell 1 determines the presence or absence of the UE where interference is a problem by comparing the information obtained from the UE 1-1 and the UE 1-3 with the SINR threshold. The cell 1 determines that interference is a problem when the SINRs obtained from the UEs exceed the SINR threshold. When the SINR Is smaller than or equal to the SINR threshold, it is determined that interference is not a problem. Upon determination that the SINR obtained from the UE exceeds the SINR threshold in Step ST3215, the cell 1 identifies the UE 1-1 as the UE where interference is a problem in Step ST3217.

In Step ST3216, the cell 2 determines the presence or absence of the UE where interference is a problem by comparing the information obtained from the UE 2-1 with the SINR threshold. The cell 2 determines that interference is a problem when the SINR obtained from the UE exceeds the SINR threshold. When the SINR is smaller than or equal to the SINR threshold, it is determined that interference is not a problem. Upon determination that the SINR obtained from the UE exceeds the SINR threshold in Step ST3216, the cell 2 identifies the UE 2-1 as the UE where interference is a problem in Step ST3218.

The UE may make the judgements in Steps ST3215 and ST3216. The cells 1 and 2 share the received channel information of the UE where interference is a problem. Although the channel information of the UE where interference is a problem is shared via communication between the cells in FIGS. 63 and 64, it may be shared via a concentrator.

In Step ST3219, the cell 2 notifies the cell 1 that interferes with the UE 2-1 where interference is a problem of the UE identifier of the UE 2-1 where interference is a problem (UEID (UE 2-1)), and the channel information of the cell 2 that has been obtained from the UE.

In Step ST3220, the cell 1 notifies the cell 2 that interferes with the UE 1-1 where interference is a problem of the UE identifier of the UE 1-1 where interference is a problem (UEID (UE1-1)), and the channel information of the cell 1 that has been obtained from the UE.

In Step ST3221, the cell 1 schedules the UEs being served thereby. In Step ST3222, the cell 2 schedules the UEs being served thereby.

In Step ST3223, the cell 1 notifies the cell 2 that interferes with the UE 1-1 where interference is a problem of the UE identifier of the UE 1-1 where interference is a problem (UEID (UE 1-1)), and the scheduling information of the UE.

In Step ST3224, the cell 2 notifies the cell 1 that interferes with the UE 2-1 where interference is a problem of the UE identifier of the UE 2-1 where interference is a problem (UEID (UE 2-1)), and the scheduling information of the UE.

In Step ST3225, the cell 1 determines the UEs that are scheduled on the same f-t resources as those on which the UE 2-1 is scheduled, from the scheduling information of the UE 2-1 that has been obtained from the cell 2, and derives precoding weights of these UEs.

In Step ST3226, the cell 2 determines the UEs that are scheduled on the same f-t resources as those on which the UE 1-1 is scheduled, from the scheduling information of the UE 1-1 that has been obtained from the cell 1, and derives precoding weights of these UEs.

In each of Steps ST3225 and ST3226, the precoding weights are derived to direct a null to the UEs being served by the other cells sharing information and where interference is a problem.

In Step ST3227, the cell 1 makes the MIMO settings of the UE 1-1 and the UE 1-3 that are being served thereby, and the UE 2-1 that is the UE being served by another cell where interference is a problem.

In Step ST3228, the call 2 makes the MIMO settings of the UE 2-1 being served thereby, and the UE 1-1 that is the UE being served by another cell where interference is a problem.

In Step ST3229, the cell 2 performs the MU-MIMO transmission to the UE 1-1 according to the MIMO settings made in Step ST3228.

In Step ST3230, the cell 2 performs the MU-MIMO transmission to the UE 1-3 according to the MIMO settings made in Step ST3228.

In Step ST3231, the cell 2 performs the MU-MIMO transmission to the UE 2-1 according to the MIMO settings made in Step ST3228.

In Step ST3232, the cell 1 performs the MU-MIMO transmission to the UE 1-1 according to the MIMO settings made in Step ST3227.

In Step ST3233, the cell 1 performs the MU-MIMO transmission to the UE 1-3 according to the MIMO settings made in Step ST3227.

In Step ST3234, the cell 1 performs the MU-MIMO transmission to the UE 2-1 according to the MIMO settings made in Step ST3227.

The following will describe that the cell obtains the uplink channel information from the SRS to determine a downlink channel using a duality. A serving cell notifies the UE of, as the channel measuring information, the cell IDs of the cells 1 and 2, scheduling information of a channel estimating signal, and synchronization information. The UE transmits a sequence specific to both the UE and the cell to the cells 1 and 2 based on the channel measuring information. Each of the cells 1 and 2 receives a transmission signal of the UE being served thereby, and measures a channel, the RSRP, and the UE category. The cells 1 and 2 may exchange pieces of the measured RSRP information. The RSRP and the RSSI may be averaged in a time direction. Each of the cells 1 and 2 measures the SINRs of the UEs from the measured information. When the SINR of a UE is smaller than a predetermined threshold, it is determined that the UE has a problem with interference.

The UE may determine whether interference is a problem. When the cells 1 and 2 notify the channel measuring information, the cells need to notify a threshold of the reception SINR together. The UE determines whether interference is a problem relative to the threshold of the reception SINR, and transmits a result of the determination to the cells.

Here, the UE need not notify the serving cell of the RSSIs, the RSRPs, and the UE categories of the cells 1 and 2. When it is determined that interference is not a problem, the UE need not notify the channel information of the cells other than the serving cell.

Figure 65:
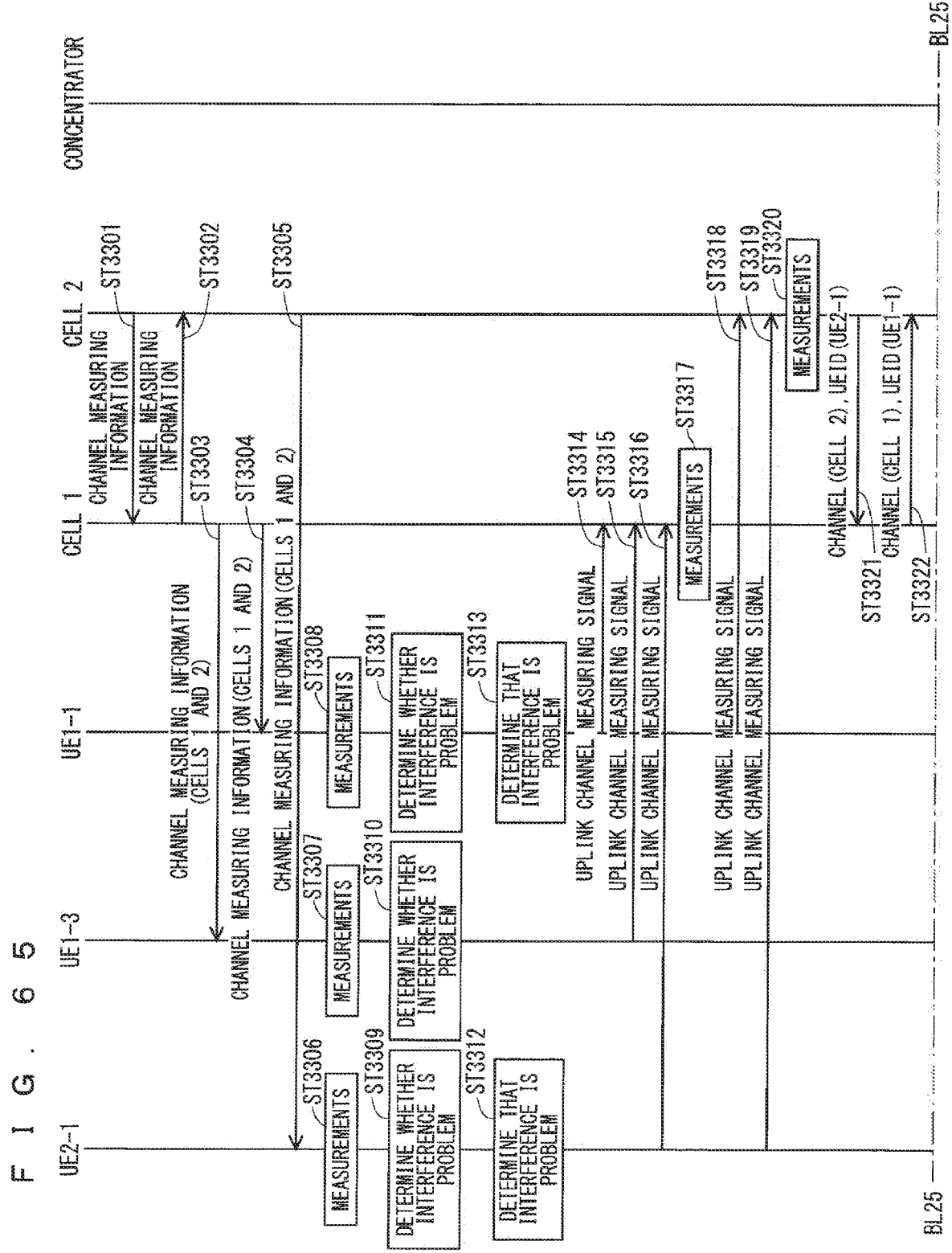
FIG. 65 illustrates an example sequence for performing the SU-MIMO by obtaining uplink channel information from a SRS to estimate a downlink channel using a duality.
Figure 66:
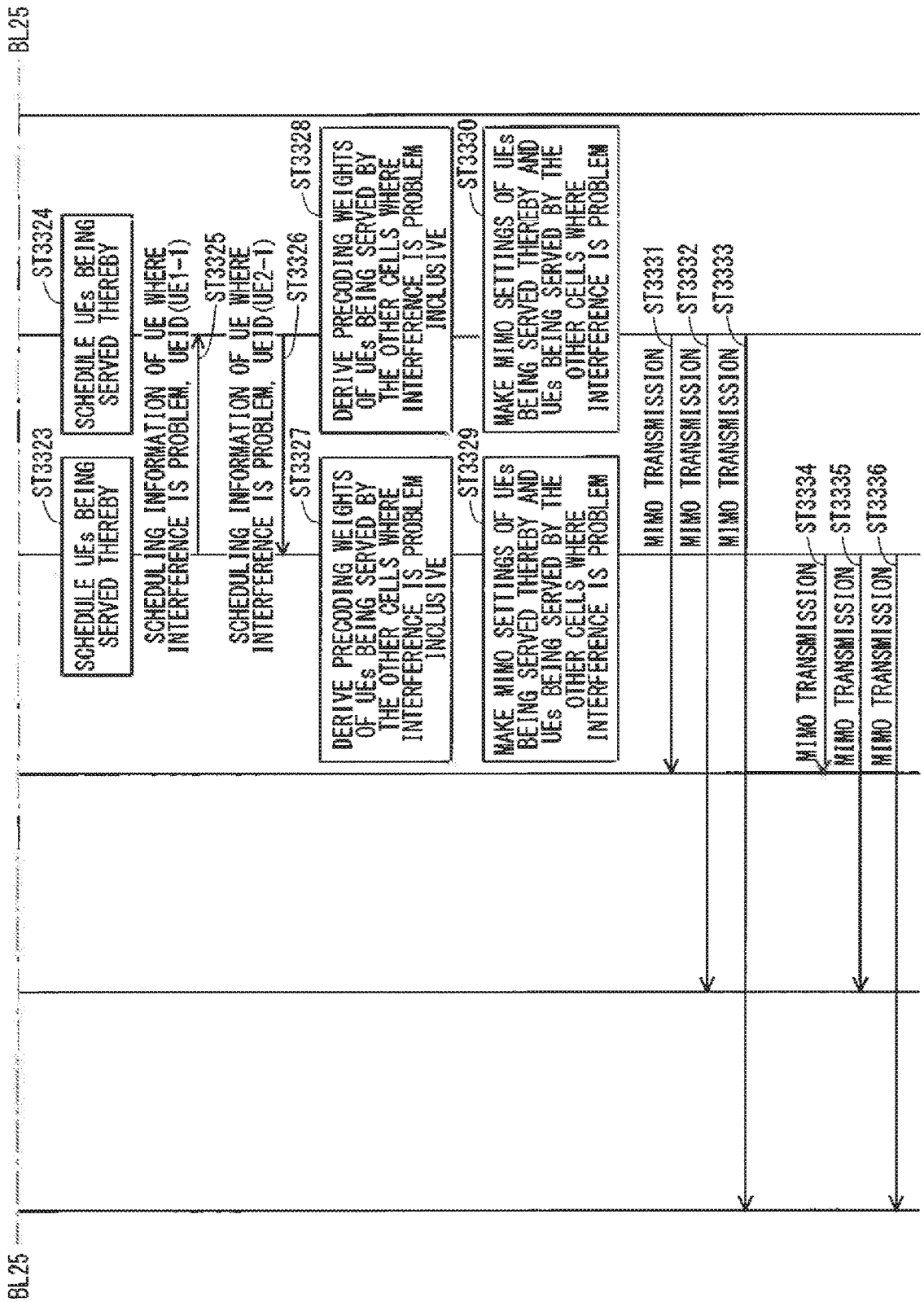
FIG. 66 illustrates the example sequence for performing the SU-MIMO by obtaining the uplink channel information from the SRS to estimate the downlink channel using a duality.

FIGS. 65 and 66 illustrate an example sequence for performing the SU-MIMO by obtaining the uplink channel information from the SRS to estimate a downlink channel using a duality. FIGS. 65 and 66 are connected across a location of a border BL25.

FIGS. 65 and 66 illustrate that the UE determines interference. FIGS. 65 and 66 also illustrate a method for performing the MU-MIMO in consideration of a plurality of cells.

In Step ST3301, the cell 2 notifies the cell 1 of the channel measuring information.

In Step ST3302, the cell 1 notifies the cell 2 of the channel measuring information.

In Step ST3303, the cell 1 notifies the UE 1-3 being served thereby of the channel measuring information.

In Step ST3304, the cell 1 notifies the UE 1-1 being served thereby of the channel measuring information.

In Step ST3305, the cell 2 notifies the UE 2-1 being served thereby of the channel measuring information.

The channel measuring information includes scheduling information for the UE to measure the SRS.

Upon receipt of the channel measuring information, the UE 2-1, the UE 1-3, and the LIE 1-1 measure the channel information with the channel measuring information in Step ST3306, Step ST3307, and Step ST3308, respectively.

In Step ST3309, the UE 2-1 determines whether interference is a problem from the measurement result obtained in Step ST3306.

In Step ST3310, the UE 1-3 determines whether interference is a problem from the measurement result obtained in Step ST3307.

In Step ST3311, the UE 1-1 determines whether interference is a problem from the measurement result obtained in Step ST3308.

The RSSI, the RSRP, the estimated SINR, and the number of antennas in the UE are considered in making the judgments in Steps ST3309, ST3310, and ST3311.

In Step ST3312, the UE 2-1 determines that interference is a problem. In Step ST3313, the UE 1-1 determines that interference is a problem. When the UEs determine that interference is a problem, the UEs transmit the channel information only to the cell 1. In the sequence illustrated in FIGS. 65 and 66, the UE 1-1 and the UE 2-1 are UEs where interference is a problem.

In Step ST3314, the UE 1-1 notifies the cell 1 of an uplink channel measuring signal based on the measurement result in Step ST3308.

In Step ST3315, the UE 1-3 notifies the cell 1 of an uplink channel measuring signal based on the measurement result in Step ST3307.

In Step ST3316, the UE 2-1 notifies the cell 1 of an uplink channel measuring signal based on the measurement result in Step ST3306.

In Step ST3317, the cell 1 measures the channel information based on the uplink channel measuring signals notified from the UEs.

In Step ST3318, the UE 1-1 notifies the cell 2 of the uplink channel measuring signal based on the measurement result in Step ST3308.

In Step ST3319, the UE 2-1 notifies the cell 2 of the uplink channel measuring signal based on the measurement result in Step ST3306.

In Step ST3320, the cell 2 measures the channel information from the uplink channel measuring signals notified from the UE 1-1 and the UE 2-1.

In Step ST3321, the cell 2 notifies the cell 1 that interferes with the UE 2-1 where interference is a problem of the UE identifier of the UE 2-1 where interference is a problem (UEID (UE 2-1)), and the channel information of the cell 2 that has been obtained from the UE.

In Step ST3322, the cell 1 notifies the cell 2 that interferes with the UE 1-1 where interference is a problem of the UE identifier of the UE 1-1 where interference is a problem (UEID (UE1-1)), and the channel information of the cell 1 that has been obtained from the UE.

In Step ST3323, the cell 1 schedules the UBs being served thereby. In Step ST3324, the cell 2 schedules the UEs being served thereby.

In Step ST3325, the cell 1 notifies the cell 2 that interferes with the UE 1-1 where interference is a problem of the UE identifier of the UE 1-1 where interference is a problem (UEID (UE 1-1)), and the scheduling information of the UE.

In Step ST3326, the cell 2 notifies the cell 1 that interferes with the UE 2-1 where interference is a problem of the UE identifier of the UE 2-1 where interference is a problem (UEID (UE 2-1)), and the scheduling information of the LIE.

In Step ST3327, the cell 1 determines the UEs that are scheduled on the same f-t resources as those on which the UE 2-1 is scheduled, from the scheduling information of the UE 2-1 that has been obtained from the cell 2, and derives precoding weights of these UEs.

In Step ST3328, the cell 2 determines the UEs that are scheduled on the same f-t resources as those on which the UE 1-1 is scheduled, from the scheduling information of the UE 1-1 that has been obtained from the cell 1, and derives precoding weights of these UEs.

In Step ST3329, the cell 1 makes the MIMO settings of the UE 1-1 and the UE 1-3 that are being served thereby, and the UE 2-1 that is the UE being served by another cell where interference is a problem.

In Step ST3330, the cell 2 makes the MIMO settings of the UE 2-1 being served thereby, and the UE 1-1 that is the UE being served by another cell where interference is a problem.

In Step ST3331, the cell 2 performs the MU-MIMO transmission to the UE 1-1 according to the MIMO settings made in Step ST3330.

In Step ST3332, the cell 2 performs the MU-MIMO transmission to the UE 1-3 according to the MEMO settings made in Step ST3330.

In Step ST3333, the cell 2 performs the MU-MIMO transmission to the UE 2-1 according to the MIMO settings made in Step ST3330.

In Step ST3334, the cell 1 performs the MU-MIMO transmission to the UE 1-1 according to the MIMO settings made in Step ST3329.

In Step ST3335, the cell 1 performs the MU-MIMO transmission to the UE 1-3 according to the MIMO settings made in Step ST3329.

In Step ST3336, the cell 1 performs the MU-MIMO transmission to the UE 2-1 according to the MIMO settings made in Step ST3329.

The following will describe advantages of methods for obtaining the uplink channel information and using a duality. The use of a duality shortens the latency necessary for obtaining a precoding weight to be derived for transmitting data from the cell. This reduces an estimation error caused by the latency between the channel estimated by the cell and the actual channel. Thus, tolerance to the movement of the UE will increase. In other words, even when the UE moves, the estimation error of the channel information can be reduced as much as possible.

Example combinations with the second embodiment to address the cell whose interference is a problem include measuring signal strength of all the cells, forming beams from a cell with the highest signal strength, and directing a null to the other cells including a serving cell, instead of forming beams from the serving cell and forming a null from the other cells. This combination can further increase the reception quality while reducing interference.

Third Embodiment

One frame format (may be referred to as a "frame structure") is used for one carrier in the LTE. The control channels to be mapped to the same carrier, for example, synchronization signals such as the P-SS and the S-SS, and the shared channels such as the PBCH and the RACH are configured in one frame format.

Operations of various services are expected in the next fifth-generation (hereinafter may be referred to as "5G") communication system. Examples of the services include enhanced mobile broadband (eMBB) services, ultra-reliable and low latency communications (URLLC) services, and massive machine type communications (mMTC) services (see Non-Patent Document 11). The communication terminals will include communication terminals supporting these services.

In the 5G radio access system, the frame format to be applied to each service will be optimized according to the performance required for the service. In 3GPP, operations of a plurality of frame formats are under study as the 5G radio access system. Example proposals include an adaptive frame structure that is a method in which a plurality of frame formats are adaptively used within the same carrier (see Non-Patent Document 12).

The frame formats include transmission time interval (TTI) and numerologies.

Time Division Duplex (TDD) has a structure of having the uplink and the downlink in the same sub-frame. The numerologies include the symbol duration, the sub-carrier interval, the cyclic prefix (CP) length, the sampling frequency, and the subframe length.

One or more sub-carriers are allocated to each frame format. Alternatively, predetermined resources on the frequency axis and the time axis are allocated to each frame format. The sub-carriers for each frame format and the predetermined resources on the frequency axis and the time axis will be hereinafter referred to as resources for each frame format.

When a plurality of frame formats are used within the same carrier, there will be a communication terminal incapable of the first access, that is, being unable to perform initial access without any ingenuity. For example, when there are different frame formats A and B and a cell transmits a synchronization signal and a broadcast channel in the frame format A, a communication terminal supporting the frame format B is unable to perform initial access to the cell. The third embodiment will disclose a method for solving such a problem.

At least one of a synchronization signal and a shared channel is provided for each frame format. At least one of the synchronization signal and the shared channel is mapped to resources for each frame format. In other words, the frame format of the resources to be mapped is used for at least one of the synchronization signal and the shared channel.

For example, the synchronization signal (SS) and the broadcast channel (PBCH) are provided for each frame format, and are mapped to the resources for the frame format in the downlink (DL).

For example, a random access channel (PRACH) is provided for each frame format, and is mapped to the resources for the frame format in the uplink (UL).

A structure of at least one of the synchronization signal and the shared channel for each frame format may be predetermined. For example, the structure may be statically determined in, for example, a standard. Alternatively, the structure may be stored in a Subscriber Identity Module (SIM) of the UE. Storing the structure in the SIM can assume a structure for each operator.

Examples of the structure of at least one of the synchronization signal and the shared channel for each frame format include a sub-carrier to be mapped, the number of symbols, an of Bet time, allocation of the resources to be mapped, and a sequence to be used. The offset time may be, for example, an offset time from the subframe timing, or an offset symbol. A structure of at least one of the synchronization signal and the shared channel for each frame format may be made periodic with, for example, a period.

When the UE accesses a radio access network using the structure of at least one of the synchronization signal and the shared channel for each frame format, the UE receives at least one of the synchronization signal and the shared channel mapped to the resources in the frame format corresponding to its own UE, i.e., at least one of the synchronization signal and the shared channel in a frame format corresponding to its own UE.

Consequently, even when a plurality of frame formats are used within the same carrier, at least one of the synchronization signal and the shared channel in the frame format corresponding to its own UE can be transmitted or received. This allows for access to the radio access network.

The resources for each frame format may be predetermined. The resources may be statically determined in, for example, a standard. Alternatively, the resources may be stored in the SIM of the UE. Storing the resources in the SIM can assume a structure for each operator.

Figure 67:
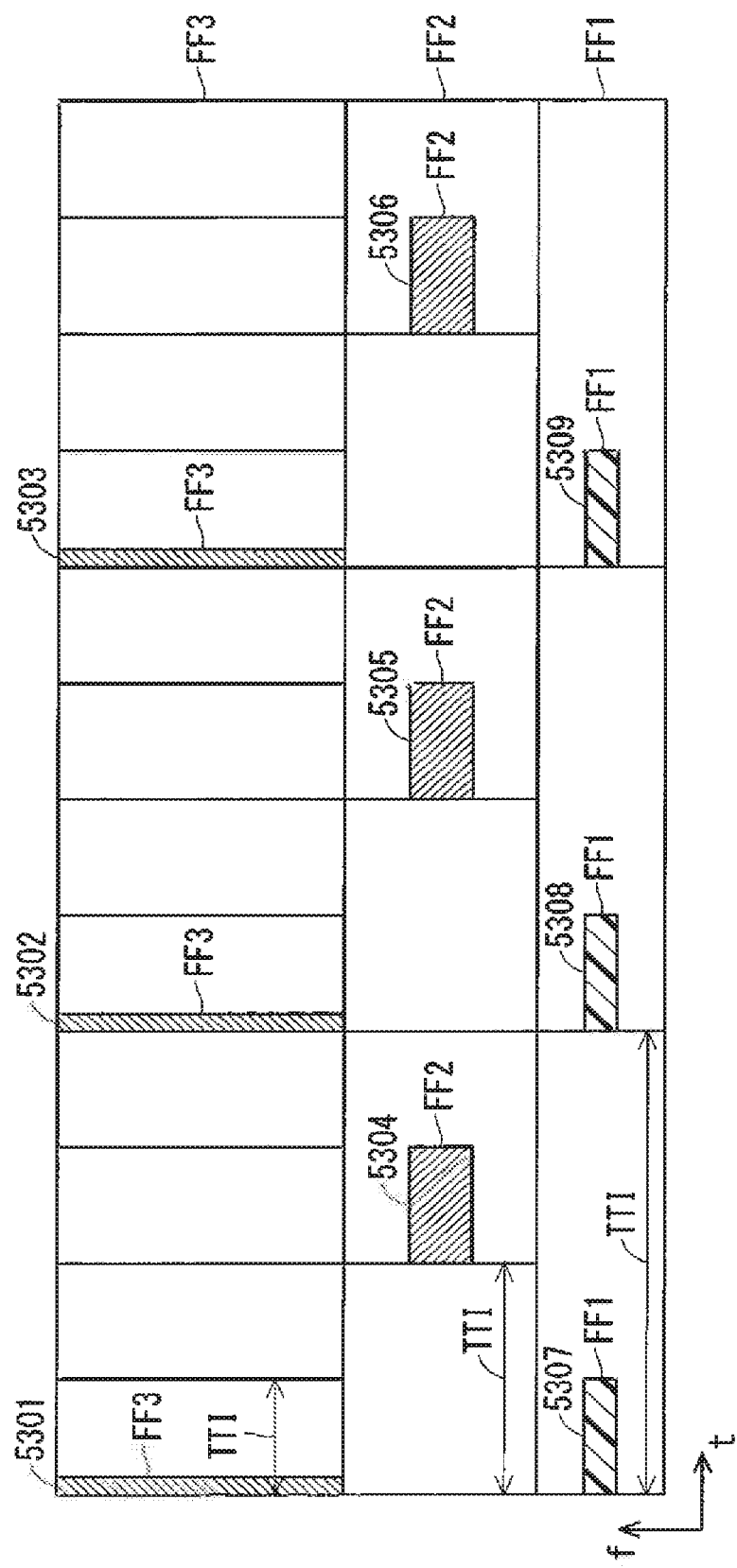
FIG. 67 illustrates an example structure in which at least one of a synchronization signal and a shared channel is provided for each frame format and is mapped to resources for the frame format.

FIG. 67 illustrates an example structure in which at least one of a synchronization signal and a shared channel is provided for each frame format and is mapped to the resources for each frame format. In FIG. 67, the horizontal axis represents time t, and the vertical axis represents a frequency f. FIG. 67 illustrates the example structure only during a predetermined duration, and similar mapping is performed during a time other than this.

Frame formats FF1, FF2, and FF3 are supported within one carrier. The carrier may be a component carrier. Regions each consisting of one or more sub-carriers are allocated to the frame formats FF1, FF2, and FF3.

At least one of the synchronization signal and the shared channel in the frame format FF3 is denoted by each of references "5301", "5302", and "5303", and is included in the regions allocated to the frame format FF3. At least one of the synchronization signal and the shared channel in the frame format FF3 is periodically mapped.

Similarly, at least one of the synchronization signal and the shared channel in the frame format FF2 is denoted by each of references "5304", "5305", and "5306", and is included in the regions allocated to the frame format FF2. At least one of the synchronization signal and the shared channel in the frame format FF2 is periodically mapped.

Similarly, at least one of the synchronization signal and the shared channel in the frame format FF1 is denoted by each of references "5307", "5308", and "5309", and is included in the regions allocated to the frame format FF1. At least one of the synchronization signal and the shared channel in the frame format FF1 is periodically mapped.

At least one of the synchronization signal and the shared channel is at least one of the SS and the PBCH in the downlink. At least one of the synchronization signal and the shared channel is the PRACH in the uplink. When at least one of the synchronization signal and the shared channel is the PRACH, the region may allow for transmission of the PRACH. The UE need not necessarily transmit the PRACHs as a whole. The UE may transmit, in the region, the PRACH in the frame format of its own UE as necessary.

Application of the method disclosed in the third embodiment enables the UE to transmit or receive at least one of the synchronization signal and the shared channel in the frame format corresponding to its own UE and to access a radio access network, even when a plurality of frame formats are used within the same carrier.

First Modification of Third Embodiment

The first modification will disclose another method for solving the problems disclosed in the third embodiment.

At least one of a common synchronization signal and a common shared channel independent of a frame format is provided. The same frame format is applied to at least one of the common synchronization signal and the common shared channel. In other words, a flame format for at least one of the common synchronization signal and the common shared channel is provided. At least one of the common synchronization signal and the common shared channel is mapped to common resources independent of a frame format.

For example, a common synchronization signal (SS) and a common broadcast channel (PBCH) independent of a frame format are provided, and are mapped to the common resources in a common frame format in the downlink (DL).

For example, a common random access channel (PRACH) independent of a frame format is provided, and can be mapped to the common resources in the common frame format in the uplink (UL).

The common frame format, and a structure of at least one of the common synchronization signal and the common shared channel may be predetermined. For example, the structure may be statically determined in, for example, a standard. Alternatively, the structure may be stored in the SIM of the UE. Storing the structure in the SIM can assume a structure for each operator.

Examples of the structure of at least one of the common synchronization signal and the common shared channel include a sub-carrier to be mapped, the number of symbols, an offset time, allocation of the resources to be mapped, and a sequence to be used. The offset time may be, for example, an offset time from the subframe timing, or an offset symbol. At least one of the common synchronization signal and the common shared channel may be made periodic with, for example, a period.

The common resources may be predetermined. For example, the resources may be statically determined in, for example, a standard. Alternatively, the resources may be stored in the SIM of the UE. Storing the resources in the SIM can assume a structure for each operator.

The UE can be configured to transmit or receive at least one of the common synchronization signal and the common shared channel in the common frame format, in addition to each frame format supported by its own UE. Consequently, the common resources can be configured irrespective of the kind of the UE.

The common resources may correspond one-to-one to carriers. The common resources may be one f-t resource. The common resources may be set to the common timing. The timing to set the common resources may be any, and may have a correlation with the timing in each frame format, such as the TTI timing and the subframe timing.

The correlation allows for identifying, for example, the subframe timing in each frame format when at least one of the common synchronization signal and the common shared channel can be received.

This enables the UE to receive a signal or a channel to be mapped to the resources in the frame format of its own UE early after receiving at least one of the common synchronization signal and the common shared channel.

The numerologies in a common frame format may be reference numerologies. The following (1) to (4) will be disclosed as example reference numerologies:

(1) adjusting the sampling frequency to the frequency with the lowest speed, that is, the lowest frequency;

(2) adjusting the sub-carrier interval to the narrowest bandwidth;

(3) adjusting the symbol duration to the longest duration; and (4) adjusting the FFT size to the smallest size.

These (1) to (4) may be combined. These may be combined with the other indicators. The reference numerologies may be numerologies for enabling reception of the UE with the lowest capability.

This makes it easier for each of the UEs to configure, when the numerologies to be supported within one carrier are scalable, the reference numerologies in addition to the numerologies supported by the UE.

The common PBCH may carry information necessary for receiving each frame format. The following (1) to (7) will be disclosed as examples of the information:

(1) an applied format according to the kind (type or category) of the UE;

(2) an applied format according to the kind of a service and required performance;

(3) an applied format according to a required Quality of Service (QoS) value;

(4) a structure of each frame format;

(5) a timing correlation value;

(6) a SFN correlation value; and (7) a frequency, time, a symbol length, a CP length, the TTI, etc.

As such, the PBCH in each frame format may be eliminated. After receipt of the common PBCH, a control channel such as the PDCCH or a control signal such as the RS in each frame format may be directly received. Consequently, the UE can shift to each frame format supported by its own UE earlier.

sub_PBCH in each frame format may be provided. This may be provided when the common PBCH lacks information.

Here, the common PBCH may carry information such as a frequency, time, and MCS of sub_PBCH.

When the UBE accesses a radio access network using a common frame format and a structure of at least one of a synchronization signal and a shared channel, the UE transmits or receives at least one of a common synchronization signal and a common shared channel that are mapped to the resources in the common frame format.

Consequently, even when a plurality of frame formats are used within the same carrier, the UE can receive or transmit at least one of the common synchronization signal and the common shared channel in the common frame format, and can access the radio access network.

Figure 68:
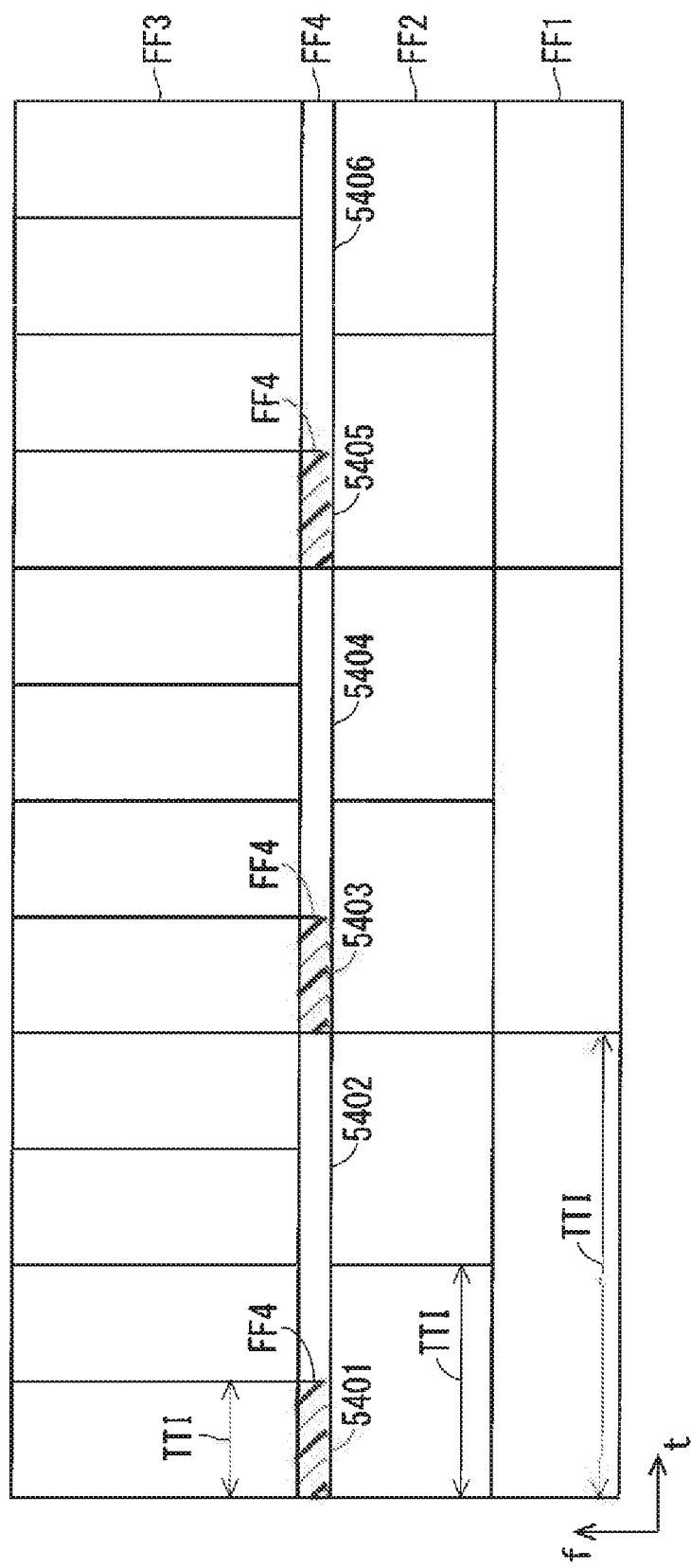
FIG. 68 illustrates an example structure in which at least one of a common synchronization signal and a common shared channel in a common frame format is provided and is mapped to common resources.

FIG. 68 illustrates an example structure in which at least one of a common synchronization signal and a common shared channel in a common frame format is provided and is mapped to the common resources. In FIG. 68, the horizontal axis represents time t, and the vertical axis represents a frequency f. FIG. 68 illustrates the example structure only during a predetermined duration, and similar mapping is performed during a time other than this.

A frame format FF4 common to the UEs is supported within one carrier, in addition to the frame formats FF1, FF2, and FF3. Regions each consisting of one or more sub-carriers are allocated to the frame formats FF1, FF2, FF3, and FF4. The region of the frame format FF4 is denoted by each of references "5401", "5402", "5403", "5404", "5405", and "5406". At least one of the synchronization signal and the shared channel in the frame format FF4 is denoted by each of the references "5401", "5403", and "5405", and is included in the regions allocated to the frame format FF4. At least one of the synchronization signal and the shared channel in the frame format FF4 is periodically mapped.

At least one of the synchronization signal and the shared channel in the frame format FF4 is not mapped to the regions denoted by the references "5402", "5404", and "5406" among the regions of the frame format FF4. The regions "5402", "5404", and "5406" are regions in which nothing is transmitted in the example of FIG. 68.

At least one of the synchronization signal and the shared channel is at least one of the SS and the PBCH in the downlink. At least one of the synchronization signal and the shared channel is the PRACH in the uplink. When at least one of the synchronization signal and the shared channel is the PRACH, the region may allow for transmission of the PRACH. The UE need not necessarily transmit the PRACHs as a whole. The PRACH in the frame format of its own UE may be transmitted in the region as necessary.

The UE can access a radio access network through transmission or reception of at least one of the synchronization signal and the shared channel in the common frame format FF4.

Figure 69:
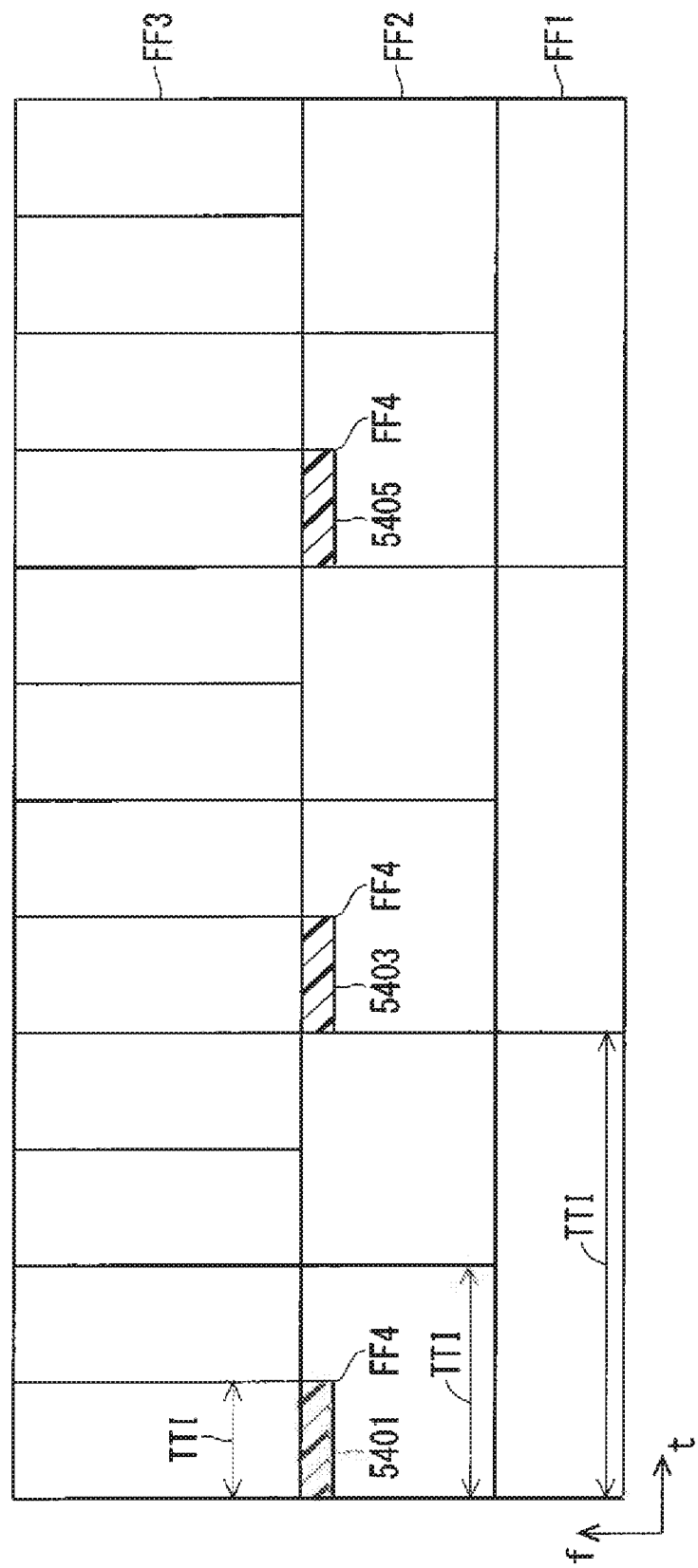
FIG. 69 illustrates another example structure in which at least one of a common synchronization signal and a common shared channel in a common frame format is provided and is mapped to the common resources.

FIG. 69 illustrates another example structure in which at least one of a common synchronization signal and a common shared channel in a common frame format is provided and is mapped to the common resources.

The example illustrated in FIG. 69 differs from that in FIG. 68 in that one or more sub-carriers to which the common frame format FF4 is allocated are not configured during the entire duration. Only the f-t resources to which at least one of a common synchronization signal and a common shared channel in a common frame format is mapped are configured in the common frame format FF4.

The region of the common frame format FF4 is denoted by each of the references "5401", "5403", and "5405". At least one of the synchronization signal and the shared channel in the frame format FF4 is mapped to each of the regions denoted by the references "5401", "5403", and "5405". At least one of the synchronization signal and the shared channel in the common frame format FF4 may be periodically mapped.

In the example illustrated in FIG. 69, the regions to which at least one of the synchronization signal and the shared channel in the frame format FF4 is not mapped are the regions in the frame format FF2. At least one of the synchronization signal and the shared channel in the common frame format FF4 may be mapped to part of the regions in the frame format FF2. The signal or the channel in the frame format FF2 is not mapped to the regions to which at least one of the synchronization signal and the shared channel in the common frame format FF4 is mapped. At least one of the signal and the channel in the frame format FF2 may be punctured in the regions.

The UE recognizes, in advance, the regions to which at least one of the synchronization signal and the shared channel in the common frame format FF4 is mapped. For example, the regions may be statically predetermined in, for example, a standard. This enables transmission or reception of at least one of the synchronization signal and the shared channel in the frame format FF2 as well as at least one of the synchronization signal and the shared channel in the common frame format FF4.

Alternatively, the UE or the base station may blindly detect at least one of the synchronization signal and the shared channel in the common frame format FF4. The UE or the base station that receives the frame format FF2 may reduce the influence of at least one of the synchronization signal and the shared channel in the common frame format FF4 by obtaining demodulation gain through, for example, the CRC.

Consequently, the UE can access a radio access network through transmission or reception of at least one of the synchronization signal and the shared channel in the common flame format FF4. The f-t resources to be used for the frame format FF2 and the use efficiency of the resources in the example illustrated in FIG. 69 can be increased more than those in the example illustrated in FIG. 68.

Figure 70:
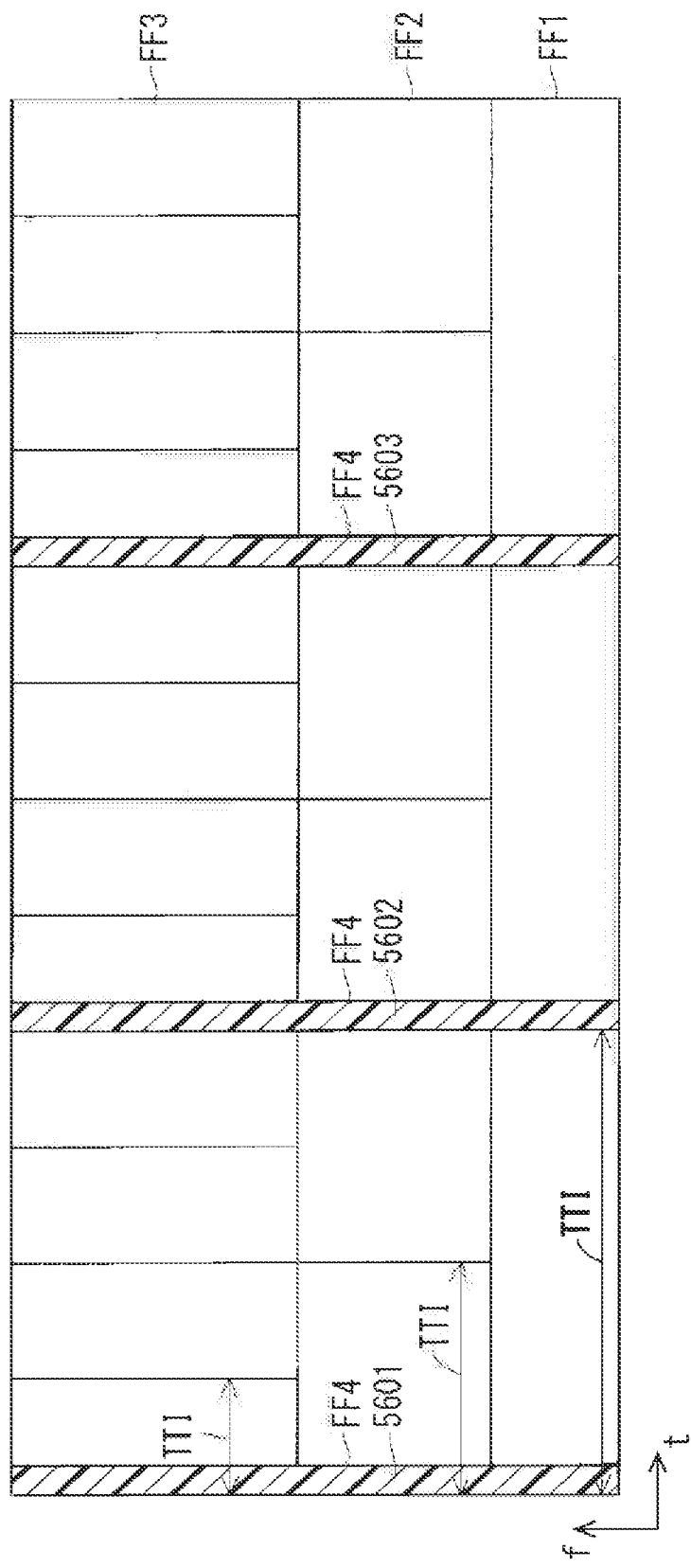
FIG. 70 illustrates another example structure in which at least one of a common synchronization signal and a common shared channel in a common frame format is provided and is mapped to the common resources.

FIG. 70 illustrates another example structure in which at least one of a common synchronization signal and a common shared channel in a common frame format is provided and is mapped to the common resources.

FIG. 70 illustrates an example of configuring the f-t resources to which the common frame format FF4 is allocated, by the number of symbols at all the carrier frequencies during a predetermined duration. In the example illustrated in FIG. 70, only the f-t resources to which at least one of a common synchronization signal and a common shared channel in a common frame format is mapped are configured in the common frame format FF4.

The region of the common frame format FF4 is denoted by each of references "5601", "5602", and "5603". At least one of the synchronization signal and the shared channel in the frame format FF4 is mapped to each of the regions denoted by the references "5601", "5602", and "5603". At least one of the synchronization signal and the shared channel in the frame format FF4 may be periodically mapped.

In the example illustrated in FIG. 70, the regions to which at least one of the synchronization signal and the shared channel in the frame format FF4 is not mapped are the regions in the frame formats FF1, FF2, and FF3. The method identical to that disclosed in FIG. 69 may be applied as a method for multiplexing these.

Consequently, the UE can access a radio access network through transmission or reception of at least one of the synchronization signal and the shared channel in the common frame format FF4.

Figure 71:
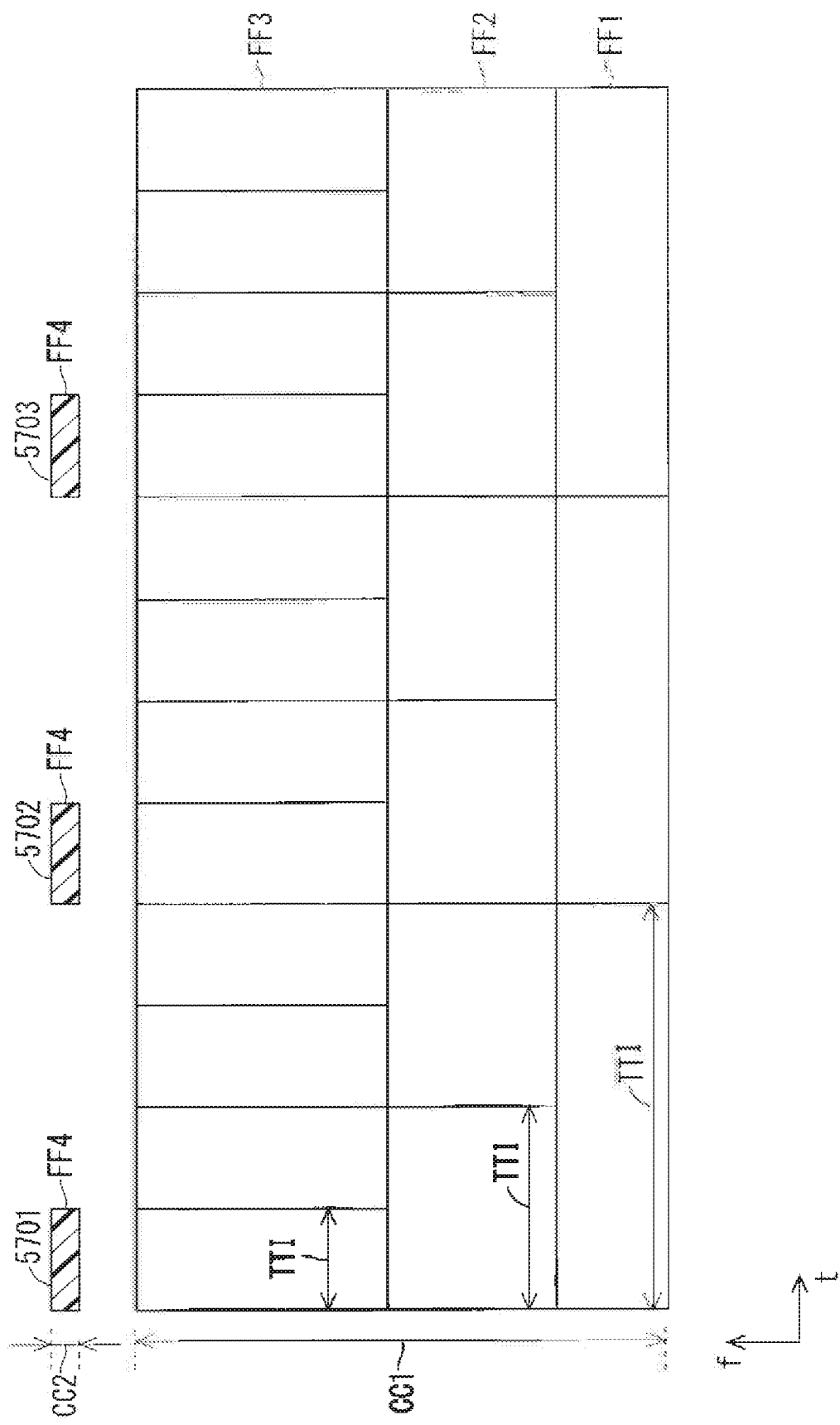
FIG. 71 illustrates another example structure in which at least one of a common synchronization signal and a common shared channel in a common frame format is provided and is mapped to the common resources.

FIG. 71 illustrates another example structure in which at least one of a common synchronization signal and a common shared channel in a common frame format is provided and is mapped to the common resources. In FIG. 71, the horizontal axis represents time t, and the vertical axis represents a frequency f. FIG. 71 illustrates the example structure only during a predetermined duration, and similar mapping is performed during a time other than this.

The frame format FF4 common to the UEs is supported by a carrier different from carriers by which the frame formats FF1, FF2, and FF3 are supported. The carriers may be component carriers. Regions each consisting of one or more sub-carriers are allocated to the common frame format.

The regions of the common frame format FF4 are denoted by references "5701", "5702", and "5703". At least one of the synchronization signal and the shared channel in the frame format FF4 is mapped to each of the regions denoted by the references "5701", "5702", and "5703". At least one of the synchronization signal and the shared channel in the frame format FF4 may be periodically mapped.

In the example illustrated in FIG. 71, one or more sub-carriers to which the common frame format FF4 is allocated are not configured during the entire duration. Only the f-t resources to which at least one of a common synchronization signal and a common shared channel in a common frame format is mapped are configured in the common frame format FF4.

Without being limited to this, one or more sub-carriers to which the common frame format FF4 is allocated may be configured during the entire duration. Nothing should be transmitted on resources other than the f-t resources to which at least one of a common synchronization signal and a common shared channel in a common frame format is mapped. Alternatively, at least one of a different signal and a different channel in the frame format FF4 may be transmitted.

Making a difference between the carriers that support the frame formats FF1, FF2, and FF3 and the carrier that supports the frame format FF4 common to the UEs enables transmission and reception of at least one of the synchronization signal and the shared channel in the frame format FF4 common to the UEs, without influencing at least one of the signals and the channels to be transmitted and received in the frame formats FF1, FF2, and FF3. The carriers may be component carriers.

Application of the method disclosed in this first modification enables transmission or reception of at least one of the common synchronization signal and the common shared channel in the common frame format and also access to a radio access network, even when a plurality of frame formats are used within the same carrier.

The embodiments and the modifications are merely illustrations of the present invention, and can be freely combined within the scope of the present invention. Any constituent elements of the embodiments and the modifications can be appropriately modified or omitted.

While the invention has been described in detail, the foregoing description is in all aspects illustrative and not restrictive. It is therefore understood that numerous modifications and variations can be devised without departing from the scope of the invention.

DESCRIPTION OF REFERENCES 701 coverage of macro cell, 702 coverage of small cell, 703 user equipment (UE).

The invention claimed is:

1. A communication system comprising:
a plurality of cells configuring one or more base station devices; and
a communication terminal device configured to perform radio communication with each of the cells,
wherein each of the cells includes a plurality of antenna elements, and performs the radio communication with the communication terminal device through the plurality of antenna elements, and
each of the cells notifies the other cells of its settings for measuring channel information on a channel used thereby, and
each of the cells broadcasts, via a master information block (MIB) of a broadcast control channel (BCCH), its settings for measuring the channel information on the channel used thereby to the communication terminal device.

2. The communication system according to claim 1, wherein the communication terminal device measures the channel information based on the settings for measuring the channel information that have been broadcast from each of the cells, and reports a result of the measured channel information to a corresponding one of the cells when the result of the measured channel information satisfies a predetermined reporting condition.

* * * * *